(12) United States Patent
Knutsson

(10) Patent No.: US 9,403,092 B2
(45) Date of Patent: Aug. 2, 2016

(54) METHOD FOR IMPLEMENTING A COMPUTER GAME

(71) Applicant: King.com Limited, St. Julians (MT)

(72) Inventor: Sebastian Knutsson, Stockholm (SE)

(73) Assignee: KING.COM LTD., St. Julians (MT)

( * ) Notice: Subject to any disclaimer, the term of this patent is extended or adjusted under 35 U.S.C. 154(b) by 224 days.

(21) Appl. No.: 14/029,404

(22) Filed: Sep. 17, 2013

(65) Prior Publication Data

US 2014/0135104 A1    May 15, 2014

Related U.S. Application Data

(60) Provisional application No. 61/701,907, filed on Sep. 17, 2012, provisional application No. 61/811,019, filed on Apr. 11, 2013, provisional application No. 61/818,702, filed on May 2, 2013, provisional (Continued)

(30) Foreign Application Priority Data

| Feb. 6, 2013 | (GB) | 1302121.7 |
| Feb. 19, 2013 | (GB) | 1302910.3 |
| Mar. 12, 2013 | (GB) | 1304442.5 |
| Mar. 12, 2013 | (GB) | 1304444.1 |
| Mar. 13, 2013 | (GB) | 1304545.5 |
| Apr. 4, 2013 | (GB) | 1306117.1 |
| Apr. 4, 2013 | (GB) | 1306118.9 |
| Jun. 13, 2013 | (GB) | 1310589.5 |
| Jun. 13, 2013 | (GB) | 1310592.9 |
| Jun. 21, 2013 | (GB) | 1311119.0 |
| Aug. 7, 2013 | (GB) | 1314147.8 |
| Sep. 10, 2013 | (GB) | 1316045.2 |

(51) Int. Cl.
*G06F 17/00* (2006.01)
*A63F 13/25* (2014.01)

(Continued)

(52) U.S. Cl.
CPC .............. *A63F 13/25* (2014.09); *A63B 71/06* (2013.01); *A63F 13/00* (2013.01); *A63F 13/005* (2013.01);

(Continued)

(58) Field of Classification Search
USPC ....................................... 463/16–25
See application file for complete search history.

(56) References Cited

U.S. PATENT DOCUMENTS

| 5,488,496 A | 1/1996 | Pine |
| 6,068,552 A | 5/2000 | Walker et al. |

(Continued)

FOREIGN PATENT DOCUMENTS

| DE | 103 04 725 A1 | 9/2004 |
| EP | 1564698 A2 | 8/2005 |

(Continued)

OTHER PUBLICATIONS

Anonymous: "Why King.com's Candy Crush is crushing it on Facebook," XP055085338, retrieved from the Internet: URL: http://blog.games.com/2012/05/01/why-king-coms-candy-crush-is-crushing-it-on-facebook/ [retrieved on Oct. 25, 2013, pp. 1-4 (May 1, 2012).

(Continued)

*Primary Examiner* — Ronald Laneau
(74) *Attorney, Agent, or Firm* — Saul Ewing LLP

(57) ABSTRACT

A method, implemented as computer code being executed by one or more processors, in which computer game graphics for a casual, social game are shown on a display of a computing device and in which one or more of the processors are programmed such that game state information is preserved, enabling a remote server system to identify a player and aspects of the state of the game they are playing, so that the player can end game play on one device and resume, from the same and also from a different device at a later time, at the same state.

19 Claims, 97 Drawing Sheets

Related U.S. Application Data application No. 61/827,298, filed on May 24, 2013, provisional application No. 61/832,348, filed on Jun. 7, 2013, provisional application No. 61/832,355, filed on Jun. 7, 2013, provisional application No. 61/832,359, filed on Jun. 7, 2013, provisional application No. 61/832,362, filed on Jun. 7, 2013, provisional application No. 61/832,364, filed on Jun. 7, 2013, provisional application No. 61/832,369, filed on Jun. 7, 2013.

(51) Int. Cl.
| | |
|---|---|
| *G07F 17/32* | (2006.01) |
| *A63F 13/00* | (2014.01) |
| *A63B 71/06* | (2006.01) |
| *A63F 13/30* | (2014.01) |
| *A63F 13/40* | (2014.01) |
| *G06F 9/44* | (2006.01) |

(52) U.S. Cl.
CPC ............... *A63F 13/10* (2013.01); *A63F 13/12* (2013.01); *A63F 13/30* (2014.09); *G06F 9/44* (2013.01); *G07F 17/32* (2013.01); *G07F 17/3274* (2013.01)

(56) References Cited

U.S. PATENT DOCUMENTS

| | | | |
|---|---|---|---|
| 6,117,013 | A | 9/2000 | Eiba |
| 7,073,792 | B2 | 7/2006 | Esposito |
| 7,749,060 | B1 | 7/2010 | Olmes et al. |
| 8,002,633 | B2 | 8/2011 | Shimizu |
| 8,088,010 | B1 | 1/2012 | Hill |
| 8,237,743 | B2 | 8/2012 | Csurka et al. |
| 8,277,320 | B1 | 10/2012 | Hart et al. |
| 8,369,873 | B2 | 2/2013 | Krasner |
| 8,526,490 | B2 * | 9/2013 | Perlman et al. .......... 375/240.01 |
| 8,672,744 | B1 | 3/2014 | Gronkowski et al. |
| 8,711,923 | B2 * | 4/2014 | Perlman et al. .......... 375/240.01 |
| 8,727,893 | B2 * | 5/2014 | Lee et al. .................... 463/42 |
| 8,784,181 | B2 | 7/2014 | Frank et al. |
| 8,964,830 | B2 * | 2/2015 | Perlman et al. .......... 375/240.01 |
| 9,033,803 | B1 | 5/2015 | Etter et al. |
| 2002/0068632 | A1 | 6/2002 | Dunlap et al. |
| 2002/0082068 | A1 | 6/2002 | Singhal |
| 2002/0094870 | A1 | 7/2002 | Murray |
| 2003/0049592 | A1 | 3/2003 | Park |
| 2003/0074416 | A1 | 4/2003 | Bates et al. |
| 2003/0119581 | A1 | 6/2003 | Cannon et al. |
| 2004/0053688 | A1 | 3/2004 | Hosaka et al. |
| 2004/0137987 | A1 | 7/2004 | Nguyen et al. |
| 2004/0224772 | A1 | 11/2004 | Canessa et al. |
| 2005/0256985 | A1 | 11/2005 | Shea |
| 2006/0068876 | A1 | 3/2006 | Kane et al. |
| 2006/0160620 | A1 | 7/2006 | Matthews et al. |
| 2006/0223635 | A1 | 10/2006 | Rosenberg et al. |
| 2006/0277474 | A1 | 12/2006 | Robarts et al. |
| 2006/0281541 | A1 | 12/2006 | Nguyen et al. |
| 2006/0287098 | A1 | 12/2006 | Morrow et al. |
| 2007/0077993 | A1 | 4/2007 | Midgley et al. |
| 2007/0259709 | A1 | 11/2007 | Kelly et al. |
| 2008/0005353 | A1 | 1/2008 | Panabaker et al. |
| 2009/0170608 | A1 | 7/2009 | Herrmann et al. |
| 2009/0203415 | A1 | 8/2009 | Falciglia et al. |
| 2009/0209311 | A1 | 8/2009 | Bennett et al. |
| 2010/0144426 | A1 | 6/2010 | Winner et al. |
| 2010/0151934 | A1 | 6/2010 | Kniberg et al. |
| 2010/0218135 | A1 | 8/2010 | Brugler et al. |
| 2010/0227675 | A1 | 9/2010 | Luxton et al. |
| 2010/0271367 | A1 | 10/2010 | Vaden et al. |
| 2010/0317437 | A1 | 12/2010 | Berry et al. |
| 2011/0014977 | A1 | 1/2011 | Yamazaki et al. |
| 2011/0053681 | A1 | 3/2011 | Goldman et al. |
| 2011/0111835 | A1 | 5/2011 | Cohen et al. |
| 2011/0136561 | A1 | 6/2011 | Acres et al. |
| 2011/0136572 | A1 | 6/2011 | Karn et al. |
| 2011/0269532 | A1 | 11/2011 | Shuster et al. |
| 2012/0030094 | A1 | 2/2012 | Khalil et al. |
| 2012/0040752 | A1 | 2/2012 | Koo et al. |
| 2012/0077580 | A1 | 3/2012 | Mahajan et al. |
| 2012/0079126 | A1 | 3/2012 | Evans et al. |
| 2012/0122552 | A1 | 5/2012 | Youm et al. |
| 2012/0191606 | A1 | 7/2012 | Milne et al. |
| 2012/0198417 | A1 | 8/2012 | Haviv et al. |
| 2013/0035164 | A1 | 2/2013 | Osvald et al. |
| 2013/0172061 | A1 | 7/2013 | Iosilevsky et al. |
| 2013/0267285 | A1 | 10/2013 | Kelley et al. |
| 2013/0316832 | A1 | 11/2013 | Olofsson et al. |
| 2013/0323697 | A1 | 12/2013 | Shadduck et al. |
| 2013/0331162 | A1 | 12/2013 | Krivicich et al. |
| 2014/0024450 | A1 | 1/2014 | Ramachandran et al. |
| 2014/0080600 | A1 | 3/2014 | Knutsson et al. |
| 2014/0235338 | A1 | 8/2014 | Hansson et al. |
| 2014/0252987 | A1 | 9/2014 | Hinrichs et al. |
| 2014/0342791 | A1 | 11/2014 | Valeriano et al. |
| 2014/0357367 | A1 | 12/2014 | Lee |
| 2014/0370950 | A1 | 12/2014 | Jaksch et al. |
| 2015/0050997 | A1 | 2/2015 | Suzman et al. |
| 2015/0174489 | A1 | 6/2015 | Evald et al. |

FOREIGN PATENT DOCUMENTS

| | | | |
|---|---|---|---|
| EP | 1 870 143 | A1 | 12/2007 |
| EP | 2211299 | A2 | 7/2010 |
| JP | 2005-228086 | | 8/2005 |
| WO | WO01/46790 | A2 | 6/2001 |
| WO | 2006/052212 | A1 | 5/2006 |
| WO | 2007/078533 | A2 | 7/2007 |
| WO | 2008/109685 | A2 | 9/2008 |
| WO | 2009/029108 | A1 | 3/2009 |
| WO | 2010/002897 | | 1/2010 |
| WO | WO 2010/045716 | A1 | 4/2010 |
| WO | 2010/083346 | A1 | 7/2010 |
| WO | WO 2010/096784 | A1 | 8/2010 |
| WO | 2011/011466 | | 1/2011 |
| WO | WO 2011/041467 | A2 | 4/2011 |
| WO | WO 2012/013198 | A1 | 2/2012 |
| WO | WO 2013/174933 | | 11/2013 |

OTHER PUBLICATIONS

Anonymous: "Facebook Spiel Candy Crush Saga: Cheats, Tipps, News und Videos BILDspielt," XP055085339, retrieved from the Internet: URL: http://www.bildspielt.de/social-games/3-gewinnt/candy-crush-saga-180643/ [retrieved on Oct. 25, 2013], pp. 1-10 (Apr. 12, 2012).

Collins: "Will Collins Game Spotlight: Candy Crush Sage," XP055085345, retrieved from the Internet: URL:https//developers.facebook.com/blog/post/2012/06/15/game-spotlight-candy-crush-saga/ [retrieved on Oct. 25, 2012], pp. 1-2 (Jun. 15, 2012).

"King.com Skill Games for iPhone and Facebook: http://www.ubergizmo.com/2008/07/king-com-skill-games-for-iphone-and-facebook/", XP055085351, retrieved from the Internet: URL:http://www.google.de/imgres?client=firefox-a&hs=0gJ&sa=X&rls=org.mozilla:en-GB:official&biw=1680&bih=858&tbm=isch&tbnid=Dp0hnHVKMxtoUM:&imgreful=http://www.ubergizmo.com/2009/07/king-com-skill-games-for-iphone-and-facebook/&docid=fJQdwQQyyLis3M&imgurl=http://cdn.ubergizmo.com/photos/2009/7/Amazon-s [retrieved on Oct. 25, 2013], pp. 1-2 (Jul. 13, 2009).

International Search Report, dated Jan. 14, 2014, and Written Opinion, issued in corresponding International Application No. PCT/EP2013/069308.

Anonymous, "Amazon Survival YouTube video, Uploaded to YouTube on Mar. 13, 2009, video length 6:06", https://www.youtube.com/watch?v=8S2gM5POUUk, Mar. 13, 2009, 1.

Anonymous, "Bejeweled 2 Wikipedia Article", Sep. 30, 2015, 1-3.

Anonymous, "Bejeweled article", Wikipedia, Sep. 30, 2015.

Anonymous, "Best iOS/Android cross-platform mobiledevelopment SDKs", retrieved from the Internet: URL:http://webification.

(56) References Cited

OTHER PUBLICATIONS com/best-iosandroid-cross-platform-mobile-development-sdks [retrieved on Jul. 2, 2013] XP055069062, Sep. 26, 2011, p. 1.
Anonymous, "Bubble Witch Saga—GameSpot", Retrieved from the Internet: URL:http://www.gamespot.co/bubble-witch-saga/ [retrieved on Mar. 21, 2014] XP055109245, pp. 1-2.
Anonymous, "Buck Rodgers Turn Based Strategy Game Design and Planning Document", https://cs.nyu.edu/courses/spring07/V22.0474.001/groups/tbsgame/tbsgame_des.pdf, Feb. 21, 2007.
Anonymous, "Candy Crush Saga Facebook Game levels 1-10 video on YouTube, YouTube screen shorts figures 1-7", https://www.youtube.com/watch?v=8TleNDnJiN8, Apr. 15, 2012.
Anonymous, "Candy Crush Saga for Facebook, YouTube video demonstrating levels 1-10, video length 15:23", https://www.youtube.com/watch?v=cfqHVkWX5yE, Apr. 12, 2012, 1 page.
Anonymous, "Candy Crush Saga on Facebook Review on YouTube video, Screen shots of YouTube video, figures 1-13", https://www.youtube.com/watch?v=AbH8Givg6XM, Sep. 7, 2012.
Anonymous, "Cross-platform", retrieved from the Internet: URL:http://en.widipedia.org/w/index.php?title=Cross-platform&oldid=487867404 [retrieved on Jul. 1, 2013] XP055068984, Apr. 17, 2012, pp. 1-16.
Anonymous, "Daily Bonus Level Oct. 17, 2012: Bubble Witch Saga Fan Site", retrieved from the Internet:URL:http://bubble-witch-saga.se/daily-bonus-level-17-oct-2012/ [retrieved on Mar. 21, 2014] XP055109244, Oct. 17, 2012, pp. 1-2.
Anonymous, "Dig Dug article", Wikipedia, Sep. 30, 2015.
Anonymous, "Facebook Platform—Wikipedia, the free encyclopedia", Retrieved from the Internet: URL:http://en.wikipedia.org/w/index/php?title=Facebook_Platofrm&oldid=533105338 [retrieved on Mar. 21, 2014] XP055109249, pp. 1-2.
Anonymous, "Game Architecture: Model-View-Controller", retrieved from the Internet: URL:http://www.koonsolo.com/news/model-view-controller-for-games/ [retrieved on Oct. 8, 2013] XP055083073, Jul. 13, 2009, pp. 1-2.
Anonymous, "Guide to Bubble Witch Saga—Facebook Hints & Tips—How to level guide", retrieved from the Internet: URL:http://reindeerz.hubpags.com/hub/Bubblewitch [retrieved on Dec. 9, 2012] XP055092347, Apr. 10, 2012, pp. 1-2.
Anonymous, "iPhone Game 'Trism' break $250,000. Review.—[Updated] razorianflyofficial", retrieved from the Internet: URL: https://razorianflyofficial.wordpress.com/2008/09/25/iphone-game-trism-breaks-25000-review/, [retrieved on Apr. 15, 2015] XP055183153, Sep. 26, 2008.
Anonymous, "King.com expands to Google+ with Bubble Witch Saga", Retrieved from the Internet: URL:http://www.insidesocialgames.com/2012/01/24/king-com-expands-to-google-with-bubble-witch-saga/ [retrieved on Mar. 21, 2014] XP055109246, Jan. 24, 2012, pp. 1-2.

Anonymous, "Minecraft", retrieved from the Internet: URL:http://en.widipedia.org/w/index?title=Minecraft&oldid=409326251 [retrieved on Jul. 1, 2013] XP055068987, May 2, 2014.
Anonymous, "Model-view-controller", retrieved from the Internet: URL:http://en.widipedia.org/w/index/php?title=Model%E2%80%93view%E2%80%93controller&oldid=511810952 'retrieved on Oct. 8, 2013] XP055083072, Sep. 11, 2012, pp. 1-2.
Anonymous, "OpenOffice, Creating Charts and Graphs", Dec. 2004, 1-17.
Anonymous, "Pygame", retrieved from the Internet: URL:http://web.archive/org/web/20120413123244/http://www.pygame.org/wiki/tut_design [retrieved on Oct. 8, 2013 XP055083074, Apr. 13, 2012, pp. 1-5.
Anonymous, "Search for Play Free Online Games on GamesGames.com Home Action Strategy Bomberman War Games Shoot & Throw Worms Fly & Shoot Run & Shoot Tower Defence Flying Wreck the City Adventure Collect & Run Puzzle & Run Role Playing Games Escaping Jump & Shoot Point", retrieved from the Internet: URL:http://web.archive.org/web/20120621061714/http://www.gamesgames.com/games/social-games/social-games.html [retrieved on Oct. 15, 2013] XP055084089, Jun. 21, 2012, pp. 4-6.
Demeter, "Trism: Upcoming iPhone Game by Demiforce", retrieved from the Internet: URL: https://www.youtube.com/watch?v=hy0ptZisr70, [retrieved on Apr. 16, 2015] XP054975820, Feb. 26, 2008.
Dotson, "Bubble Witch Saga Pops Bubbles o iOS and Facebook >148Apps> iPhone, iPad, and iPod touch App Reviews and News", retrieved from the Internet: URL:http://www.148apps.com/news/bubble-witch-saga-pops-bubbles-ios-facebook/ [retrieved on Dec. 9, 2013] XP055092342, Jul. 27, 2012, pp. 1-2.
Duffy, "Home Product Guies Software Internet 7 Great Google+ Games You Might Also Like", retrieved from the Internet: URL:http://www.pcmag.com/article2/0,2817,2391136,00.asp [retrieved on Oct. 15, 2013] XP055084091, Aug. 16, 2011, p. 1.
Josef, "Bloxley Tutorial #1—Sokoban", http://bloxley.net/2010/10/tutorial-1-sokoban, Oct. 13, 2010.
Murphy, "Bejeweled 2 Strategy Guide", www.bigfishgames.com, Aug. 15, 2010.
NAMCO, "Dig Dug Video Game", 1982.
POPCAP, "Bejeweled Video Game", 2001.
Rua, "Candy Crush Saga Gameplay First Look (Episode 1-10 levels)", retrieved from the Internet: URL: https://www.youtube.com/watch?v=8TleNDnJiN8 [retrieved on Apr. 16, 2015]XP054975821, Apr. 15, 2012.
Schoenau-Fog, "The Player Engagement Process—An Exploration of Continuation Desire in Digital Games", http://www.digra.org/wp--content/uploads/digital-library/11307.06025.pdf, 2011.
Squires, "Bubble Witch Saga is going mobile—Gamezebo", retrieved from the Internet: URL:http://www.gamezebo.com/news/2012/06/27/bubble-witch-saga-going-mobile [retrieved on Dec. 9, 2013] XP055092339, Jun. 27, 2012, pp. 1-2.

* cited by examiner

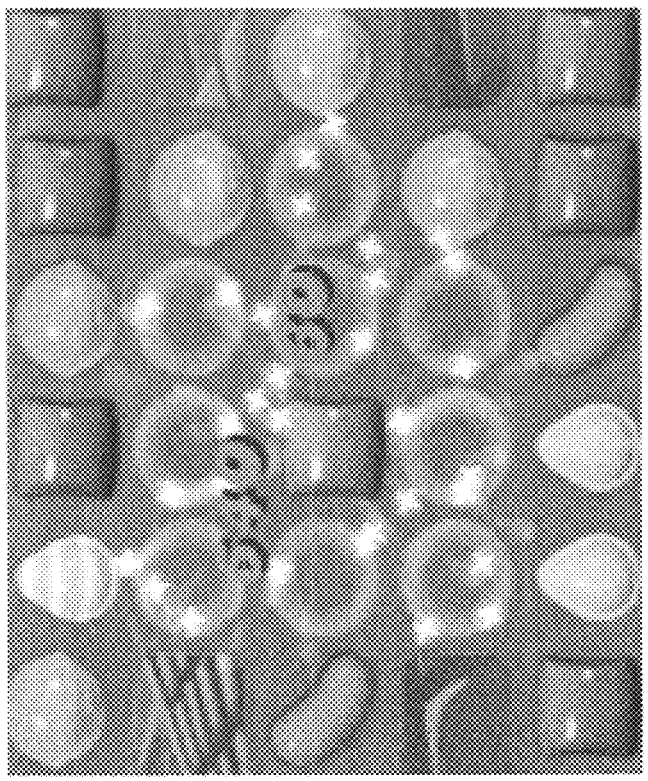
Figure 18

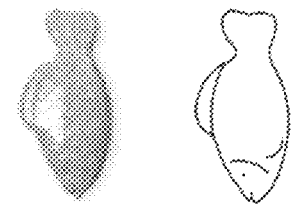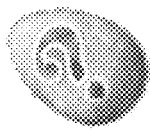
Figure 21

METHOD FOR IMPLEMENTING A COMPUTER GAME

CROSS-REFERENCE TO RELATED APPLICATIONS

This application is based on, and claims priority to U.S. Provisional Application No. 61/701,907, filed Sep. 17, 2012; UK Application No. 1302121.7, filed Feb. 6, 2013; UK Application No. 1302910.3, filed Feb. 19, 2013; UK Application No. 1304442.5, filed Mar. 12, 2013; UK Application No. 1304444.1, filed Mar. 12, 2013; UK Application No. 1304545.5, filed Mar. 13, 2013; UK Application No. 1306117.1, filed Apr. 4, 2013; UK Application No. 1306118.9, filed Apr. 4, 2013; U.S. Provisional Application No. 61/811,019, filed Apr. 11, 2013; U.S. Provisional Application No. 61/818,702, filed May 2, 2013; U.S. Provisional Application No. 61/827,298, filed May 24, 2013; U.S. Provisional Application No. 61/832,348, filed Jun. 7, 2013; U.S. Provisional Application No. 61/832,355, filed Jun. 7, 2013; U.S. Provisional Application No. 61/832,359, filed Jun. 7, 2013; U.S. Provisional Application No. 61/832,362, filed Jun. 7, 2013; U.S. Provisional Application No. 61/832,364, filed Jun. 7, 2013; U.S. Provisional Application No. 61/832,369, filed Jun. 7, 2013; UK Application No. 1310589.5, filed Jun. 13, 2013; UK Application No. 1310592.9, filed Jun. 13, 2013; UK Application No. 1311119.0, filed Jun. 21, 2013; UK Application No. 1314147.8, filed Aug. 7, 2013; and UK Application No. 1316045.2, filed Sep. 10, 2013, the entire contents of each of which being fully incorporated herein by reference.

BACKGROUND OF THE INVENTION

1. Field of the Invention

The inventions related to casual social games.

2. Technical Background

Computer implemented games is a well known category of games that allow a player to interact with a computing device to cause the processor to perform certain calculations and typically display a result on a screen or other display device.

Different types of games have evolved from classical arcade games in to games that can be played on a handheld device such as a smartphone or personal computer. Some games are also connected to the Internet and the player can play against or compare score with other users in multiplayer mode.

There are multiple technical challenges facing the designer of computer-implemented games to create a fun and compelling game. Three of these challenges can be broadly categorised into the following areas: 'engagement'; 'viralisation' and 'monetisation'.

We will look first at 'engagement', which involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce players' sense of success and accomplishment. Effective engagement can be greatly magnified if the game has as social aspect—for example if it is linked to a social network so that game players can interact with their friends in the social network. The game can then transform into something that goes far beyond a solo game experience and become more like a shared journey.

'Viralisation' requires a game to include various techniques that encourage players to share the game with others, encouraging them to play the game. It is a key technique in enabling mass-scale distribution or penetration of games. Viralisation can be especially effective when the game is integrated into a social network environment in some manner, so that the game can then propagate through the network of player's friends, and their friends and so on.

'Monetisation' covers those techniques that enable revenue to be generated from a game; this involves many challenges, because the monetisation techniques need to be acceptable to players and in no way undermine engagement.

A successful and original game will require a team of game designers to solve complex problems of engagement, viralisation and monetisation; this can take many months of skilled work and, not infrequently, a great deal of trial-and-error testing of new ideas, functions and game mechanics before a game successfully combines all these elements into a new experience.

A 'match-3 game' is a type of casual puzzle game where the player is required to find patterns on a seemingly chaotic board. The player then has to match three or more of the same type of game element on the game board and those matched elements will then disappear.

One variant of casual games are the so called 'clicker' games where the player can click on a group of adjacent game elements of a certain type and those will then be removed. Some clicker games only require two adjacent objects to remove those elements if clicked by the user.

Another type of match-3 games are the so called 'switcher' games where the player switches place on two adjacent game elements on the game board so that one or both of them create a chain of at least three adjacent game elements of the same type. Those matched game elements will then disappear. In a typical switcher game the game board will be repopulated with game objects from the top of the board with the physics of the game board being that the game pieces are falling downwards on the board.

Another type of match-3 game are the so called 'shooter' games where the player launches for instance a ball or bubble on to the game board tying to aim at groups of similar game elements already on the game board. If the launched ball hits or forms a group of more than 3 similar game elements then that group of game elements are removed from the game board. In a typical shooter game the physics of the game board being that the game pieces are falling downwards on the board.

This patent specification describes not only various ideas and functions, but also their creative expression. A portion of the disclosure of this patent document therefore contains material to which a claim for copyright is made and notice is hereby given: Copyright King.com Limited 2012 and 2013 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

DISCUSSION OF RELATED ART

Casual social games have been implemented before and are known. However previous inventions have not successfully devised effective solutions to one or more of engagement, viralisation and monetisation in the same way as the present invention does.

SUMMARY OF THE INVENTION

A first aspect is:

A method, implemented as computer code being executed by one or more processors, in which computer game graphics for a casual, social game are shown on a display of a computing device and in which one or more of the processors are programmed such that game state information is preserved, enabling a remote server system to identify a player and aspects of the state of the game they are playing, so that the player can end game play on one device and resume, from the same and also from a different device at a later time, at the same state.

Any one or more of the following optional features may be included, resulting in a method:
  in which the game state defines all previously completed levels
  in which the game state defines all previously completed levels, plus the current state of playing a level
  in which the game state defines all boosters, charms or other in-game assistance acquired
  in which the game state defines all boosters, charms or other in-game assistance acquired but not paid for using any form of currency
  in which the casual, social game is a clicker, switcher or shooter game
  in which the different device can be a different type of device, so that the player can move seamlessly between playing the game on a smartphone and on a tablet
  in which a processor is programmed so that game state information is fully sync'd across different types of computing platform, such as iOS, web-based social network application or environment and Android, so that a player can seamlessly stop and re-start playing the game on any of those different platforms
  in which a remote server system can identify a player because that player has accessed the game through a social network
  in which a processor is programmed so that a player's score and game level position and also the scores and game level positions of all their social network friends also playing the game, is fully sync'd across different platforms, such as iOS, web-based social network application or environment and Android, via the social network
  in which a casual, social game is a game that can be downloaded as an app to a smartphone and/or tablet computer and which can be accessed or played using a social network application or environment
  in which a processor is programmed so that every change in the game state, such as every move of a game piece by the user, and every consequential change in every game piece on the game board, is accompanied by sound and visual feedback to provide immediate, positive gratification to the player
  in which a processor is programmed so that a single user database, which may be distributed or centralised, tracks all metrics for all players, including all game state information, irrespective of the platform used by each of those players, and that single user database is accessible by several different games, such as a match 3 switcher and a match 3 clicker, a bubble shooter etc.
  in which a processor is programmed so that a player's score and game level position and also the scores and game level positions of all their social network friends also playing the game, is fully sync'd across different platforms, such as iOS, web-based social network application or environment and Android, and there are sections of the game that must be unlocked through either help from those friends or through a purchase
  in which a processor is programmed so that players can see their own and also their social network friends' game level position on a virtual path or other virtual world and where the player can play the game in offline mode on one platform/device and the progress in the game and other game state information is synchronised with a remote server when the device is online again and the player can continue playing the game on another platform
  in which a processor is programmed so that players can see their own and their social network friends' game level position on a virtual path (or other virtual world), in which the game state information is fully sync'd across different platforms, such as iOS, desktop and Android, and, in which the gameplay for each level can be enhanced through the use of an acquired item, such as a booster, and where the game state information relating to the acquisition or use of an acquired item is synchronized across several different platforms Another aspect is:

A computing device adapted to play a computer game, the device including a processor, a memory, a display, a touch screen or a cursor based input device, and computer code stored in device memory or on a remote server and executable by the device processor or a remote processor, and in which the computer code generates computer game graphics for the display on the device;
  and in which the processor(s) are programmed such that game state information is preserved, enabling a remote server system to identify a player and aspects of the state of the game they are playing, so that the player can end game play on one device and resume, from the same and from a different device at a later time, at the same state.

A final aspect is:

A non-transitory computer readable medium encoded with instructions for controlling a computer system to display a game on a display; and in which the instructions running on the processor(s) enable game state information to be preserved, enabling a remote server system to identify a player and aspects of the state of the game they are playing, so that the player can end game play on one device and resume, from the same and from a different device at a later time, at the same state.

BRIEF DESCRIPTION OF THE DRAWINGS

FIG. 18 shows the triggering of a Wrapped candy its explosion.

FIG. 21 shows an example of some special candies.

FIG. 104 shows notification settings turned on.

DETAILED DESCRIPTION

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

Figure 83:
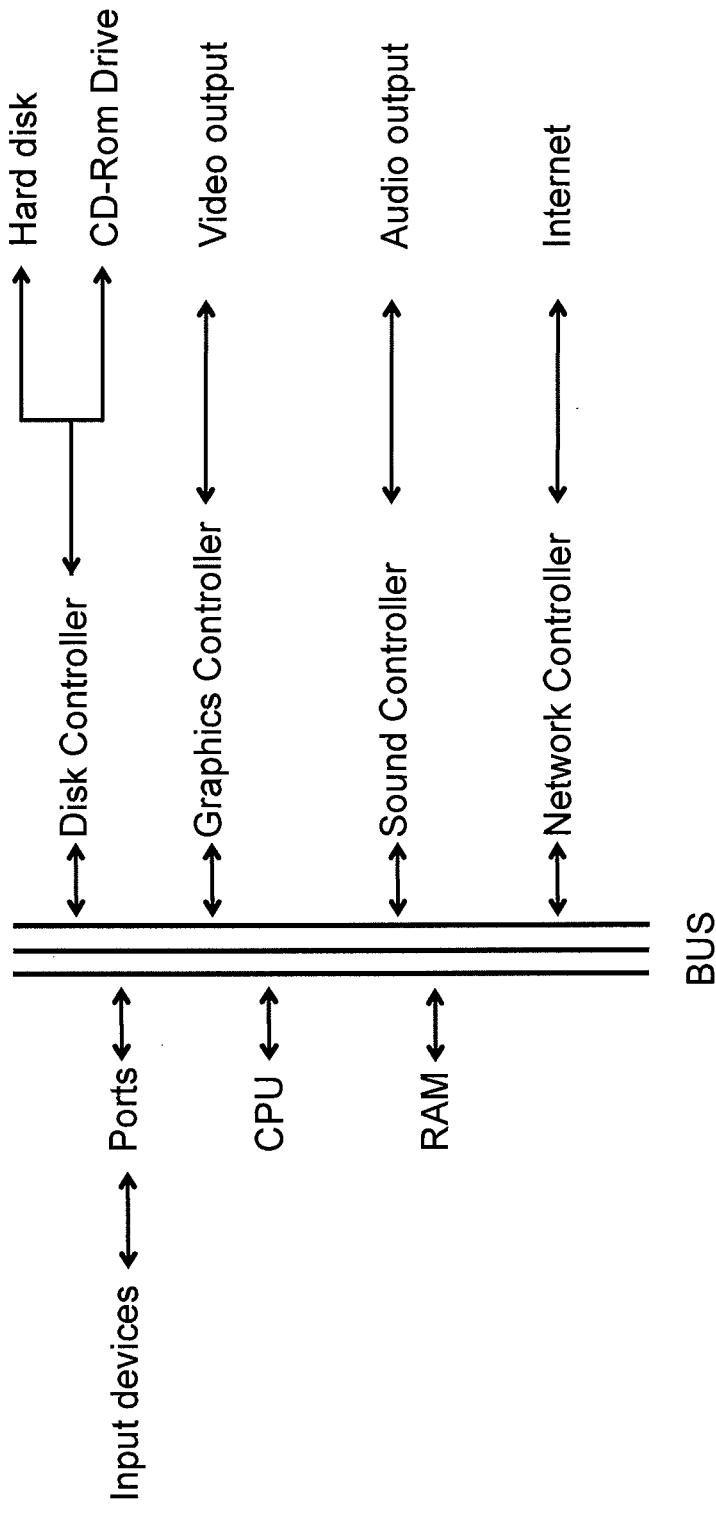
FIG. 83 Schematic illustration of a computing device.

FIG. 83 shows a schematic picture of a computing device, containing a Central Processing Unit and Random Access Memory. The CPU acts according to input given from input devices, such as a keyboard, mouse or touchscreen. Computer BUSes are used to communicate, both between input devices and the CPU, but also between different controllers within the computer device, such as the graphics controller and the network controller. These controllers in turn communicate with external devices, such as a monitor for video output with which the graphics controller communicates, and the network controller communicates with for instance the internet, through wireless or wired connections. A user can interact with the computing device through input devices, such as a pointing device (e.g. a mouse) and a keyboard.

Figure 84:
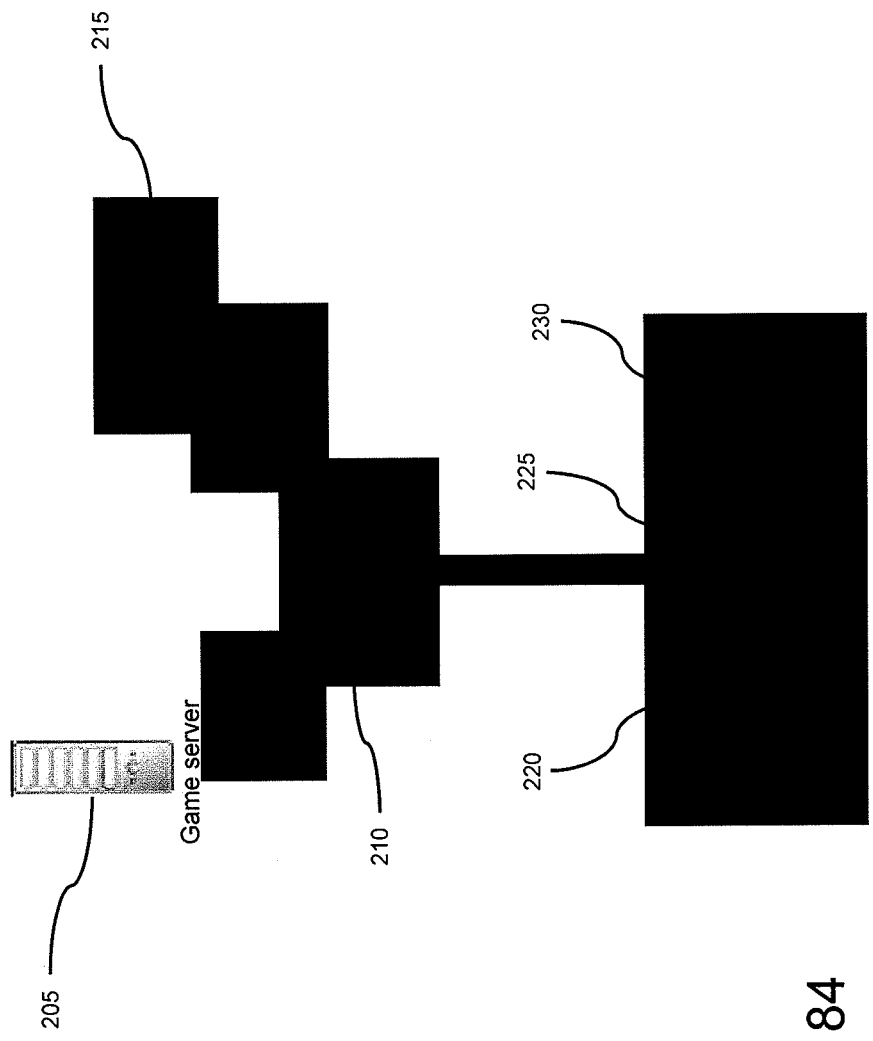
FIG. 84—Exemplary environment.
Figure 85:
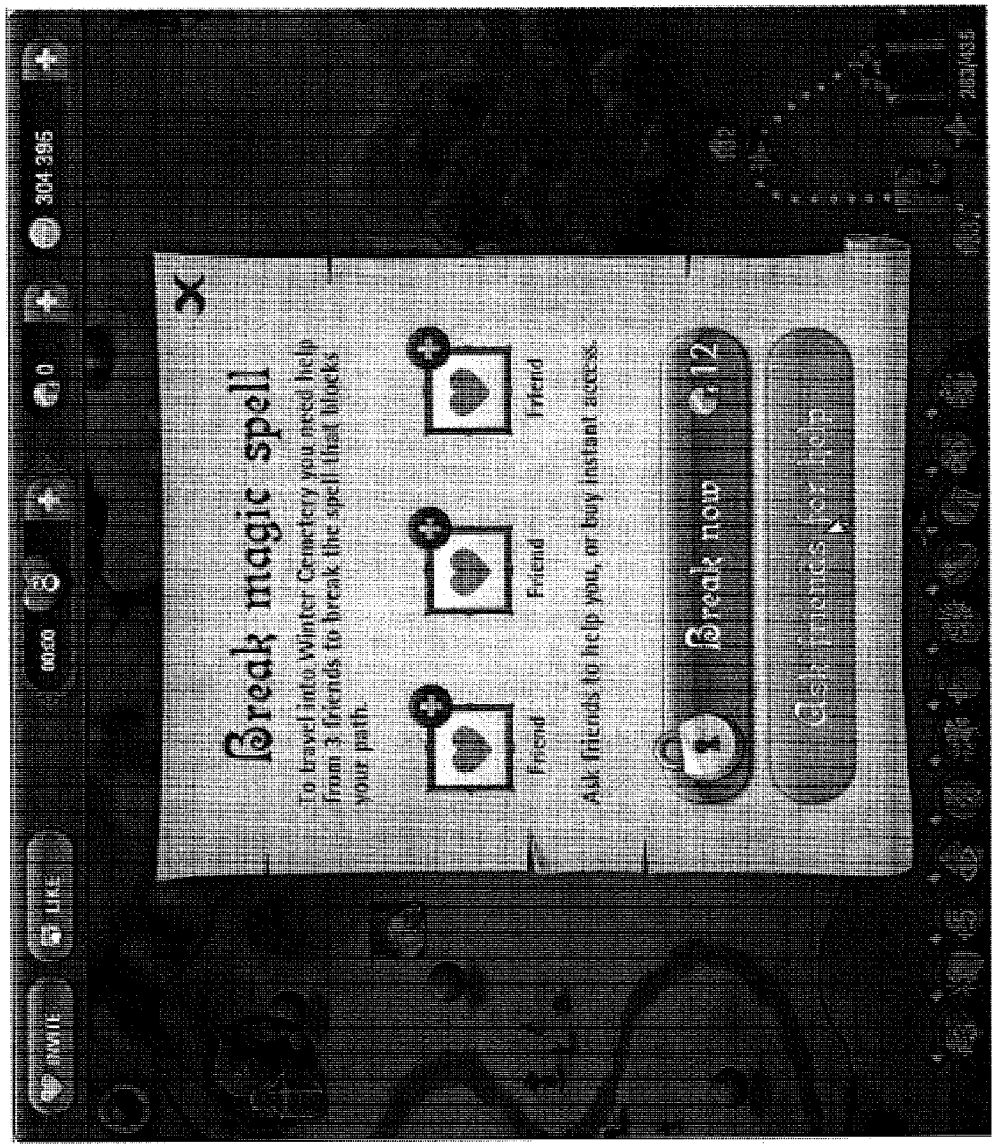
FIG. 85 shows a collaboration block.

FIG. 84 portrays an exemplary overall environment in which the present invention can be utilized. A virtual game is stored on for instance a game server 210. The virtual game is to be played on a client device, such as a computer 240, 250 or a smartphone or other handheld device 260. The client device can also be a kiosk, arcade gaming station, smart TV or other device with computing capabilities, input devices and a screen that can present the game to a user. The client device communicates with a game server 210 and a social network server 230, for instance through the Internet 220 or other network. It should be understood that the social network 230 and the game server 210 does not have to be located in different places, they could be on the same server or on a plurality of servers located in different locations. An environment where the invention may be implemented is described in PCT/EP2013/060641 which is hereby incorporated by reference.

People skilled in the art will understand that other devices than the exemplary ones listed can be also be used without departing from the spirit and scope of the invention.

The techniques described in this patent can be deployed in many different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone etc.) to enable the client to render and display graphics and sounds; this 'web services' approach is increasingly common.

Another approach is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as a keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Over the course of players playing the game, data will be produced. This data can for instance be related to a player's game performance or to game information related to a social network to which the game is connected. It is possible to gather this data, store it and make use of it for instance to improve the game. One example is by using a database to store the amount of times players try and fail a level on average. This data can then be reviewed, and if the players seem to fail a substantial amount of times before completing a level, the difficulty can be adjusted accordingly. The difficulty can be adjusted through changing a score target for the level, increasing the available time or moves or giving the player for instance a booster to enhance the gameplay.

There can be certain performance indicators used to measure the success of the game. These indicators can for instance relate to player retention, the virality of the game and the revenue of the game.

A person skilled in the art will realise that the different approaches to implementing the game is not exhaustive, what is described herein are certain preferred embodiments. It is possible to implement the way in a number of variations without departing from the spirit or scope of the invention.

The terms user and player are used interchangeably throughout this document and no specific meaning is intended using one or the other unless the context suggests otherwise.

Introduction to the Game

The following description will describe some implementations of the inventions described in the document. The examples will be from the game Candy Crush Saga™ by King™. The person skilled in the art will understand that there are many other ways the present ideas can be implemented and the description is not limited to only one implementation.

GLOSSARY/TERMS

Game board: The area where the matching and swapping of elements occur.

Game elements: All elements that appear on the game board.

Standard game elements: These are the six basic candies used for making switches and colour matches on the game board. Compared to special game elements, the standard game elements have no extra properties or behaviour, they are only used to make colour combinations or to create new special game elements.

Ingredients: Game elements that are included in levels where one of the goals to complete the level is to bring down ingredient elements to the bottom of the game board.

Jelly block: A game element that is placed underneath other game elements and need one or two matches on top of them to disappear.

Special game elements: All elements that appear on the game board and which have specific behaviours and properties.

Striped candy: A special candy with a line blast effect which means it removes one row or one column.

Line blast: An effect which removes one row or one column.

Moves & Score Level: In this game mode you have a limited number of switches before running out of moves. If you have not reached the score required to earn at least 1 Star, then you will fail the level.

Jelly Level: In this game mode the game board behind the candy is covered in jelly.

Remove the jelly by matching candy on top of the jelly. If you fail to remove all jelly before running out of moves then you will fail the level.

Ingredients Level: In this game mode, ingredients will appear on the game board. Collect these ingredients by bringing them to their delivery point. On the side of the board you will see a recipe of how many ingredients you need to collect. If you do not bring down all the ingredients before running out of moves then you will fail the level.

Time Limited Level: In this game mode there is a time limit. If you have not reached the score required to earn at least 1 Star when the time runs out, then you will fail the level.

Candy Order level: In this game mode, you are tasked with collecting a number of candies. This is done by removing the wanted candies. If you have not collected all the wanted candies before running out of moves then you will fail the level.

Bomb element: a candy in wrapped paper which removes candies in a 3×3 square area.

Wrapped candy: a candy in wrapped paper which removes candies in a 3×3 square area.

Colour Bomb: Removes all candies of the colour it is being swapped with.

Booster: Something that enhances the gameplay and that supports, assists, or increases power or effectiveness.

Blocker: Special game elements that are unswappable, need 1 or more matches next to them to disappear and are in the way for falling candies.

Figure 1:
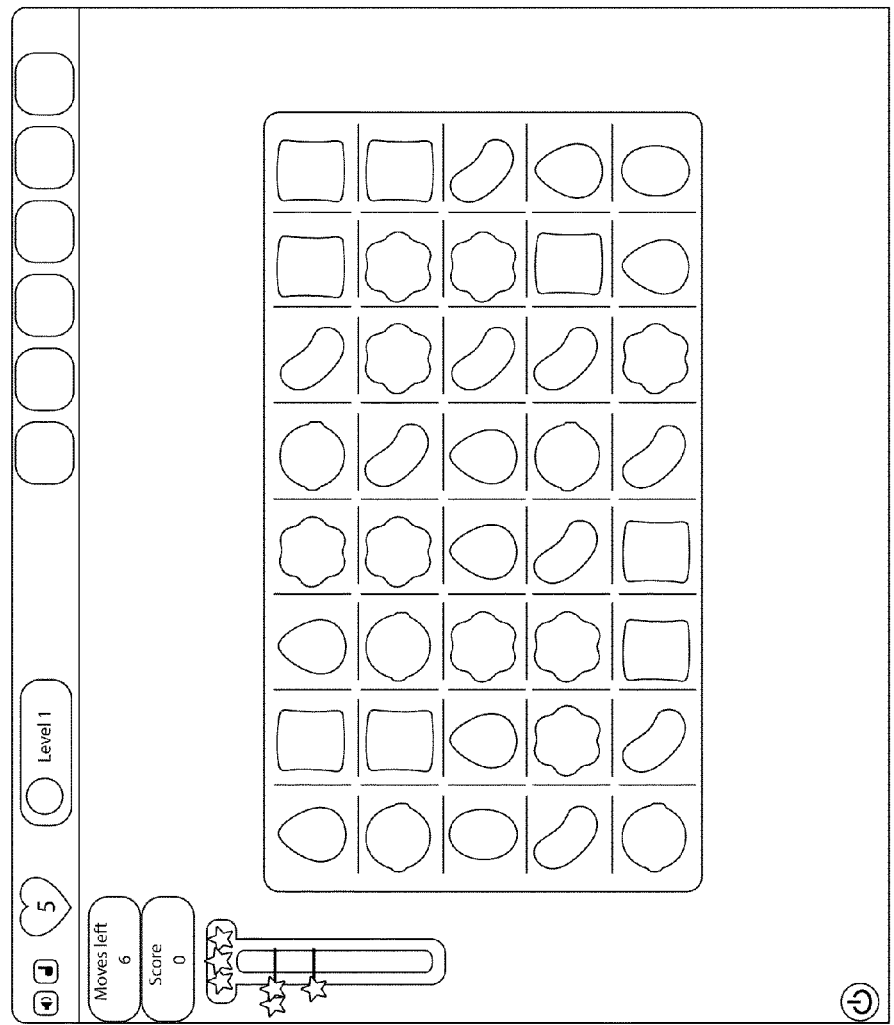
FIG. 1 shows one implementation of a level.
Figure 2:
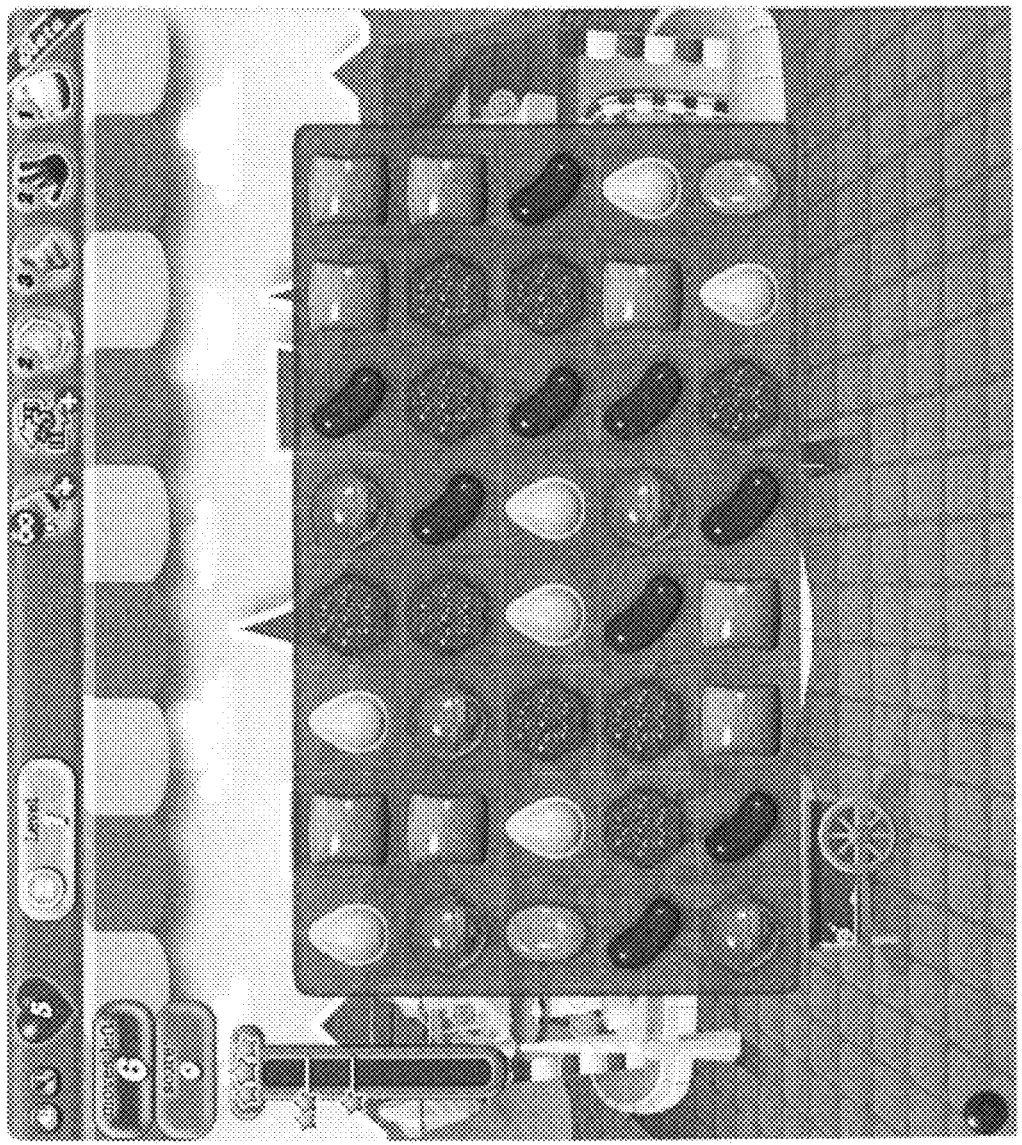
FIG. 2 shows one implementation of a level.

Candy Crush Saga™ by the games developer King™ is a game belonging to the match-3 category of games. This means that the core basic of the game is to match three or more game elements sharing the same colour with each other. In Candy Crush Saga, these game elements are implemented as candies. FIG. 1 and FIG. 2 shows one implementation of the first level in Candy Crush Saga™ where candies have to be matched to complete the level.

The game has more than 350 different levels and not all of those levels have the same requirements to be completed. Simply matching three or more game elements is not enough to complete all levels in the game but the player has to meet certain goals as well. These goals could be to reach a certain amount of points before running out of moves or time; to bring down certain game elements to the bottom of the screen; to remove a certain amount of game elements before running out of moves or to collect certain game elements through specific matches before running out of moves.

If the game becomes difficult there are boosters to help the player pass a level. These can be obtained from in-game purchases or received as gifts from Facebook friends.

Figure 3:
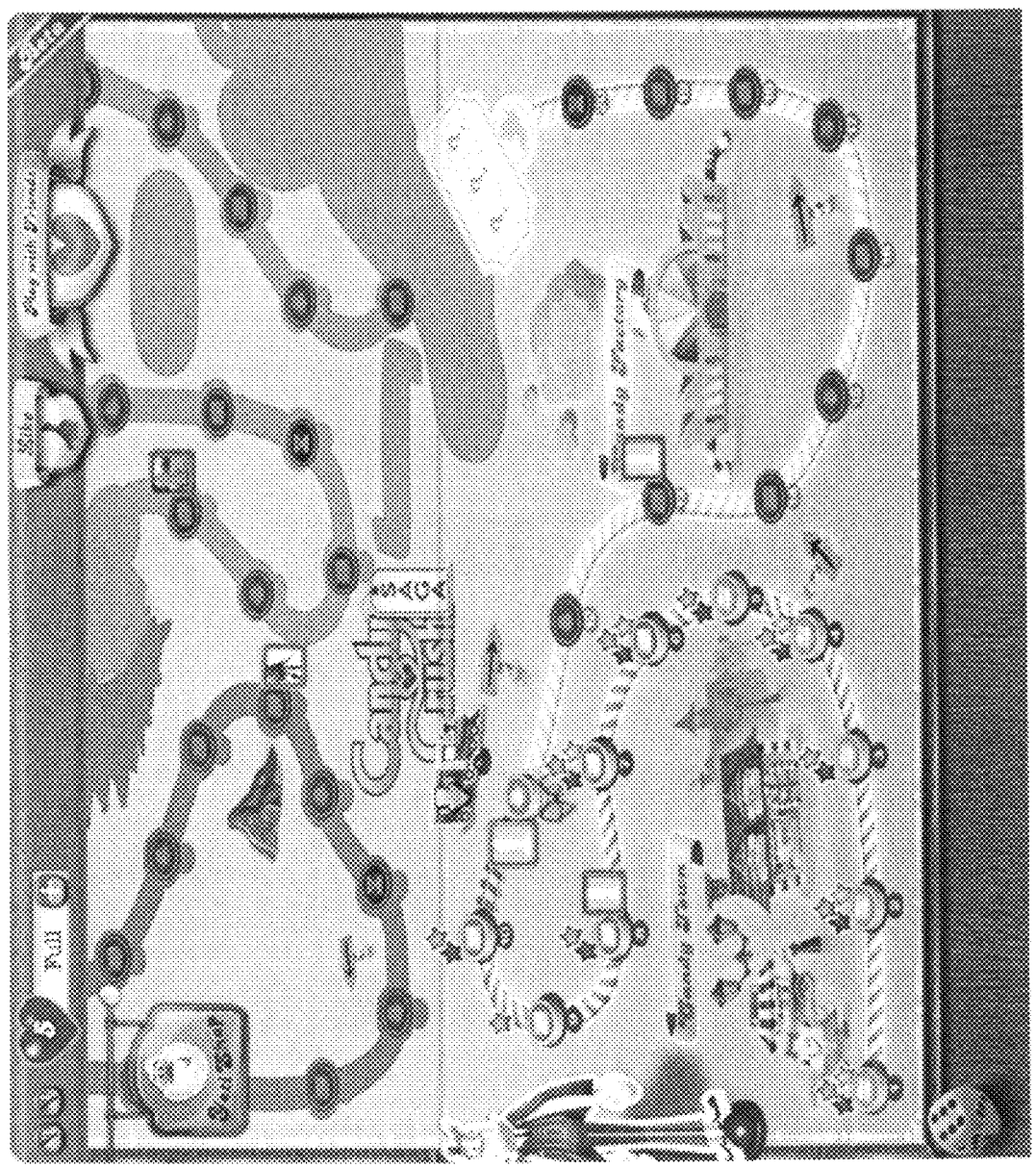
FIG. 3 shows one implementation of a map view.

The game also has a candy land themed map view, FIG. 3 illustrates one implementation of this where the map can be scrolled up and down. The map view shows what levels have been completed as well as how many levels are left to play. Throughout the game and for each level completed, the player journeys across the map and follows the story of a girl who is journeying through the candy land. The map is also divided into different areas where each area has its own candy theme as well as a small story connected to that area.

If the player has connected to a social network by entering login details through a prompt in the game, then friends' progress from the same network can be viewed on the map by the means of their portrait next to the highest level they have currently reached.

If the player connects to the social network Facebook when playing the game, then the game will automatically synchronize and either download or upload the latest changes in the progression of the game. For example, the player could have played the game on another computer via Facebook's own platform and if the player then later decides to play on for example their iPhone, the latest updates would be sent to this device. As long as the player is connected to the internet and has logged in to Facebook via the game, then the game will automatically synchronize and send data to Facebook, making it possible for the player to play on any computer, iOS device or Android device without having to start the game over. This makes the place to play very flexible.

Rules

Basic Moves and Combinations

Moves

To play Candy Crush Saga, game elements in the shape of candies are swapped with each other to make moves on a game board. To gain points the player has to make moves that create matches of at least three of the same candy. If doing so, the player gains points and the matched candies are removed, see FIG. 14. As a result, new candies fall into place from the top of the game board in order to fill any empty spaces created. For all candies that are removed on the game board, points are always shown in the same colour as the candy that was removed, for example three red candies will show red points, green candies green points and so on. If a blocker element would be removed then the points shown would be in the same colour as the candies from the match that removed it.

Only swapping moves that will create at least one combination of at least three game elements of the same type are allowed.

Limited Number of Moves

A typical game mode of Candy Crush Saga provides the player with a limited number of moves to reach the level target.

In some implementations additional moves can be earned by good gameplay.

The Game Board

Figure 5:
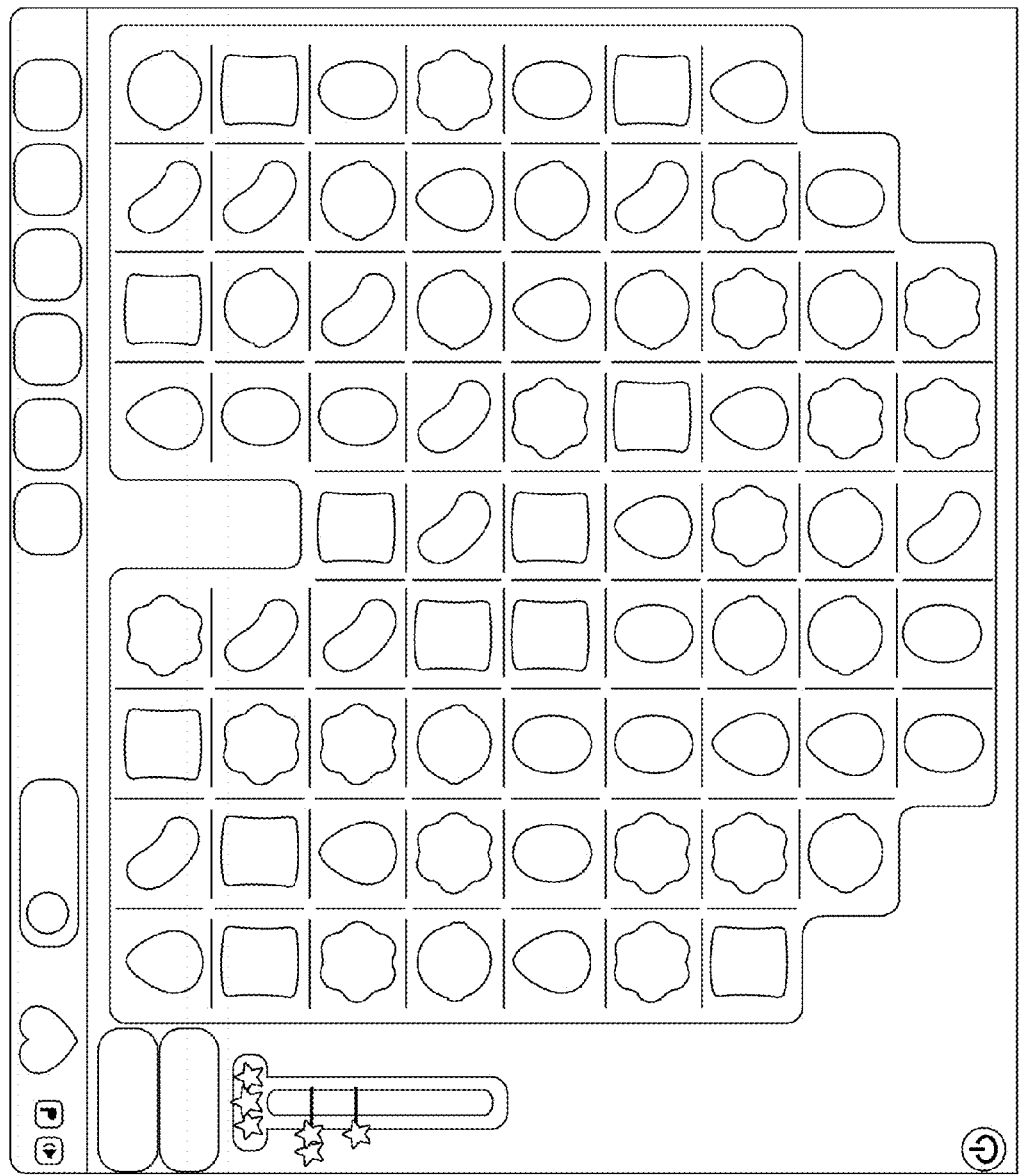
FIG. 5 shows one implementation of a game board's shape within a 9×9 square grid.
Figure 6:
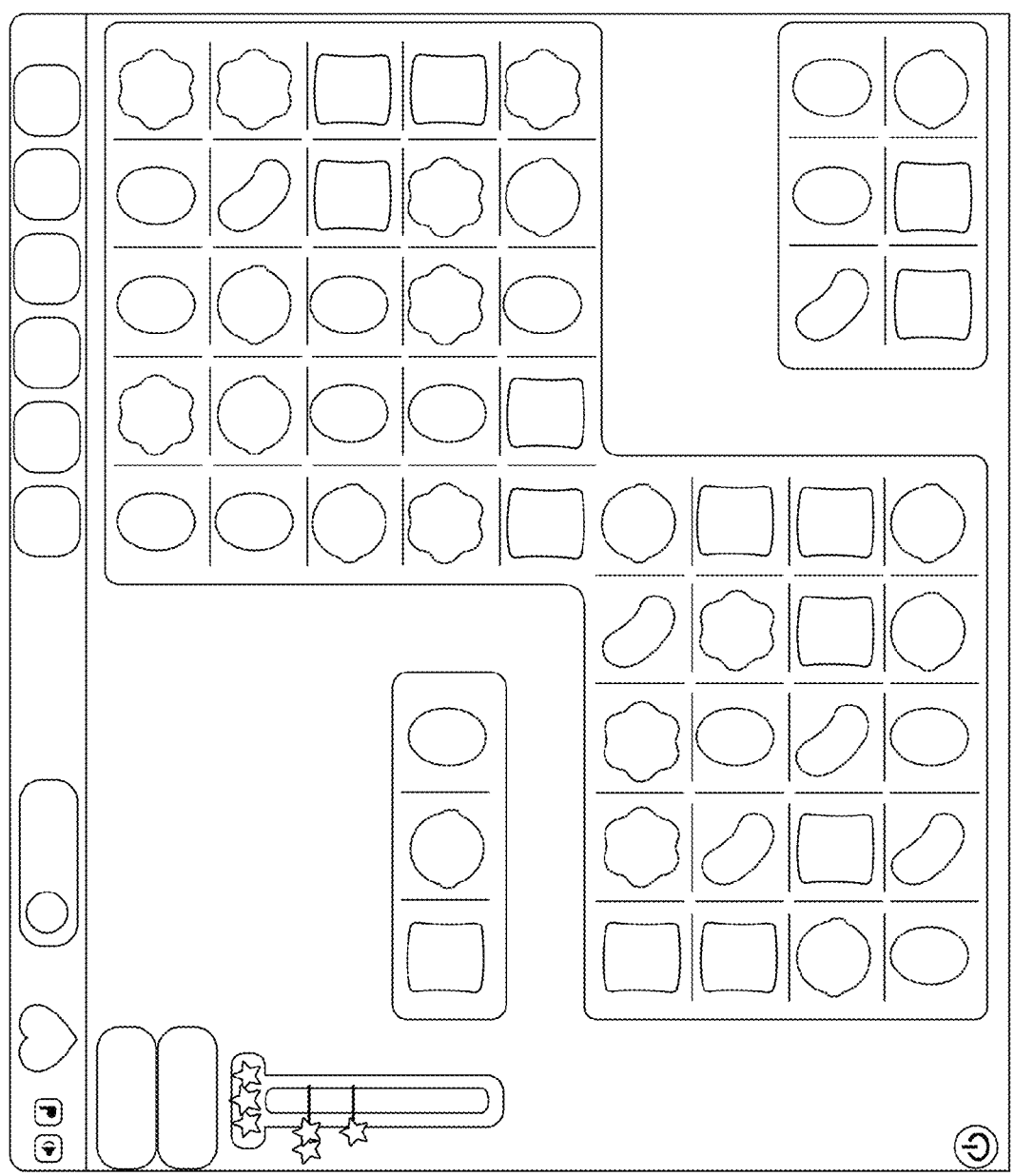
FIG. 6 shows a second implementation of a game board's shape within a 9×9 square grid.

The Candy Crush Saga game board comes in various shapes and sizes. The maximum size is a grid of 9×9 squares but within those limits the shape and size varies between the levels played (see FIG. 5 and FIG. 6). This gives more variety to the game compared to many other games in the match-3 genre where the game board always looks the same.

Different Goals to Complete Levels

To add more diversity and make Candy Crush Saga™ a more dynamic game, players have to fulfil different criteria in order to complete different levels; these are referred to as goals. Each level always has one or more goals that have to be fulfilled in order to complete that level.

Reach a Set Score Before Running Out of Moves

Figure 7:
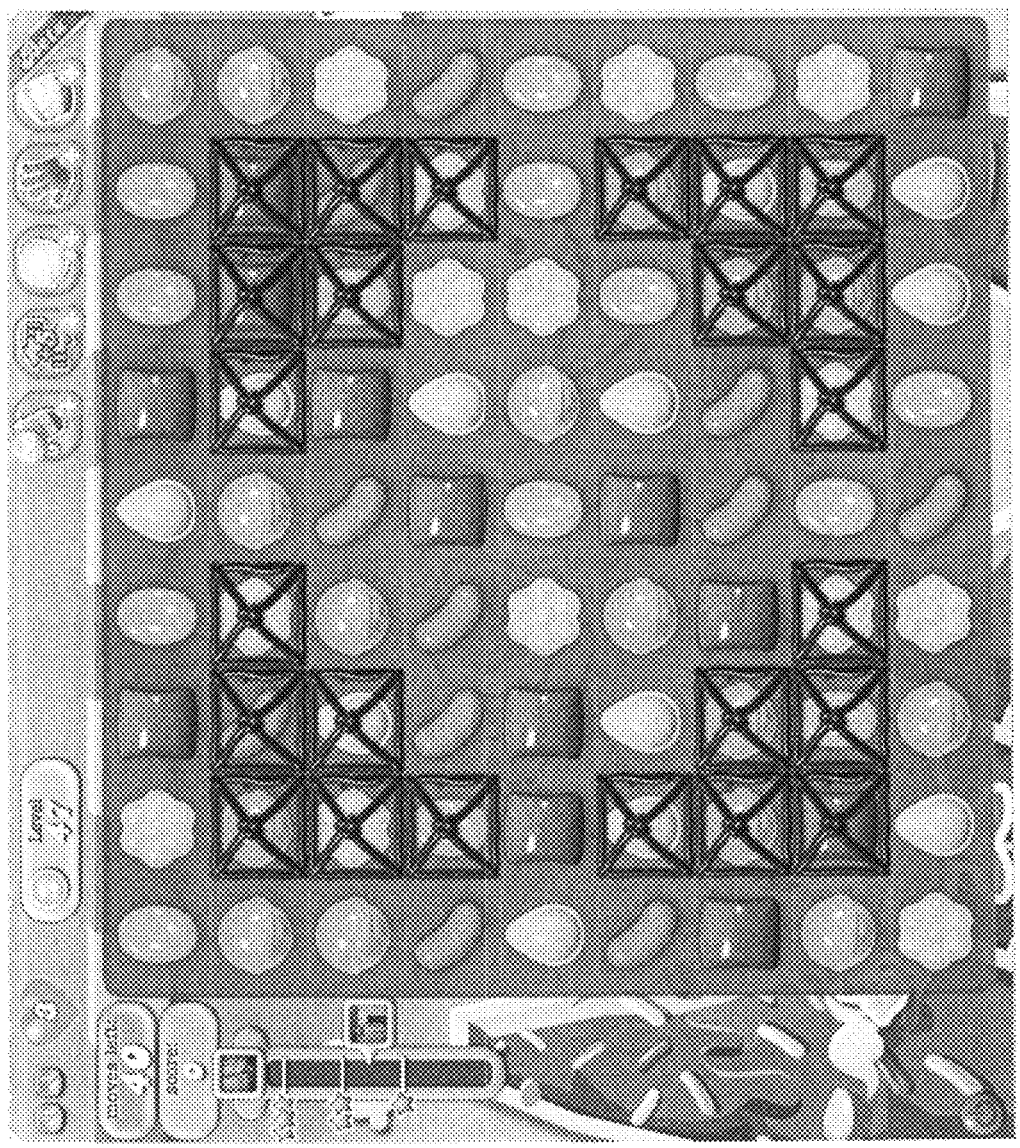
FIG. 7 shows one implementation of a level where the goal is to reach a set score before running out of moves.

One of Candy Crush Saga's most common goals is to collect a certain amount of points before running out of moves, FIG. 7 illustrates this. The points are collected through making matching combinations on the game board. The smarter combinations made, the more points.

Reach a Set Score Before Running Out of Time

Figure 8:
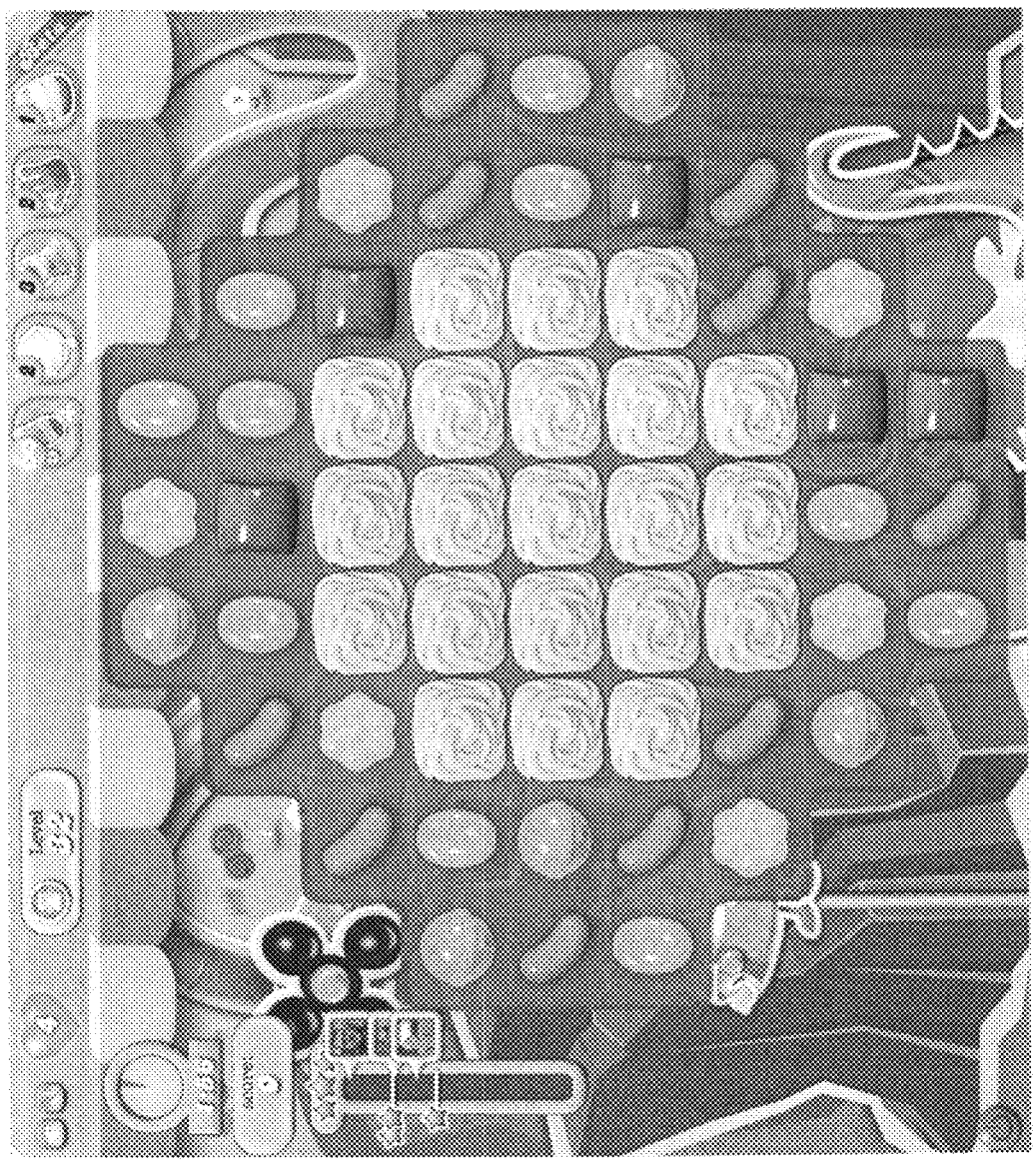
FIG. 8 shows an example of a timed level.

Candy Crush Saga also has timed levels. The goal that needs to be fulfilled on these levels is to collect a certain amount of points before time runs out, see FIG. 8. The smarter combinations made, the more points.

Bring Down Ingredients

Some levels are referred to as Ingredients levels. The Ingredients levels have two goals which need to be fulfilled in order to complete the level:

- The player has to reach a certain target score before running out of moves.
- The player has to bring down a certain number of so-called ingredients to the bottom of the game board before running out of moves. When the ingredients reach the bottom of the game board they disappear and candies above them take their place. Ingredients are game elements shaped as fruits or nuts and only exist for this specific goal. They are not matchable with other game elements but they can be switched with other game elements.

Figure 9:
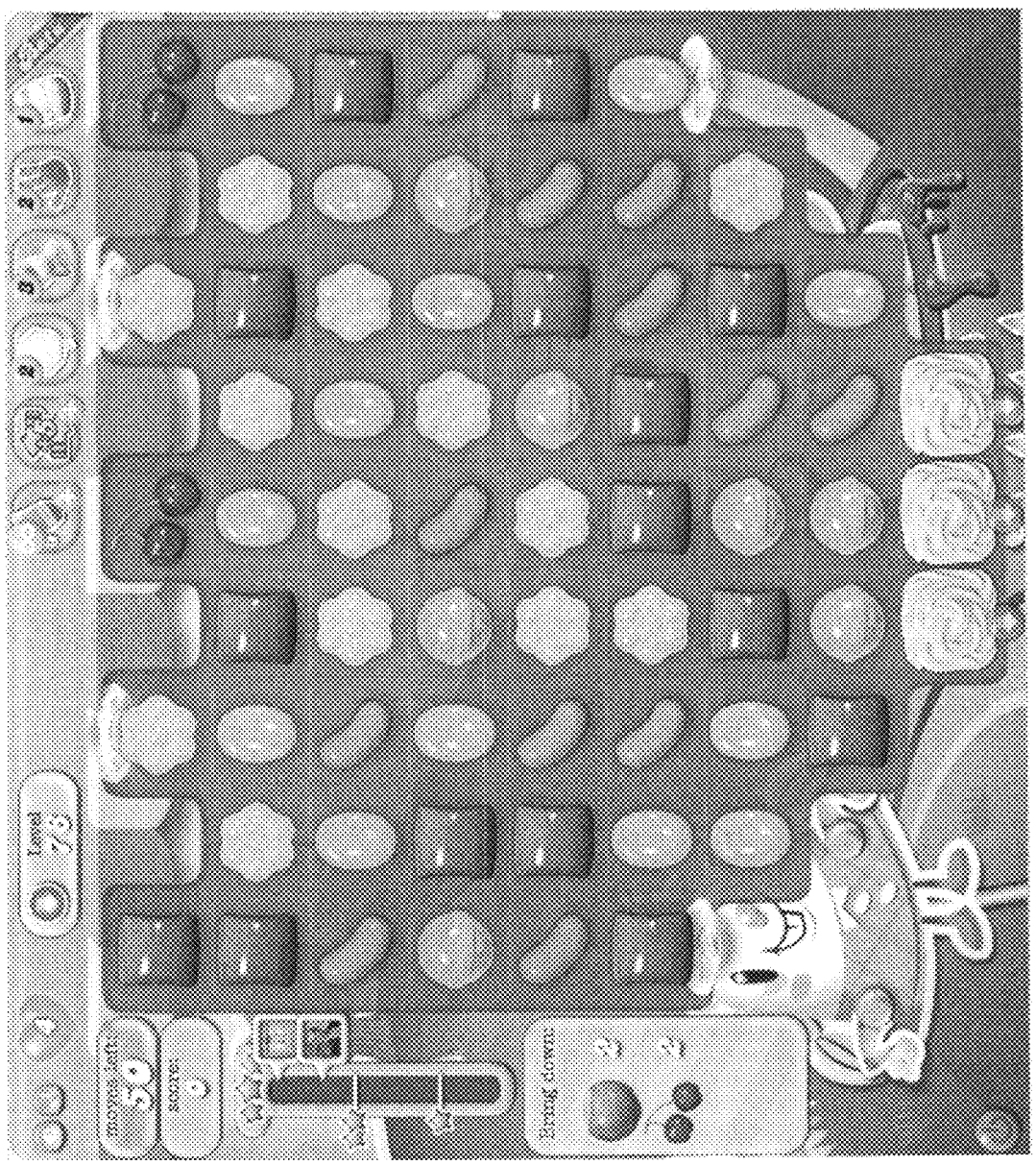
FIG. 9 shows one implementation of an Ingredients level.

FIG. 9 illustrates one implementation of an Ingredients level. The arrows at the bottom of the game board indicate where the ingredients (here depicted as cherries and nuts) can fall down. If there is no arrow at the bottom then the ingredients can not fall down that way.

Figure 10:
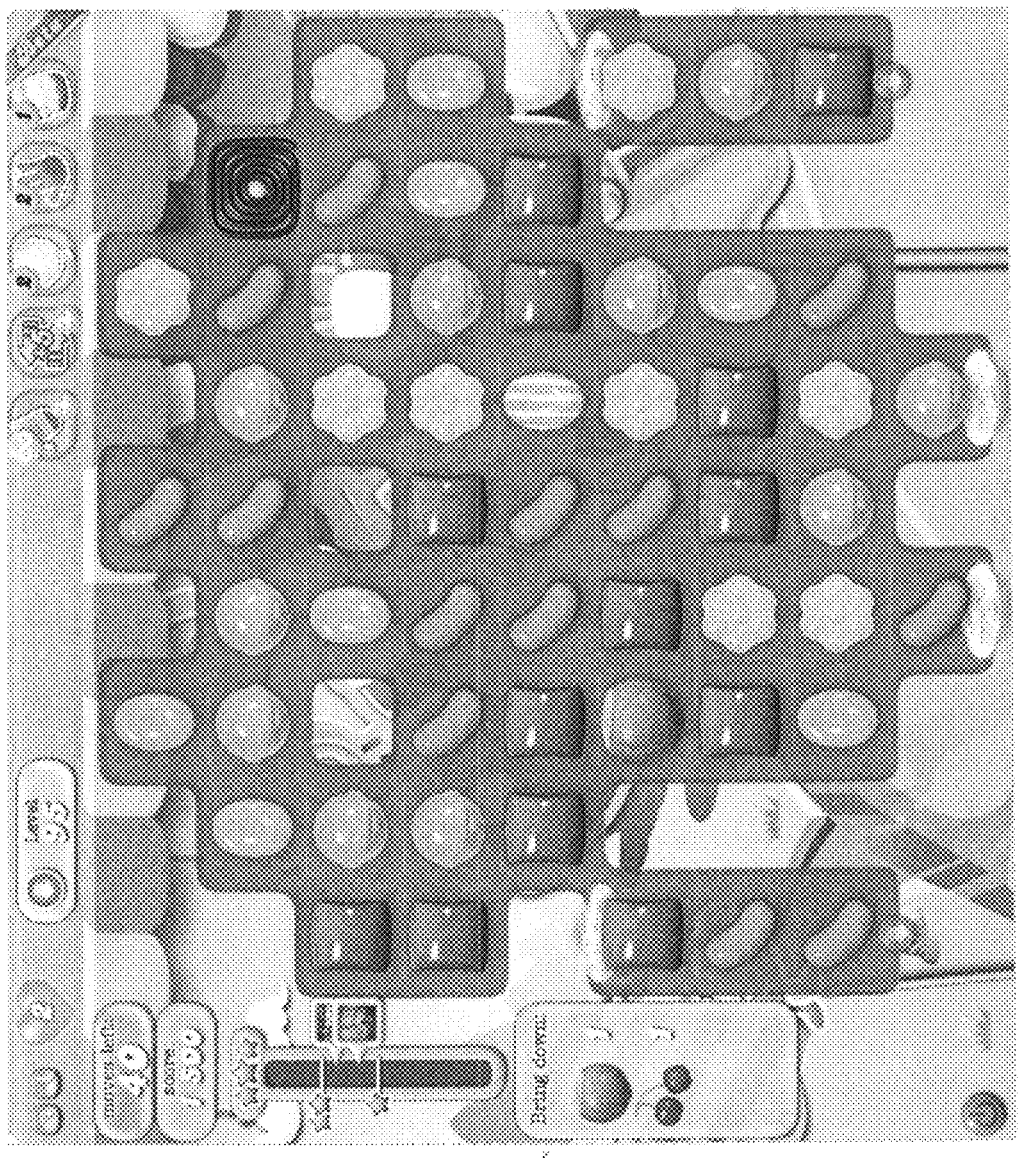
FIG. 10 shows one implementation of an Ingredients level.

FIG. 10 illustrates another implementation where ingredients do not always have to fall down at the bottom of the game board may also fall down higher up, as long as they reach the edge of the game board and the edge has an ingredients indication arrow.

Clear Jelly

Figure 11:
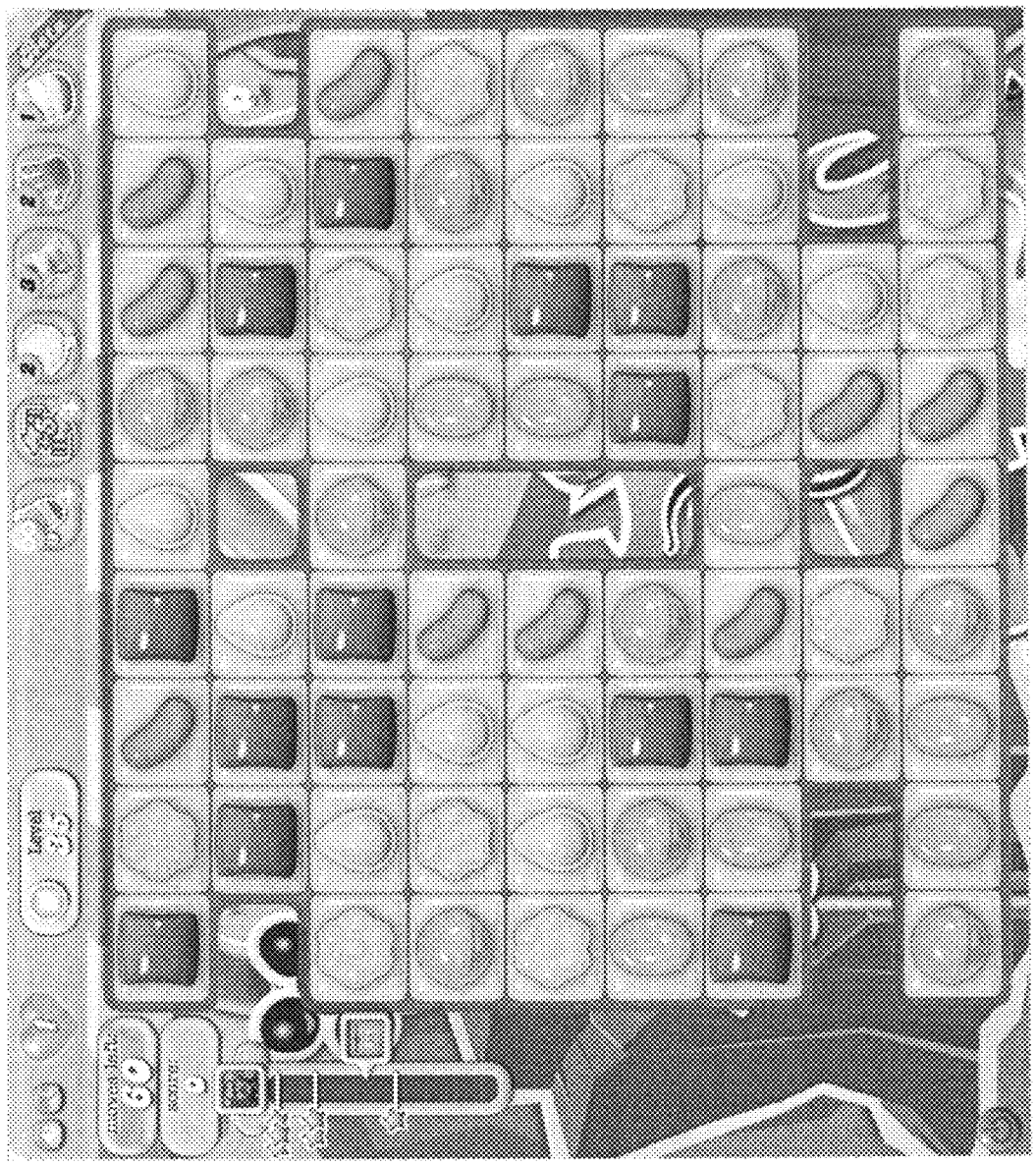
FIG. 11 shows one implementation of a level with the goal to clear all Jelly and reaching a certain target score.

One of the most frequent set of goals in Candy Crush Saga is the one used for levels that contain Jelly blocks. Jelly blocks are game elements that are found underneath other game elements and need one or two matches on top of them to disappear (See description elsewhere). The goals that need to be fulfilled on levels with Jelly blocks are:

- Reach target score before running out of moves (as described elsewhere)
- Remove all jelly blocks before running out of moves FIG. 11 illustrates one implementation of a level where the player has to clear all Jelly blocks as well as reaching a certain target score in order to complete the level.

Collect Certain Elements

Another type of level Candy Crush Saga has introduced to their variety of game modes is a so-called Order level. Order levels have two goals:

- Reach target score before running out of moves (as described elsewhere).
- Collect certain amount of candies through specific matches as well as achieving hard to make combos specified on the level played.

Figure 12:
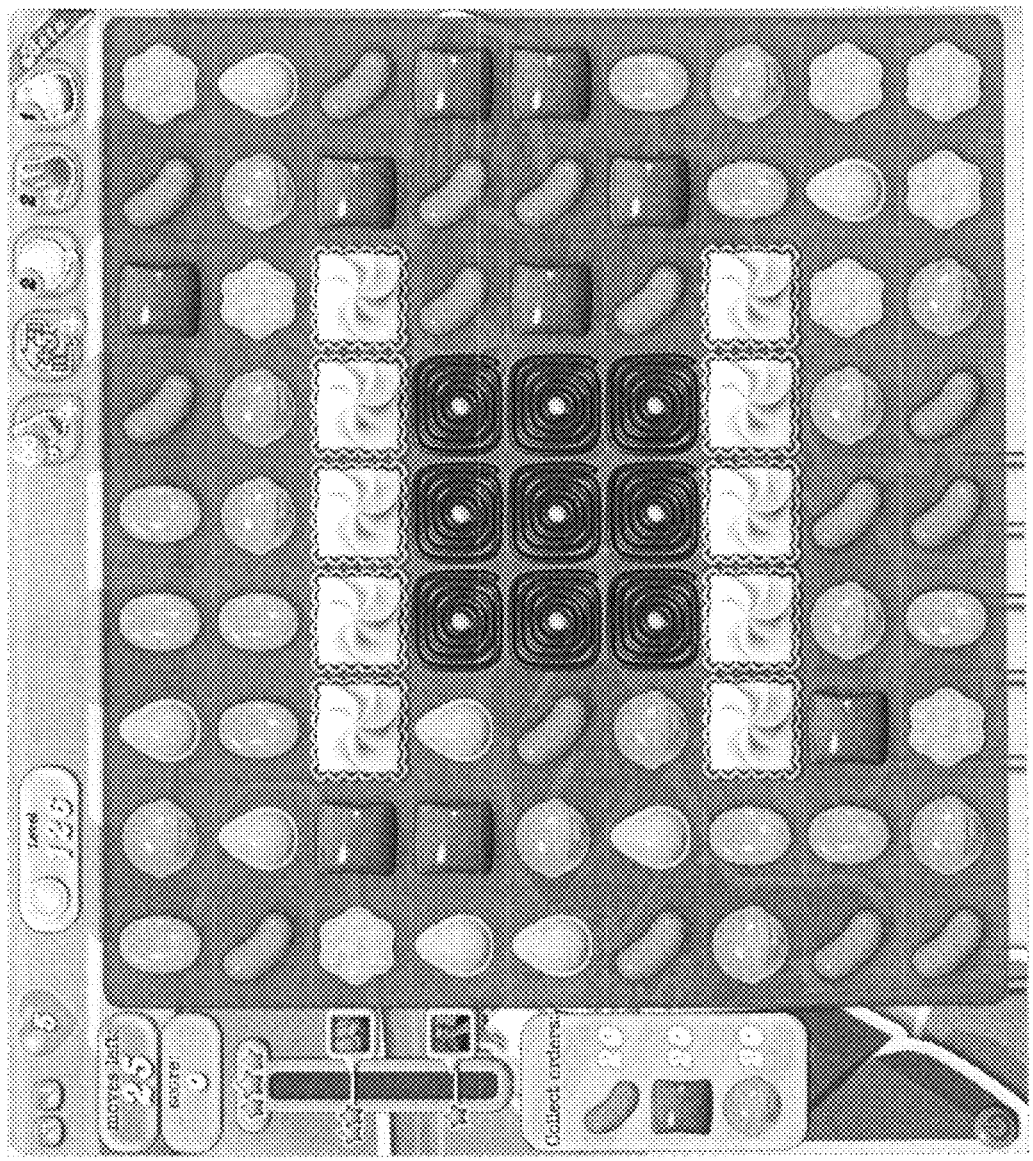
FIG. 12 shows one implementation of an Order level.

FIG. 12 illustrates a typical order level where in this example, 20 pieces of three different game elements need to be collected through matches in order to complete the level. The target of the level can here be seen on the left side of the image.

Balance Mode

In this game mode, players are required to collect an even amount of two colours of candies to complete the level. The level goal can be indicated with a scale where the two different types of candies to be collected are placed on either side. When the count is unbalanced, one side of a scale starts tipping, the bigger the difference the faster it tips. If one end touches bottom level has failed. Score is given to the player based on the number of moves it takes to collect the required amount of the two colours.

Crescendo Mode

The goal of this game mode is to light up all squares/cells on the game board. In some implementations, the requirement to light up a cell is to combine a candy that is in that cell. In other implementations, the player has to combine multiple candies in the same cell before it lights up.

Digging Mode

In this game mode, players are required to combine candies in cells adjacent to blockers in order to 'dig' down in the level. When digging, the player can uncover objects that are covered initially.

Multiple Game Modes

All of the game modes described herein can also be used in any combination with one another. For instance, the requirement to complete one level could be to remove all jelly as well as bringing down ingredients.

Basic Rules

How to Play

If the player tries to make a move with two candies in such a way that no candy will be matched with at least two more of its own colour, then the move will not be allowed and the player will have to try to find another move.

Figure 13:
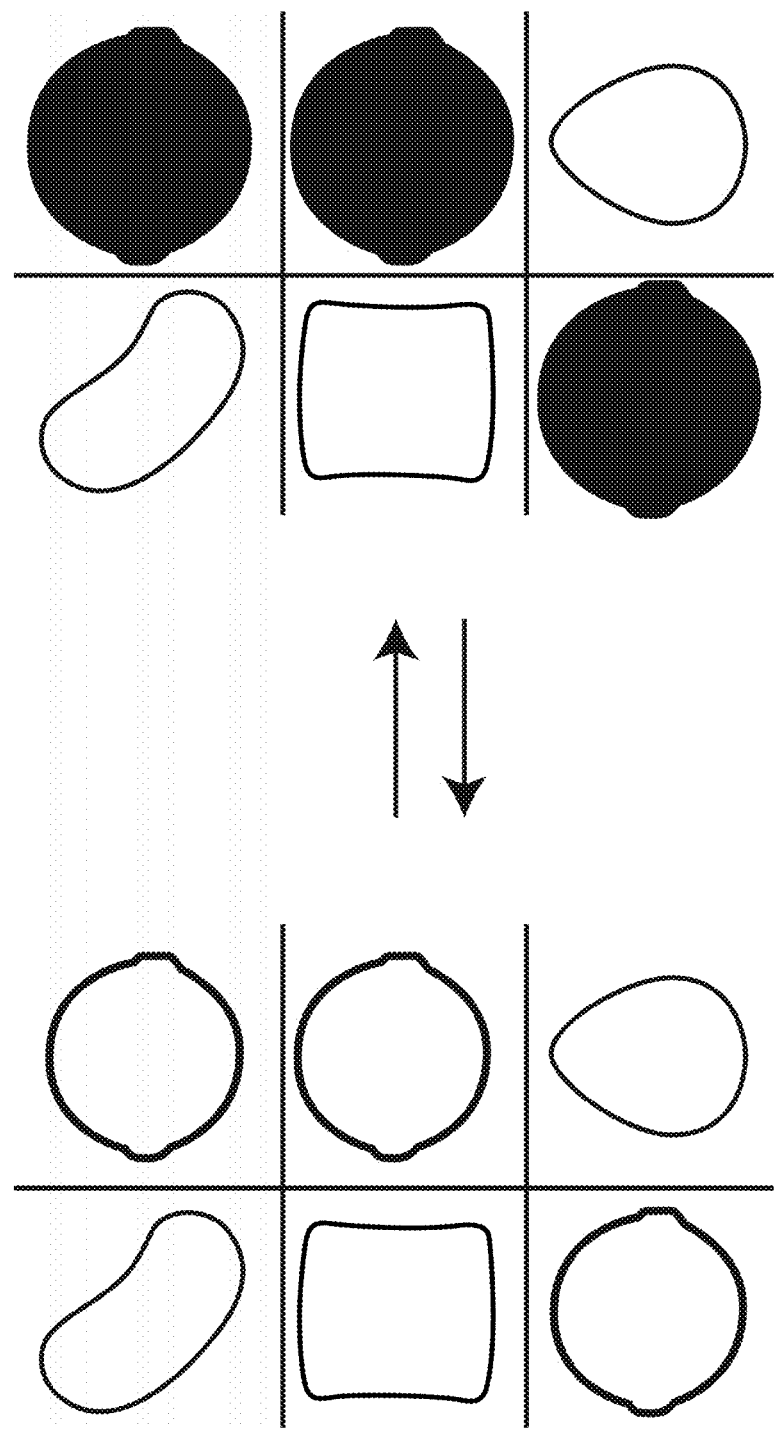
FIG. 13 shows one implementation on how to visualise hints.

If no moves are possible on the game board then all the candies are reshuffled so that there will always be at least one possible move available. If the player can't see or find a move to make, then the game helps the player by giving a hint. The hint is displayed after a few seconds of inactivity and is shown by brightening and magnifying the candies of a possible move in a flashing animation, see FIG. 13.

Advanced Rule

Figure 14:
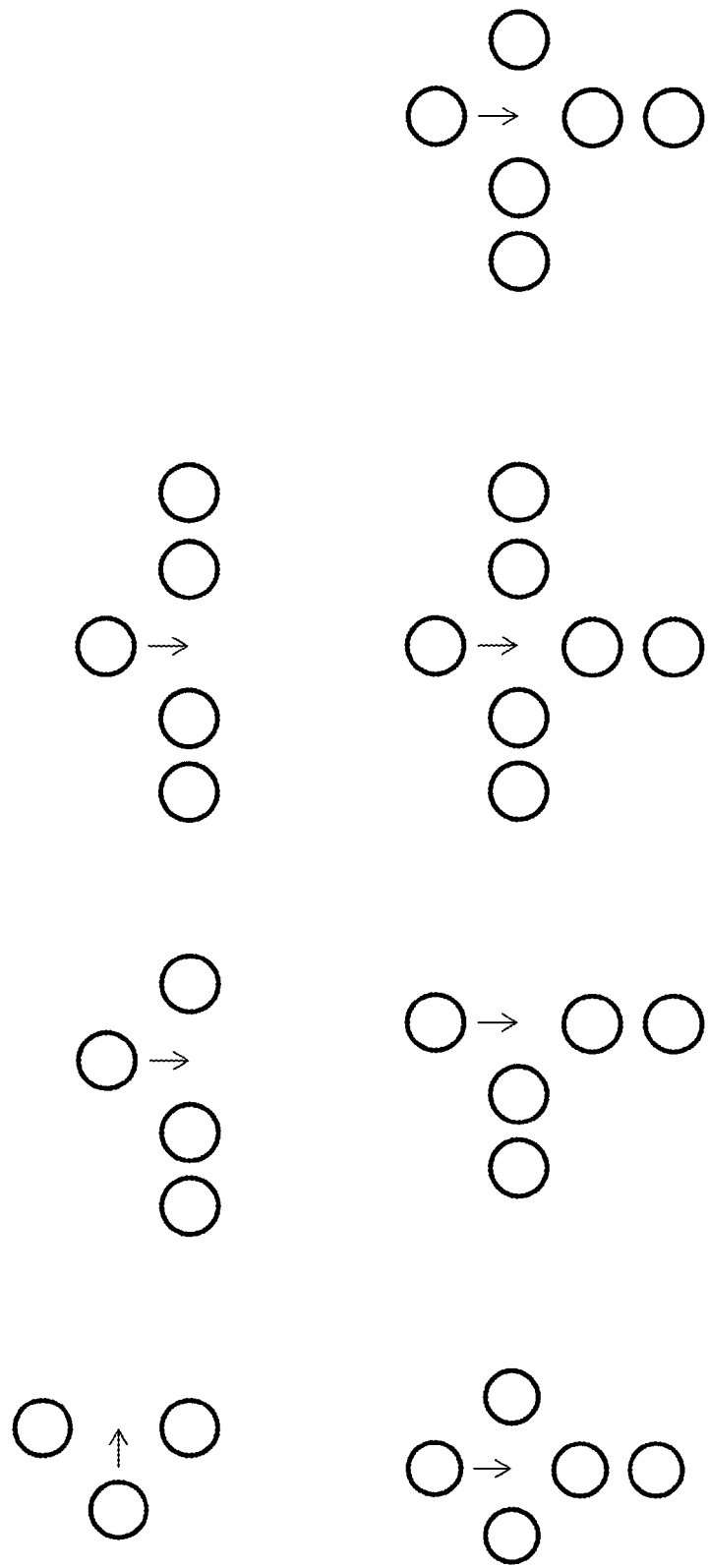
FIG. 14 shows one implementation's possible matching patterns.

Not only the match of 3 candies is allowed but matches of more candies can also be done; see FIG. 14 for the different possible match patterns. Matches with more than 3 candies give more points and is something the player should try and aim for. Different acceptable matches are:

- Match of 3 in a line.
- Match of four in a vertical line.
- Match of four in a horizontal line.
- Match of five in a vertical line.
- Match of five in a horizontal line.
- Match of five in a T-shape.
- Match of five in an L-shape.
- Match of 6 or more candies in a combination of 4-in-a-row, 5-in-a-row, T- and L-shapes.

As can be noticed from the list of possible matches, no diagonal matches are accepted. Diagonal matches and/or swaps can be allowed in some implementations of the game.

Combos to Receive Special Elements

Matches made of four or more candies not only give more points but also reward the player with special game elements. The special game elements received from combos have various positive properties and can be used to gain more points and to easier pass a level. The elements received from different matches are:
- 4-in-a-row: Striped candy
- L- or T-shape: Wrapped candy
- 5-in-a-row: Colour bomb If a match is made with more than 6 candies, then it is likely that the combo is a shape merged from 4-in-a-row, 5-in-a-row, L-shape and T-shape. If so, there is a hierarchy of what kind of special element is received:

- If there is a merge of 4-in-a-row and an L- or T-shape, then the special game element received will be the same as from an L- or T-shape. L- and T-shapes give the same special game element.
- If there is a merge of 5-in-a-row and an L- or T-shape, then the special game element received will be the same as from a 5-in-a-row combo.

How to Trigger Special Elements

To use the special game elements received from combos there are two different ways:

- Some of the special game elements are triggered through a standard match with two or more candies of the same colour as the special game element.
- Some of the special game elements are triggered by swapping place with any candy regardless if a match-3 is made.

Combining Special Elements with Each Other

Special game elements received from matches can be combined with each other for various positive effects affecting the game board. Striped candies, Wrapped candies and Colour bombs can all be matched with each other. To trigger these combos they do not need to be matched by game elements of the same colour but can simply be swapped with each other for an instant trigger.

Points

The points given for different combinations and removals of blocks are:
- 3-in-a-row: 60 points
- 4-in-a-row: 120 points
- 5-in-a-row: 200 points
- T-shape: 200 points
- L-shape: 200 points
- Break a Jelly block: 1000 points
- Break a Frosting block: 20 points/per block
- Break a Chocolate block: 20 points/per block
- Get an ingredient to the bottom of the screen: 10 000 points
- Using a special game element to remove other game elements: 60 points/per game element removed Game Elements Standard Game Elements In Candy Crush Saga there are 6 standard game elements (see FIG. 15) which all look like candies:
- Purple candy in the shape of a flower
- Blue candy in the shape of a sphere
- Green candy in the shape of a square block
- Red candy in the shape of a tilted bean
- Yellow candy in the shape of a drop
- Orange candy in the shape of an oval Special Game Elements Special game elements can either be received from special combos or from an automatic placement on the game board.

Special Game Elements Received from Combos

Striped Candy

How to Generate a Striped Candy

A Striped candy is given by matching four candies of the same colour in a horizontal or vertical line.

Looks

Figure 15:
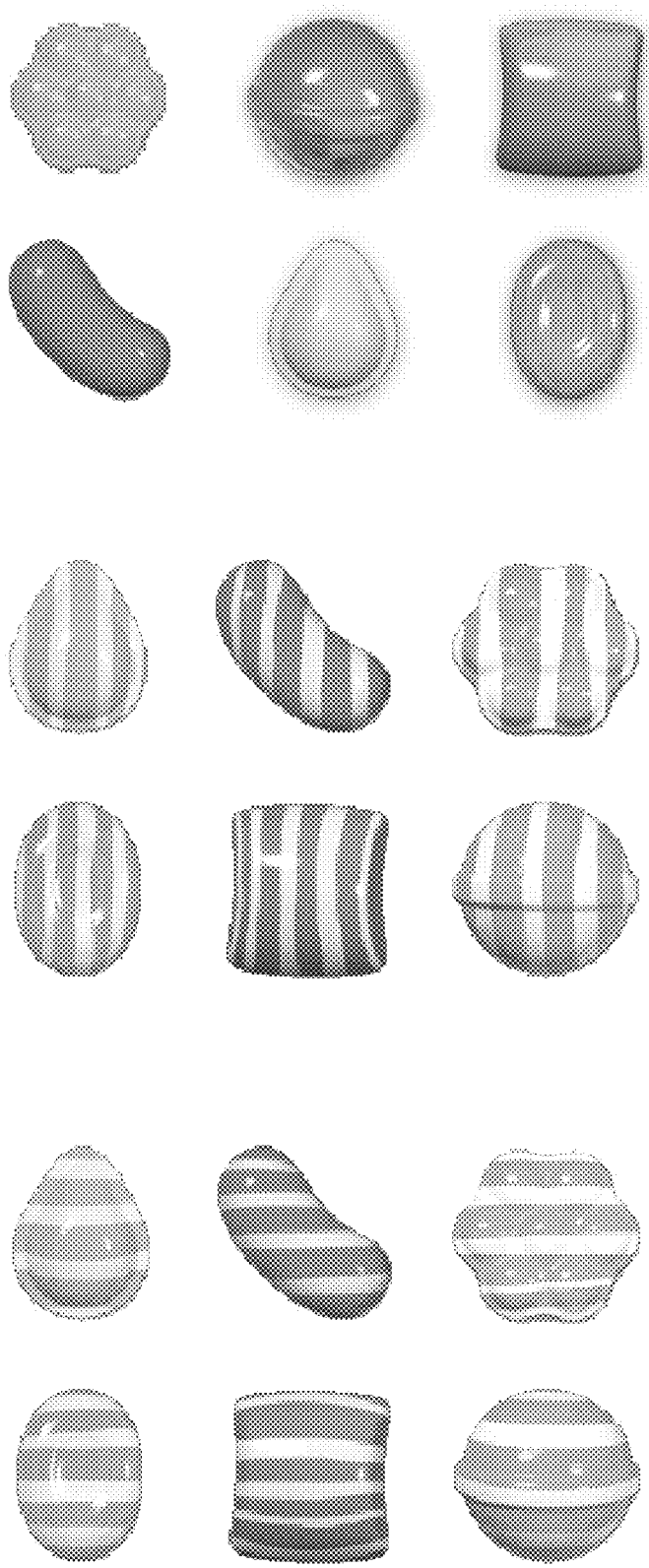
FIG. 15 shows some examples from one implementation's game elements.

The Striped candies have the same shape and colour as the standard game elements except for that they have white vertical or horizontal lines on them, see FIG. 15. The colour and the shape of the striped candy will be the same as the candies' which were being matched to create it.

If the match of four candies is done in a horizontal line then a candy with vertical lines will be given. If a match of four candies is done in a vertical line, then a candy with horizontal lines will be given.

Effect

Striped candies removes a whole row or column depending on if it was made from a vertical or horizontal combo. The white lines on the candy indicates whether it will remove a row or a column. To trigger a Striped candy it needs to be matched with two more candies of the same colour.

Striped candies removes all candies in a row or column also if the game board is divided up in two or more areas that are not connected. The player can this way remove candies from areas that otherwise would be hard or impossible to find combinations in. The impact of different game board designs are described elsewhere in this document.

Animation when Used

When a Striped candy is being triggered, an animation shoots out of the Striped candy following the row or column which it is removing. The animation looks something like the candy being stretched out and turned into lines that shoot out together with a sparkle effect. For all candies that are being removed, the points given for each candy will be shown in the same colour as the candy being removed. See FIG. 16 for an example of triggered horizontal and vertical striped candies and the animation they come with.

Wrapped Candy

How to Generate a Wrapped Candy

Figure 16:
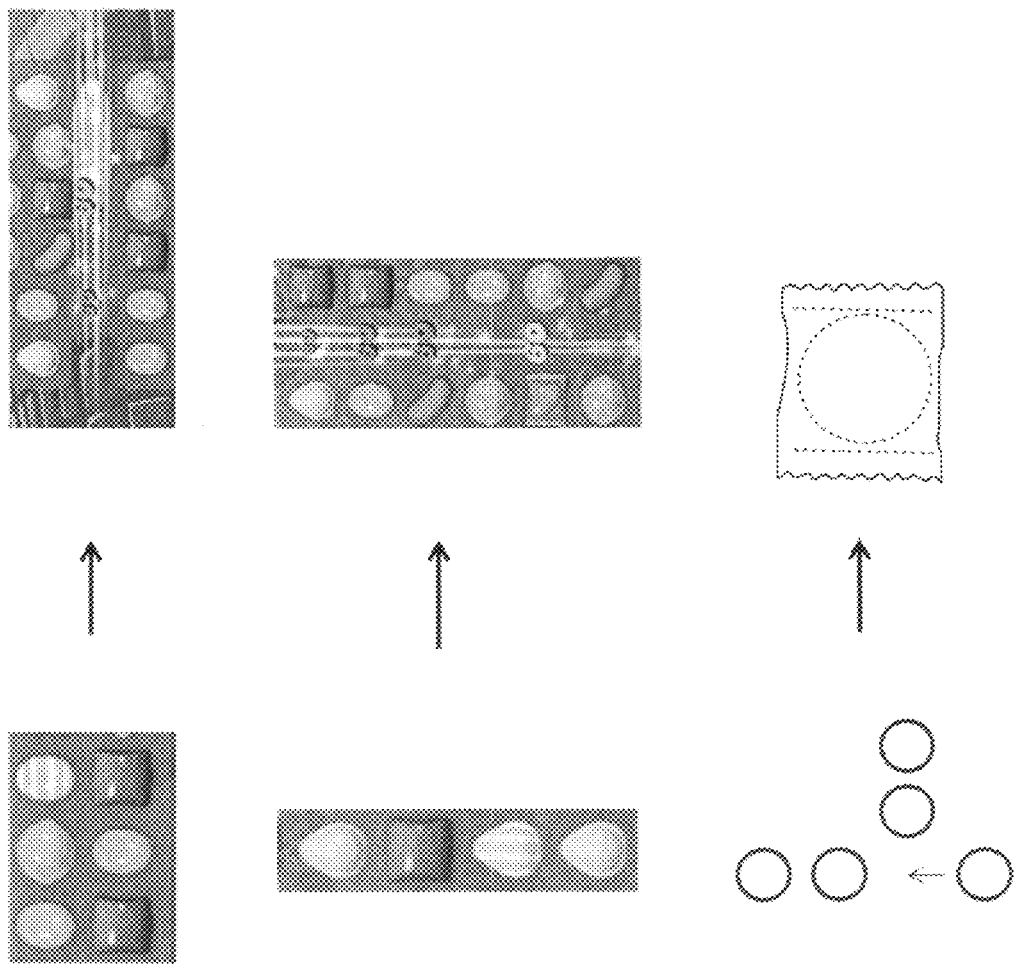
FIG. 16 shows one implementation of different outcomes when making matches.

A Wrapped candy is given by having an L- or T-shaped combination, see FIG. 16.

Looks

Figure 17:
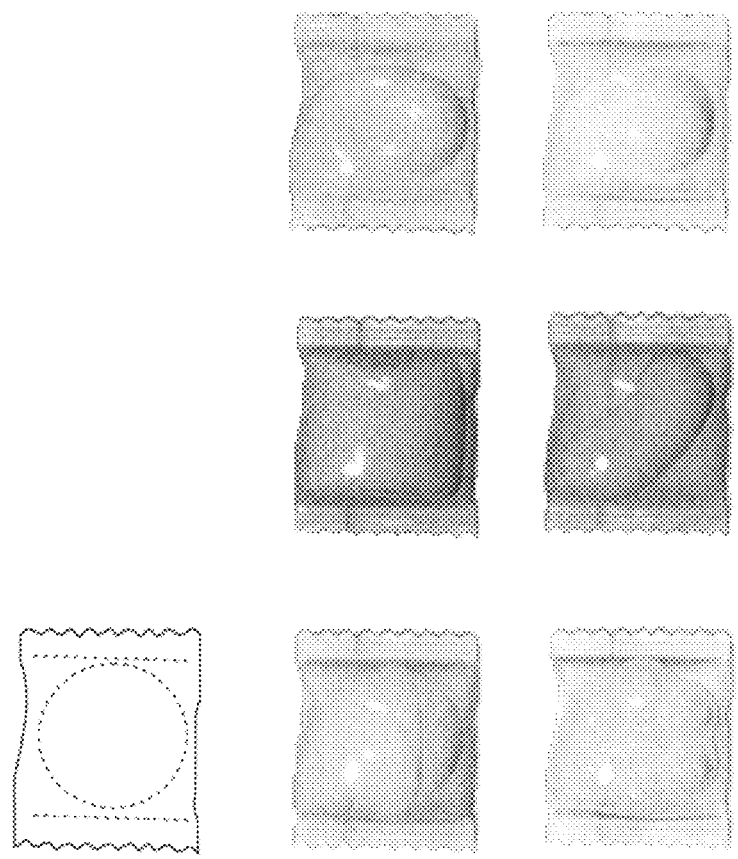
FIG. 17 shows one implementation's six different Wrapped candies.

The Wrapped candies have the same shape and colour as standard game elements but with a wrapping around them, see FIG. 17. The colour and the shape of the Wrapped candy will be the same as the candies' which were being matched to create it.

Effect

The Wrapped candy is triggered by matching it with two more candies of the same colour. The result of the trigger are two explosions removing candies in a 3×3 square around the Wrapped candy. The first explosion occurs instantly when the Wrapped candy is being triggered, the second explosion occurs after all candies from the first explosion have been removed and replaced with new candies. If the Wrapped candy is at the edge of the game board an explosion will happen but there is no effect from the part of the explosion area that is outside of the game board.

Animation when Used

When a Wrapped candy detonates, an animation with sparkling effect and light circles is shown with the Wrapped candy in the centre of the animation, see FIG. 18.

Colour Bomb

How to Generate a Colour Bomb

Figure 19:
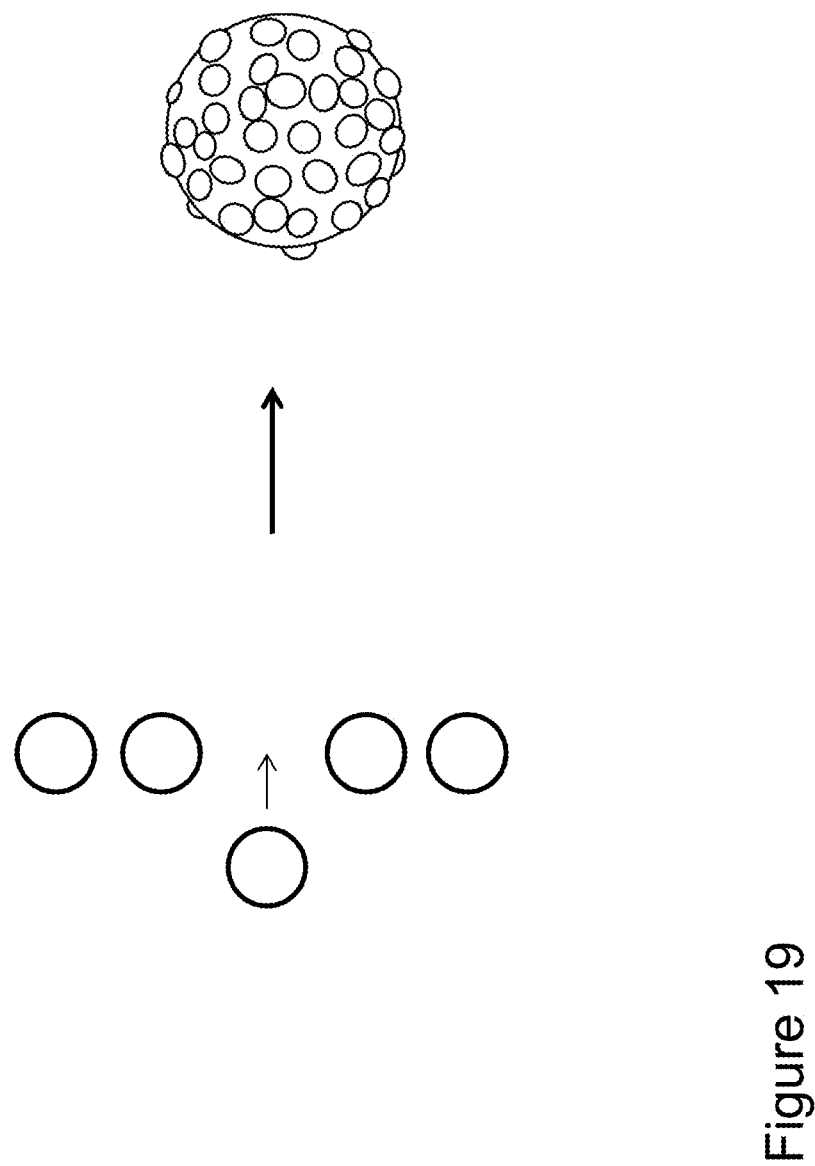
FIG. 19 shows how to create a Colour bomb.

A Colour bomb is received when matching five candies in a vertical or horizontal line, see FIG. 19.

Looks

The Colour ball looks like a chocolate sweet. A round ball with multi coloured sprinkles on it.

Effect

To trigger the Colour bomb it can be swapped with any candy, no match-3 is necessary. When the Colour bomb is triggered, it removes all candies of the same colour as the candy that was used to trigger it.

Animation when Used

Figure 20:
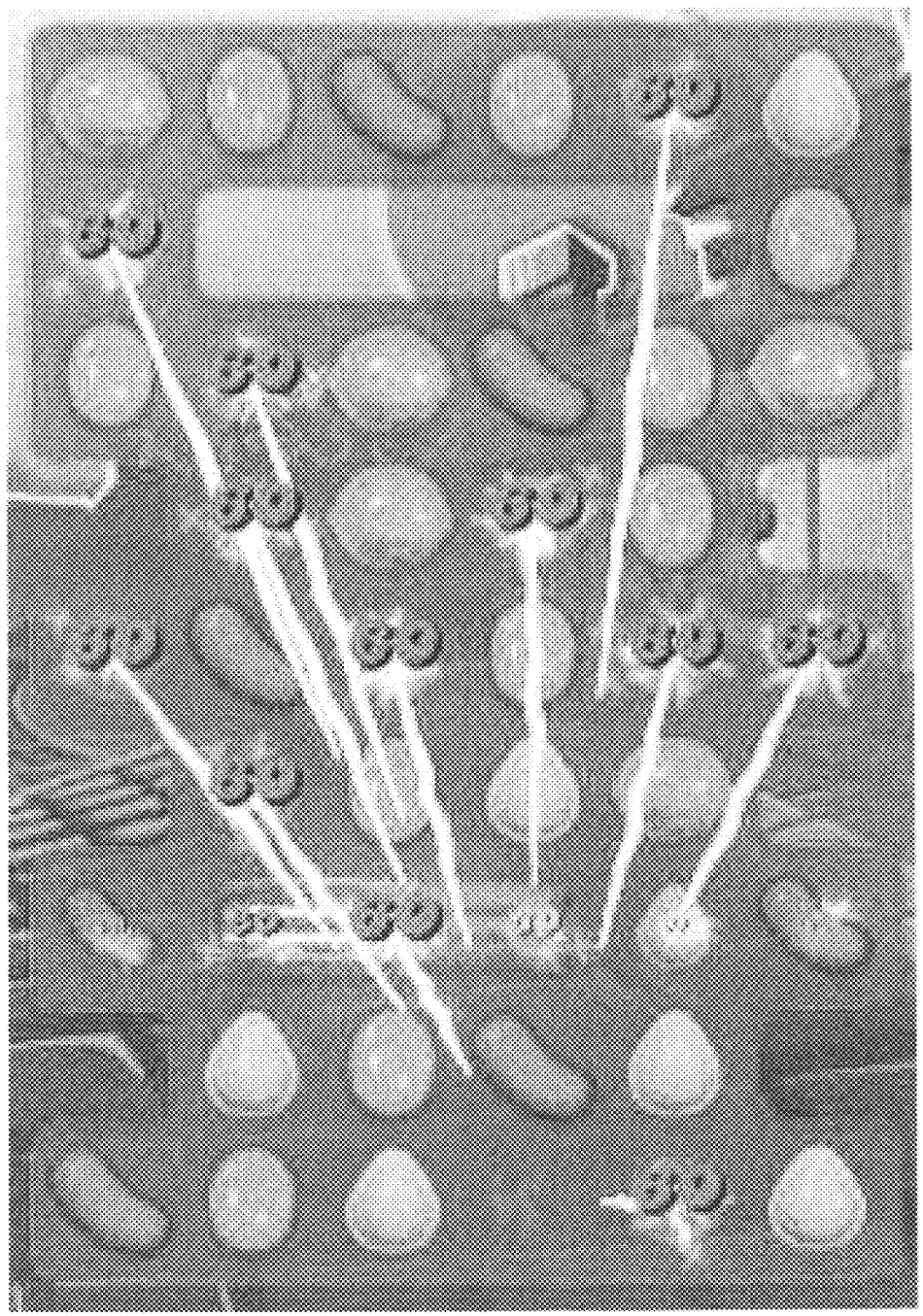
FIG. 20 shows a triggered Colour bomb element.

When the Colour bomb is being used. Blue coloured lightning bolts shoots out from the colour bomb to all candies that are going to be removed, see FIG. 20.

Other Special Game Elements

Mystery Candy

How to Generate a Mystery Candy

Mystery Candies are placed randomly on the game board and do not need a special combination to appear.

Looks

The Mystery candies have an oval flattened shape which is slightly tilted and with a question mark painted onto it, see FIG. 21. The Mystery candy comes in the 6 standard candy colours.

Effect

To use the mystery candy it needs to be included in a standard match-3 with candies of the same colour as the Mystery candy. The Mystery candy will then turn into a random game element which could have either positive or negative impact for the player. It could for example turn into a Striped candy or a Colour bomb, or it could turn into something less fortunate for example a spreading chocolate block (see description elsewhere) or a bomb that counts down and explodes to make the player game over.

Animation when Used

When the Mystery candies are used in a combination they burst and turn into a random element.

Lucky Candy

How to Generate a Lucky Candy

Lucky candies are inserted on the game board automatically when having selected a pre-game booster which specifically adds Lucky candies to the candy mix on the game board.

Looks

The Lucky candy looks like a flattened sphere with a white tick mark painted on top of it, see FIG. 21. The candy comes in all the 6 standard candy colours.

Effect

To use the Lucky candy it need to be matched with two more candies of the same colour. The Lucky candy will then turn into a random positive game element.

Animation when Used

Figure 22:
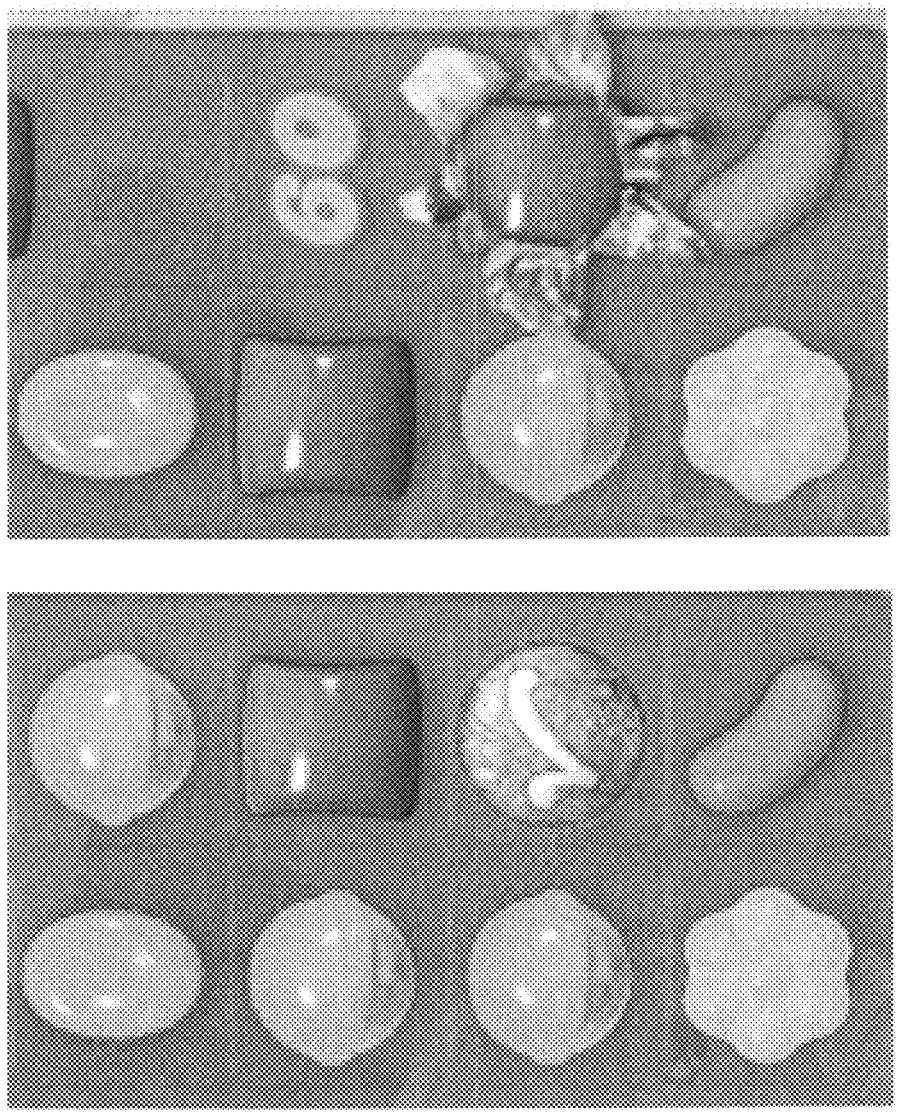
FIG. 22 shows the triggering of a Lucky candy.

When the Lucky candy is being matched it looks like it is unwrapped and behind the wrap it reveals the new game element, see FIG. 22.

Fish

How to Generate a Fish

Fishes are placed on the game board by selecting a pre-game booster that specifically does so. Further ahead in the game the Fish can also appear randomly on the game board.

Looks

The Fish looks like a candy jelly fish, see FIG. 21. It comes in the same colours as the standard 6 candies.

Effect

The fish is used by matching it with two more candies of the same colour. Doing so will trigger 3 fishes to swim into the screen and remove a total of three random pieces on the game board. If there are Jelly blocks or other blockers then the game will prioritize to remove those before removing a candy that stands on an empty square.

Animation when Used

When the Fish is used it swims away out of the screen and then three Fishes swim into the screen, remove one block or candy each and then disappears. The Fishes appearing are in the same colour as the fish that was in the combo.

Wrapped Fish

How to Generate a Wrapped Fish

A Wrapped fish is obtained if switching a Wrapped candy with a Fish. The Wrapped candy and the Fish do not need to be of the same colour. Furthermore the Wrapped fish will be triggered instantly and can not be saved for later use.

Looks

The Wrapped fish looks like the standard candy Fish but with a wrapper around it. The Wrapped fish comes in all the 6 standard candy colours.

Effect

When the Fish is switched with the Wrapped candy, the effect of the Wrapped fish is triggered immediately. Three random game elements will be turned into Wrapped candies which trigger instantly and explodes two times like the standard Wrapped candy.

Animation when Used

The Wrapped fish created from the switch with the Wrapped candy swims out of view and comes back with two more Wrapped fishes that swim onto the game board and to the position where the Wrapped candies will be created. Having reached the position the Wrapped fishes disappear.

Polka Fish

How to Generate a Polka Fish

This fish is given when combining a Fish with a Striped candy. The Striped candy and the Fish do not need to be of the same colour. Furthermore the Polka fish will be triggered instantly and can not be saved for later use.

Looks

The Polka fish looks like a standard candy Fish but with the same kind of stripes as the Striped candy.

Effect

The Polka fish turns three random candies into 3 randomly vertical or horizontal Striped candies which in turn are instantly triggered and creates 3 line blast effects.

Animation when Used

In one implementation, as with the standard candy Fish and the Wrapped Fish, the created Polka fish swims out of view and returns with two more Polka fishes of the same colour which then swims to the position of the candies that are to be turned into triggered line blast elements. Having reached their destination the Polka fishes disappear.

Polka Dotted Fish

This fish is acquired by combining a colour bomb with a fish. The Polka dotted fish is instantly triggered from this combination and swims out of the screen to bring three new Polka dotted fishes. The new Polka dotted fishes swim to three random locations on the game board and turn 1 game element each into a new Fish. The three new fishes will in turn swim out of the screen and then bring three new fishes each so that a total of nine new fishes swim onto the game board to nine random positions on the game board where they remove one game element each. After this the fishes disappear. The total effect of the initial trigger of the Polka dotted fish is that 12 game elements have been removed from the game board. Furthermore, if there are squares with Jelly blocks on, the fishes will always go to these first.

Colour Changing Candy

How to Generate a Colour Changing Candy

These candies are placed automatically on the game board. They could also be a resulting candy when having used a mystery candy.

Looks

Like a standard candy but with a soft glow around it and an animation of a rainbow passing by over the surface of the candy.

Effect

The candy changes between two colours for every switch made on the game board.

Teleporter

This is a game element that is automatically placed on a fixed position on an edge of one of the cells in the game board. The teleporter will typically be placed on the game board in pairs where one of the teleporters act as an entry point for candies falling on the game board across the cell edge where the teleporter sits. The candy will then be introduced on the game board where the exit point teleporter sits. So if a candy is normally falling one way from the top of the game board to the bottom of the game board, the teleporter can move a candy up the game board again or to another area of the game board.

The teleporter does not fall down or take space on the area where switching is done and it is never included in any colour combinations.

Figure 23:
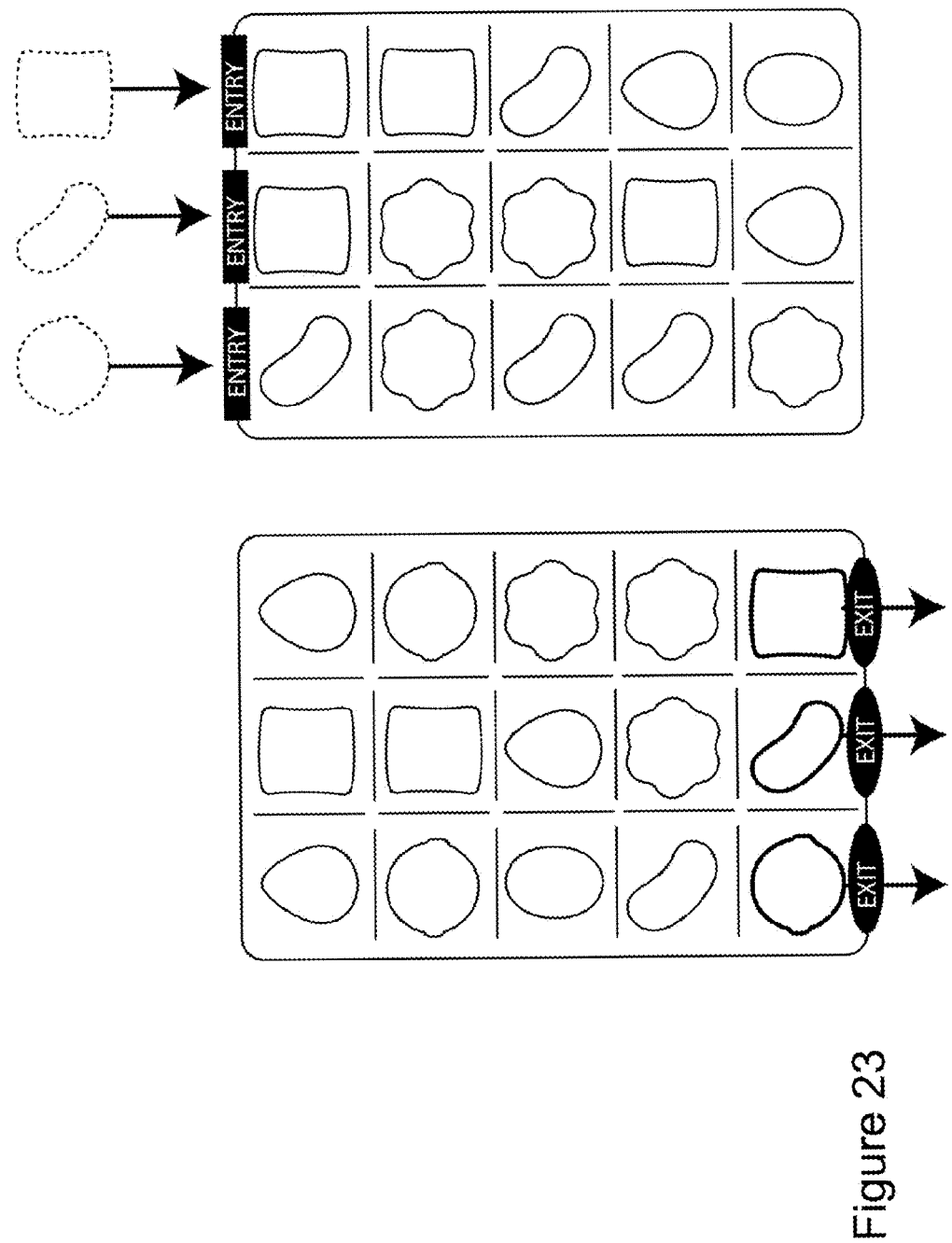
FIG. 23 shows one implementation where game elements have gone through a teleporter.

FIG. 23 shows one implementation of a level with teleporters. If game elements on the right side of the game board would be removed, then game elements from the left side of the game board will fall through the teleporters located on the bottom left of the game board and come out of the teleporters located on the top right of the game board, filling up the emptied space created.

Jelly Blocks

Jelly blocks are introduced early in the game and a typical goal to complete a level is to remove all Jelly blocks on the game board.

The Jelly blocks are placed behind candies and are stuck into place. They can not be swapped and they do not fall down if candies below them are being removed.

To remove a Jelly block a match has to be made on top of it. Sometimes Jelly blocks consist of two layers and then they need two matches on top of them to be removed.

Candy Cannon

This is a visible game mechanic. In one implementation it can indicate where liquorice, bombs, and ingredients are set to appear.

Combining Special Game Elements

Special game elements can be combined with each other through a simple switch. Doing so creates powerful effects that help the player earn more points and to easier pass a level.

Figure 24:
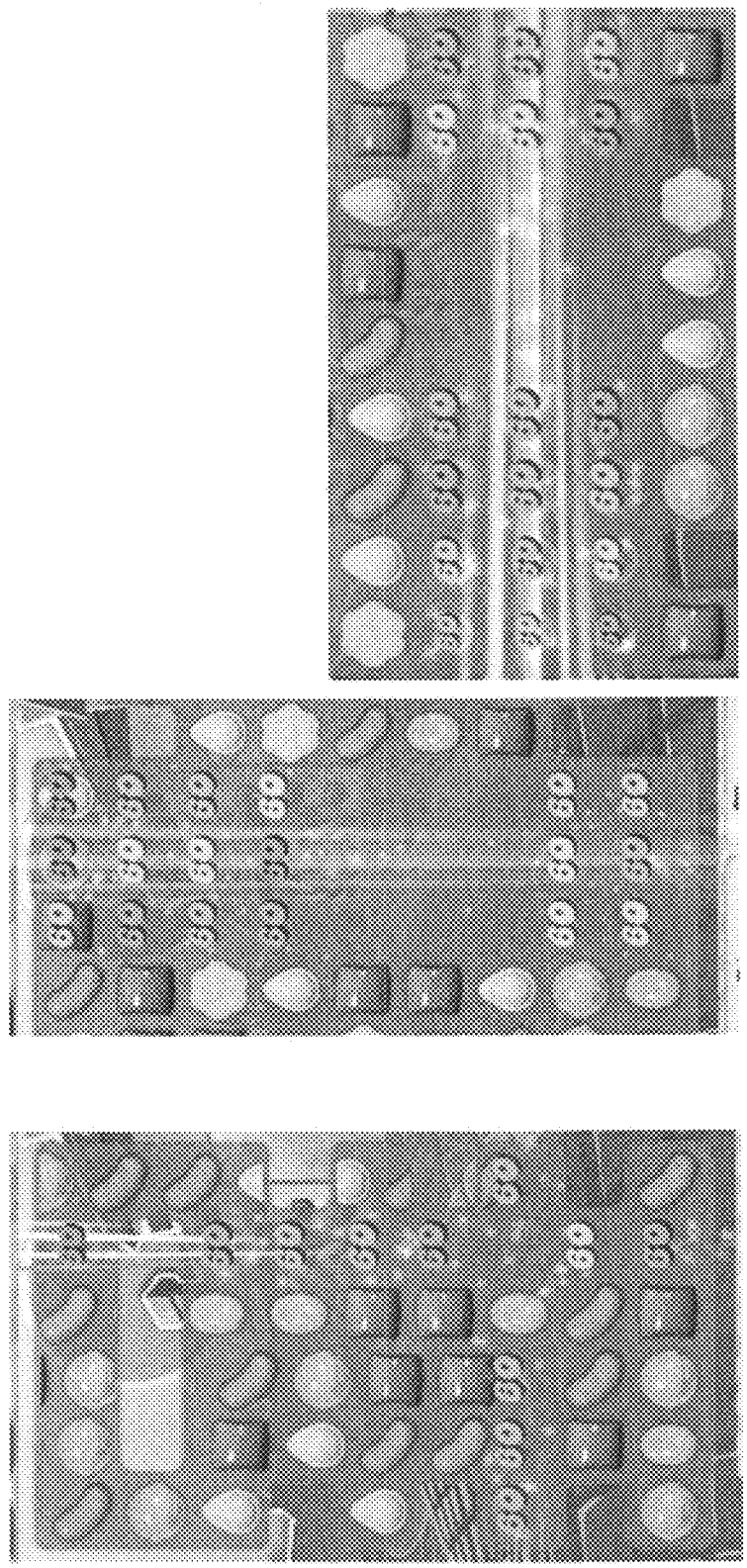
FIG. 24 shows one implementation of animations from special game elements.

The different combos and effects received are:
Two Striped candies
Two Wrapped candies
One Striped and one Wrapped candy
One Wrapped candy and one Colour bomb
One Striped candy and one Colour bomb
Two Colour bombs
Fish and Colour bomb Two Striped Candies Combining two Striped candies will trigger two simultaneous line blasts where one row and one column is removed in a cross shaped way, see FIG. 24. It does not matter if the Striped candies combined are horizontal or vertical. The column and row blasts will be initiated from the position which the moved striped candy has been moved to.

Two Wrapped Candies

Figure 25:
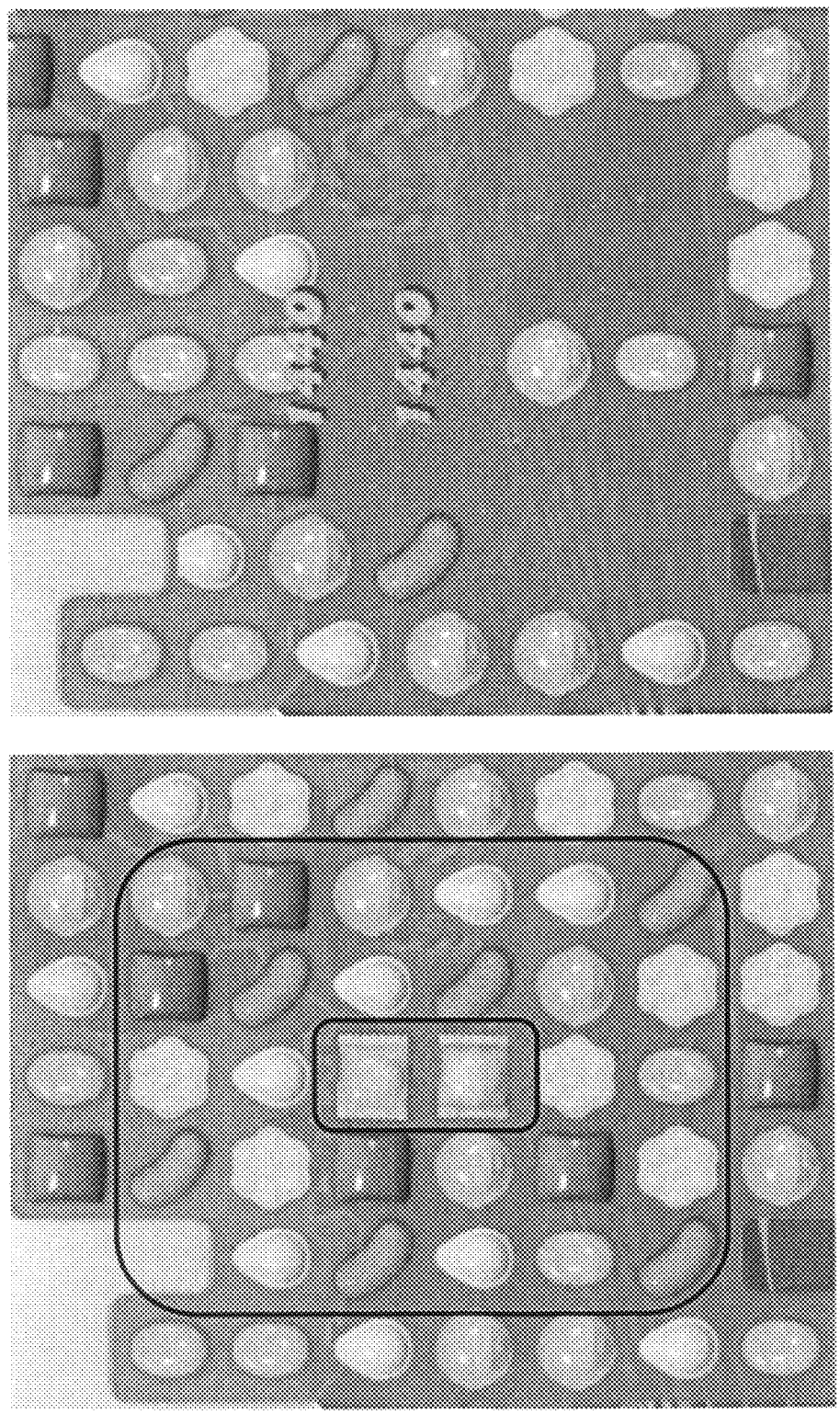
FIG. 25 shows one implementation of two wrapped candies and their combined explosion.

Swapping any two Wrapped candies with each other will create a double explosion as with a standard Wrapped candy, the difference being that the area of effect will be much larger (see FIG. 25) and remove everything in a 6×5 square area or a 5×6 square area depending on if the Wrapped candies are placed next to each other horizontally or vertically.

One Striped and One Wrapped Candy

Combining any Striped candy with any Wrapped candy will trigger 3 horizontal and 3 vertical line blast effects. The result is three adjacent rows being removed (see FIG. 24) and thereafter three adjacent columns being removed (see FIG. 24).

One Wrapped Candy and One Colour Bomb

Combining these two will first remove all candies of the same colour as the Wrapped candy. After that the Colour bomb will be triggered a second time and remove all candies of a random colour.

One Striped Candy and One Colour Bomb

Figure 26:
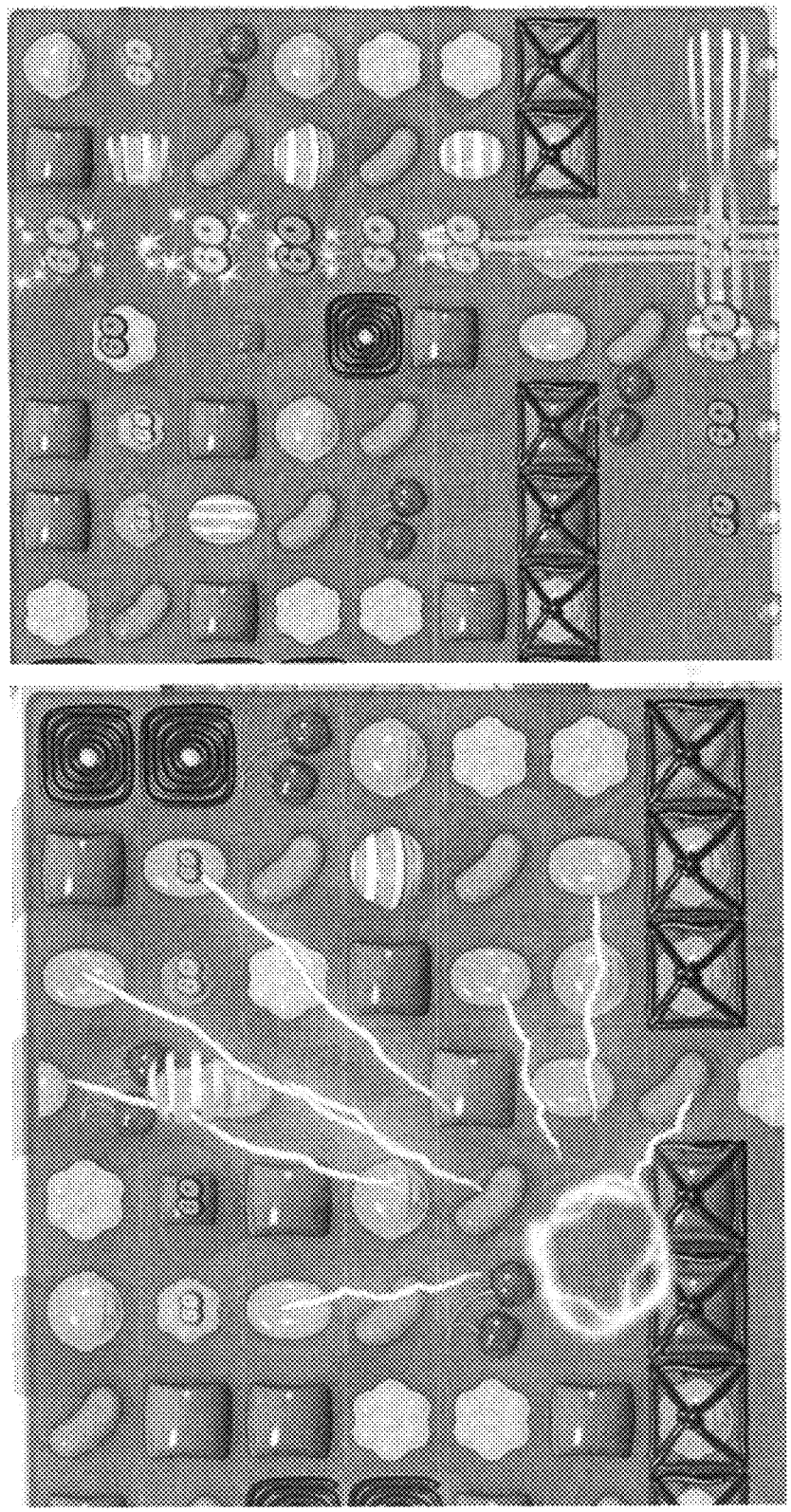
FIG. 26 shows the effect of a Striped candy and a Colour bomb combined.

The combination of these two special candies will turn all candies of the same colour as the Striped candy into randomly vertical or horizontal Striped candies which are then instantly triggered and fills the game board with line blasts. In FIG. 26, a Colour bomb has been matched with an orange Striped candy, turning all orange candies into Striped candies which are then automatically triggered.

Two Colour Bombs

Figure 27:
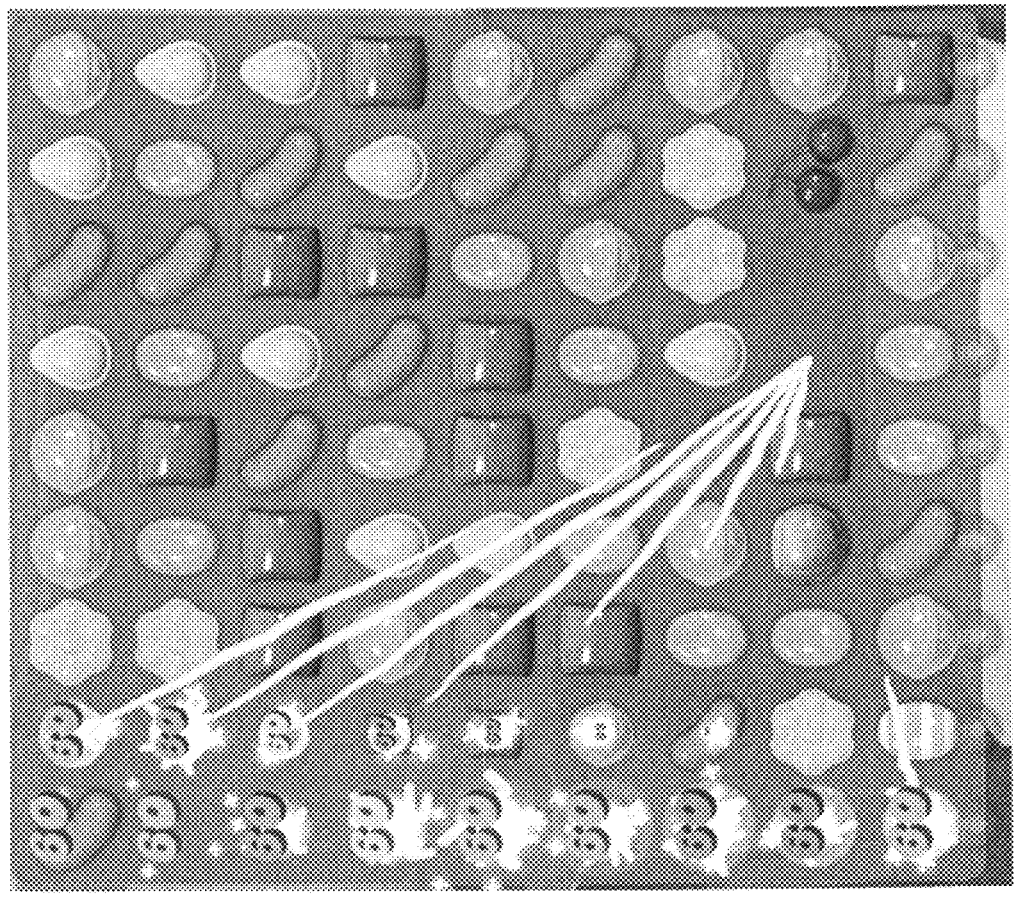
FIG. 27 shows the animation and effect of two matched Colour Bombs.

Combining two Colour bombs will remove all game elements on the game board except if a game element is a multi-layered blocker (see description elsewhere). If a game element has more than one layer then one of those layers will be removed. FIG. 27 displays one implementation of the animation when two colour bombs have been combined.

Coconut Wheel and Colour Bomb

First, all candies which the game board has the most of will be removed. After those candies have been removed, the Coconut wheel will roll over the board and every candy it rolls over will turn into stripes.

Coconut Wheel and Striped Candy

With this combination, the Coconut wheel will roll over the board and turn all candies it rolls over into Striped candies that instantly triggers.

Coconut Wheel and Wrapped Candy

With this combination, the Coconut wheel turns all candies that it rolls over into Wrapped candies which are then instantly triggered and explodes.

Overview of Special Combinations

Below is an overview of combinations between special game elements:

| | Special Combo impact | | |
|---|---|---|---|
| | Striped | Bomb | Colour Bomb |
| Swedish fish | Swims away and triggers 5 candy on unlit spaces to turn them to line blasts that activate. | Swims away and triggers 5 candy on unlit spaces to turn them to activated bombs. | Turns all 5 random candy of the fish colour into fish that each swim and trigger 5 unlit spaces (25 clear). |

Special Combo impact

|  | Striped | Bomb | Colour Bomb |
|---|---|---|---|
| Coconut Liquorice | Does the 3 step activation roll twice. Second goes back after first stops. | Does a full 9 step activation roll that triggers touched candy into activated bombs. Wrap around. | Full wrap around to activate 9 line blasts (i.e. all visible drop). |
| Jelly Frog | Created big Frog. | Fills out both balance counts with 9 each, each explosion taking 1 colour. | Triggers 2 simultaneous colour bombs of the 2 balance colours. |
| M&M multiplier | Doubles scores for 10 seconds and makes each combo trigger a line blast in same period. | Doubles scores for 10 seconds and makes each combo trigger a bomb in same period. | Doubles scores for 10 seconds and makes each combo trigger a colour bomb in same period. |
| Magic chocolate | Makes a triple size chocolate, same explosion as other big. Crack to reveal next delivery. | Makes a chocolate bomb. Explodes twice and reveals an order each time. | Makes a triple size chocolate, same explosion as other big. Crack to reveal next delivery. |
| Magic chocolate alt. Mode | Makes a triple size chocolate, same explosion as other big. Crack to reveal 9 extra of the colour to collect. | Makes a chocolate bomb. Explodes twice and reveals 9 of a missing colour each time (18 collected extra). | Makes all of lowest colour into chocolate, collecting the converted, then each small chocolate explodes in 5 square cross. |

Blockers

The game implements several different kinds of so called Blockers. Blockers are negative game elements that are in the way for the player when wanting to make matches on different areas of the game board.

The different blockers appearing in the game are:
Frosting blocker
1 Layer Frosting
2 Layers Frosting
3 Layers Frosting
4 Layers Frosting
5 Layers Frosting
Expanding Chocolate blocker
Liquorice blocker
Locked objects blocker
Candy Cannon
Chocolate fountain
Marmalade
Bomb The blockers can have different properties, some allow candies to sit on top of them while other allow candies to be included in them. Some fully cover a cell on the game board and are for instance only removed when there is an adjacent match of candies.

Figure 28:
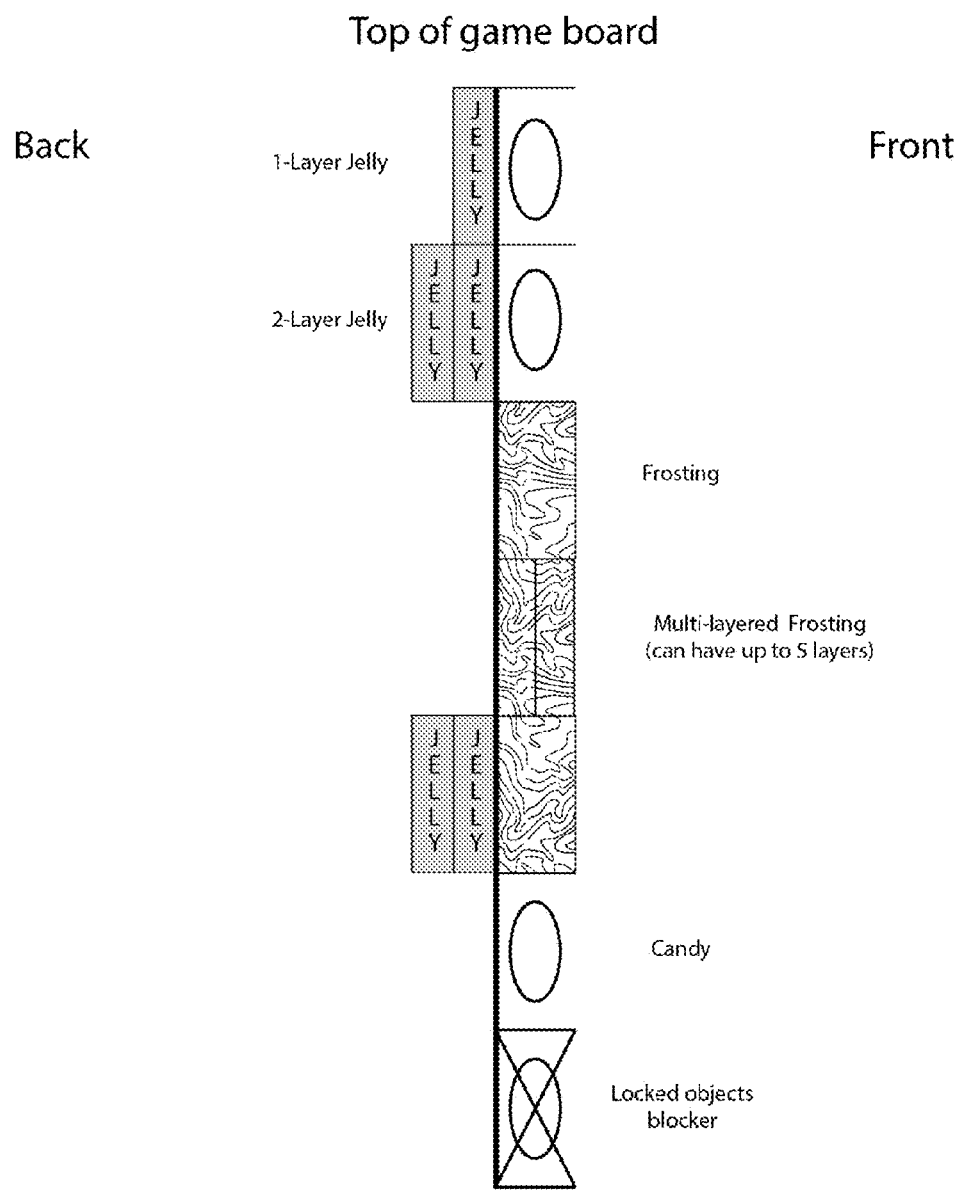
FIG. 28 shows a cross section of the game board and on what layers blockers are placed.

FIG. 28 illustrates the different layers on the game board and how the blockers are placed on it. Jelly blockers are placed in 1 or 2 layers behind candies while Frosting and other blockers are placed on the same level as candy and may or may not have jelly placed behind them or have a candy inside them.

Frosting Blocker

The frosting blocker (see FIG. 29) appears early in the game and functions as an obstacle that is in the way for surrounding candies. Frosting blockers can not be swapped, they are stuck where they are. To remove the Frosting blocker the player has to create a colour match next to the blocker.

Layered Frosting

Figure 29:
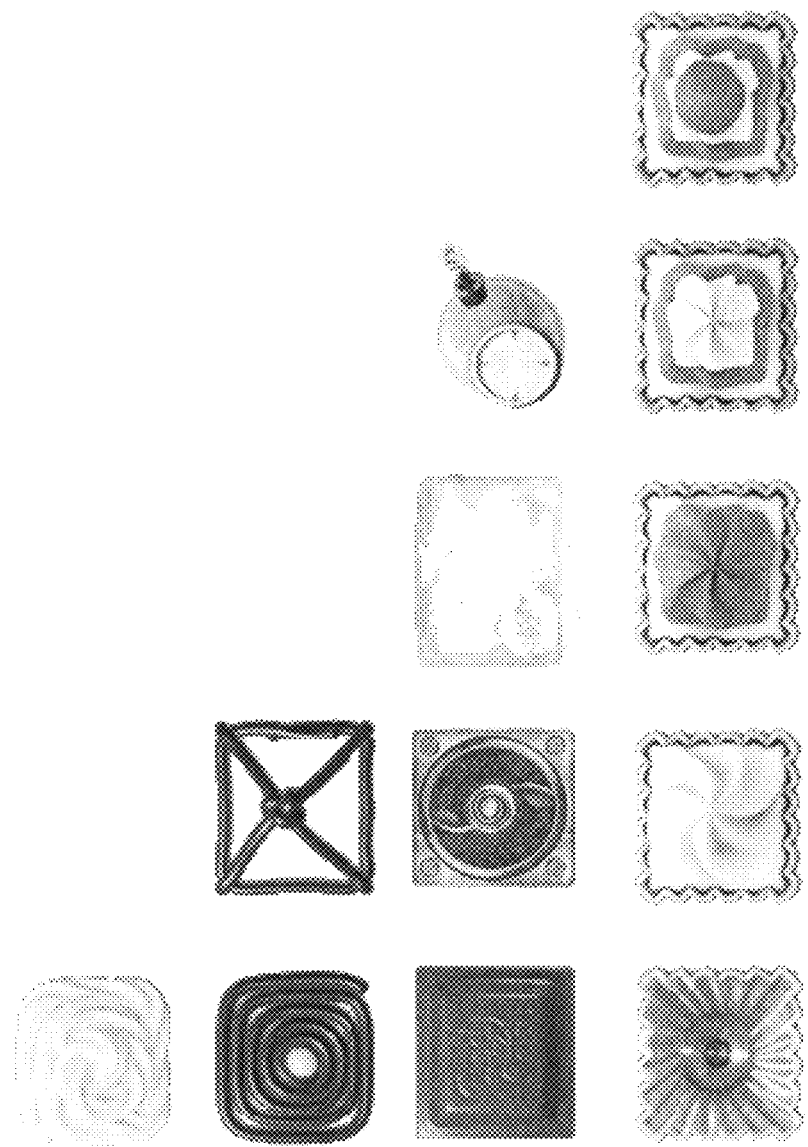
FIG. 29 shows one implementation of the various blockers in the game.

This is another blocker that comes in five different versions (see FIG. 29). It can have 1 to 5 layers which means it needs 1 to 5 colour matches next to it to disappear. A 1-Layer frosting needs one colour match, a 2-Layer frosting needs two colour matches and so on. Layered frostings are stuck where they are and can not be swapped.

Expanding Chocolate

Another type of blocker found in the game is the Chocolate blocker (see FIG. 29). It not only blocks a space on the game board but also multiplies to block even larger areas of the game board. If a colour combination is made next to a Chocolate blocker then no Chocolate block will multiply and that Chocolate block will be removed. However, if a colour match is made and is not next to a chocolate block then one of the Chocolate blocks on the gameboard will multiply and another space on the game board will be filled with a Chocolate blocker. The space that receives a new Chocolate block will always be adjacent to an existing Chocolate block, however, which Chocolate block on the game board it will come from is seemingly random. If all Chocolate blocks on the game board have been removed then no new Chocolate blocks will appear. Chocolate blockers can not be swapped and change places but are stuck where they are. Chocolate blockers can only multiply to a cell on the game board that is occupied with a candy.

Liquorice Blocker

Liquorice blockers (see FIG. 29) need one colour match next to them to disappear. What makes them different is that they are not fixed on the game board but falls down as regular candies. They can be swapped if the candy they are swapping with is part of a colour match. Liquorice blockers can not be matched with each other.

Locked Objects Blocker

This blocker is stuck in place and can not be swapped with other elements (see FIG. 29). The blocker contains a standard candy and can be removed if it's a part of a colour match with candies of the same colour as the one it is holding. It can not be removed by making colour matches next to it.

Chocolate Fountain

The Chocolate fountain (see FIG. 29) is a blocker connected to Chocolate blockers. It creates new Chocolate blockers even if the player as removed all on the game board. The Chocolate fountain can not be switched but is stuck in place. The Chocolate fountain can not be removed.

Marmalade

This is a blocker that holds candies into place so that they can't be swapped (see FIG. 29). The candies may however be part of a colour combination and if so the Marmalade will disappear. The Marmalade will also disappear if a colour match is made next to it.

Bomb (Countdown Bomb—One in Each Colour)

The Bomb (see FIG. 29) is an element that exists in all the standard 6 candy colours. It falls onto the game board at the same time as new candies fall into place when colour matches have been made. The bomb is switchable and falls downwards on the game board like standard candies. The bomb has a timer which counts down for each move that is made by the player. If the timer hits zero then the Bomb will explode and the level will be failed. The player has to stop the bomb from exploding and this is done by matching the bomb with two more candies of the same colour or removing it with the help of a special candy.

Boosters

Candy Crush Saga™ has a wide selection of boosters available to the player. Boosters are items or features that help the player by enhancing gameplay and support, assist, or increase power or effectiveness. In the game, boosters unlock as the player progress through the game. To be able to use a booster the player must pay to top it up with a certain amount of charges, or receive a booster as a gift from a friend. Using a booster once will remove one charge and when there are no charges left the booster will need to be topped up again. In the implementation of this game the player can choose to use boosters either before starting a level, when playing a level or when ending a level.

Pre-Level Choice of Boosters

There is an option to choose what boosters to use before starting a level. This is referred to as a pre-level choice of boosters. Boosters available for a pre-level choice are:
  Jelly Fish
  Coconut Wheel
  Colour Bomb
  Extra Time
  Striped Wrapped
  Lucky Candy In-Level Choice of Boosters The player can choose to use booster in action and at the exact moment when they need them. This is an In-level choice. Boosters available for an in-level choice are:
  5 Extra Moves
  Lollipop Hammer
  Free Switch
  Shuffle
  Bomb Cooler
  Sweet Teeth
  Bubble-gum Troll End-Level Choice of Boosters If being very close to completing a level but knowing you are not quite there and the level is about to fail, then there is a choice of boosters at the end-level. Boosters available for an end-level choice are:
  5 Extra Moves
  Bomb Cooler
  Extra Time Charms Some boosters are permanent and will only have to be purchased one time, these are called Charms. After a first initial payment the Charm will be available to the player forever and will never have to be topped up.

Permanent Boosters—Charms

There are three different charms available in Candy Crush Saga™:
  Charm of Life
  Charm of Stripes
  Charm of Frozen Time Charm of Life Charm of Life increases the maximum number of lives from 5 to 8. It is a passive permanent booster which means it is always in use and the player does not need to do anything to take advantage of its effect. To buy the charm the player has to pay 169 Facebook Credits which is equivalent to £11.20 GBP. When buying this charm the player receives a free life top up.

Charm of Stripes

This charm is booster that is available when playing a level. It lets the user create a Striped candy once per game. To use the charm, the player clicks on the icon for the charm and then on the candy they wish to transform. To buy the charm the player has to pay 399 Facebook Credits which is equivalent to £26.45 GBP.

Charm of Frozen Time

This charm freezes time on levels with time limits. It's included in the group of pre-level choice boosters and if the player wants to use the charm it will then have to be chosen before starting a level. To gain use of the Charm of Frozen Time the player has to pay 249 Facebook Credits which is equivalent to £16.51 GBP.

Non Permanent Boosters

The selection of non-permanent boosters are:
  Jelly Fish
  Coconut Wheel
  Colour Bomb
  Extra Time (can be used in different places. End-game)
  Striped Wrapped
  Lucky Candy
  5 Extra Moves (can be used on different places. End game)
  Lollipop Hammer
  Free Switch
  Shuffle
  Bomb Cooler (can be used in different places. End game)
  Sweet Teeth
  Bubble-gum Troll Jelly Fish Jelly Fish is a booster that adds Jelly Fishes as game elements on the game board together with all the standard candies. As described elsewhere, the Jelly fishes on the game board need to be match with 2 more candies of the same colour and if doing so 3 random game elements will be removed from the game board. To gain access to this booster the player has to pay 19 Facebook credits which is equivalent to £1.26 GBP. Paying this will let the player use the booster three times before it has to be topped up again.

Coconut Wheel

Figure 30:
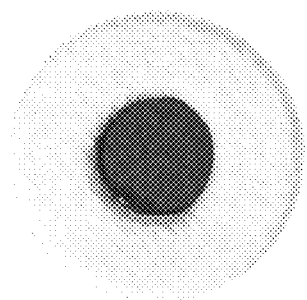
FIG. 30 shows one implementation of the Coconut wheel.

In some implementations, this booster can only be used in ingredients levels. When using the booster it appears as an extra candy piece on the game board that looks like a pink round candy with some black candy filling in the middle (see FIG. 30). To trigger the Coconut wheel it can be switched with any game element and does not need a colour match.

Figure 31:
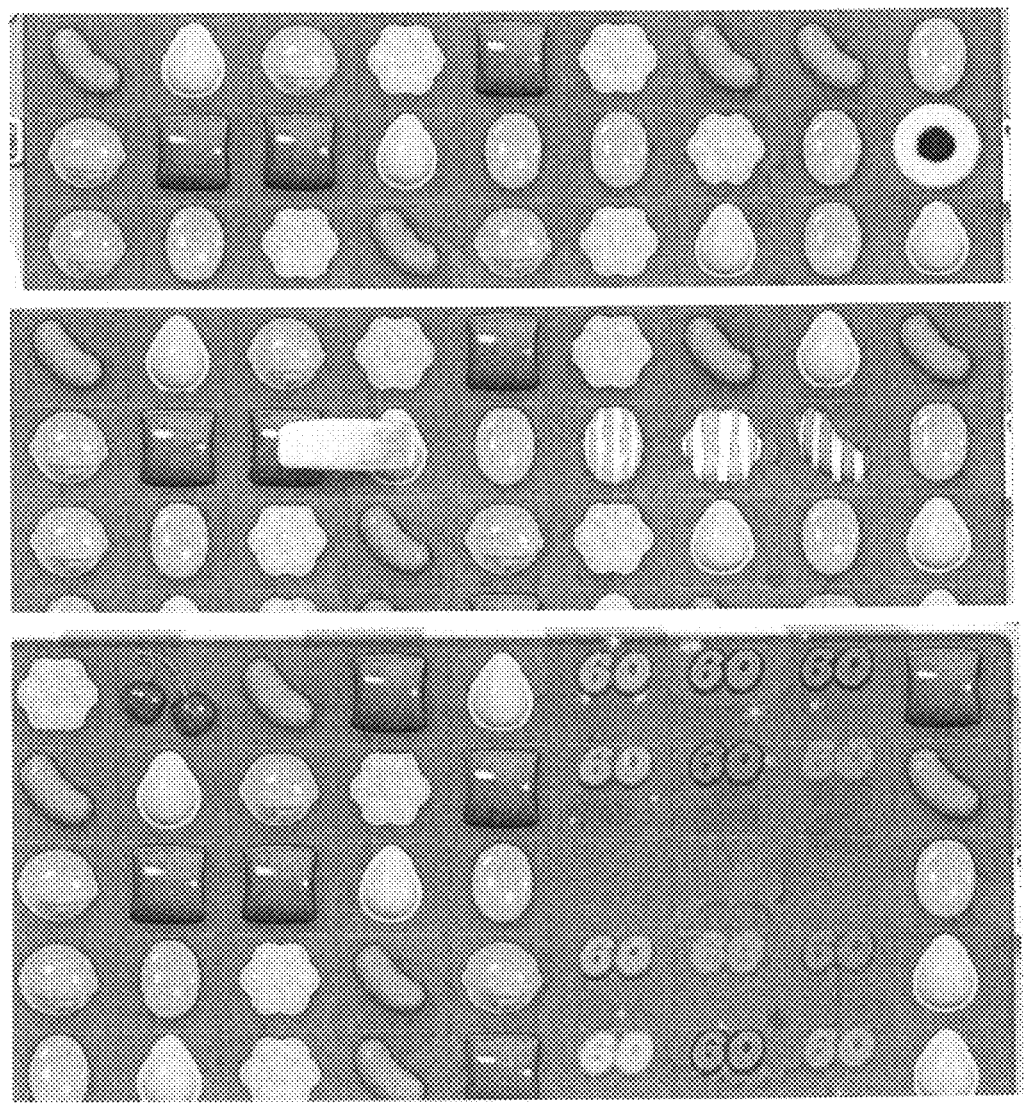
FIG. 31 shows the activation and use of a coconut wheel.

When triggered, it rolls over the game board in the same direction as it was switched in. In its path the Coconut wheel transforms 3 standard candies into Striped candies which in turn are instantly triggered. When the wheel starts spinning it also removes the candy it was swapped with. FIG. 31 illustrates one implementation of the Coconut wheel before it has been switched with a candy and after is has been activated.

When activated, the wheel rolls over the game board and creates three striped candies which then automatically triggers.

If the player wants to use this booster they can pay 39 Facebook Credits which is equivalent to £2.59 GBP. The booster will then top up and let the player use it three times before it needs to be topped up again.

Colour Bomb

The Colour bomb booster can be used on all levels. It lets the player start a level with one Colour bomb on the game board. To buy it the player has to pay 9 Facebook credits which will let the player use the booster three times before it has to be topped up again.

Extra Time

This booster gives the player 15 extra seconds either in the beginning of a level or when time is up on a level. If buying it when time is up it costs 9 Facebook credits which is approximately £0.53.

Striped Wrapped

This booster lets the player start a level with one Striped-and one Wrapped candy on the game board. To use it the player can top up the booster for 19 Facebook credits which will then let the player use the booster 3 times.

Lucky Candy

The Lucky Candy booster adds Lucky candies on the game board which will turn into useful candy when removed. The Lucky candy booster costs 29 Facebook credits (£1.92) to top up and will then let the player use it three times before it needs to be topped up again.

5 Extra Moves

This booster is available to buy at any point when playing a level. It has a booster icon that can be pressed but there is also a reminder message that appears when starting to run out of moves. In some implementations, the booster becomes available when the player has five moves left. The booster may also appear when already being out of moves, giving the player the option to continue the level. If using the booster it instantly gives the player five extra moves which can help the player to complete the level. To use the booster the player needs to pay 9 Facebook credits.

Lollipop Hammer

Figure 32:
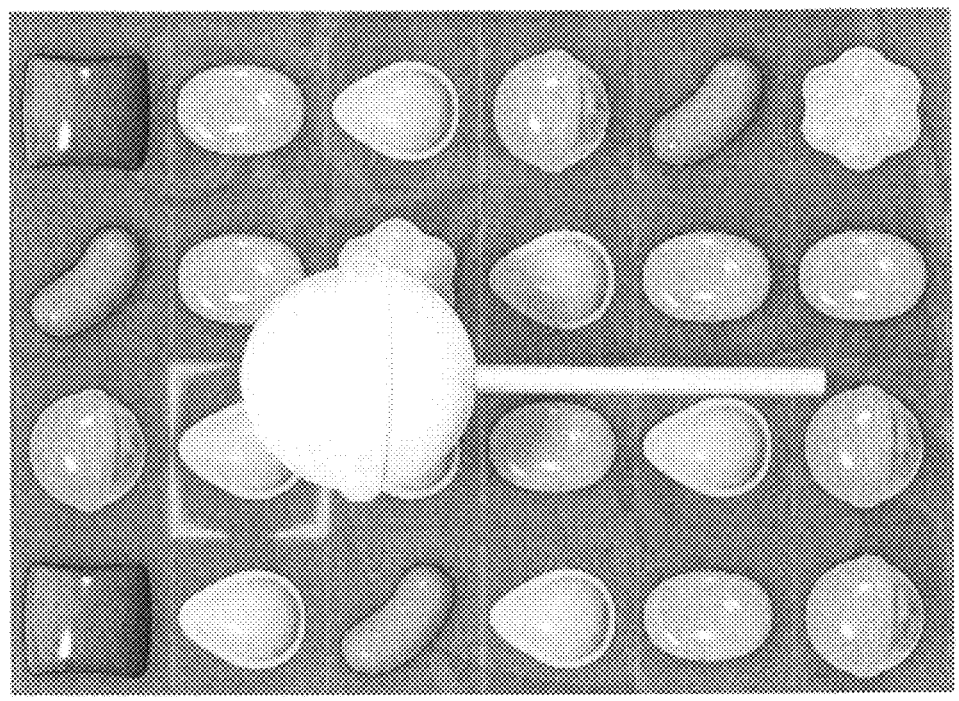
FIG. 32 shows one implementation of the Lollipop booster.

The Lollipop hammer lets the player remove any candy from the game board. The booster can be used at any time when playing a level. The player simply clicks the booster icon which, in one implementation, will turn the cursor into a big lollipop, see FIG. 32. The player then clicks on the candy they wish to remove and the cursor/lollipop will break and remove that candy.

Free Switch

Figure 33:
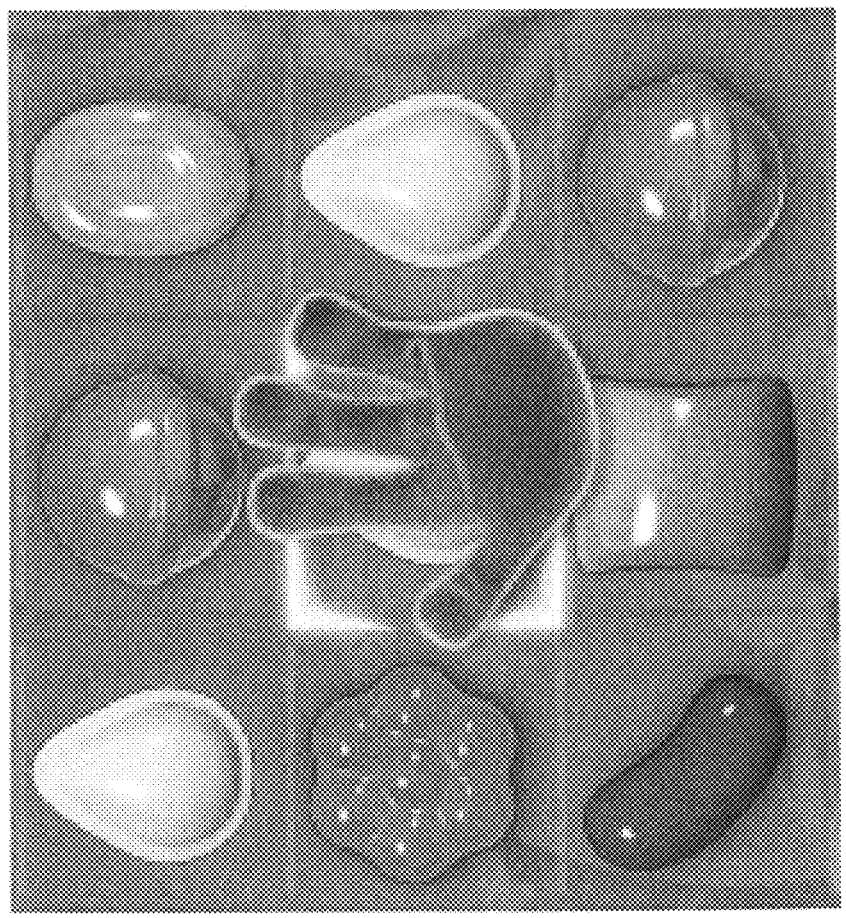
FIG. 33 shows one implementation when using the Free Switch booster.

This booster lets the player switch two candies on the game board even if no match will be made. If clicking the booster icon then in one implementation, the cursor turns into a hand or a glove (see FIG. 33). To use the glove the player switch two candies like normal. To use the booster the player must have topped it up using Facebook credits. Topping it up lets the player use the booster three times.

Shuffle

The Shuffle booster shuffles all the candies on the game board.

Bomb Cooler

The Bomb cooler helps the user with bombs that are counting down. The booster adds 5 more to the timer of the bomb and rescues the player from failing a level. If the bomb does reach zero then there is an option to add 5 more on the bombs' timer in order to continue playing. If choosing to use the Bomb cooler when all bombs have reached zero, it will cost 19 Facebook credits (£1.26 GBP) to use it even if the player has uses left from the last top up.

Sweet Teeth

The Sweet Teeth booster destroys different kinds of blockers. To gain access to it the player has to pay 99 Facebook credits (£6.56 GBP) and will then be able to use it three times before having to top up again. When the booster is being used, it flies over the game board and removes blockers by eating them up. The Sweet Teeth is "very fond of chocolate, liquorice and marmalade."

Figure 34:
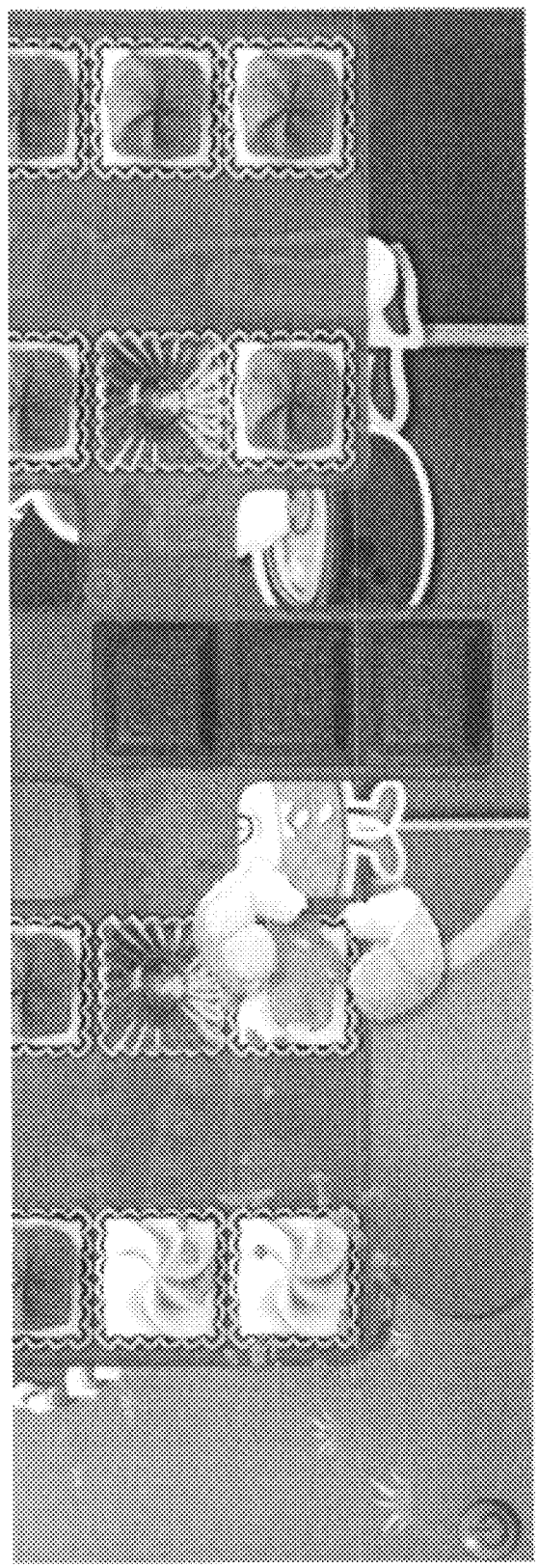
FIG. 34 shows one implementation when using the Sweet Teeth booster.

FIG. 34 illustrates when the Sweet Teeth booster has been activated and various game blocks are being removed.

Bubble-Gum Troll

Figure 35:
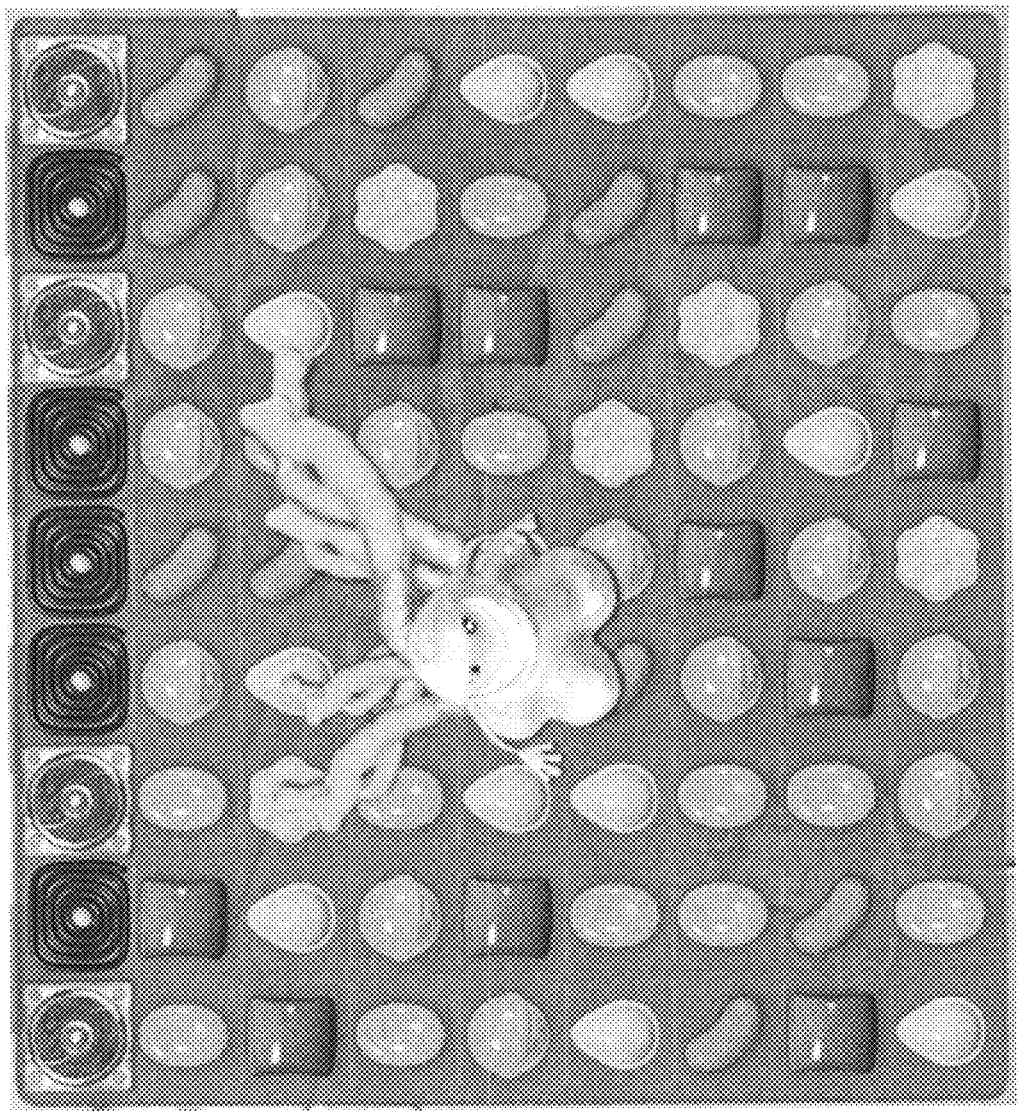
FIG. 35 Shows one implementation of the Bubble-gum Troll booster.
Figure 36:
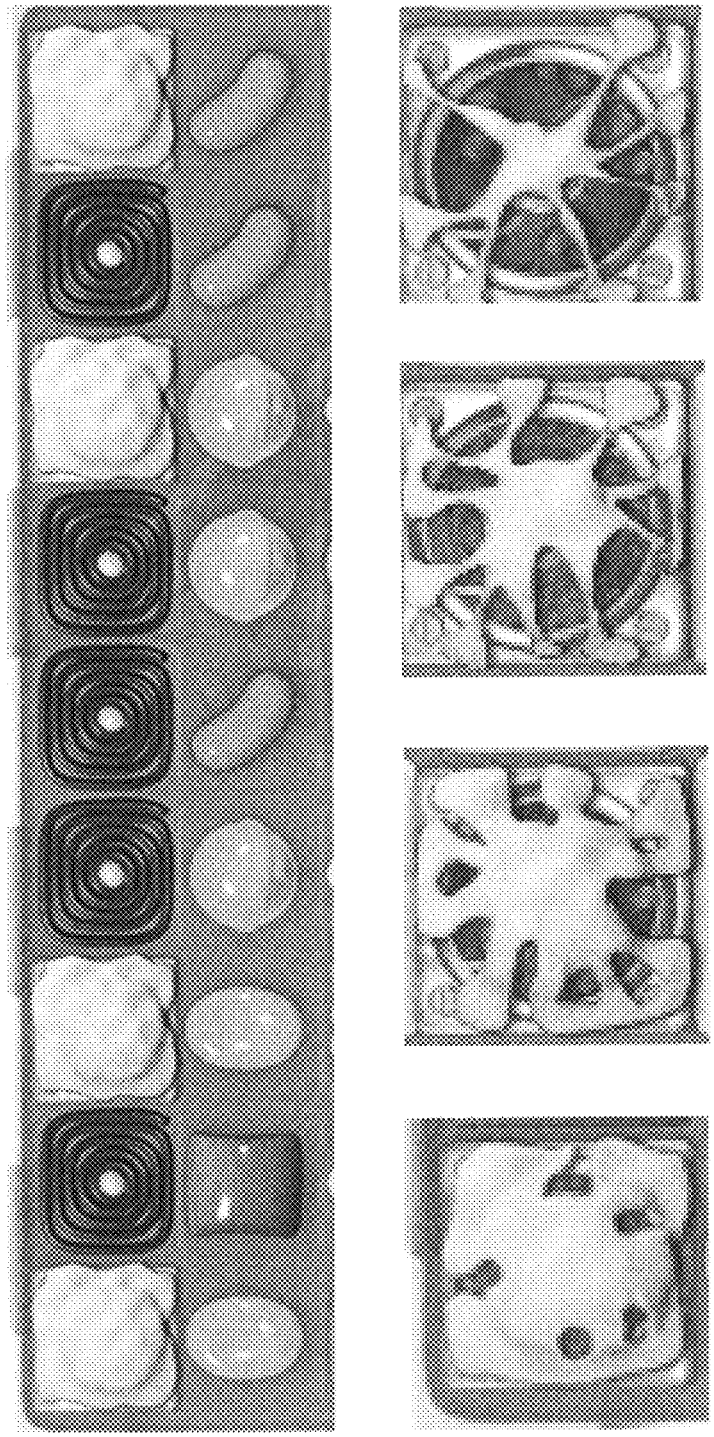
FIG. 36 shows one implementation of the different stages of the Bubble-gum Troll booster.

The Bubble-gum Troll booster helps the player out on levels that contain Chocolate fountains. When clicking on the booster's icon a Bubble-gum troll appears (see FIG. 35) which then shoots bubble-gum on top of the fountains (see FIG. 36). This prevents the Chocolate fountains from spreading chocolate blocks. The bubble-gum stays on the fountains during four switches (see FIG. 36). On the fifth switch the bubble-gum disappears. On the 6th switch a new chocolate block appears. To gain access to the Bubble-gum troll booster, the player needs to top up the booster by paying 39 Facebook credits (£2.59 GBP) which then lets the player use the booster three times before having to top up again.

Creating Your Own Boosters

All boosters are created through a crafting model, that let's the player choose what to create based on items he has collected. Items are collected by playing, gifting or buying them for credits. A booster is only available to craft once you have unlocked it, which will be based on progress.

Special candies that can be crafted are:

Coconut Liquorice: Match with anything for a swirl effect where it rolls in the direction of your switch, turning candy in its path into striped candy with a direction perpendicular to the path of the Coconut Liquorice. The striped candy will then automatically trigger one by one Swedish fish: Swims away and lights 5 random unlit squares in Light up mode.

Chocolate bunny: Hops away to balance your colours in a time of need.

Marshmallow: Switch with a Fudge space and it will suck up all fudge in a 3×3 area around it Hammer: Controlled space clear Special candy that can be crafted for a balance mode where not too many of a certain candy may be collected without another certain candy being collected in between:

Slower balance movement or Freeze balance

Bottom bounce save

Something that eats up some objects of the end that reaches bottom to balance it again A colour changer to increase the amount of the needed colour Special candy that can be crafted for order levels:

Shuffle with positive outcome, behaves like a slot machine to put key power-ups next to each other Free movement: Teleport next to the other piece of the combo Random throw in or add one valuable special candy, no direct control of spot.

Charm Overview

Below is an overview of different charms (referred to as Investment goods):

| Investment goods: Candy Jars | Category | Game mode |
|---|---|---|
| Unlimited Sweeteners (one free per game) | Candy Jars | Any |
| Unlimited Gummi hammers (one free per game) | Candy Jars | Any |
| Unlimited Shuffles (one free per game) | Candy Jars | Any |
| Unlimited Marshmallows (one free per game) | Candy Jars | Any |
| Unlimited extra colour bomb (one free per game) | Candy Jars | Any |
| Unlimited Sugar dusting (one free per game) | Candy Jars | Any |
| Always Swedish fish on | Candy Jars | Light up |
| Always Coconut liquorice on | Candy Jars | Drop Down |
| Always Jelly Frog on | Candy Jars | Balance |
| Always M&M on | Candy Jars | Score |
| Always Magic chocolate on | Candy Jars | Order |

Booster Overview

Below is an overview of different boosters:

| Candy Crush boosters | Category | Game mode |
|---|---|---|
| Impact Boosters: pre game activation | | |
| 15 seconds extra time | Game impact | Classic score |
| 5 extra moves | Game impact | Move based |
| Slower balance shift | Game impact | Balance |
| Bottom balance 1 save | Game impact | Balance |
| Mix in rainbow candy as 3% of all, match all | Game impact | All |
| Remove 1 colour (very powerful) | Game impact | All |
| Start with colour bomb on field | Game impact | All |
| Helper: shows special combos | Game impact | All |
| Activation Boosters | | |
| Sweetener: Turn a Turkish pepper bomb into a harmless candy | Activation | Any |
| Gummi hammer: clear a space | Activation | Any |
| Shuffle: Puts special candy next to each other | Activation | Any |
| Marshmallow: suck up fudge sauce 3 × 3 | Activation | Any |
| Add colour bomb, select where | Activation | Any |
| Sugar dusting: clear a space of 3 × 3, allows to unlock and thaw faster | Activation | Any |
| Special Boosters: one per game mode | | |
| Swedish fish: activate spaces | Special Candy | Light up |
| Coconut Liquorice: rolling trigger, controlled direction | Special Candy | Drop Down |
| Jelly Frog: collects enough of its colour to rebalance | Special Candy | Balance |
| M&M multiplier: doubles scores for 10 seconds when activated | Special Candy | Score |
| Magic chocolate: Mix with any special to create what you need | Special Candy | Order |

Shop

Candy Crush Saga™ offers an in-app shop and in-app purchases in addition to booster purchases.

Lives

Figure 37:
FIG. 37 shows one implementation where the player can ask or pay for lives.

If the player has run out of lives, instead of waiting 30 minutes to gain a new one, lives can be purchased. Paying 12 Facebook credits will refill the lives counter and give the player 5 or 8 lives depending on if the player has previously acquired the Charm of Life. To find where to buy lives, the player can click on the white plus sign next to the counter in the map view interface. If the player does not want to pay for new lives then messages can be sent to friends (see FIG. 37) where the player asks them to send a life. Sending a life to a friend does not cost anything but is free for both the player asking for lives and the person sending a life.

Yeti Shop

Figure 38:
FIG. 38 shows one implementation of the shop's Charms section.
Figure 39:
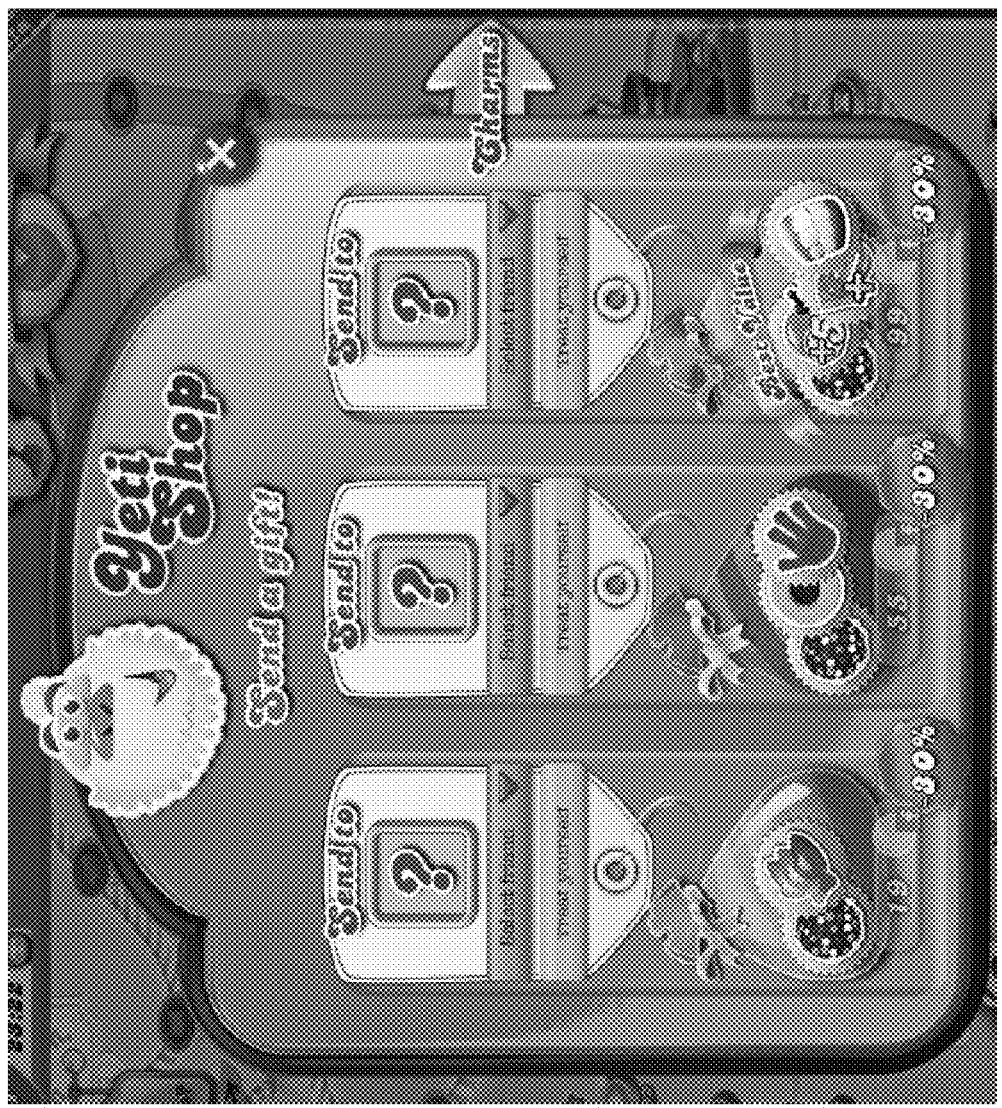
FIG. 39 shows one implementation of the shop's presents section.

In the 'Yeti shop' the player can either buy charms (see FIG. 38) or gifts (see FIG. 39). The charms are personal whereas the gifts are for Facebook friends.

The gifts that may be purchased are:

A bag containing 2 boosters: A Colour Bomb and a Jelly Fish

Cost: 19 Facebook credits

A bag containing 3 boosters: A Colour Bomb, a Free Switch and a Coconut Wheel

Cost: 55 Facebook credits

A bag containing 4 boosters: A Colour bomb, a Bomb Cooler, a Striped and Wrapped and some Sweet Teeth.

Cost: 99 Facebook credits

Tutorial & Introductions

When starting Candy Crush Saga for the first time, the player is given tutorials in order to facilitate learning the game. Tutorials are not exclusive to the first few levels of the game, certain game features are given an introduction at the time they are introduced, which can be far into the overall game progress. Such game features can for instance include new boosters and new game modes.

Level 1

Figure 40:
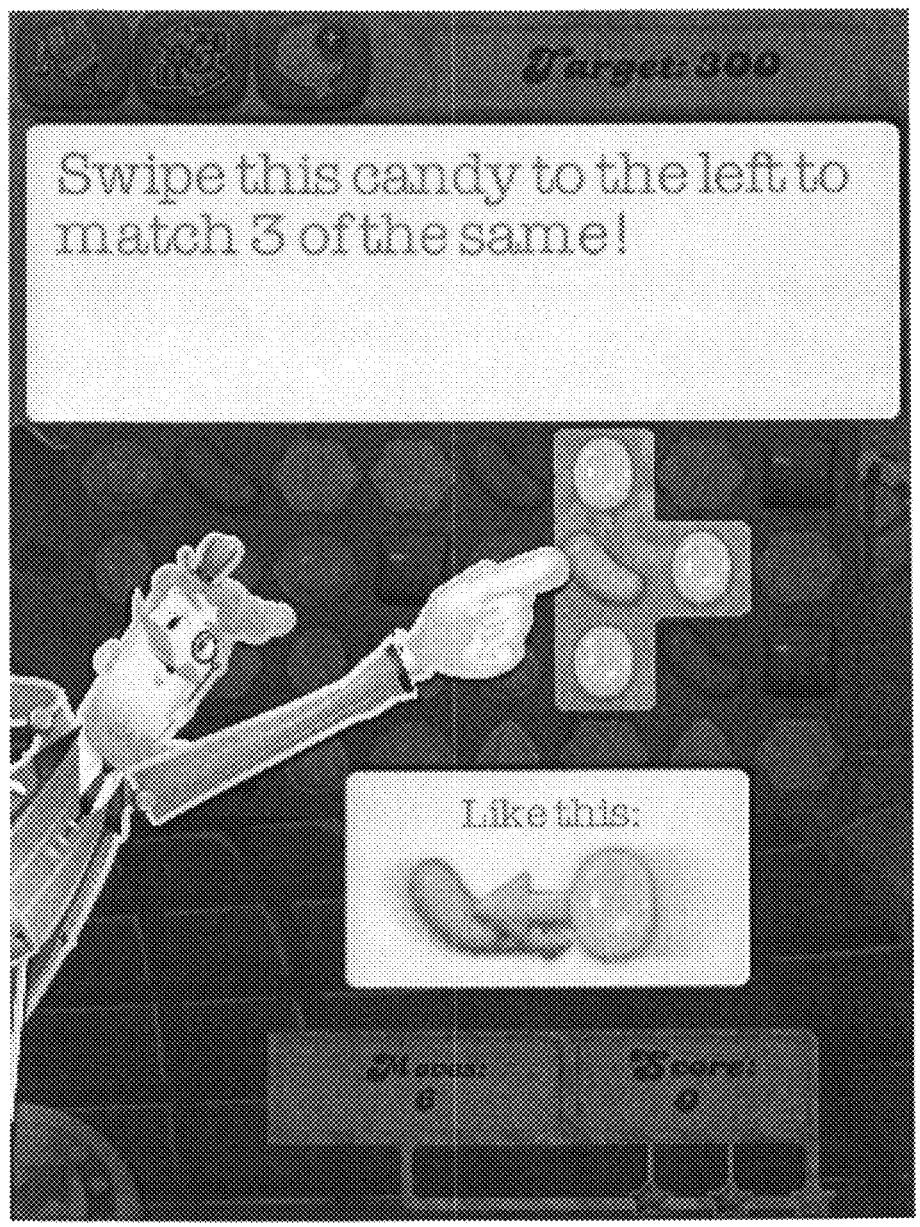
FIG. 40 shows one implementation of the tutorial.

When playing Candy Crush Saga for the first time, level one automatically starts. The player is presented with instructions of how to make the most basic of combinations—three of the same kind of candy, see FIG. 40. This is shown both vertically and horizontally. The game specifies which three candies are to be combined, and the player must then combine those. It is not possible to perform other moves than the ones prompted by the game when playing the level for the first time. The player is prompted to do three specific combinations first and then three of their own choice.

Level 2

Level two starts off with prompting the player to combine four candies, which results in a striped candy. The player is then further prompted to combine the striped candy with two other candies, which results in the striped candy triggering a line blast. It is not possible to perform other moves than the ones prompted by the game. After performing these two moves, the player is told to achieve a certain score within a certain amount of moves. When getting enough points to qualify for the first star of the level (at 1900 points), the concept of stars and score levels is described to the player.

After completing level 2, the player is taken to the map view where level 3 becomes unlocked. Before being able to play level 3, the player is briefly introduced to the Yeti Shop with a message saying that it can be used to send gifts to friends.

Level 3

Level three starts off with prompting the player to combine five candies in a T-shape or L-shape, which results in a wrapped candy. The player is then further prompted to combine the wrapped candy with two other candies, resulting in two consecutive blasts of three times three candies. Once again, the player is unable to perform any other moves than the ones prompted by the game. Once these two moves are performed, the player can freely choose how to perform moves.

Level 4

Level four starts off with prompting the player to combine a wrapped candy and a striped candy that are already placed on the game board at the start. After this single move, the player is allowed to perform moves freely.

Level 5

Level five starts off with prompting the player to combine five candies in a single line, which results in a colour bomb. After this the player is prompted to combine it with another candy, but the player must use the combination prompted by the game. After this move has been performed, an instruction is displayed telling the player the different possible combinations of special candies. However, it does not specify which effects that are generated by these combinations.

Level 6

Level six is the first level introducing a new goal for the game. The goal is to remove all the jelly blocks. It is explained that candies have to be matched in the areas containing jelly for it to be removed. The player is then prompted to make a specific move to remove three candies and also three tiles of jelly. After this single forced move, the player is allowed to perform moves freely.

After completing level six, the player is taken to the map view and is informed that a new booster has been unlocked—the Lollipop Hammer.

Level 7

When starting level seven for the first time, the player is shown how to use the recently unlocked Lollipop Hammer booster. It is described as 'a hammer that can smash candy'.

After completing level seven, the player is taken to the map view and is informed that a new booster has been unlocked—Five extra moves.

In-Game

Game Board

The game board is part of the view that is presented to the player while playing levels in Candy Crush Saga. The term game board signifies the area that contains candies and other elements such as ingredients, jelly and frosting, not the surrounding landscape such as the score meter and the heart showing the amount of lives left.

Figure 41:
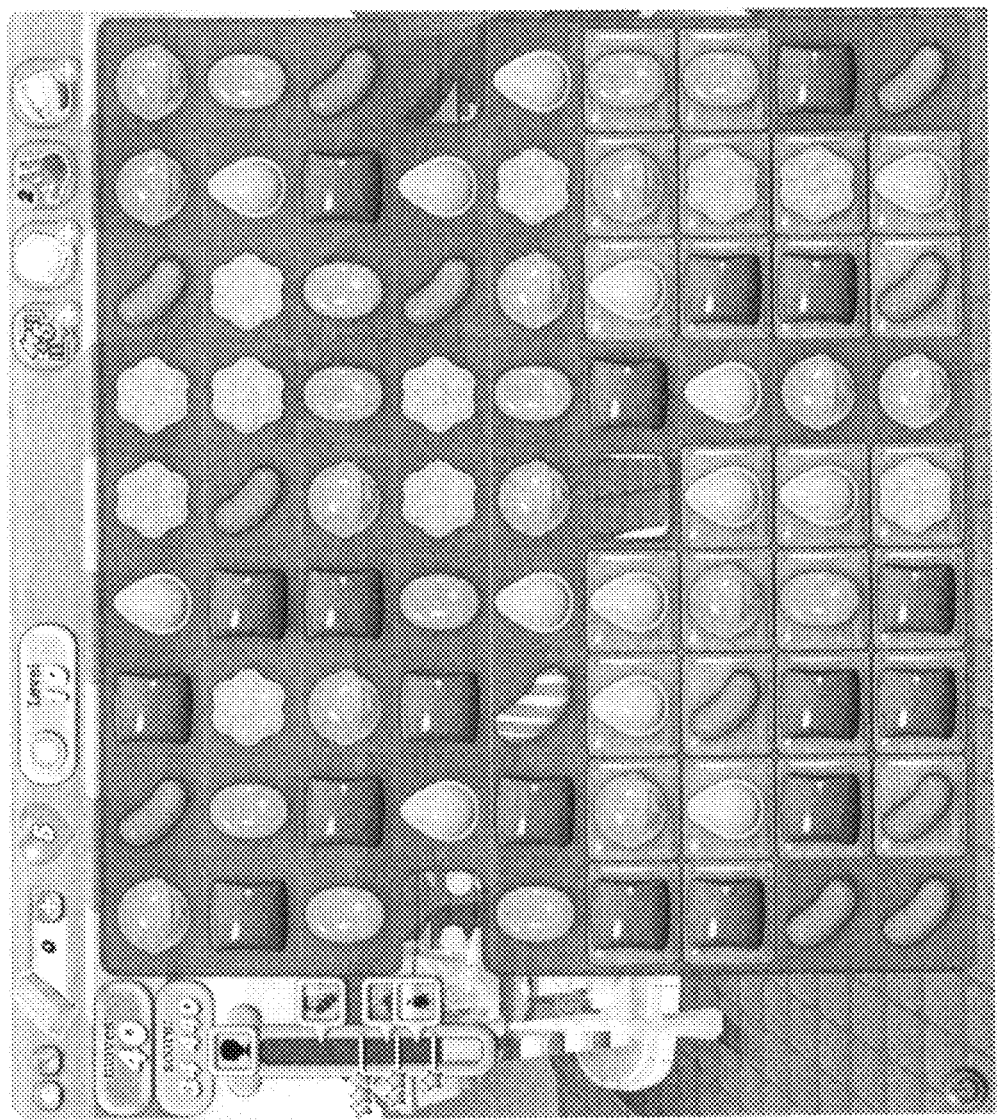
FIG. 41 shows one implementation of a typical game board layout.

FIG. 41 shows one implementation of a game board. There are audio controls used for the music and sound effects. The amount moves the player has left to complete the level is shown. The current score of the player, expressed in absolute points is presented so that the player may follow the gameplay. The star meter, showing an indication of how much points the player has in relation to the pre-defined goals required for achieving a certain amount of stars. The game board is populated with regular candies in a regular cells and regular candies in cells filled with jelly that has to be removed in order to complete the level. The number of lives the player has left is shown. Both the current level of the game and a symbol indicating what the goal of the level is are shown in relation to the game board. The places where new candies enter onto the board when existing ones are removed are shown. In some implementations new candies are generated from the top and fall downwards, in other implementation the candies can be spawned from any position. Available boosters that can be used during the play of a level are also shown.

Figure 42:
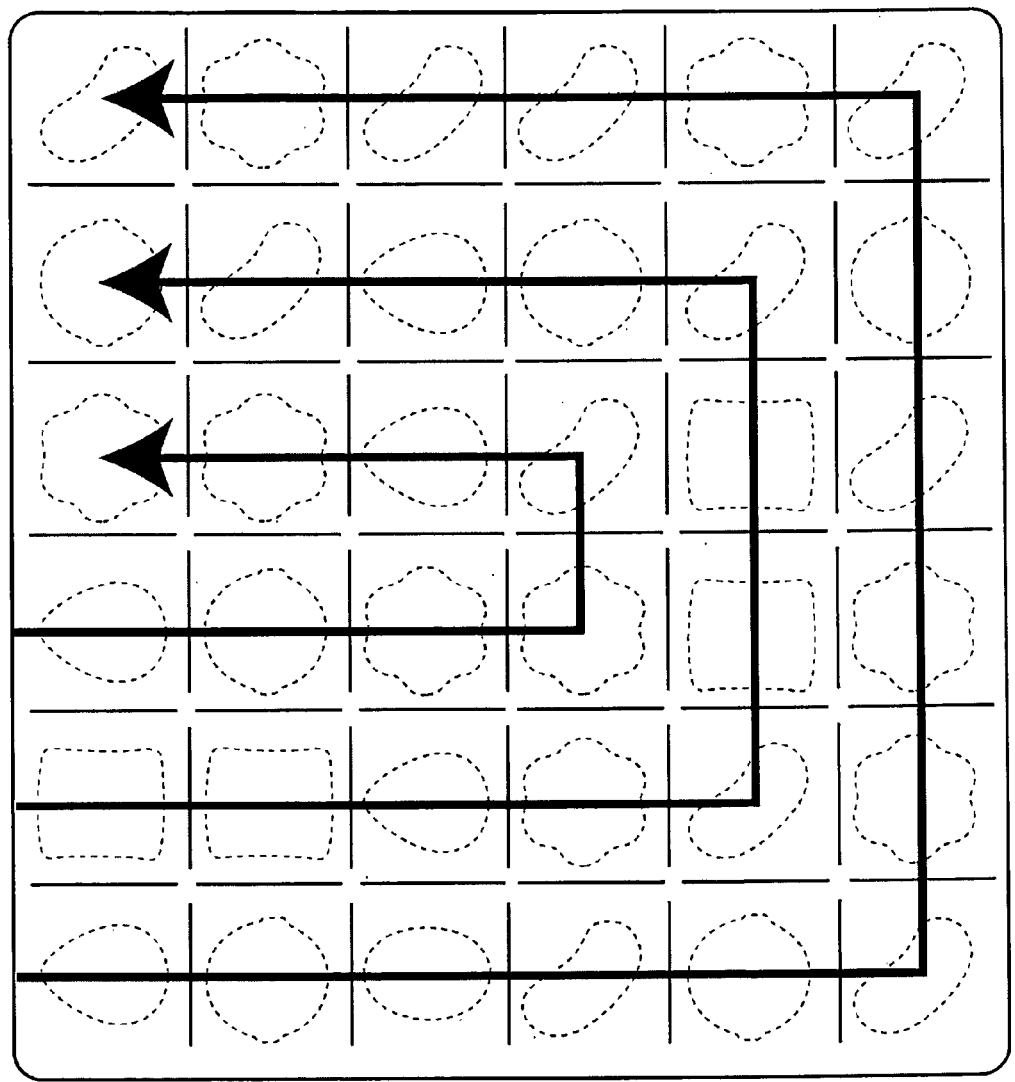
FIG. 42 shows an alternative implementation of the flow of falling game elements.

FIG. 42 illustrates an alternative implementation where new candies fall down from the top of the game board and then change direction to the right before starting to fall upwards again. The arrows in FIG. 42 indicate the direction of the falling candies.

Figure 43:
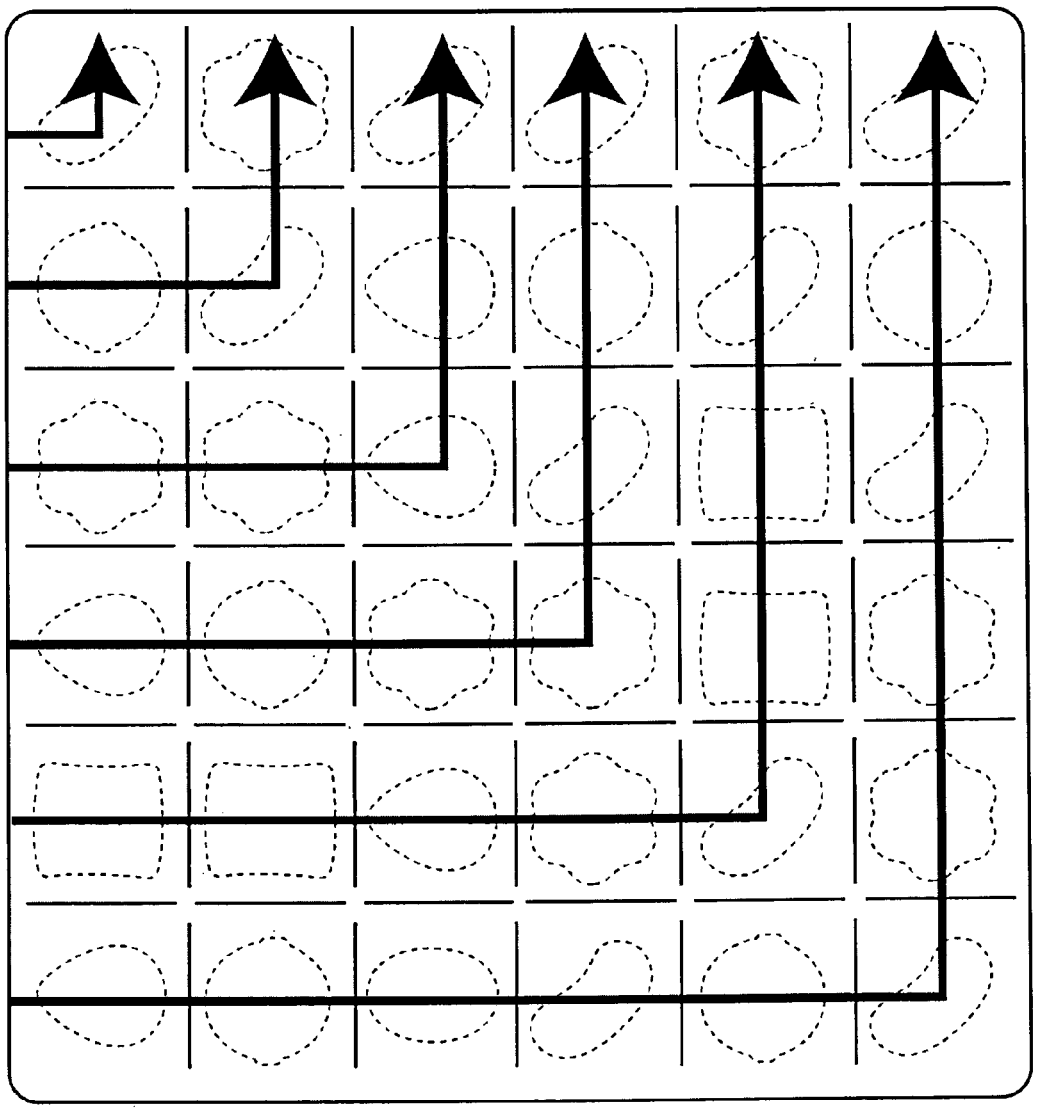
FIG. 43 shows an alternative implementation of the flow of falling game elements.

FIG. 43 shows another alternative implementation of the flow of falling candies; the arrows indicating the direction of the candies.

Different Types of Game Boards

Typically the game board consists of a number of connected areas/cells arranged in a grid that can be occupied by either candies or special game elements. However, there can be more complex layouts as well. For instance, the areas containing game elements do not have to be interconnected. There may be multiple sections of interconnected areas that are not connected to each other, see FIG. 6. This means that candies can only travel between these areas through falling or using 'teleporters'. Also, sometimes the only way to interact with these areas will be through special game elements, for instance striped candies which trigger line blasts, which make for very challenging levels.

Star Meter

In the most basic version, this feature serves the purpose of letting players know their performance while playing the game by showing which level of score they have accomplished. The level of score is determined by the amount of points gathered and compared against predefined levels that will earn the player one, two or three stars. Stars are a representation of how well a player is performing on a level. Achieving at least one star is required to pass a level. Achieving more than one stars indicates that a player is performing better than the minimum required and is a factor that helps drive engagement by making players feel more skilled. The amount of points required to achieve one, two or three stars is pre-defined and typically does not change for any level. However, in some implementations it is possible to have a variable score required for different amounts of stars, for instance one that is correlated with the average scores of all players playing the game.

In some implementations, there are indications of the performance of other players displayed during the play of a level. This information is often based on data from previously completed levels, but it can also be related to levels that have been attempted and failed by other players. Performance information can for instance be derived from a social network connected to the game or from databases more directly related to the game. In some implementations, players can see the score of other players in real-time, thus increasing the competitive element of the game. The other players whose performance will be displayed is sometimes chosen by the player, sometimes automatically derived from a social network of the player, and other times it can be based on other elements, such as the performance of all players of the game.

Figure 81:
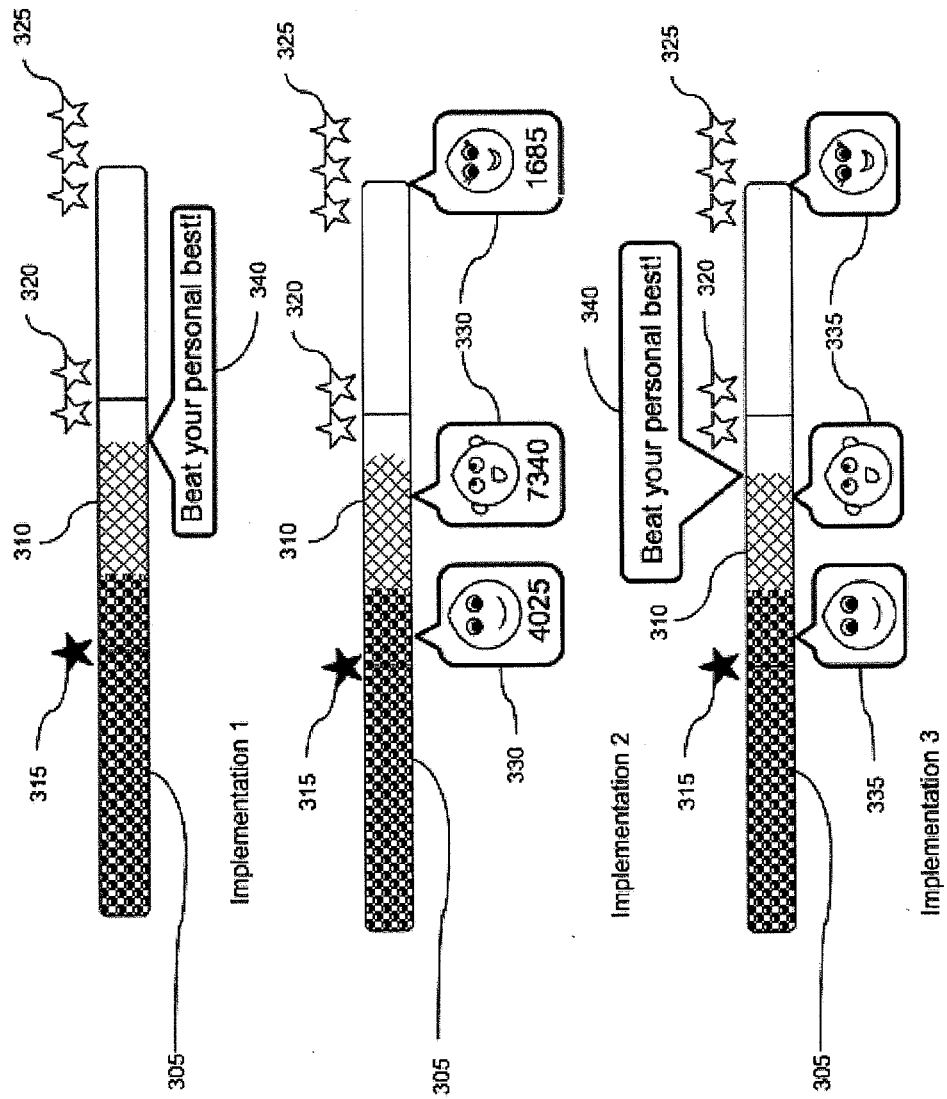
FIG. 81 shows different ways of implementing a score meter and the results of other players.

In some implementations, the player can see indications of the previous high score achieved on a level while playing it, shown by 310 in FIG. 81. It is also possible that no indication of the player's own previous score is shown.

In some implementations, the indications of the performance of other players are shown in relation to the score meter. It can be both absolute and relative indications. The indications can be in the form of pictures associated with the players, as shown by 330 and 335 in FIG. 81. When the player passes the score of another player or the previous best score the player has achieved, a message can be shown to encourage the player and denote the accomplishment. One example of such a message is illustrated by 340 in FIG. 81.

It should be understood that the invention is not limited to using stored scores to show the performance of other players. In one implementation, players can see the scores of other players currently playing the same level while they are playing it, making it so that the indications of other players' scores can be moving in real time during the play of a game.

The score comparisons presented to the player can be given in percentages, points and when applicable other indicators, for instance time played or number of attempts on a level.

The look of a level, as well as the overall look of the virtual landscape, can change as the player performs better. For instance, after achieving one star during the play of a level, the digits shown when scoring points can turn into a different colour. The lookout of the virtual landscape can be come warmer and more colourful as more stars are gained. The look of the game can change according to other variables as well, such as the in-game view changing depending on how many moves are left in order to convey a sense of urgency.

In Candy Crush Saga, the Star Meter also has other important functions. One is that the score of friends from a social network is shown on the meter, if there is data available. This increases competition and incentivises players to replay levels in order to beat the score of friends.

Another function is that the amount of stars achieved on each level is shown next to the levels on the map view. This gives players an overview of their overall performance in the game. Also, in order to complete a level the player needs to reach the amount of points needed to achieve at least one star.

Sugar Crush End Game

Upon finishing a level, Candy Crush Saga displays "Sugar Crush" accompanied by audio saying the words. The first thing that happens after this display is that all special candies trigger one after another, removing other game elements and gaining points. After all remaining special candies have been triggered, the player is awarded for remaining moves, if there are any. Being awarded for the remaining moves when finishing a level is important for making players feel successful and skilled at the game, and is an important driver for increasing replayability. There are two different end game bonuses that trigger depending on the type of level.

Candy Fish

In some game modes, players are awarded for their remaining moves by a number of candy fish spawning. The fish are proportional to the amount of remaining moves left. The fish come from outside the game board and randomly seek out candies, which are removed upon impact. Players receive bonus score for when each fish hits a candy.

Striped Candy Transformation

In other game modes, players are awarded for their remaining moves by a number of candies turning into striped candies and subsequently triggering. The number of candies transforming from regular into a striped version is proportional to the amount of moves left. Upon a candy transforming from a regular version into a striped one, the player is awarded with bonus points.

Wrapped Candy Transformation

In levels where the player has a limited amount of time, there are certain candies that are marked with a '+5' symbol, meaning that they give an additional 5 seconds if popped. If any of these candies remain when the time runs out, they transform into wrapped candies that subsequently trigger.

Overview of Sugar Crush-Effects

Below is a summary for the different types of Sugar Crush-effects for levels with different goals:

Target score—there is no real sugar crush effect here, except unactivated special candies being activated.

Jelly—for every move remaining, three candy fish come on the screen and start eating the candies at random, giving you more points.

Ingredients and Orders—both levels have the same effect. For every move remaining, a candy at random will become a striped candy, giving an extra 3000 points for every striped candy. Then they all activate.

Timed – any +5 candies left on the screen will turn into the exploding wrapped candy and activate itself.

Pre-Level

Before starting a level, players have to select which level to play from the map view. The exception to this is the very first time Candy Crush Saga is played, when level one starts immediately. When selecting a level, the player is shown information about the level, such as the amount of points needed, the available boosters that can be used, the goal of the level and also the highscores of friends who have previously played that level, see FIG. 44.

Figure 44:
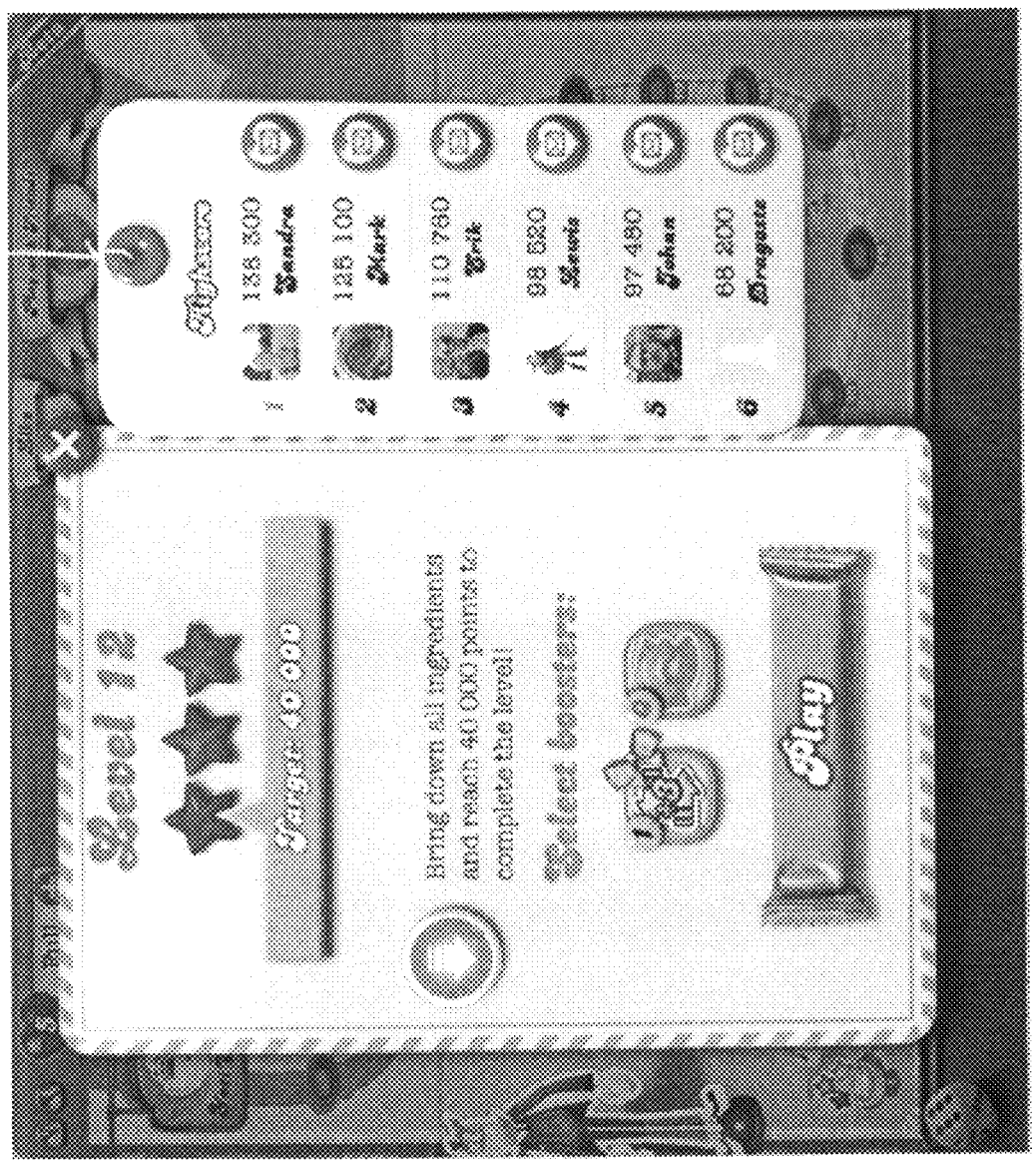
FIG. 44 shows one implementation of a pre-level screen.
Figure 45:
FIG. 45 shows one implementation of a pre-level screen for an already completed level.

A difference between playing a level for the first time and playing a previously completed level is that the previous best score of the player is displayed, together with the amount of stars achieved, see FIG. 45. Also, the text that is telling the player what the target goal is, in terms of points, is changed depending on how many stars the players has achieved before. As can be seen in FIG. 44 and FIG. 45, the target goal in FIG. 44 is 40 000 points, which correlates to one star on the level. When the player replays the same level after already achieving two stars, as seen in FIG. 45, the target goal is displayed as 100 000 points, which correlates to three stars. Having the game set up in this way increases replayability by making players focus on always improving, but not necessarily too much at a time. If the first goal presented was the one correlating to three stars, players could feel inadequate if they get less points than that, even if the level was completed.

The player can choose boosters, that will in some way affect the game play, before starting a level. Boosters are unlocked and gained as the player progresses throughout the game, but it is also possible to purchase more boosters. As can be seen in FIG. 44 and FIG. 45, players can only select boosters that are applicable for the type of level to be played and boosters which they have at least one of. If they player does not have enough boosters, a top up can be purchased.

It is also possible to help friends by sending them lives. FIG. 44 illustrated one implementation where this can be done by clicking on the icon with a heart and letter on it located next to friends' names in the highscore list.

Figure 46:
FIG. 46 shows one implementation of a mobile version pre-level screen.

In some implementations, the pre-level screen shown on a mobile device is slightly different from the one shown on a computer. It has the same core components, but the layout can differ. It does not have the information about the level goal in the standard view, but this can be shown by clicking on a symbol indicating what the goal is, see FIG. 46.

Post-Level

Completing a Level

Figure 47:
FIG. 47 shows one implementation of a post-level screen.

When completing a level, the player is presented with a screen that shows the amount of points gained, the amount of stars achieved and the previous highscores of friends. This is shown in FIG. 47 where the player has earned three stars and is therefore placed on 4th place in the highscore list.

Figure 48:
FIG. 48 shows one implementation of a post-level screen.

FIG. 48 shows an alternative post level screen where the player 'Johan' has just completed the level. The score which he earned on the level places him on 22nd place in the high score list containing friends playing the game. The long high score list shown in the previous figure has been adjusted to also show the current player and the place before and after him on the high score list.

Figure 49:
FIG. 49 shows one implementation when a friend has been beaten.

After the post-level screen has been closed, the player may be presented with yet another screen related to the performance of the just completed level. FIG. 49 shows one implementation of this screen which displays how well the player scored in relation to friends' highscores, together with a message about which friend(s) that has been beaten.

Both the Post-level screen and the screen that shows when a friend has been beaten present the player with an option to share this information. The sharing part is done on a social network to which the game is connected. By sharing information such as which friends the player has beaten, competition is encouraged and the viralisation of the game is increased, due to people not playing the game also being able to see such messages.

It is possible to help friends by sending lives from this screen as well. As depicted in FIG. 49 this can be done with a click on the icon with a heart and letter on it, next to the friends' names. The tick marks indicate that the player has already sent lives to those friends. The player may only send lives to any one friend once within a certain period of time—for instance once per day.

Figure 50:
FIG. 50 shows one implementation of sharing information.

FIG. 50 shows what happens when the player decides to share the score gained on a level. A pre-defined message is shown, displaying what information will be posted in regards to completing a level. The player also has the option to add a comment about the occurrence.

Figure 51:
FIG. 51 shows one implementation of a mobile version post-level screen.

In some implementations, the mobile version of the game has a slightly different post-level screen. When completing a level, the player is given the options of retrying the level or going to the next one. If choosing to play the next level, it starts immediately without going over to the map view. A version of the mobile post-level screen is shown in FIG. 51.

Failing to Complete a Level

Figure 52:
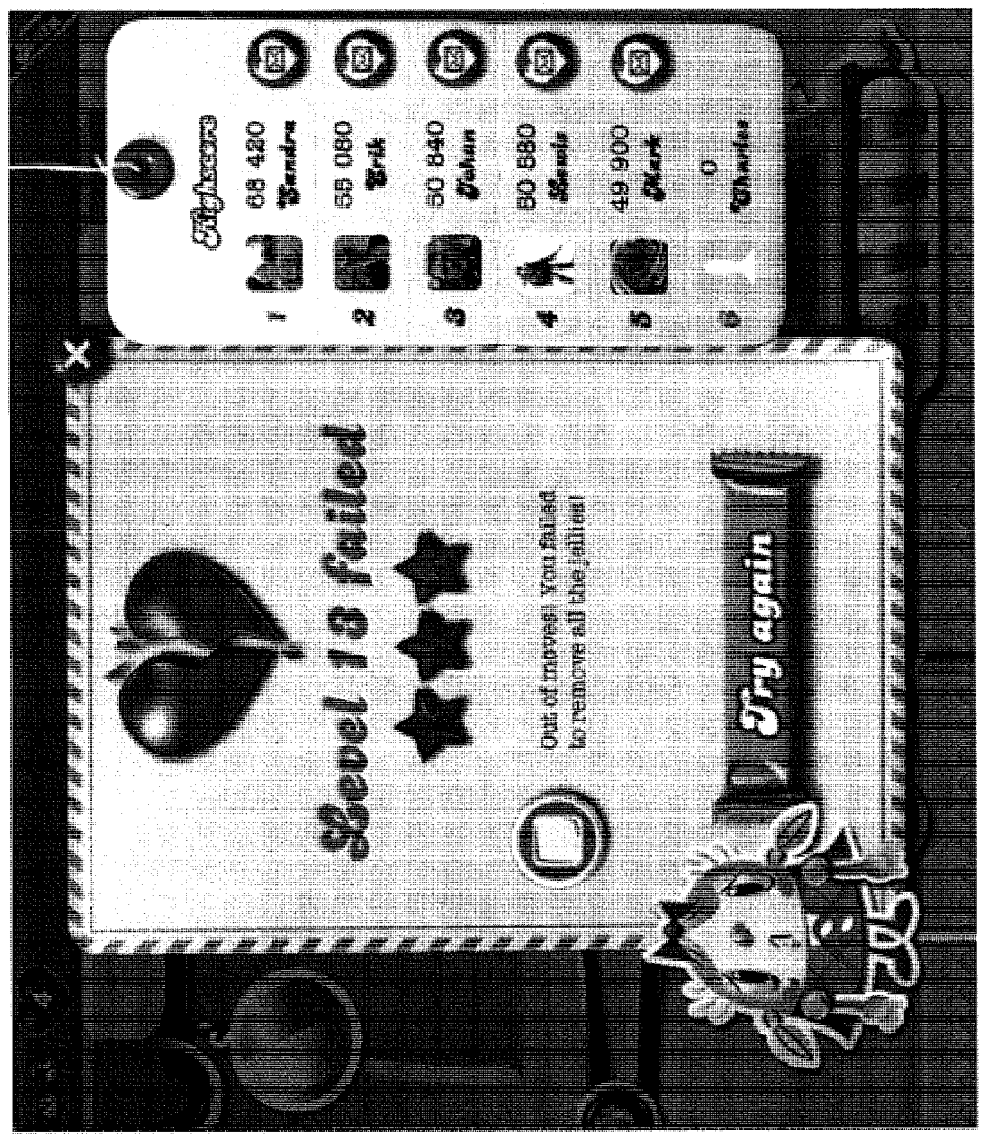
FIG. 52 shows one implementation of the screen when a level has been failed.

When failing to complete a level, a screen similar to the one shown when completing a level is displayed. The difference is that the screen when failing a level has a broken heart on it, together with information stating why the level was failed (see FIG. 52). Failing a level can happen due to a number of reasons, such as not reaching the minimum score for one star, failing to accomplish the goal or by a bomb exploding. The player is informed of the reason for why he has failed the level. Understanding why you have failed a level increases the likelihood that he player will try to play the level again to reach that target for the level. If wanting to play the same level again there is an option to do so. In one implementation the option to replay the failed level is presented with a large and visually significant button.

Level Progress and Ways of Playing the Game

Ways to Play the Game

Games created using the techniques described herein can be played locally on a player's computer or handheld device. The game can also be played over the Internet where the whole game or portions are downloaded and executed on the local machine or run on a remote computer or server. The user's progress in the game and results can be stored locally and compared to the user and other players on the local computer. The progress and results can in an alternative embodiment be synchronised with other players, either directly or through a server or social network or gaming platform.

Cross-Device and Cross-Game Functionalities

Three platforms in particular are changing the way people expect games to be played. These three platforms are growing at the same time, and provide new input possibilities. To date, games have not absorbed all the new input possibilities.

The first platform is Facebook. The skilled person will understand that where Facebook is referred to in this document, other social network platforms may be used. A Facebook game may be a social game, a game you play with your friends. It is rare or unthinkable to launch a game (i.e. to play for the first time) on Facebook that is a paid game, because people playing games on Facebook expect not to pay to access a game. A Facebook game may be played on the internet, after logging in to Facebook (whether automatically or manually), such as from a personal computer.

The second platform is smartphones. Use of smartphones is not always continuous. You may use a smartphone for 5 minutes on a bus, and then for 20 minutes on a connecting train, for example. The use can have many starts and stops. Not like someone working at an office desk or at a home desk in a conventional way. A smartphone can be on an iOS platform, or on an Android platform, for example.

The third platform is tablets. What is a tablet? It can function as a mobile device and as a non-mobile device. The tablet can be a substitute for a personal computer. A user may want a seamless experience between using the game on a personal computer and on a tablet and on another mobile device. A tablet can be on an iOS platform, or on an Android platform, for example.

A game which works on a plurality of such as all three of the above platforms (or more), may provide a connected fully-synchronized seamless experience. Hence multi-platform games are important. Key criteria for multi-platform games are: they are free, they are social, stop-start use is possible, and seamless experience is provided. Such games may be "played anywhere" e.g. in a mobile environment or in a non-mobile environment. Such games may also be played online or offline.

The game must be fun when used in a stop-start way, and when used for even just short intervals. In an example, a game consists of parts or levels, each of which runs for about 3 minutes, eg. between 1 and 5 minutes. In an example, a game is structured in levels, so that if successful in a game level, such as by scoring a minimum score, a user can progress from that level to the next level. In an example, a game has about 200 levels.

A game can be optimized post-launch. For example, if it is clear that too many users are failing to progress past a particular level, the minimum score to pass the level can be lowered. An optimized game may be provided as an application update from an application store. In an alternative, a game may be optimized by a server sending a revised data file of scores required to pass each game level to a mobile device, when a game state of a user is being synchronized with the server, wherein the application running on the device replaces the previous file of scores stored on the device required to pass each level with the revised file of scores required to pass each level.

The progress of a player is also synchronised across devices, for instance between a handheld device and a computer. This is described in further detail in Appendix A. The player can play on one platform, have the progress saved and then continue playing seamlessly on another platform. It is also possible for the player to play on offline devices and having the game synchronise when a connection is available.

In some implementations, players can be rewarded for playing the game on multiple platforms. For instance, players active on a computer-based platform could get a bonus for also installing the game on a handheld device.

Players can also be rewarded for playing multiple games that are related, for instance games from the same developer. When choosing to play a new game, the player can receive bonuses in another game. This can be triggered by using a link from one game to the other, or by games sharing information between one another so that it automatically detects a player that is playing more than one game and subsequently rewards them.

It is also possible that games can have elements in common that enables certain objects, for instance boosters, to be usable in multiple games. These games can be located on the same or on different servers. In some implementations, a booster bought in Candy Crush Saga can be used in another game that shares certain features with it.

One example of an implementation with synchronisation across platforms is as follows: A first server, for instance one hosting a social network, with a first data store storing data relating to the state of a game. The first server is configured to communicate with a first plurality of devices, such as mobile phones or personal computers, through a first application programming interface, where the first plurality of devices is related to a first computing platform.

A second server, for instance one hosting a game platform, with a second data store storing data relating to the state of the game. The second server is configured to communicate with a second plurality of devices, such as mobile phones or personal computers, through a second application programming interface, where the second plurality of devices is related to a second computing platform.

A third server with a third data store, configured to communicate with the first and the second server. The three servers are configured to synchronise the three data stores in such a way that when synchronized, the first, second and third data store all relate to a synchronised game state.

Localisation and Updates

It is possible for implementations of the game to vary depending on the location of the player. For instance, the language can be adapted and translated into different languages. It can also be so that updates of the game are incorporated at different times in different locations, in order to avoid interference with the times of the day that players are as most active.

Figure 53:
FIG. 53 shows one implementation of an updating the service message.

If trying to access the game online, as opposed to starting a local version that is saved on the device, while updates are being made, the player can be met by a message saying that the game cannot be accessed right at that moment, see FIG. 53.

The screen in FIG. 53 could be displayed instead of the game as a placeholder for when the game is taken offline, for instance so that the game can be updated with new features and software.

Progress Over Several Levels

Figure 54:
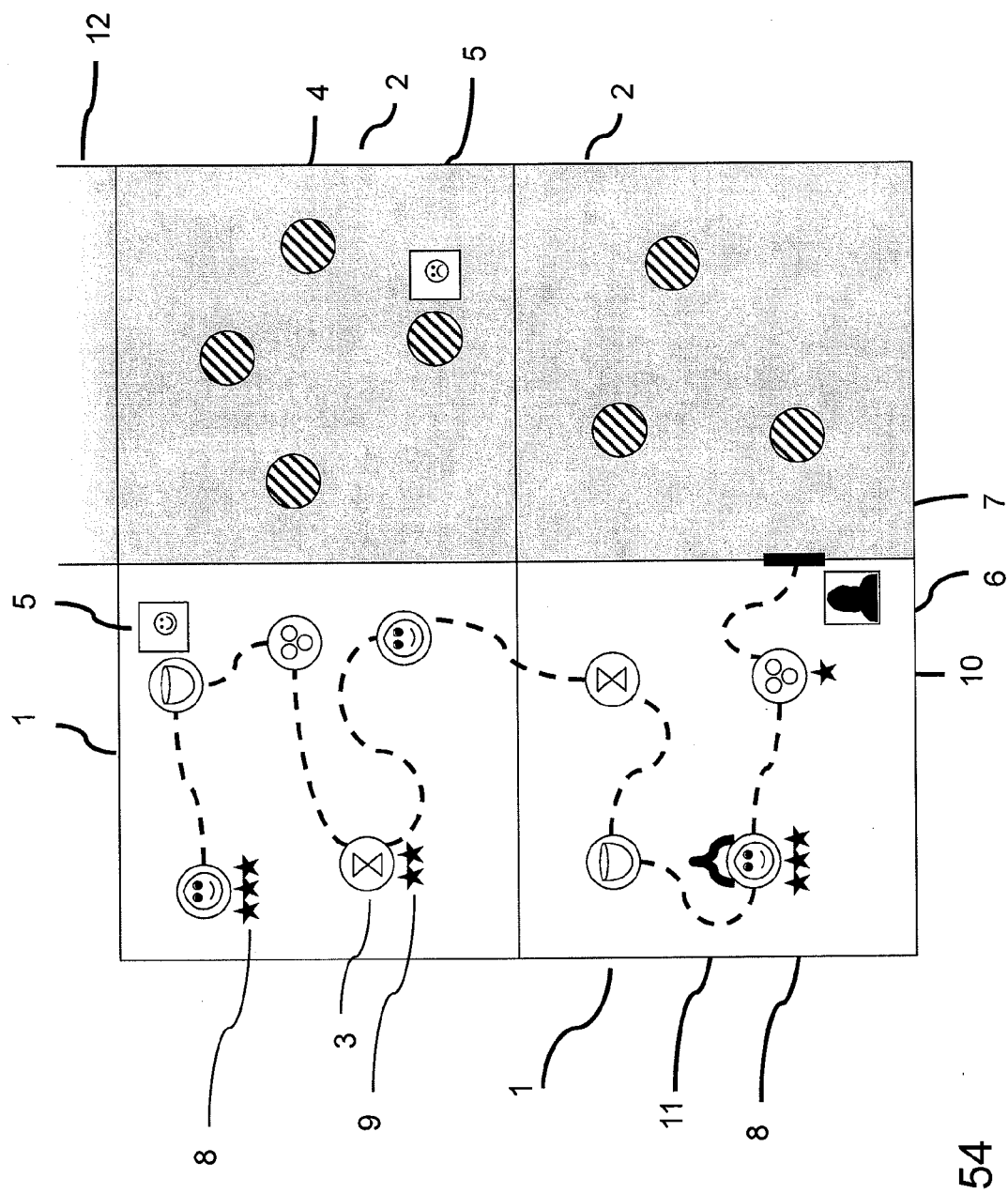
FIG. 54 shows one implementation of a virtual map.

The game can be implemented so that a player progresses through multiple levels of changing and typically increasing difficulty. FIG. 54 shows an implementation of the game with a virtual map layout of a game environment, displayed on the computing device used by the game player. As the player travels through the levels in the game, his progress is represented as a journey along a path in the virtual map. Representing progress in this manner provides an additional layer of engagement for players, and also opportunities for viralisation and monetisation.

The virtual map consists of stages 1, 2 with varying number of levels 3, 4. The user travels between levels and completes the levels one by one along a path by playing the associated game. When the player reaches the goal of a level, the next level is unlocked and the player can play that level in the game. The number of stages and levels can vary depending on the implementation. The levels can be numbered consecutively throughout the game or they can be numbered within a stage, it is also understood that other ways of identifying the stages and levels can be implemented. New stages to the virtual map 12 can be added by the game designers at any time—so a game may be launched with say 20 levels, and after a number of weeks, there may be fifty or sixty levels present.

One way of unlocking new stages is to complete the last level on the latest stage. The user is sometimes faced with challenges 7 to unlock the next stage in the virtual map.

In one implementation, traveling from one stage to another once all the levels have been completed on that stage requires the help of for instance three friends. The player can ask friends for help by sending an in-game message within the game environment or for instance through a social network that the game is connected to. The friends can already be playing the game and do not have to be 'new' players, but they can be friends not already on the same social network.

The player can also pay to get instant access to the locked stage. The player can use a combination of help from friend and payment to unlock the new stage. The cost for unlocking can in some implementations be lowered as a fraction of the total number of friends needed when help from some but not all needed friends have been received.

The request for help is sent to the friend who then has the option to accept to help. The request for help can in some implementations be sent using the social network to which the game is connected; an alternative implementation is to send the request to someone external to the game (via email, text message, instant message for instance) who has to join the game to respond to the help request. This is one of the viralisation techniques implemented in this game.

In addition to the virtual map layout in FIG. 54, there can also be other levels or stages that are not part of the progress along the path in the virtual map. Such stages or levels can be present in the game associated with the virtual map at all times or can be unlocked when the user reaches a certain in-game achievement. This in-game achievement can for instance be completing a specific level, reaching a predetermined high score (for instance, collecting a specific number of stars when completing a level—highly skilled gameplay can win the user three stars) or paying virtual currency to unlock the stage or level.

The map layout in FIG. 54 can be used in games connected to or linked with a social network. It is common that the users on such networks have avatars with for instance a photo of the user and/or the user's name. Such avatars can for instance also be a sign or a figure. The user's avatar is displayed on the map layout alongside the level where the user is 6. It is understood that there are different implementations of showing where the user currently is on the map. This can for instance be the latest level the user completed, the level with the highest score or the last completed level along the traversed path.

The user can in some embodiments be given the option to select which users should be shown on the virtual map. The users to choose from can be friends on a social network, or the user can get suggestions to show friends which meet a certain criteria, for instance friends which the player has interacted with the most in the past or friends living in the same geographic area as the player. The user can get the option to choose from other people not being friends on the social network, but that meet other certain criteria.

The user can play any of the unlocked levels on the map, so the user can go back and replay already completed levels to get a better score or beat friends' high scores.

The player is in some implementations of the game rewarded for good gameplay of a level, for instance reaching a target score. In some implementations the user has to reach a certain number of points to complete a level, reaching this target score can be represented with a symbol such as a star. In one implementation a star is lit when the user reaches a certain number of points in a level. The user can earn more than one star on each level and the levels are re-playable to get a higher score.

The player's total number of stars collected in the game can in some embodiments unlock features. The unlocked features can for instance be power-ups, in-game currency or bonus levels.

The symbol representing how well the user has played on each level can be displayed alongside the level on the map 8, 9, 10.

If the game is connected to a social network or the user has connected with other players in the game, the levels will present a leaderboard showing who among the user's connections has the highest score. There can in some embodiments be a notification 11 shown on the map if the user that has the highest score among the friends connected to the game.

The type of game mode or game goals for a level can be displayed on the map as a symbol.

Animations and Interactions on the Virtual Map

The landscape of the virtual map will typically have animated sequences which give a feeling of the map being alive and dynamic. For example, trees on the map can sway in the wind, animals can move around and the player progressing from one level to another can be accompanied by an animation of a player-associated character moving on the map.

In some implementations, it is possible for the player to interact with objects on the map in such a way that animations are triggered. For instance, clicking on a bird can make it fly into the air and hovering over water can make waves appear.

It is also possible to have any combination of a map that is static but reacts to player input, a static map that does not react to player input, a dynamic map that reacts to player input and a dynamic map that does not react to player input.

Figure 82:
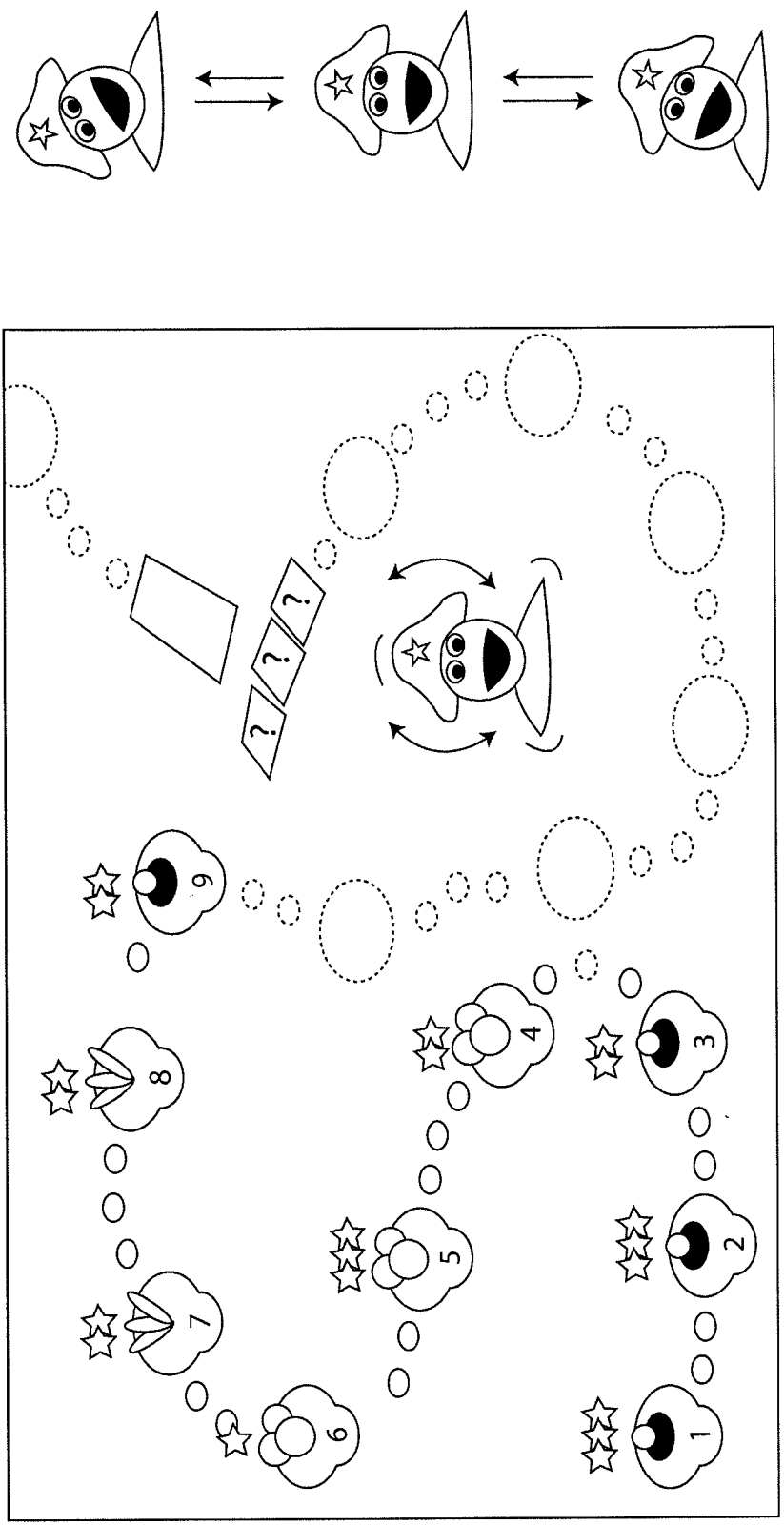
FIG. 82 shows an animation on a virtual map.

One example of how the virtual map can be dynamic and moving is shown in FIG. 82 where as an example, a coconut character moves slightly from side to side. A collection of subtle as well as less subtle animations throughout the map will together make the map appear moving and alive.

Head to Head Tournaments

The game can also be implemented to be played with a limited time or limited number of moves or both over a consecutive set of levels. The score can be collected over the several levels to give the player a score for all the levels completed.

The player can in some implementations play the game in head to head tournaments against one or several other players. The player with the highest collective score over the number of levels will be the winner in the tournament. In some implementations the tournaments are played with real time comparisons of players' scores, in other implementations the scores of players are compared after finishing a level.

The game can also be played in tournaments with jackpots where the player plays the same level where the same types of game elements are used.

The game can also be played in an elimination competition against other players.

Rewards and Bonuses

The game can have schemes for giving rewards and bonuses to players. One reason for giving out rewards is to increase player engagement, and to some extent to help with monetisation. Players can for instance be rewarded for playing multiple days in a row, something that awards persistence and dedication. In other implementations, there is a daily bonus available that is gained by every player playing the game online during that day, or to players passing a certain secret location during that day. By giving players samples of existing boosters, they are given a free preview of purchasable items that potentially can lead to sales in the long run, which helps monetise the game.

Virtual Landscape

The virtual landscape of Candy Crush Saga is presented to the player in between levels. This is also referred to as the 'map view' and the 'virtual map' within this document. The player travels along a virtual path as more levels are completed in the game, which gives the feel of moving forward.

Total Looks

Figure 55:
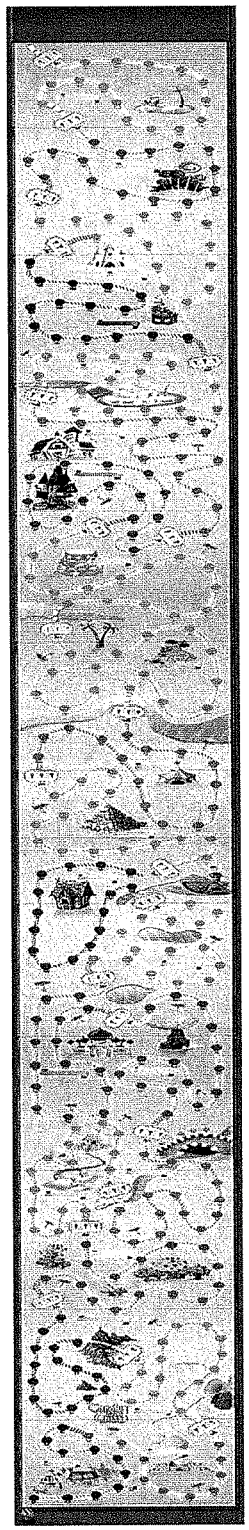
FIG. 55 shows one implementation of a map.

The looks of the map view is in the style of a physical foldable game board (see FIG. 55), such as one commonly used for board games. However, since Candy Crush Saga is not a physical board game but a virtual one, the board is much larger than what can be displayed in a single screen. The player can at any time, while in the map view, look at all available levels and also scroll through the entirety of the game board. Having such a style gives a strong feeling of actually progressing forward in the game as more levels become unlocked.

Navigation

When navigating on a map in a game, it is sometimes difficult to find desired spot or area of the map if the map is, for example, too large. One way to solve this problem is to have mini map in an expandable tab, connected to the edge of the screen, where the player can fast jump to desired location. In this document we refer to the expandable tab and the mini map as the navigator.

Navigator Hidden

Figure 56:
FIG. 56 shows the navigator hidden.

If the player does not need to use the navigator then it is unnecessary for it to take up precious screen space. Therefore, in one implementation the navigator is only in full view when the player needs it; the rest of the time it is hidden with only a small part of it showing, see FIG. 56. Clicking on this small part will expand the navigator (see FIG. 57) and let the player use it. Clicking on the same part again will once more hide the navigator. In one implementation, when the navigator is hidden, a small tab is placed at the bottom right edge of the screen which will in turn expand the navigator when clicked on, see FIG. 58.

Navigate within an Area

When the navigator is expanded, the player is provided with a mini map showing an area of the map. The player can press anywhere on the mini map and when doing so the main view will jump to the same location. The player may also press and drag the mouse up or down over the mini map which will then simultaneously scroll the map in the main view.

Figure 59:
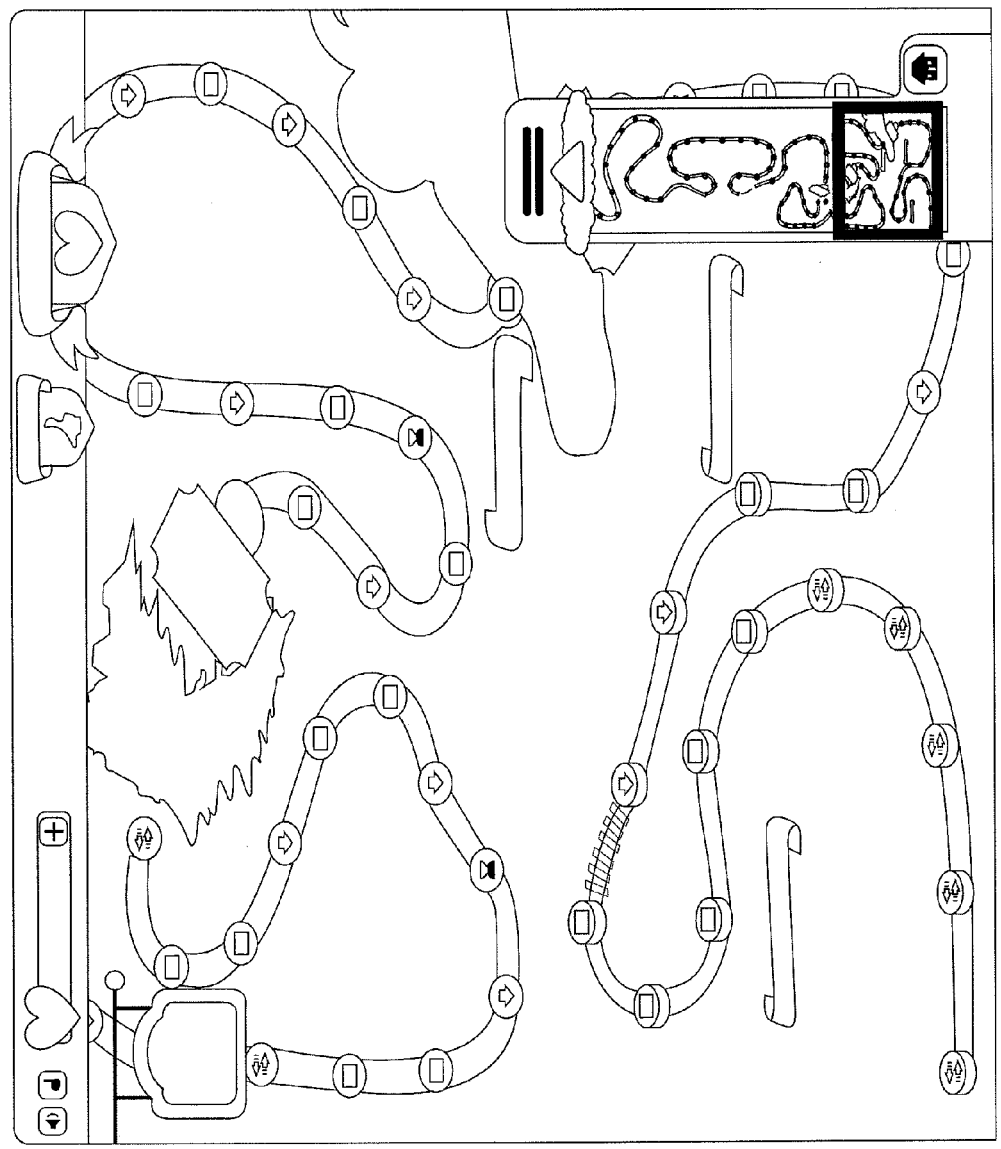
FIG. 59 shows one implementation of the navigator.

FIG. 59 illustrates one implementation of the navigator where there is no more area of the map further down but there is more to view further up (in this implementation that is indicated by a cloud). Pressing somewhere else on the mini map will jump to the same place in the main view.

Figure 60:
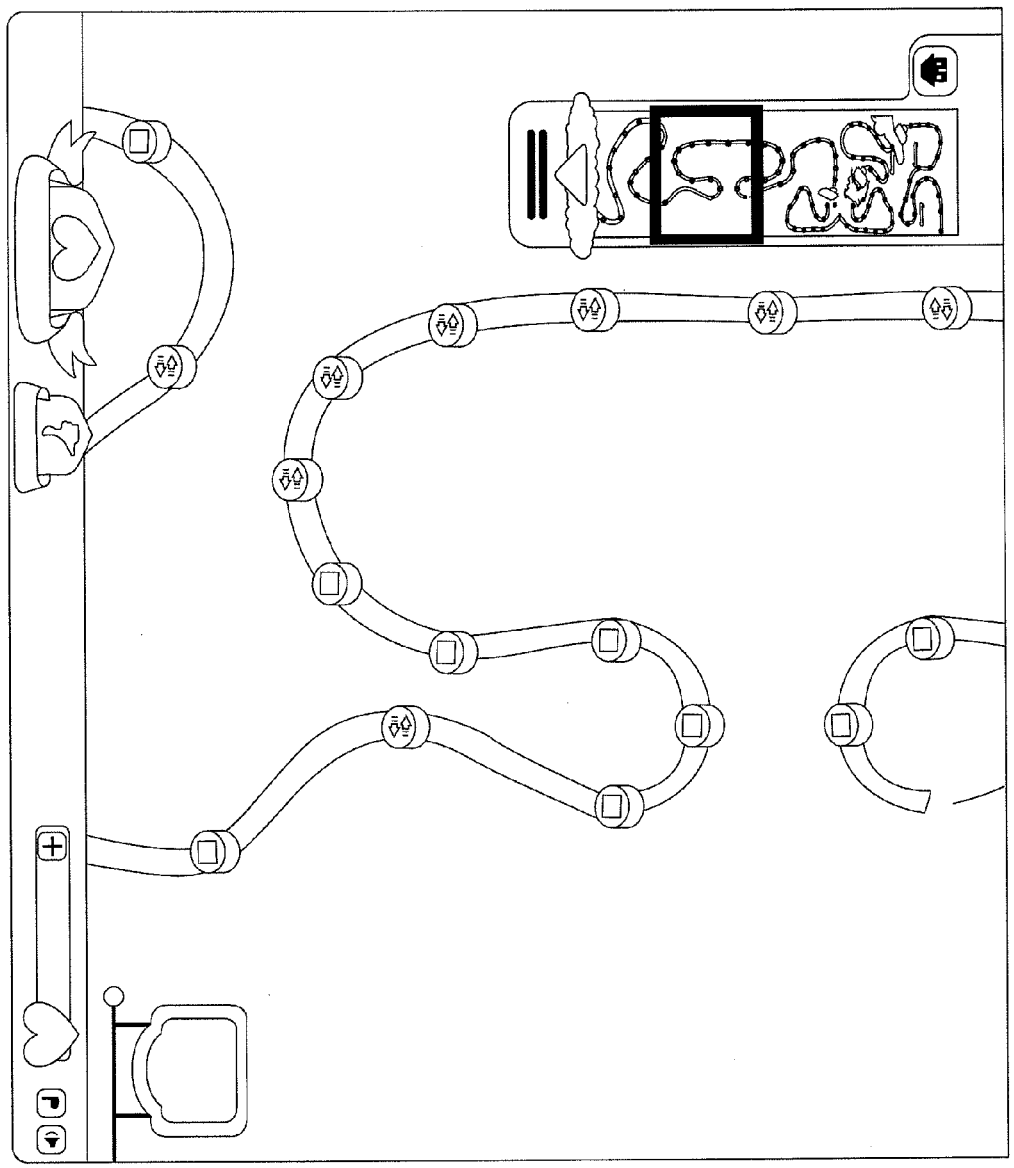
FIG. 60 shows one implementation where the player has jumped to another part of the map.

FIG. 60 illustrates how the main view has changed as the player has clicked or scrolled to a new place on the map.

Navigate Between Areas

A map may sometimes be too large to fit on a mini map, at least if the player is to make any sense of what it is displaying. One way to solve this problem is to divide the map into areas and on the mini map only show one area at a time.

Figure 61:
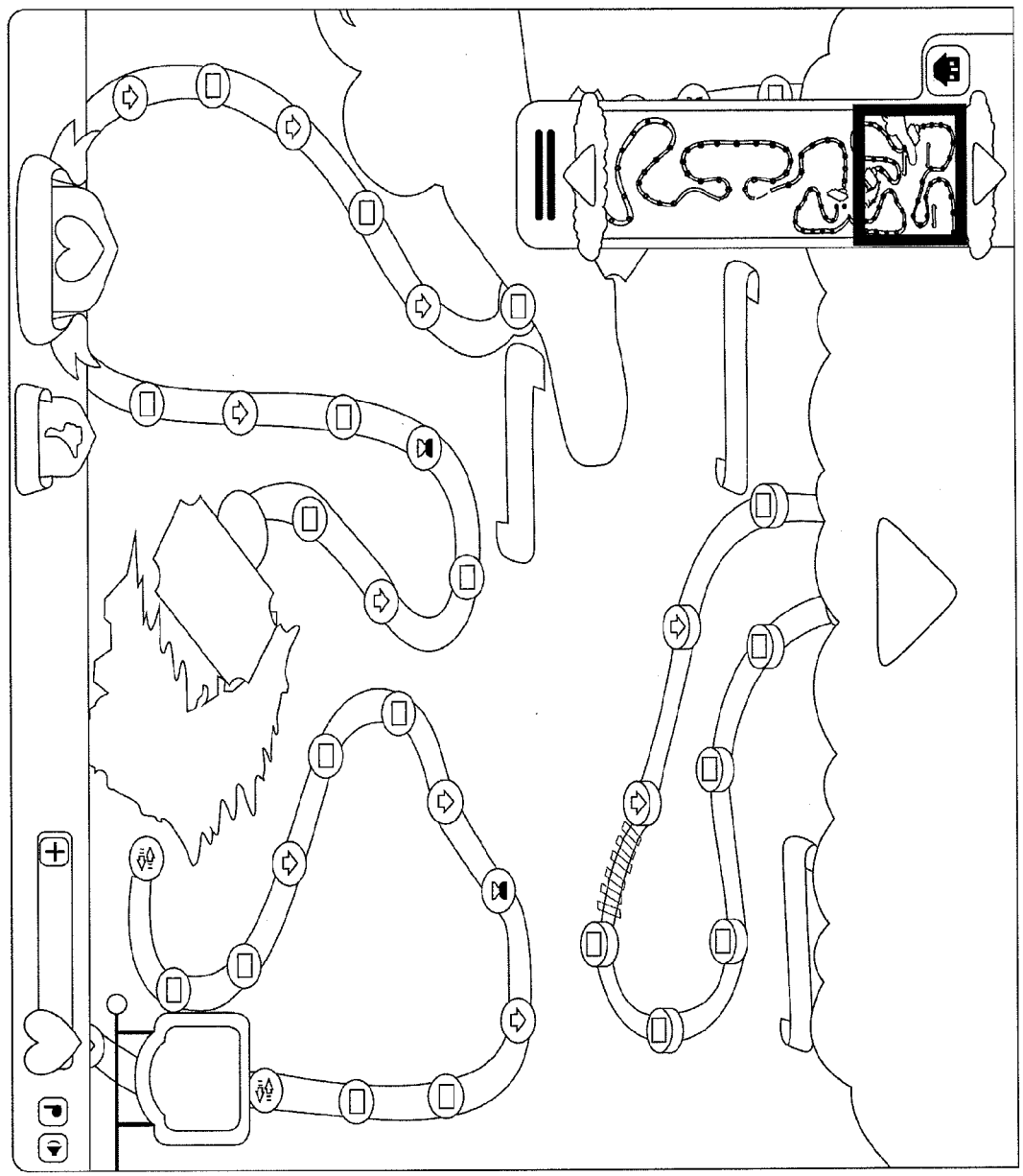
FIG. 61 shows one implementation with clouds indicating there is more to be seen.
Figure 62:
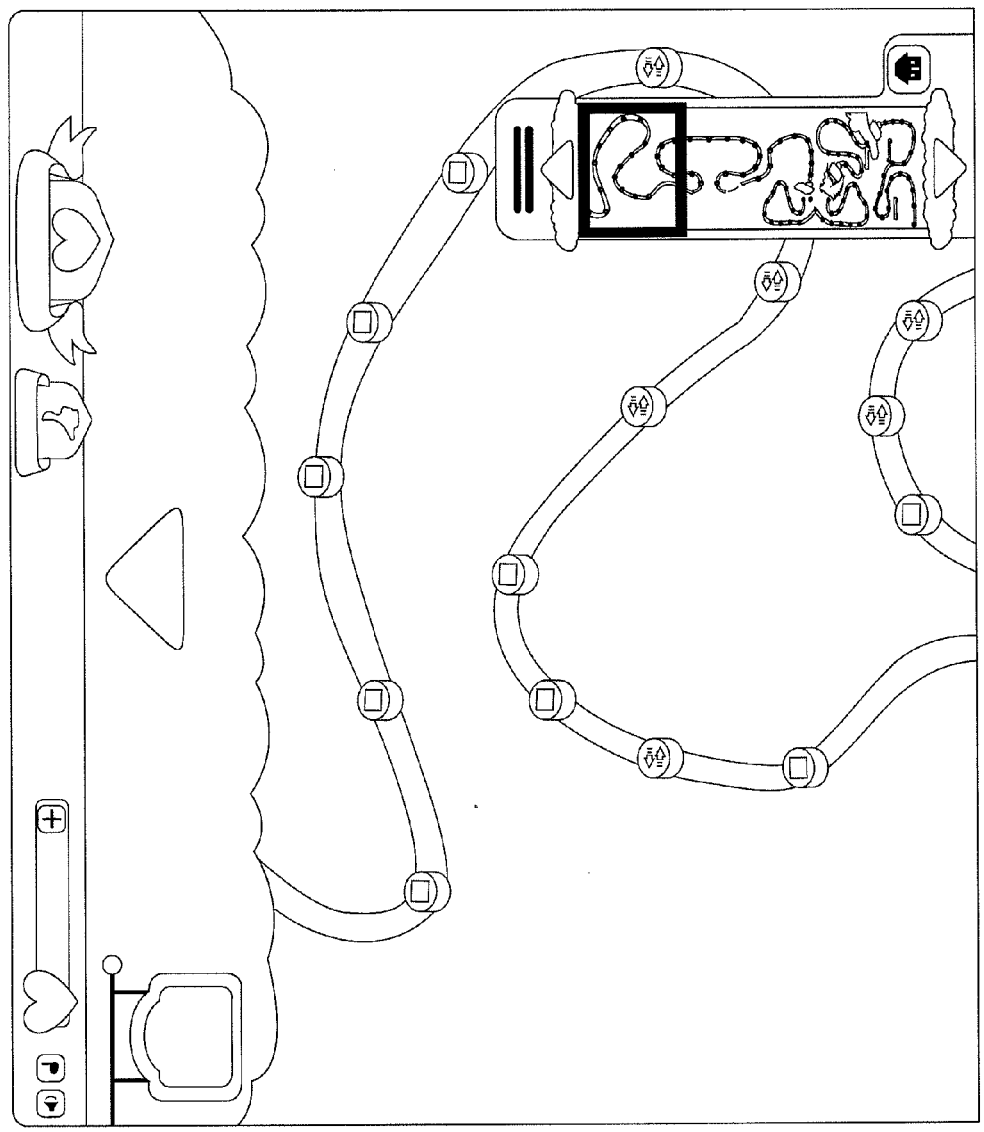
FIG. 62 shows one implementation with an arrow point up both on the map and the navigator.
Figure 63:
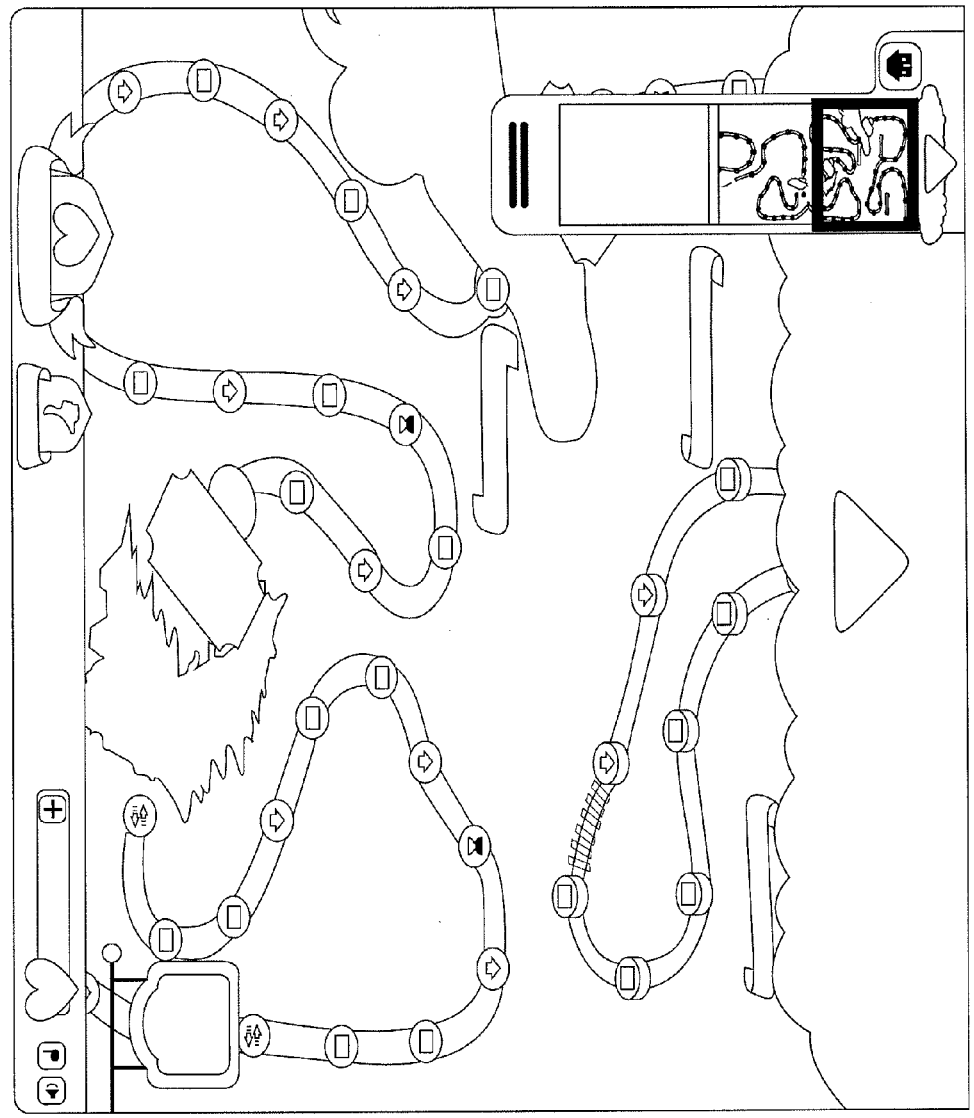
FIG. 63 shows one implementation where the navigator has reached the end of the map.

In one implementation there are clouds on the bottom and/or on the top of the mini map to indicate that there is more to be seen. Pressing one of the arrows, which are placed on the clouds, will take the player to either the next or previous area of the map. The arrow can be pressed both on the mini map and in the main view, see FIG. 61 and FIG. 62. If changing area on the mini map, the main view will also jump to the next area. If the player reaches the end of the map, unused areas of the mini map will be clearly marked and therefore indicate to the player that the map is ending. The player can not scroll past this point, see FIG. 63.

Jump to Specific Levels

Even when being able to scroll and click to desired locations on the mini map, it may still be difficult to find a specific spot on the map. There are several implementations to make it easier for the player on this point.

In one implementation, if the player for example wants to jump to the furthest reached location on the map, then there is a home button which will take the player there directly. Pressing the home button will not only take the player to the current location but will also hide the navigator, giving the player a full view. With the home button, the player can always find their active location in the blink of an eye.

Figure 57:
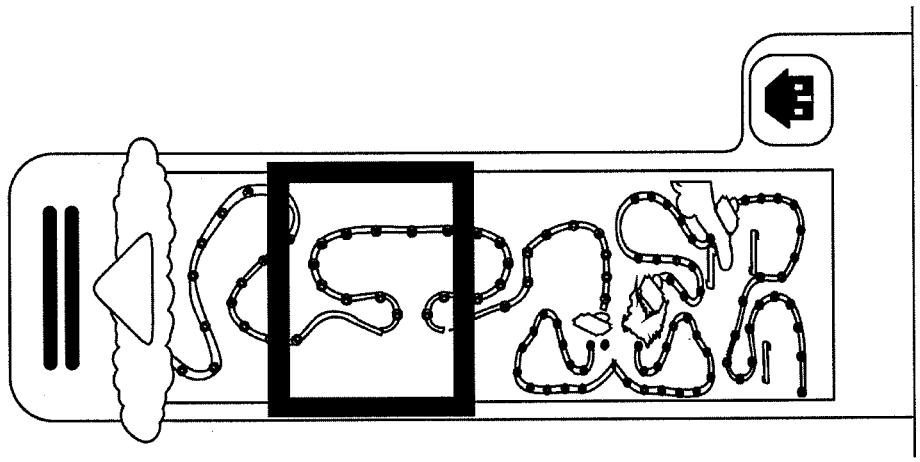
FIG. 57 shows the navigator expanded.
Figure 58:
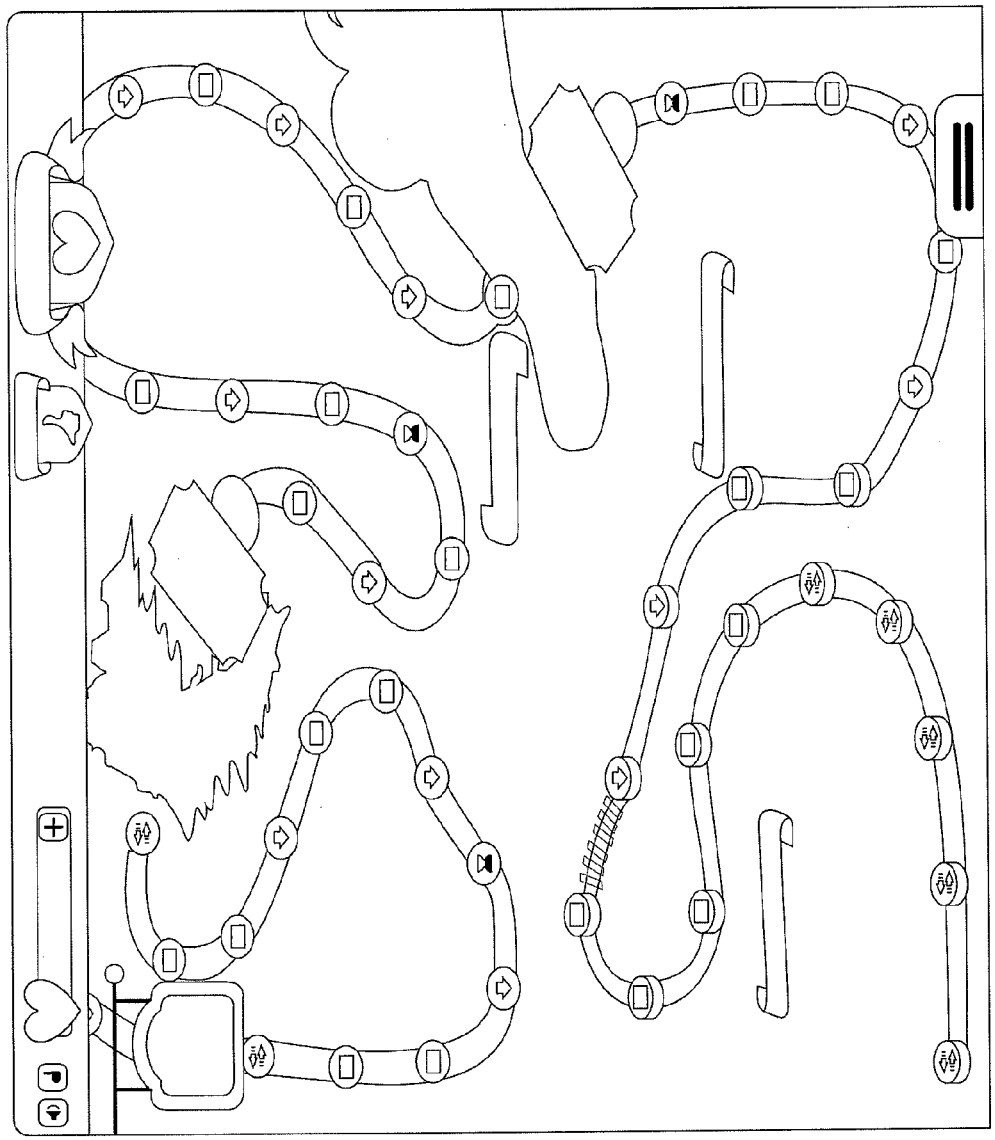
FIG. 58 shows one implementation with the navigator hidden in a map view.

FIG. 57 displays one implementation where the home button is placed in the bottom right of the navigator with a house symbol on it. Pressing the button will take the player to the furthest reached location.

Figure 64:
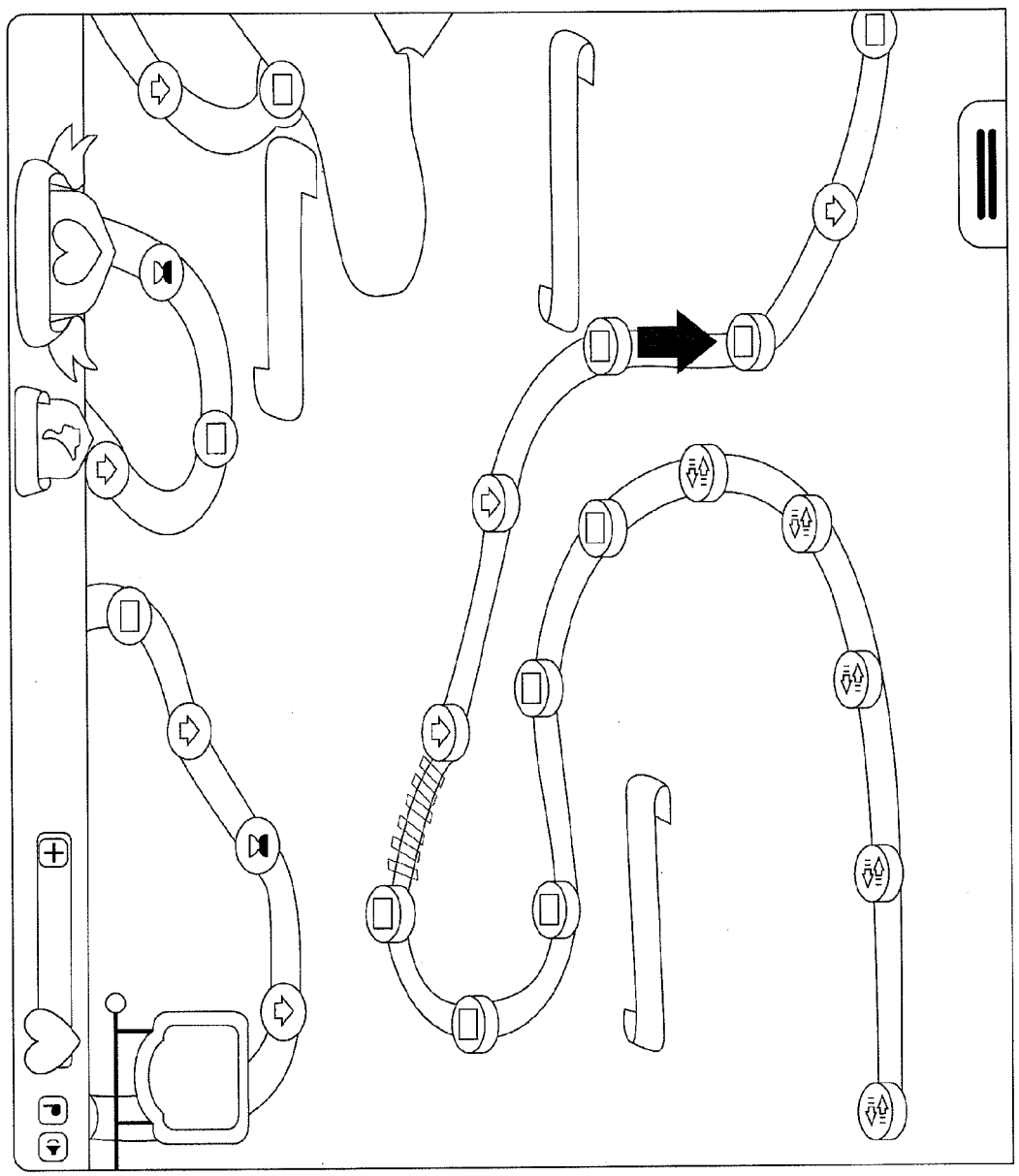
FIG. 64 shows one implementation when the home button has been pressed.

In an alternative implementation, the map will also be zoomed in when the player presses the home button and jumps to the furthest reached location; this is illustrated in FIG. 64.

Figure 65:
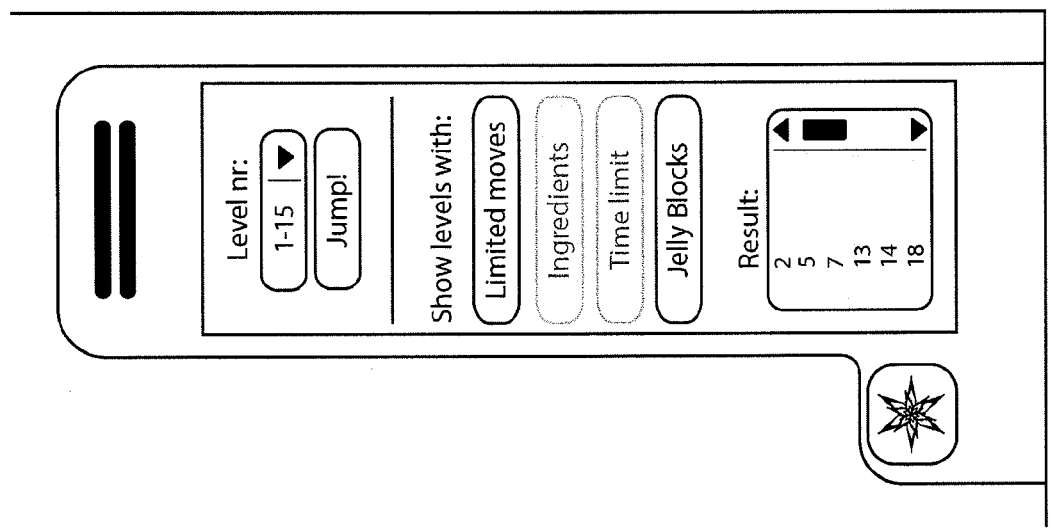
FIG. 65 shows an alternative implementation of the navigator with filters and multiple choices.

Another implementation may be to offer the player filtering and multiple choices of where to jump on the map. There could for example be an icon which when pressed lets the player choose exactly which level to jump to. There could also be an alternative to receive a list of levels the player can jump to which satisfy certain criteria, for example all levels with limited moves and ingredients in them. The filter could offer many kinds of choices. FIG. 65 shows an alternative implementation of the navigator offering multiple choices and filters.

Zooming in and Out on the Map

Figure 66:
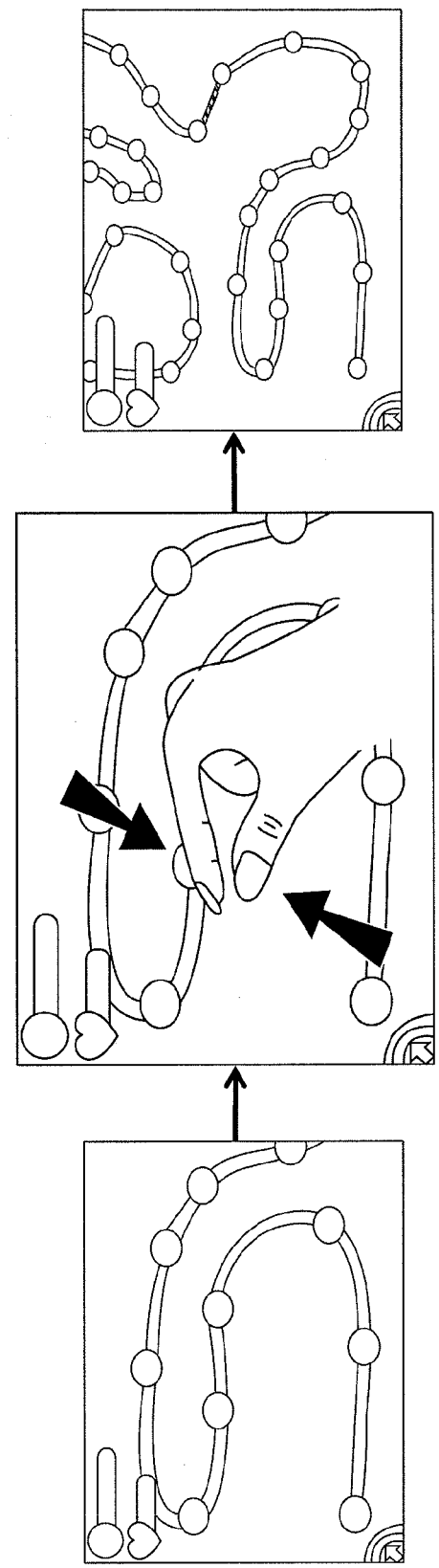
FIG. 66 shows how to zoom out on a touch screen device.
Figure 67:
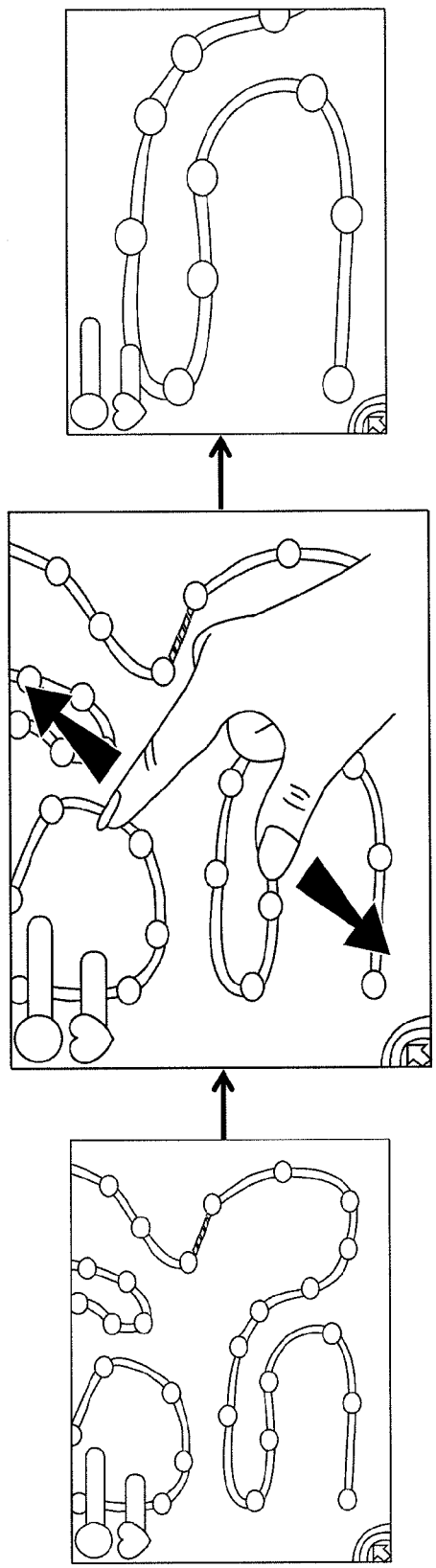
FIG. 67 shows how to zoom in on a touch screen device.

The player may not only navigate to different locations on the map but can also be presented with the possibility to zoom in and out. If playing a game on a touch screen device, pinching ones fingers on the screen would make the map zoom out, see FIG. 66. Zooming in on the map would require the fingers to spread out from each other, the opposite of doing a pinch gesture, see FIG. 67.

Having a zoom in/out function can help the player get an overview of a map while at the same time being able to see details and other various interesting parts of it which are connected to a specific area or position. Furthermore, zoom in functions on a touch screen device can be helpful if there are interactive parts that may feel to small to press properly. Zooming in makes it easier to target and interact with desired object.

Theme

Overall Theme

The overall theme of Candy Crush Saga lends a special atmosphere to the game. Everything is candy-themed with bright and warm colours used in all animations and pictures. The words used for encouragement throughout the game, such as 'sweet' and 'delicious', serve as an example of the candy-theme.

Individual Areas and Level Progression

As the player progresses in the game, new areas/episodes are unlocked. Each episode has a related story and often a mini-theme that is present in at least some levels in the area. Also, the same background picture is used in all levels in the same area. When reaching a new are the background image will change. Each episode also has a specific colour which is used in the virtual landscape-view to show the different episodes.

The episodes all have different names, each with a candy-theme to it for example Candy Town, Candy Factory, Lemonade Lake, Chocolate Mountains, Lollipop Forrest and so on.

Within each episode there is a set of levels. The division of levels between the episodes is not entirely linear. The first two episodes consist of ten levels each, while episodes three and onward each consists of 15 levels each. This makes it easier for the player to advance in the beginning, something that can be important for player retention and engagement.

Path

In the virtual landscape, the player follows a virtual path as the game progresses. After completing a level, the next one becomes unlocked and the player 'travels' there on the virtual map. There is an indicator showing which level the player is currently on; in one implementation the indicator is in the form of an orange arrow bouncing up and down.

Figure 4:
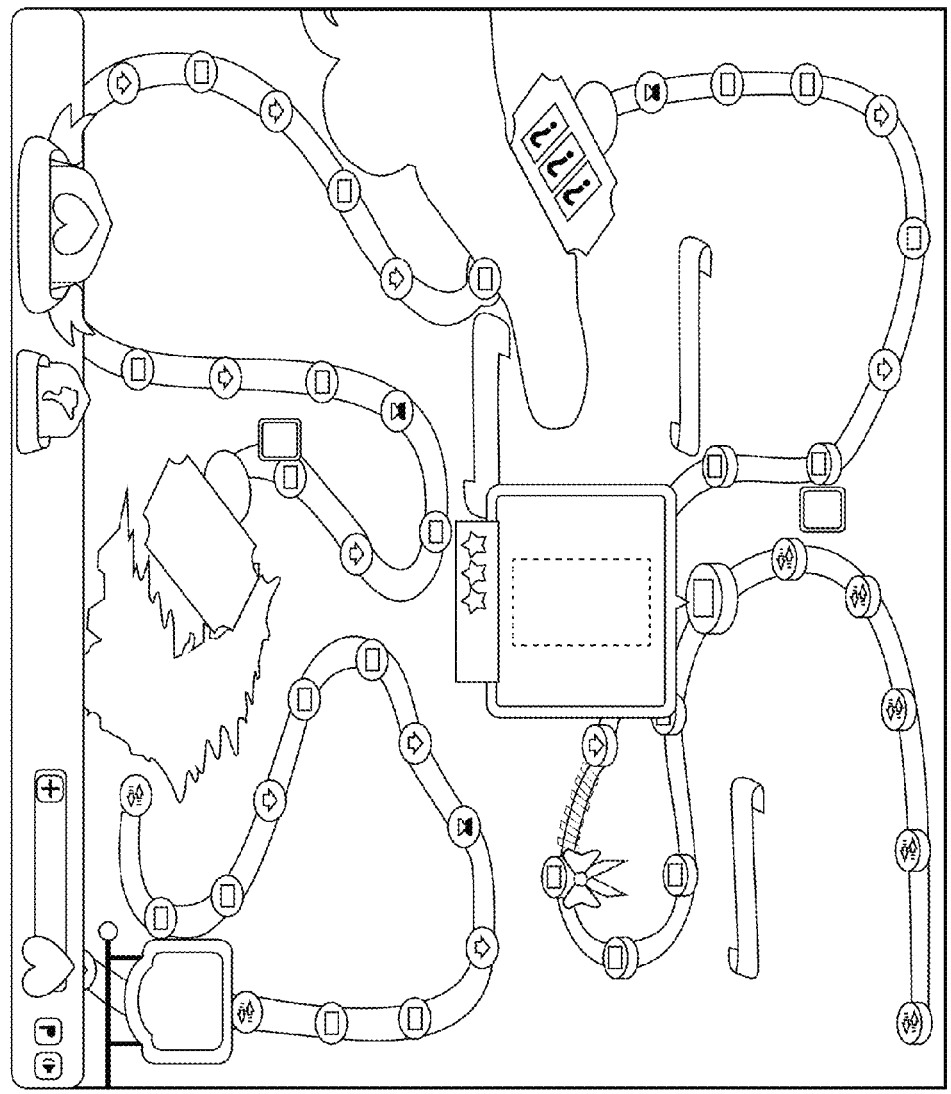
FIG. 4 shows one implementation of a virtual map.

The virtual landscape is divided into areas, each area representing a different episode of the game. The episodes are also coloured differently, with one colour being used consistently throughout one episode/area. The end of an episode is marked by a special kind of obstacle that can only be passed with the help of three friends, or through a purchase. In FIG. 4 this obstacle is depicted with three question marks inside a rectangle with inverted corners. When passing these kinds of obstacles, there is a celebratory animation accompanying the passage to signal that the player has progressed into a new episode of the game.

Unreached Areas

In the virtual landscape (see FIG. 4), levels that have not yet been reached by the player are shown in a different way than levels already accessible. There is also a difference between unreached levels in an unlocked area and unreached levels in areas not yet unlocked. As can be seen in, areas that have not yet been reached are greyed out. This furthers the experience of giving players a sense of accomplishment when reaching a new area, since it is reflected by the virtual landscape actually changing slightly.

Collaboration Blocks

As already mentioned, there are special obstacles that hinder the player from reaching new areas in the game. These obstacles are 'collaboration blocks', which means that the player needs to receive help from friends in order to pass. One such implementation can be seen in FIG. 86. Help from friends can be requested through a social network, and the new area will not be unlocked until three friends accept to help. This is a way to increase viralisation as well as player engagement. By helping each other players get a sense of collaboration, as well as it being a competitive element to remind the player how far friends have come.

It is possible to circumvent the need of having friends to help pass into the next area by instead paying for it. The amount that has to be paid can be reduced by having some friends help, even if the required amount of help for passing without paying is not reached. For example, if one friends help the player has to pay more than if no friends help, if two friends help a lesser amount has to be paid than if one friends help, and if three friends help the player does not need to pay at all.

When reaching a collaboration block, which is at the end of each episode in the game except for the first two, the player is prompted to select which friends to send requests to. The friends need to have Candy Crush Saga installed in order to be able to provide help, but it is possible to send requests to friends who do not yet To travel from one stage to another once all the levels have been completed on that stage requires the help of three friends. These friends can already be playing the game and do not have to be 'new' players. However, instant access can also be bought using a virtual currency. Friends can be asked for help either by clicking the 'Ask friends for help' button, or by the '+' sign to the right of the buttons. Once the stage has been unlocked with the help of the three friends, all the levels within that stage are unlocked too.

The user can choose to request help from only selected friends or to send a request to multiple friends. There can be a limit to how many friends the player can send the request to and also a limit in time before the user can send a reminder or similar request.

The request for help is sent to the friend who then has the option to accept to help or to decline to help. The request can in one implementation be sent using the social network to which the game is connected; an alternative implementation is to send the request to someone external to the game (via email, text message, instant message for instance) who has to join the game to respond to the help request. This is one of the viralisation techniques implemented in this game.

Figure 86:
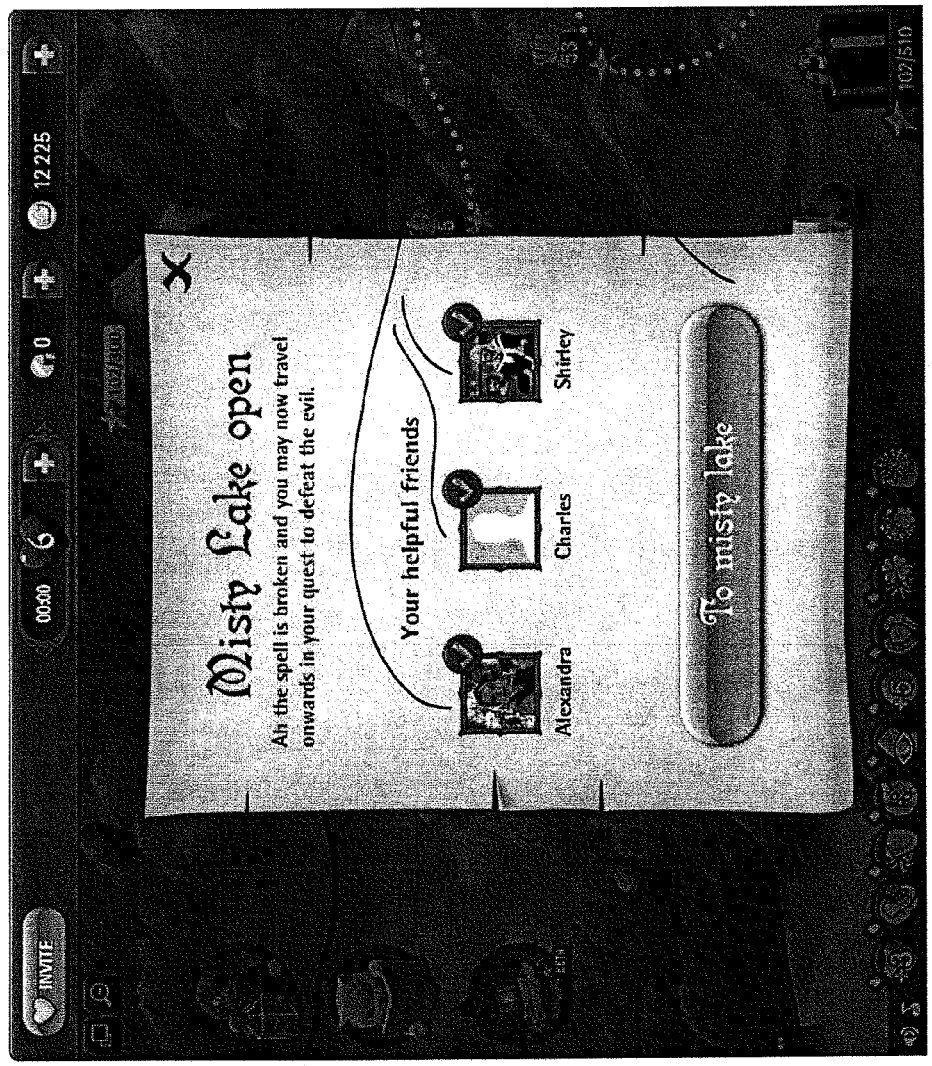
FIG. 86 shows a collaboration block where the player has received help from three other players of the game.

FIG. 86 shows an implementation where three friends who the player has requested help from have enabled the played to unlock a new stage. Each of the friend's avatars appear on the screen, with their names underneath the avatar and a tick next to the picture to show that they have accepted the player's request for help. This allows the player to start playing the newly unlocked levels in the new stage.

Mystery Quests

The inventions may be implemented with ways of getting past a collaboration block other than asking friends for help and paying for it, which are the most common ways of passing a collaboration block. This can be done through to use of 'Mystery Quests', which gives the player the option of completing one or several challenges to unlock the block. Such challenge can for instance be to play one or several past levels with modified goals in order to pass the collaboration block, for instance three levels—one for each of the locks.

These challenges are typically in the form of replaying a previously completed level but with a new goal to reach, for instance a target high score. In a typical implementation, the score requirement is higher than it is for playing the level regularly, and also no other goals need to be fulfilled. For example, if the player gets to replay a level with jelly with a new target high score, the player would not need to remove the amount of jellies specified as long as the target score was reached.

Figure 87:
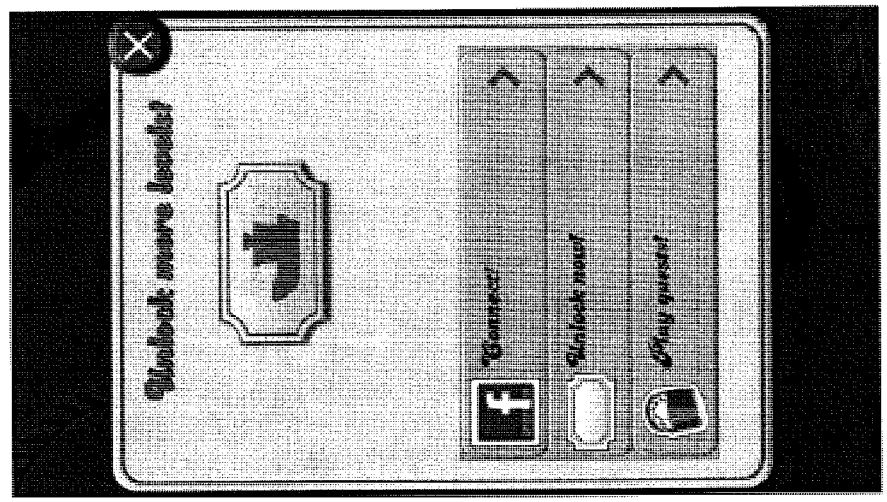
FIG. 87—Collaboration block pop-up showing three available options for passing; Connecting to Facebook to ask friends, Unlock now with a purchase, or Play mystery quests.

In a typical implementation this option to pass a collaboration block in the game is available in three cases; if the player is not connected to the Internet, if the player has not connected the game to a social network, or if the player is not connected to either a social network or to the Internet. If the player is not connected to either a social network or the Internet then the other options available for passing the block, such as sending requests to friends, cannot be used. However, it is possible to have this option available to users connected to both a social network and to the Internet as well. FIG. 87 shows the three options typically available for passing a collaboration block.

It is possible to combine the ways of passing a collaboration block. For instance, completing one Mystery Quest could make it so that the player only has to request help from two friends once a connection to a social network has been established, or that the player does not need to pay as much for purchasing a way through the collaboration block.

In some implementations, Mystery Quests are not tied to specific collaboration blocks. For example, if the player reaches a collaboration block and completes a Mystery Quest, then connects to a social network and receives help from three friends, the player will only have to complete two Mystery Quests the next time that option is chosen to pass a collaboration block. If the player then only completes one more mission, and then goes on to receive help from friends or purchase a way through, the third time a Mystery Quest is chosen as a way to pass a collaboration block, the player only needs to complete one level.

Figure 88:
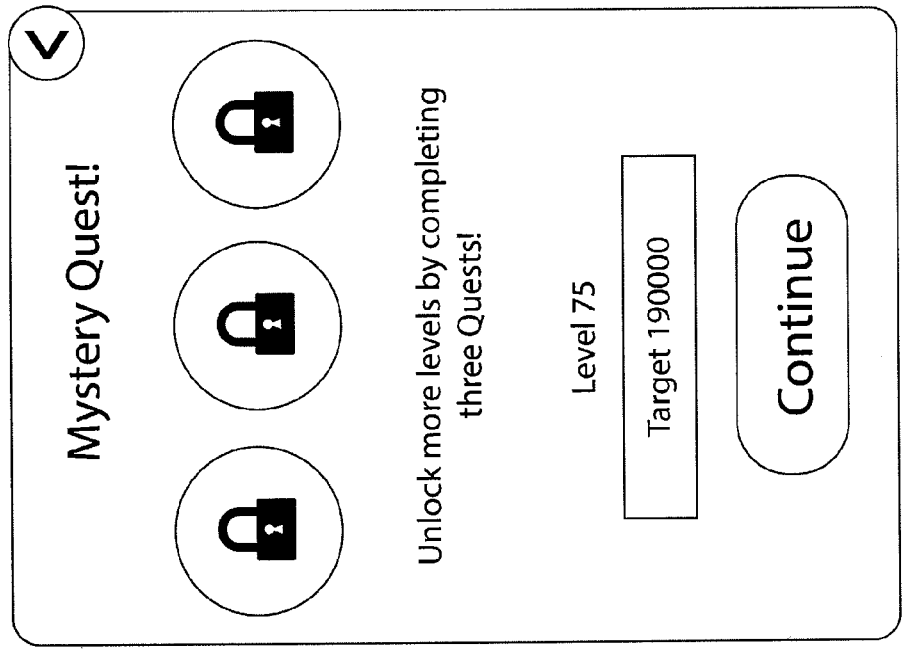
FIG. 88—Main page for the Mystery Quests. Quest information for one level of the Mystery Quest is shown, specifying required score and which level will be played.

If the player chooses to play the mystery quest to pass the collaboration block, the player will be taken to a screen showing three symbols representing challenges to be completed, as well as specifications regarding which level is to be played and what score is required to pass the first challenge. This can be seen in FIG. 88. In a typical implementation, the game randomly chooses a previously completed level and increases the score required to pass it. In other implementations, the Mystery Quest levels can be new levels that the player has not completed before.

Figure 89:
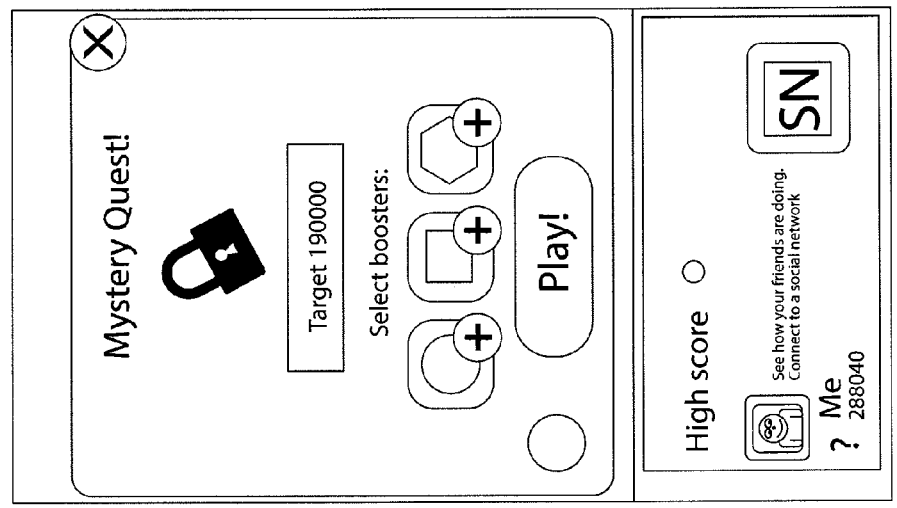
FIG. 89—Pre-level screen for a mystery quest level.

If the player chooses to continue with the quest, another screen is presented, allowing the player to choose boosters. This screen is very similar to a regular pre-level screen, with the difference that instead of the level number it says 'Mystery Quest', instead of three stars it shows a special padlock indicating that it is a Mystery Quest, and a special symbol in front of the target score to further indicate that it is a Mystery Quest and not a regular level. One implementation of the pre-level screen for a Mystery Quest can be seen in FIG. 89.

Figure 90:
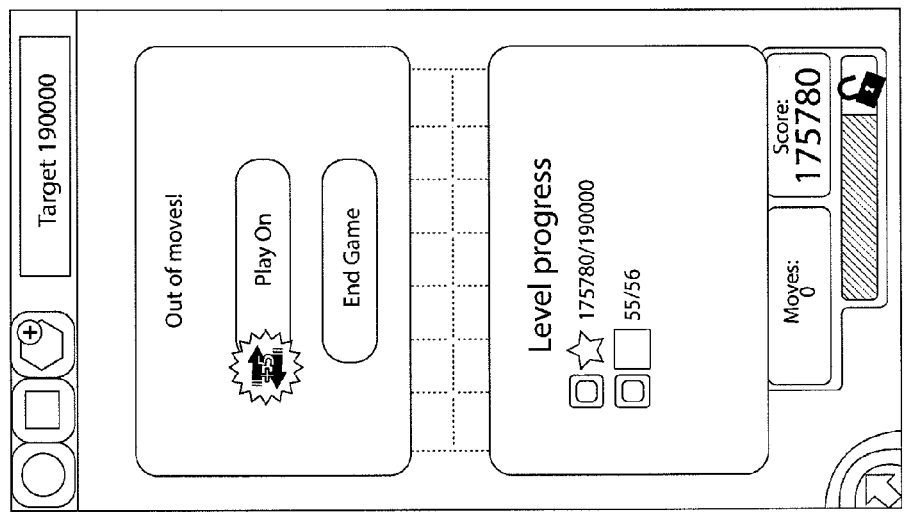
FIG. 90—Failing to complete a mystery quest.

If the player chooses to play the Mystery Quest level, the game proceeds to the game board screen and the player can start playing. If the player fails to achieve the target score, a pop-up shows why the player failed. In some implementations using levels previously completed as Mystery Quests, the regular goals for completing the level are listed as a reason for failure as well as failing the target score, as can be seen in FIG. 90. However, even though this is shown as a reason for failing the level, the player will in a typical implementation complete the Mystery Quest as long as the target score is achieved, even if the other goals of the level are not. In other implementations, the player can be required to achieve both the target score and other goals for the Mystery Quest to be completed.

Figure 91:
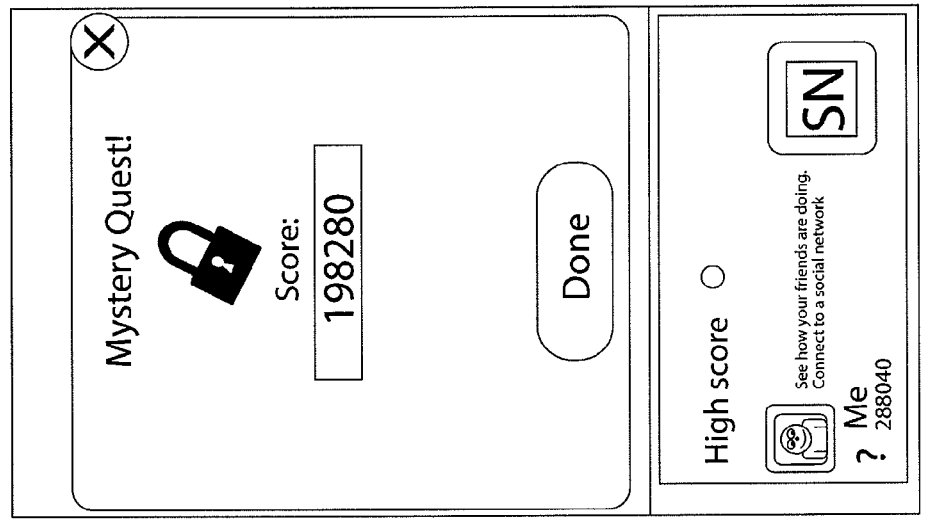
FIG. 91—Post-level screen after completing a Mystery Quest 1.
Figure 93:
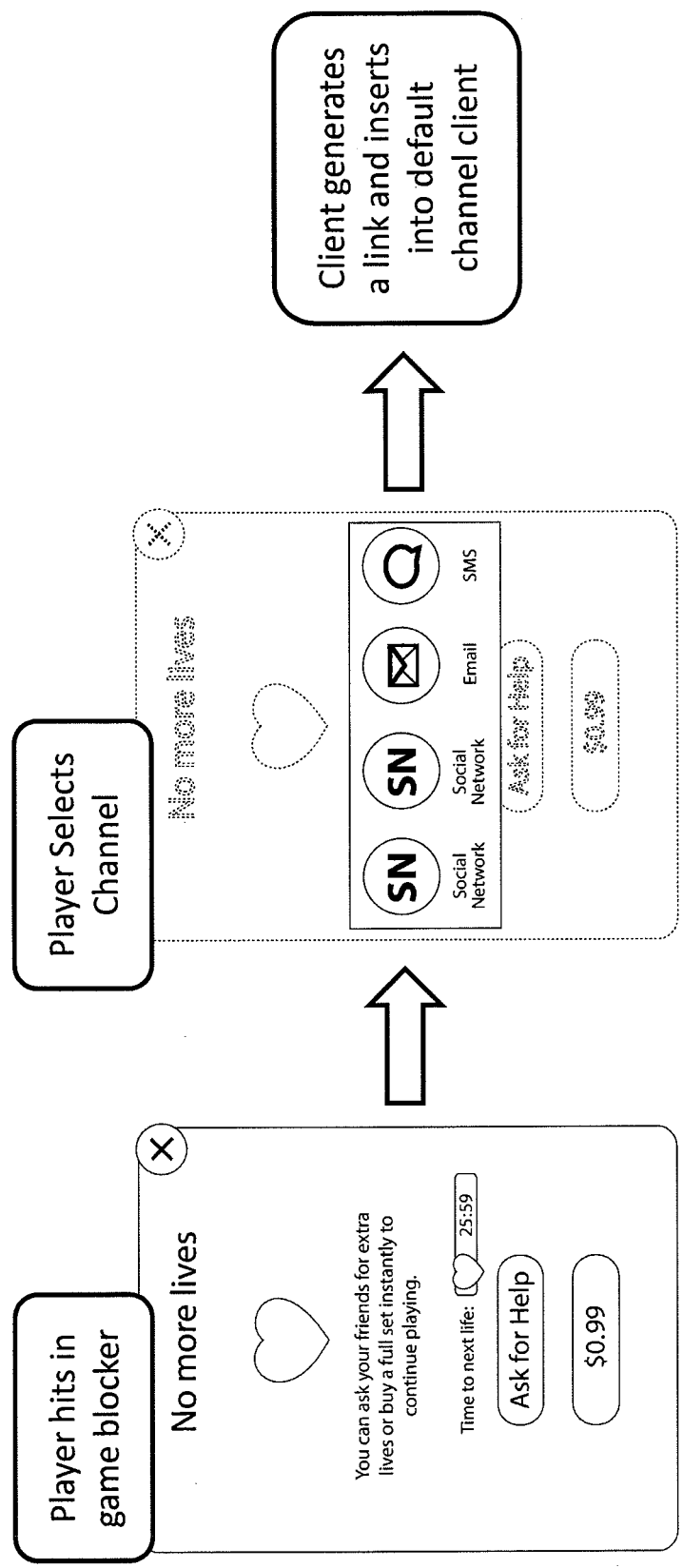
FIG. 93 An example of the flow.
Figure 94:
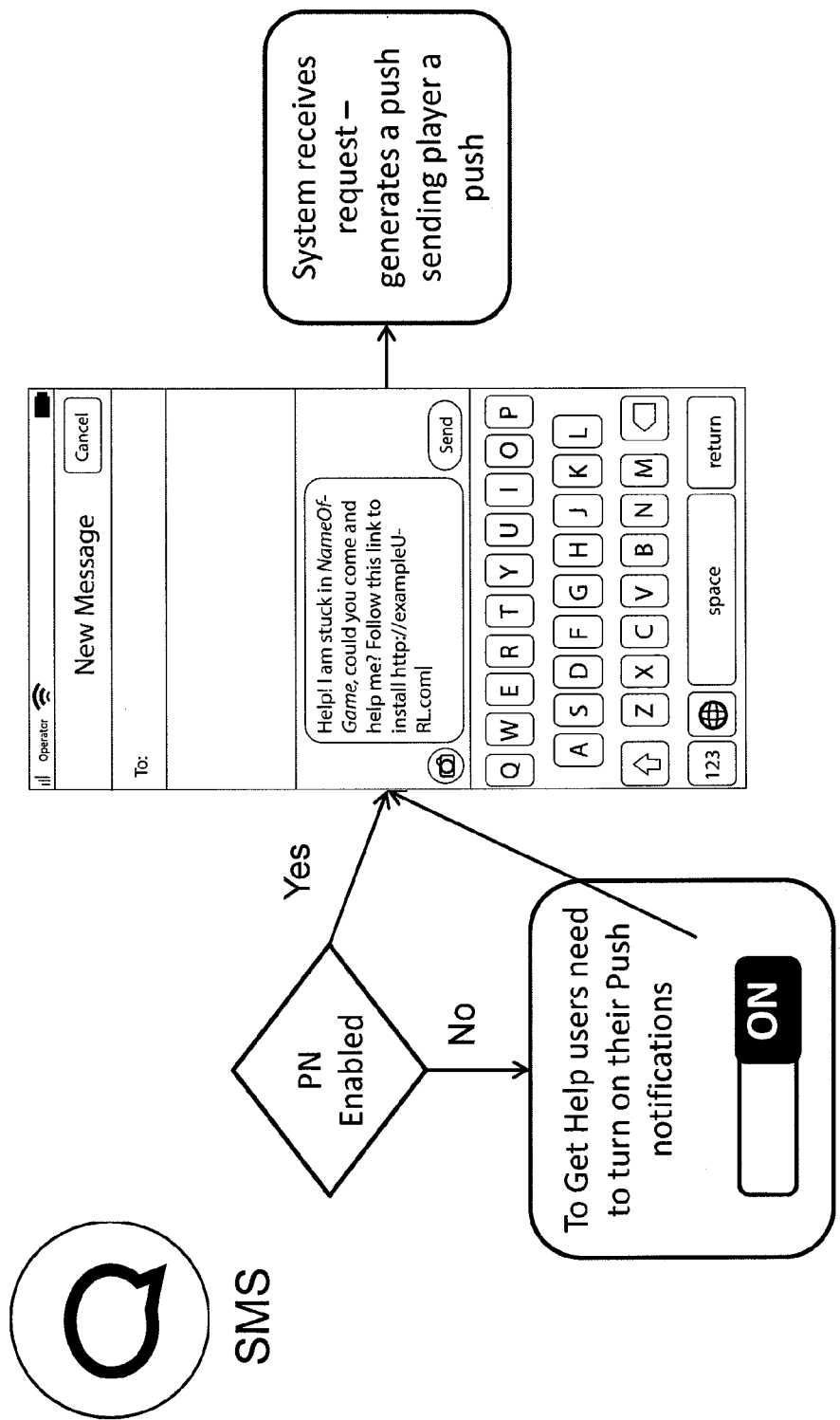
FIG. 94 A typical user flow for using SMS to end a request.
Figure 95:
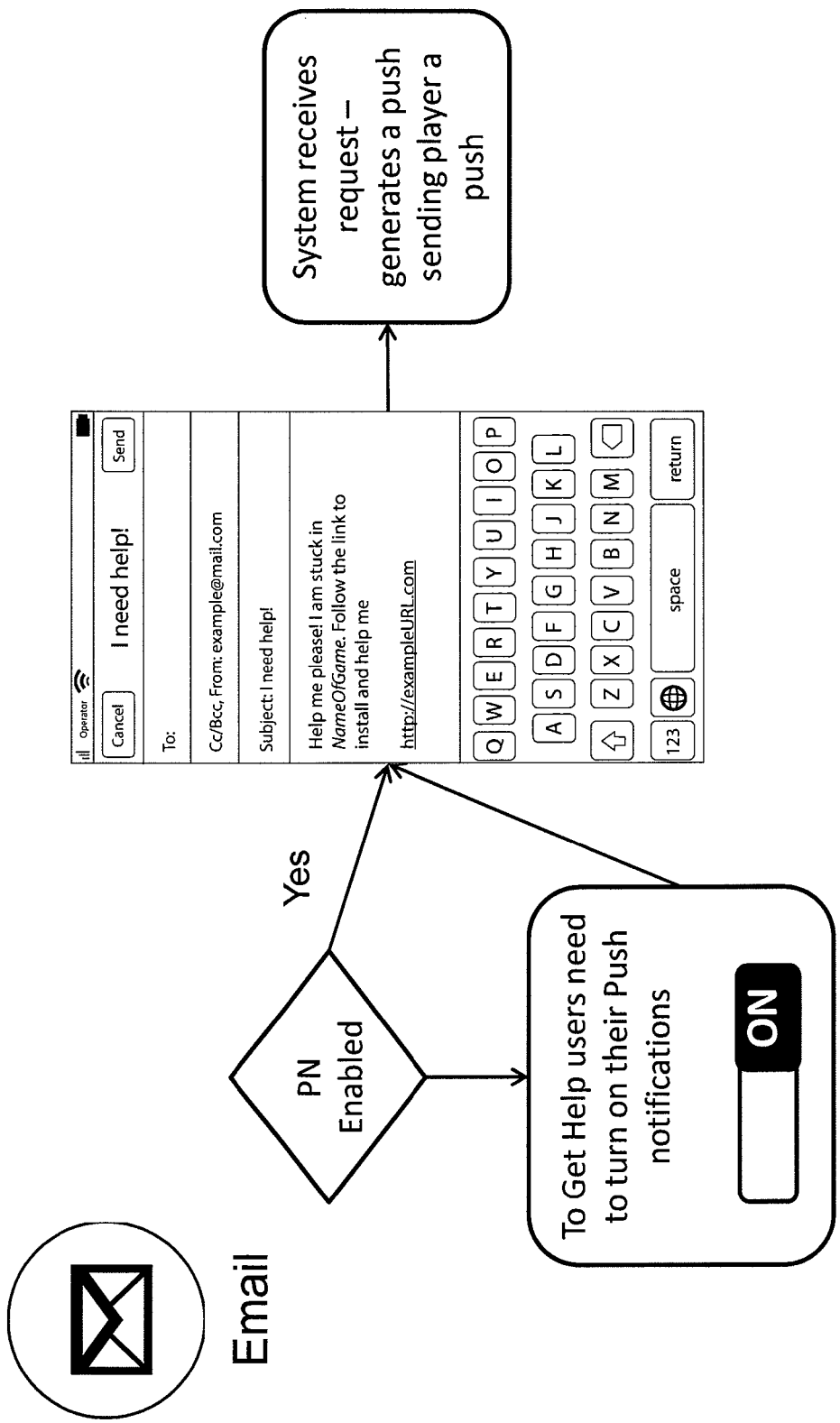
FIG. 95 A typical user flow for email.
Figure 96:
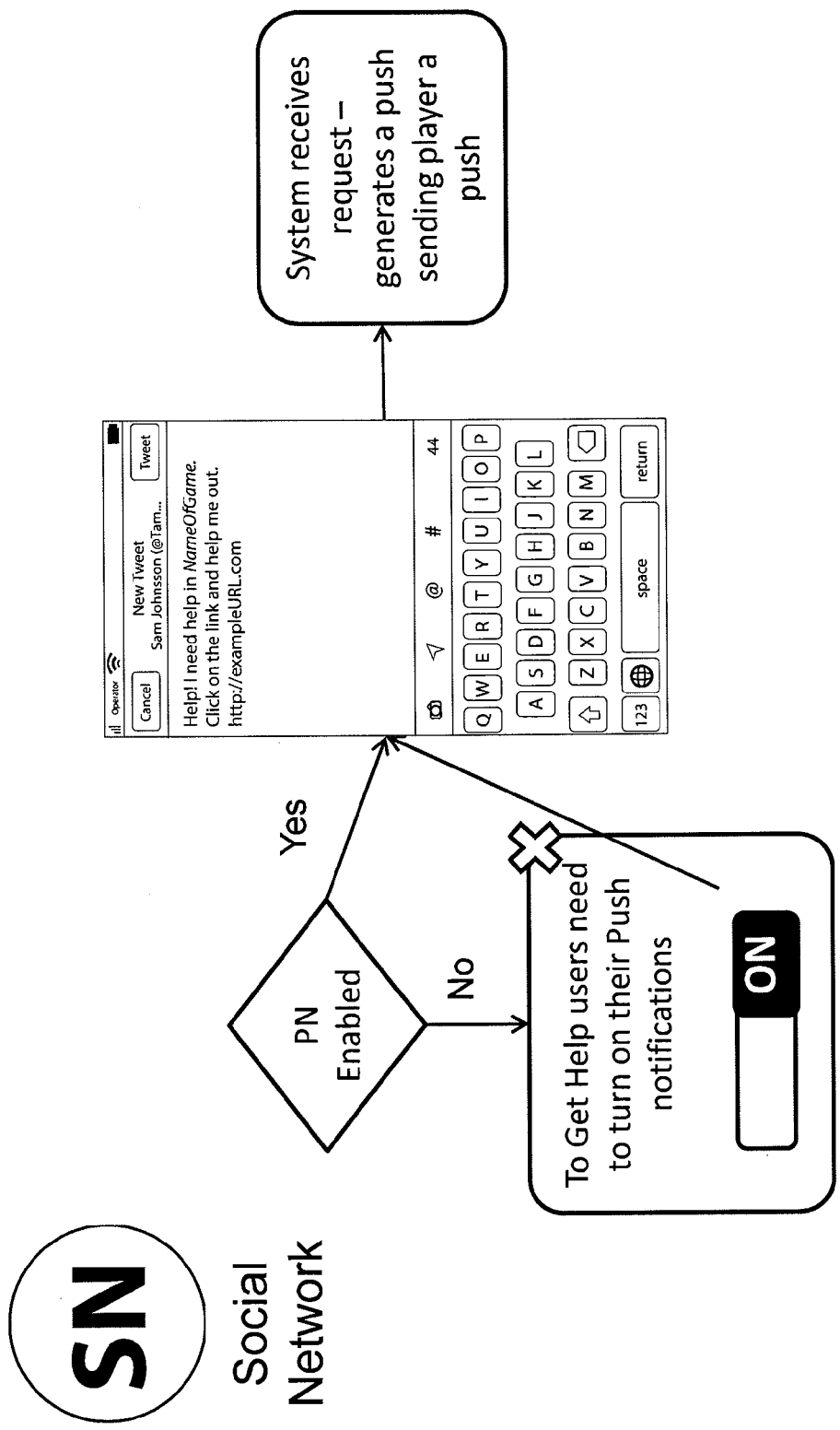
FIG. 96 A typical user flow using a micro-blogging service such as Twitter.
Figure 97:
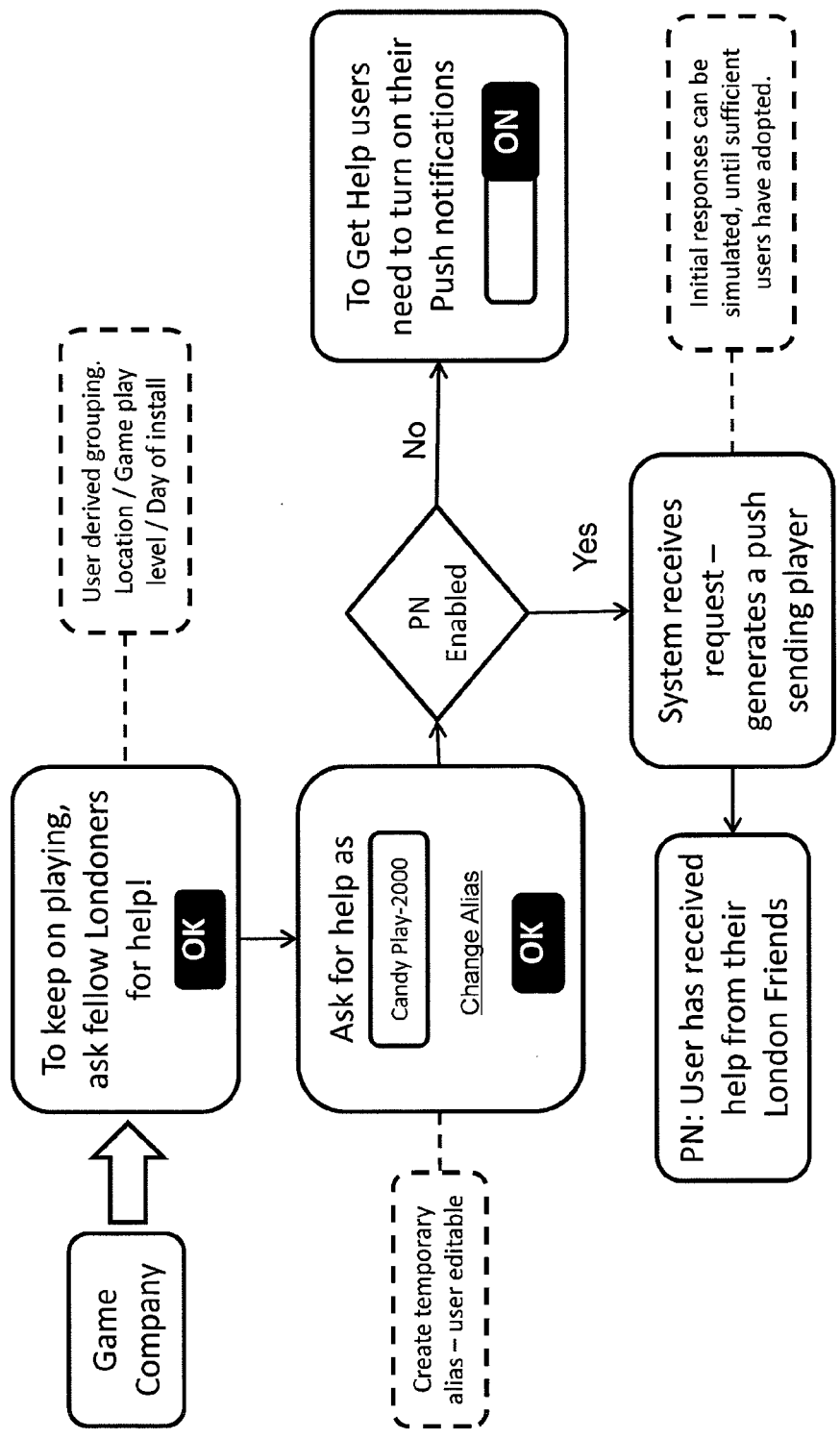
FIG. 97 Game friend—user experience.
Figure 98:
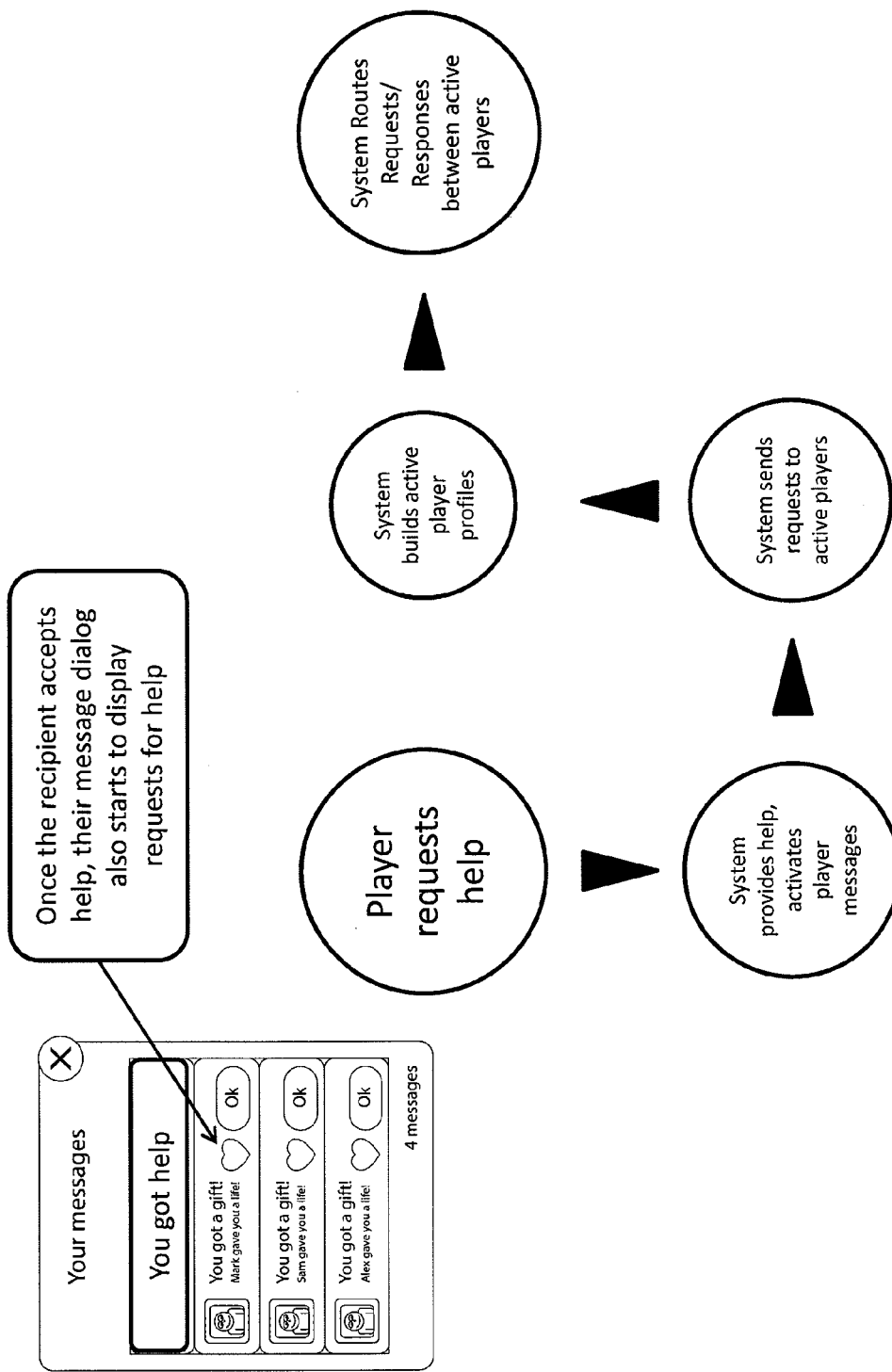
FIG. 98 Game flow help system.

However, if the player manages to achieve the target score on a Mystery Quest, the level will be completed. Completing a Mystery Quest level will take the player to a post-level screen similar to a regular post-level screen but with the same differences as the pre-level screen. One example of such a post-level screen is shown in FIG. 91. After this there will typically be an animation to signal that the player has completed the level, such as the padlock going from being locked to being unlocked. There can be other ways to show a post-level screen after the animation of unlocking the padlock has been shown.

Figure 92:
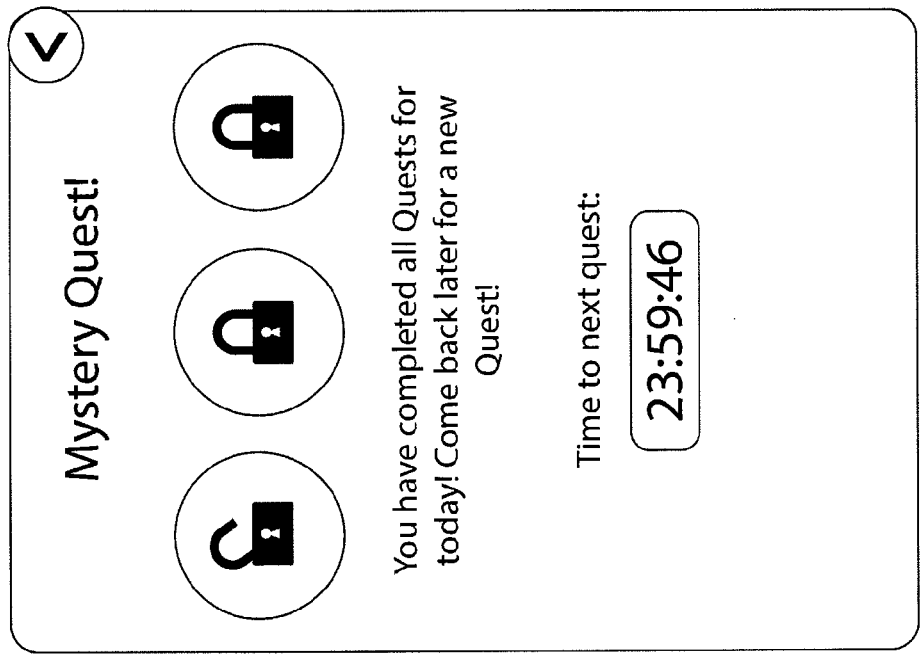
FIG. 92—Screen showing the progress of completing all Mystery Quests.

After completing a Mystery Quest and pressing 'Done' on the post-level screen, the player is typically taken back to the main Mystery Quest screen. This screen will then show the player the overall progress with the Mystery Quest, which in a typical implementation consists of three levels. In FIG. 92 it can be seen that the player has completed the first quest, and that the next one will become available after a certain period of time, 23 hours 59 minutes and 46 seconds in the figure.

In some implementations, the player needs to wait 24 hours between completing each of the three levels of the Mystery Quest. In other implementations, the wait time could be less or none at all. It is also possible to use other criteria for accessing the next Mystery Quest, such as getting more stars on previously completed levels.

Typically the player will use a life for each failed attempt of clearing a Mystery Quest level, just as is the case with regular level. It is also possible that the Mystery Quest levels do not affect the player's life total, or that it uses up another kind of resource as such as boosters.

It is possible for Mystery Quests to be used for other reasons than to pass a collaboration block. For instance, there can be bonus levels within the game that can only be accessed through completing Mystery Quests. In some implementations, Mystery Quests can be a way for players to earn boosters in the game without having to purchase them. It is also possible that Mystery Quests are only available at certain times, such as between 9 PM and 10 PM each day or on specific days.

Alternative Ways to Connect with Other Players for Help or Other Requests

For players who are not connected to friends through a social network, or players who are connected but only have very small social networks, an alternative way is to connect them to other players (if they want) and find proxies for the social experiences that existing networks provide.

It is important to allow players who otherwise would be stuck at a collaboration block or other social interaction tools to also be able to progress in the game. This is important to minimize the churn and to allow the game to be a fun experience for a larger portion of the players.

One such implementation is to drive installs of the game using new channels—SMS, E-Mail, Twitter etc. This will boost DAU, create engagement by creating social connections and communication channels with those connections. It may also increase revenue by keeping players in the game.

Overall Structure

This alternative approach may be used for interaction for instance when a player reaches a collaboration block or runs out of lives. The game prompts player to "ask for help" from other players based on some user derived player characteristics such as location, player game experience. The player gets a prompt to get help with a generated but editable alias and they "send" the message. If the player's Push Notification (PN) settings are set to off include the requirement to turn PN on. The client registers the player request user ID with the server. Server generates a response granting the user request, on a random basis, from 5 to 55 minutes from request. And sends a PN to player. After the player has completed a single loop—request-PN-request grant. They become capable of receiving help requests when they launch the game.

Feature Description

When a standalone player (a player with no or only a few 'friends' connected to the game or to a social network) reaches a blocker in the game, this alternative approach gives them a way to extend their game play by asking for help. Players will be able to select where they ask for help from, through SMS, Email, Twitter etc.

Upon Completion of the loop, they will receive the requested help allowing them to continue in the game.

This approach can be used for collaboration blocks, that the player can request lives, request other help in the game. It can also be implemented so that the player can send invitations to the game and if the recipient will join the game then the inviting player may get a reward.

Exemplary flows and steps in the implementation can be seen in FIG. 93, FIG. 94, FIG. 95, FIG. 96, FIG. 97 and FIG. 98.

The player that receives the request for help can click on the link on for instance his mobile device or computer.

Figure 99:
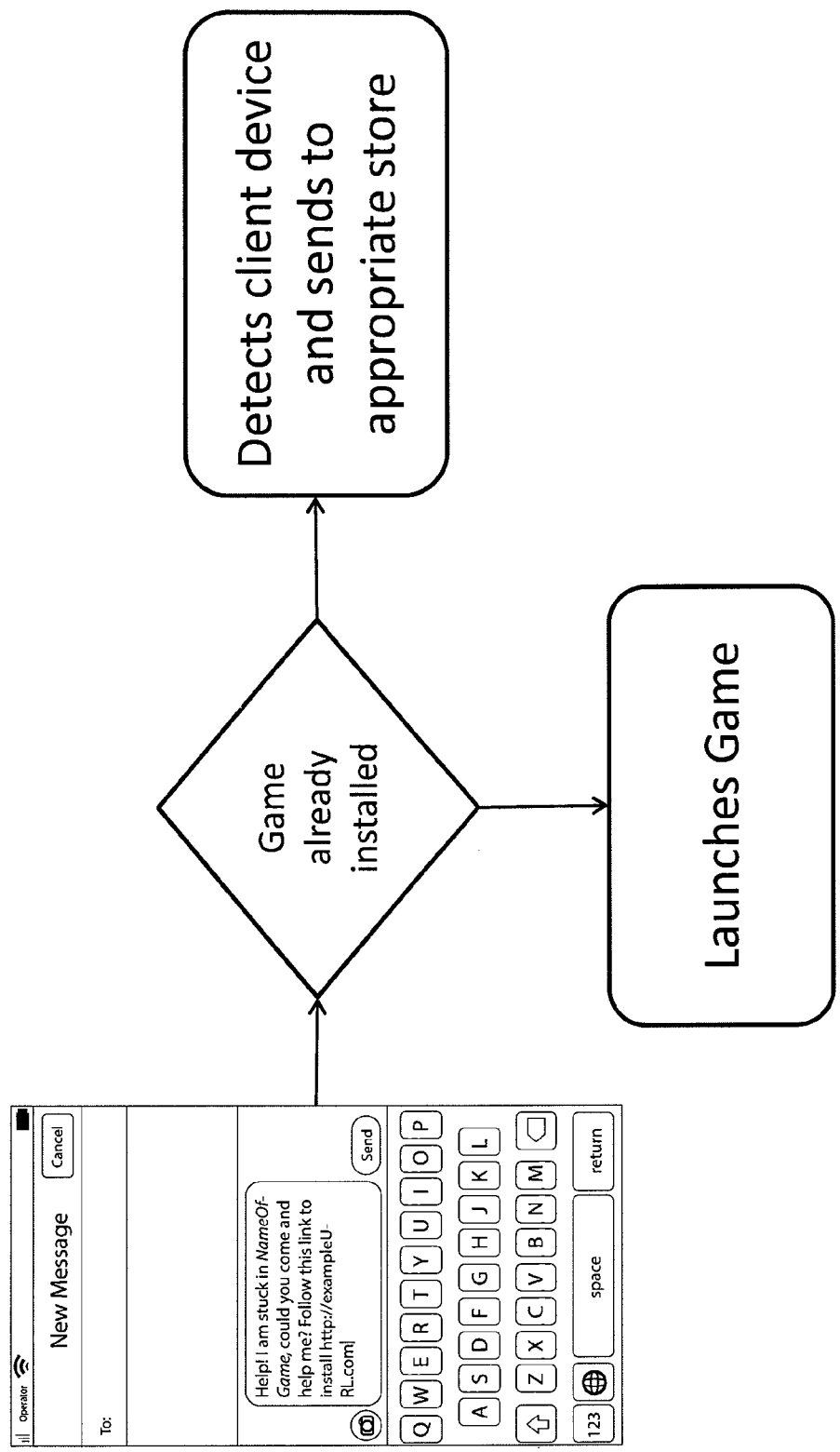
FIG. 99 Link recipient behaviour.

The recipient will be taken to the link destination where the client device is detected and it is identified whether the player has already installed the game on the device. An exemplary overview is seen in FIG. 99. This can for instance be done using a so called URI scheme as described below. If the recipient does not have the game already installed he is taken to the appropriate webpage or application store to download or activate the game. This can for instance be the Apple or android app stores or to the Facebook app page. There are different options available to implement this functionality and the identification of the device can be done on the specific device or on the server.

Figure 100:
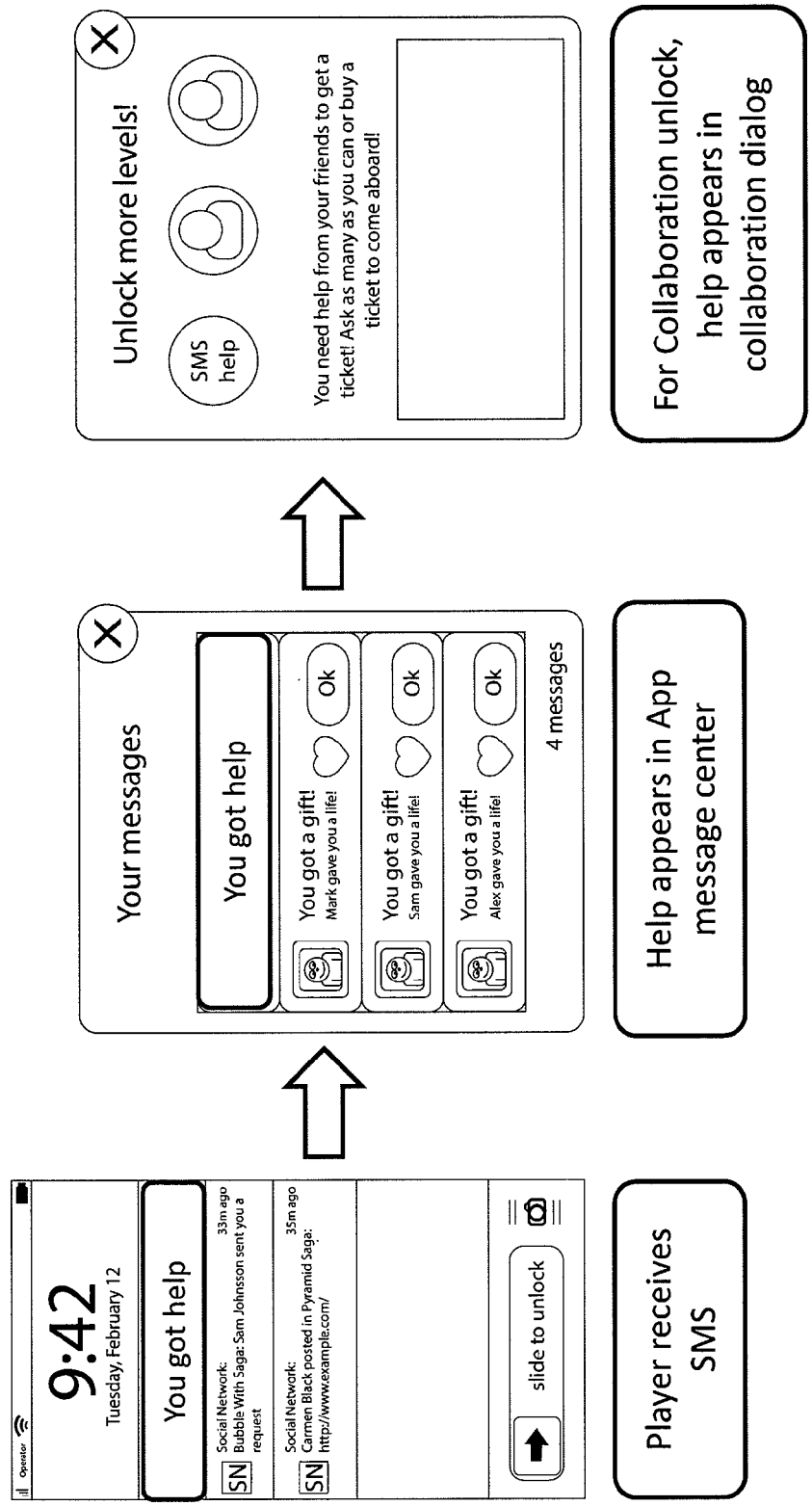
FIG. 100 Help request experience.

The player that has sent a help request will be notified when he has received the requested help. The help request experience can be seen in FIG. 100.

Further Explanation

When a player has run out of lives or is stuck at a collaboration block he or she can send a request for help via SMS. The SMS consists of a short message describing what help is wanted and a link. The message and link can be sent to one or more receivers. The link contains info on who sent the request, what the request was for and a timestamp. When the receiver clicks the link the required help is sent. Link usage is kept track of in the database so a link cannot be reused by the same user. If the player does not get help within a certain time span he or she gets help from themselves (looks like someone helped them). This is only to reward the behavior of asking for things and its use is limited.

The link payload consists of:
5 bytes user ID
1 byte transport medium and request type
2 bytes arguments (timestamp for life requests, episode and level index for collaboration blocks)

The data is then encoded in Base64, / is replaced by _ and = is replaced by empty string. The link is a normal http link. Nothing is stored server side until the receiver clicks the link.

Push notifications are used to close the loop and are also limited per 24 h period. In some implementations they are not needed for the help to get sent.

7.1 Notifications

Players can choose to be notified of certain events in a game. The notifications may be both 'pushed' as well as only available once a player logs into the game. Notifications can be sent on both stationary computers and mobile devices, depending on the players platform of choice. It is also possible to have notifications that stretch across multiple platforms, for instance they can pop up on both Facebook and on a mobile device at the same time.

Figure 101:
FIG. 101 shows a banner notification.

'Push technology' and subsequently 'push notifications' describes communications in which transaction requests are initiated by a publisher or central server, as opposed to 'pull technology' in which the receiver or client initiates a transaction requests. Typically the player can configure in which way push notifications should be received from a range of available options, such as:

Banners—Notifications are shown at the top of the screen and automatically disappear after a set period of time, typically a few seconds, unless the player interacts with them. A typical implementation of a banner notification can be seen in FIG. 101. Banner notifications can state information regarding the notification, or it can simply state which game the notification is coming from. It is in a typical implementation possible to interact with banner notifications, for instance by clicking on them. Typically clicking on a banner notification will bring the player into the game.

Alerts—Notifications require interaction from a player before disappearing, typically they appear in the middle of the screen. A typical implementation of an alert notification can be seen in FIG. 105.

No notifications—The player can also choose to turn of notifications altogether.

Figure 102:
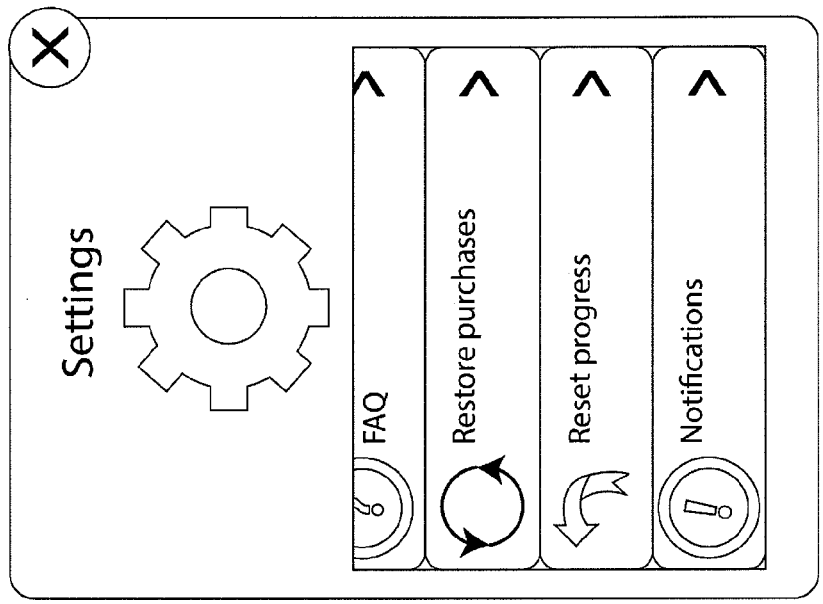
FIG. 102 shows an notifications tab in settings.

In a typical implementation the player can choose which events to be notified about. FIG. 102 shows the settings where a player can choose to be notified about certain events. In some implementations, the player can be choose to be notified when a new Mystery Quest is available, or when the player has full lives. In other implementations, the player can choose to be notified regarding a variety of different events, such as the following:

When a friend passes them in the level progression.

When their score is beaten on a specific level or on any level.

When new levels have been added to the game.

When help has been received.

When help has been requested.

When a new friend, either from a social network or from a game platform, starts playing the game.

When they have not played for a certain period of time.

When the game has been updated.

When new games from the same developer have been added to the application store.

When there are special offers in the in-game shop.

Figure 103:
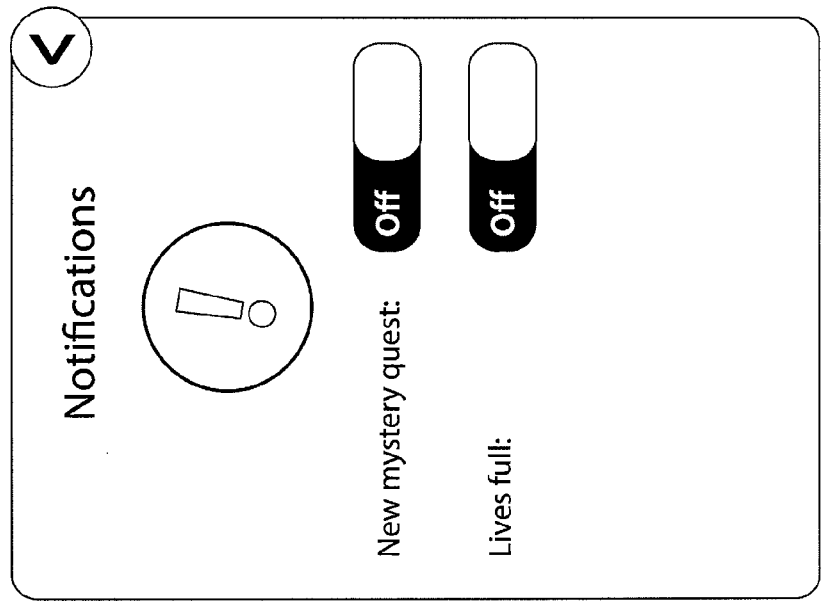
FIG. 103 shows notification settings turned off.
Figure 104:
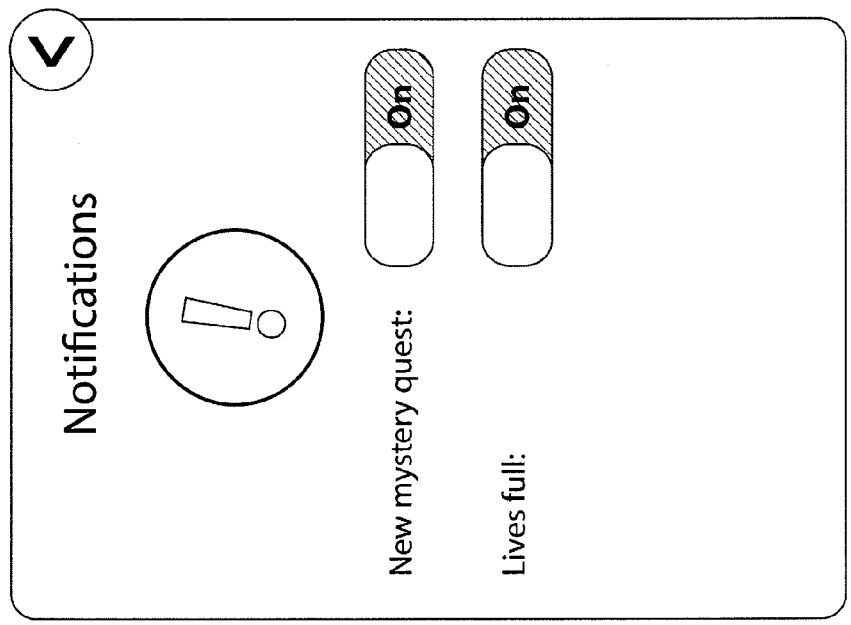

FIG. 103 shows one implementation in which the notification settings are turned off and FIG. 104 shows a similar implementation where notifications are turned on.

Figure 105:
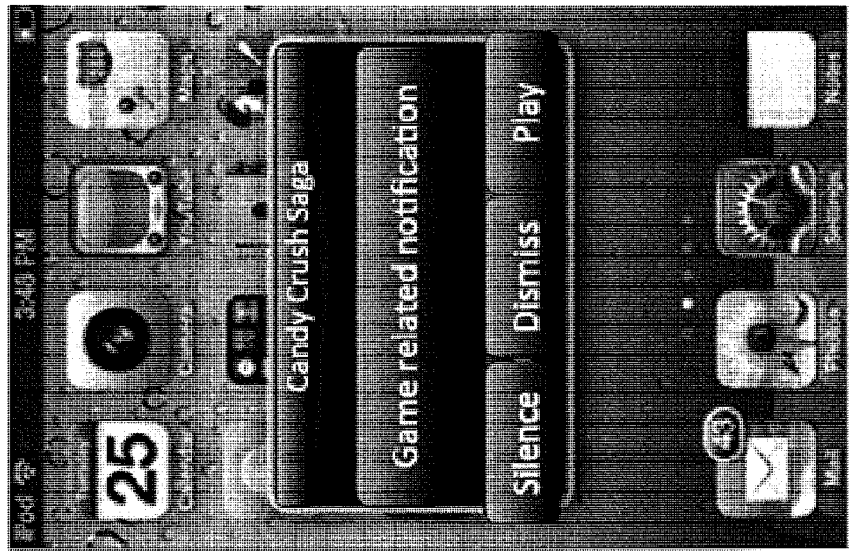
FIG. 105 shows an alert notification.

In a typical implementation, the player can choose to interact with notifications in various ways, some of these are shown in FIG. 105, for example:

Silence the notification temporarily but keep it available.

Dismiss the notification entirely so that it is removed and cannot be seen again.

Go directly to the game and start playing. This can in some implementations be done by automatically starting a specific level, for instance in the case a friend has beaten the player's score on a level or if the player has been passed.

Directly respond to the notification, for instance if a friend has requested help, the player can respond directly by one click that allows them to send help without actually going through the game interface.

In some implementations where notifications are pushed, the player will only get the first notifications pushed, subsequent ones will not be seen until the player chooses to acknowledge the first one. This is because players should not feel irritated or overwhelmed by notifications.

Notifications can also be implemented so that they synchronise across platforms. For instance, if a player has been notified about an occurrence it can be sent to both a mobile device and the Facebook platform, but after acknowledging the notification on one platform it also disappears from other platforms. Notifications can be sent in various ways, for instance:

Email message

Message sent through a social network to which the game is connected

Through a message sent on the game platform

Through a text message, for instance sent to a mobile device

Phone call

Level Nodes

In the virtual landscape, levels are not simply represented by numbers signifying which level it is. There are also symbols that correlate to each game mode, depending on what the goal is in that mode. There are five different symbols:

Orange button, one arrow pointing to the left and one arrow pointing to the right: Signifies a level in which the player has to gain a certain amount of points in a limited number of moves.

Blue button with a square of jelly: Signifies a level in which the player has to remove all the jelly.

Green button with a downwards pointing arrow: Signifies a level in which the player has to bring down ingredients.

Purple button with an hourglass: Signifies a level in which the player has to fulfil certain criteria within a limited amount of time.

Pink button with a tick on it: Signifies a level in which the player has to remove certain amounts of specific candies, or make specific combinations of regular and special candies.

Thumbnails

In the map view, the player can hover over an unlocked level to display a thumbnail of it, see FIG. 4. This makes it easier to find specific already completed levels, and can also give the player an idea of what to expect before actually starting a level. Thumbnails cannot be displayed for levels that have not yet been reached. If trying to view one of these a symbol of a padlock will be in the place the miniature version of the level is supposed to be.

The thumbnail can also display how well the player has done on the level if he has played it previously. This can for instance be represented with the number of stars the player has received on that level, the actual score or some other indication.

The thumbnail can also display the player's position on the high score table in relation to the player's friends or showing what friends are on the high score table. This can be a driver for the player to replay the level to beat one of the friends.

Stars Next to Level Nodes

In order to give players a better overview of their progress and overall performance in the game, Candy Crush Saga shows the amount of stars achieved on a level adjacent to the level node. When hovering over a level node, the stars are instead displayed adjacent to the thumbnail.

Social Aspect

Connection to a Social Network

Games created using the invention described herein can be connected to or linked with a social network such as Facebook™ or Google+™ or a games platform with different players who can interact and see each other's progress. It is common that the users on such networks have avatars with for instance a photo of the user and/or the user's name. Such avatars can for instance also be a sign or a figure.

The social network can be located on a server that is different from the server on which the game is located, the game and the social network can also be located on the same server. In some implementations there is a direct live connection between the social network and the game platform that continuously synchronise them, in other implementations the two platforms synchronise at certain intervals, such as when the player logs into the game. The players progress when having played in offline mode (for instance completed levels and score), for instance if the player is travelling in a tunnel, can be synchronized when the player is connected to the internet.

The user and his friends' avatars can be displayed in the game or in relation to different levels in the game to show the player's progress. The avatars can also be shown in relation to indicators of the player's skill level or high score. In some implementations the avatars can be derived from a social network to which the game is connected, in other implementations they can be derived from a database related to the game. It is possible for the avatars related to users to change depending on the overall progress or performance in the game. For instance, an avatar can become larger or more visually advanced as the player plays the game for a longer time.

The user can connect with other users of the social network, either as "friends" on the social network or as "friends" within the game environment. The player can interact with other players he is connected to on the social network or who are playing the same game.

The game can be implemented to synchronize game state information and/or retrieve and connect to the social graph information and user profile of the player on a social network. It can also be connected to a proprietary network related to the game or the game developer.

The game can also be implemented so that it is connected to a plurality of social networks. The user can be given the option to select what information that can be derived and shared with which social network.

One example of how the game can be connected to a social network is the Facebook™'s Open Graph API allows websites and applications to draw and share information about more objects than simply people, including photos, events, and pages, and their relationships between each other. This expands the social graph concept to more than just relationships between individuals and instead applies it to virtual non-human objects between individuals, as well. A game can typically share in-game events such as that a level has been completed, that a player has passed a friend in the game or beaten a friend's high score on a level. The game can also post events, such as that a player has purchased objects in the game or received objects from other players of the game.

High Score List

When showing the pre-level screen, players are presented with the highscores of friends. This gives an opportunity to know beforehand what to aim for, and is something that increases the competitive element in the game. The information about friends' scores is derived from a social network connected to which the game is connected. It is important for further increasing the engagement and of players and to some extent viralisation, since players are constantly being reminded about the performance of others, which can incentivise players to try harder.

In some implementations, each area in the game can have a 'Candy King', meaning the player within a network of players that has the best performance on the levels in that area.

Friends' and Player's Progress Showing on Virtual Path

Another feature in the game that increases the competitive element is that friends' progress on the virtual map is shown. Even if the player has not unlocked or reached the areas in which friends are playing, their progress can still be shown by means of a picture associated with the player being displayed next to the level they are currently at, see FIG. 4.

It is also possible to invite new players to play the game. These can be invited through the game platform or through a social network to which the game is connected. In some implementations, the game suggests which players to invite. This suggestion can for instance be based on if the players have played other games from the same developer, if they are active on a social network or if they seem to like other games in the same genre. It is also possible for the suggestions to be based from data related to a social network, such as how often they interact with other players or how often they log in to the social network.

One aspect that increases the competitive element of the game is that messages can be sent to friends, for instance related to beating their scores or passing them in terms of overall level progression. In some implementations, the game prompts the player to send a message to signal that a friend has been beaten. This message can be edited by the player, or it can be a pre-defined version suggested by the game.

The messages can be generated on a server hosting the game or on a server hosting a social network to which the game is connected. Information used in the message can for instance be derived from one of the databases to which the game is connected or from databases related to networks to which the game is connected.

Sending Gifts

Figure 68:
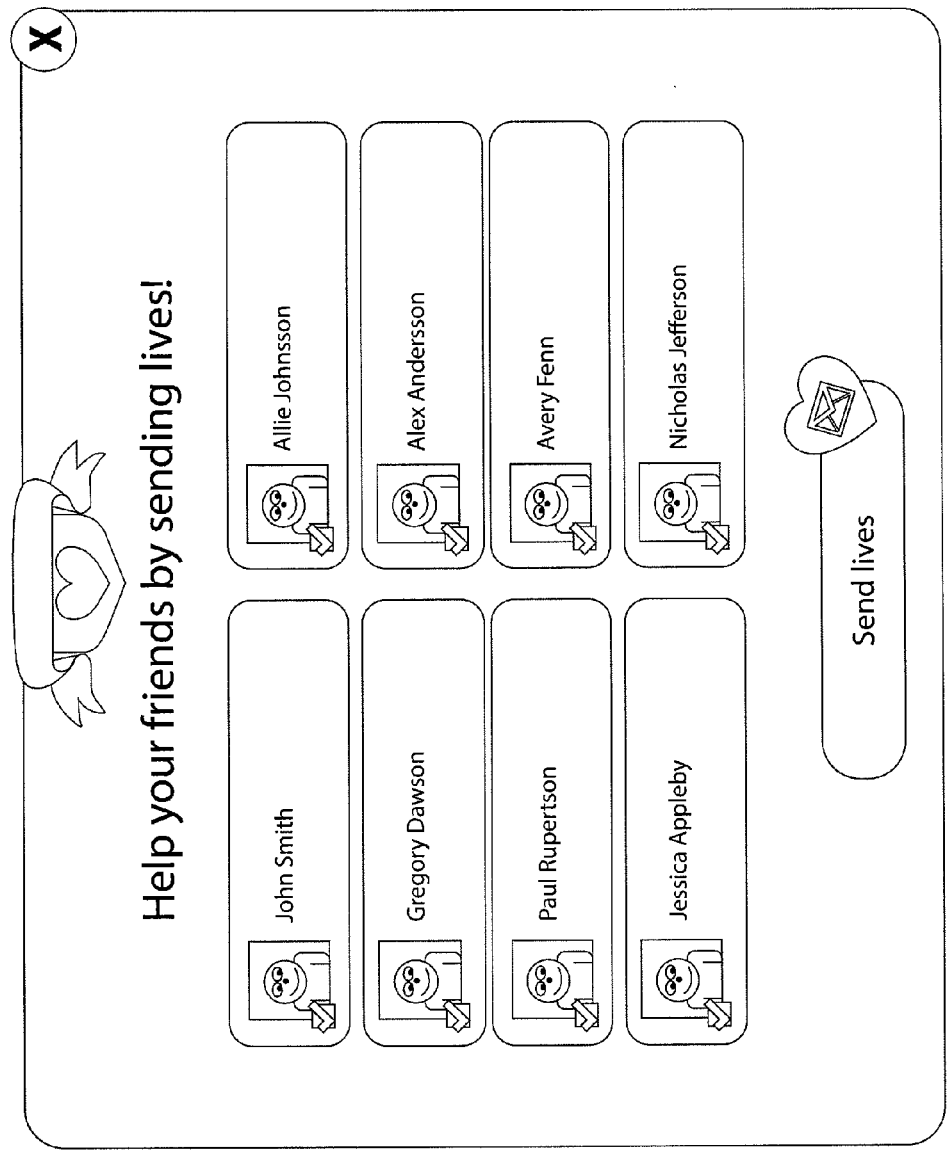
FIG. 68 shows one implementation when sending lives to friends.

One aspect of Candy Crush Saga that increases the viralisation and engagement of players is the ability to send gifts to other players, which help them in the game. It is possible to give certain gifts for free, such as one extra life. The option to send free lives is available for instance through the pre-level screen and the post-level screen. When starting the game, the player is presented with a list of friends to send lives to, as FIG. 68.

Figure 69:
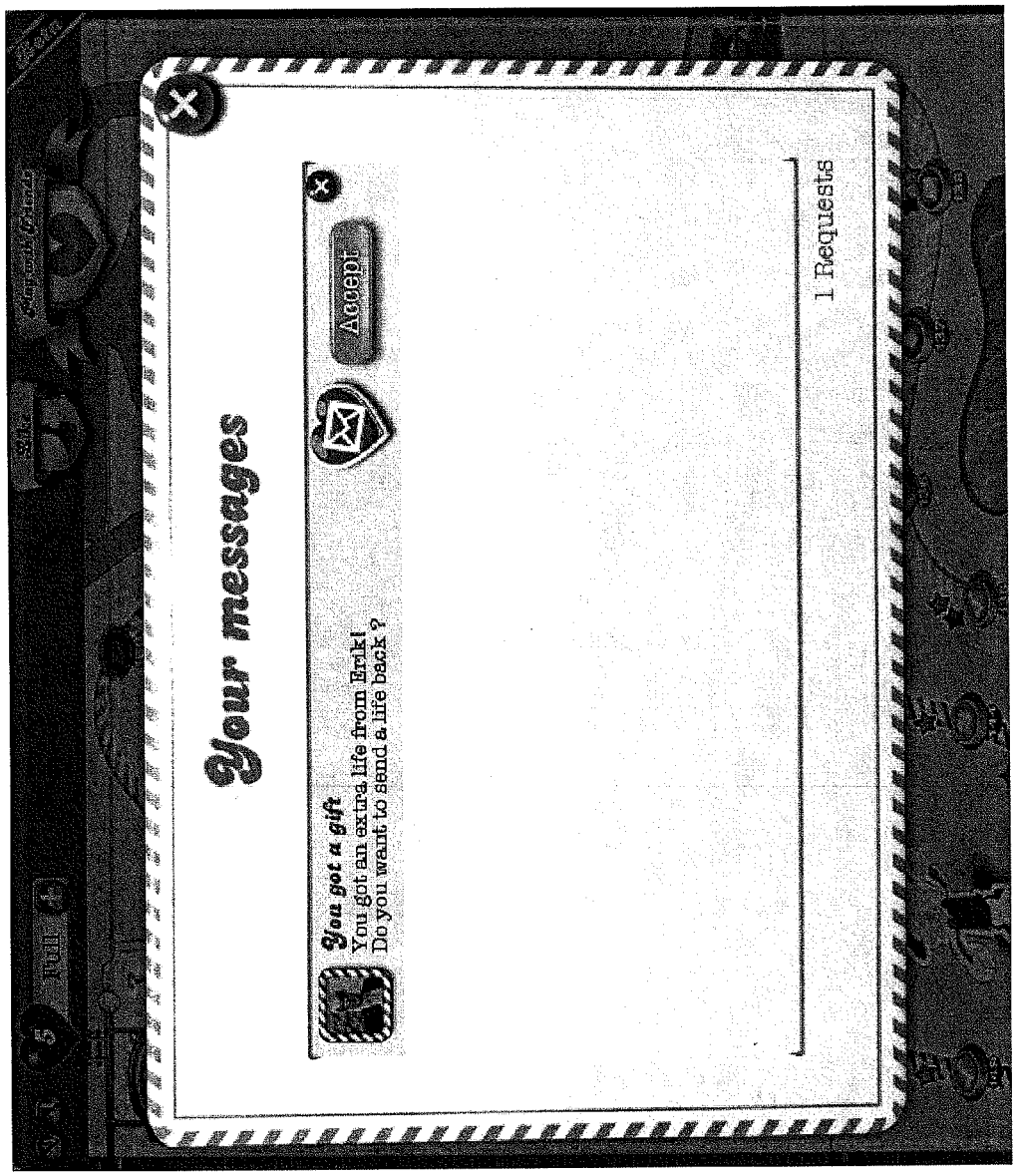
FIG. 69 shows one implementation of received gifts and messages.

After this screen, the player is presented with new messages. Gifts sent from other players are displayed under messages, and certain free gifts such as lives can easily be reciprocated. In FIG. 69, clicking 'Accept' would automatically send a life back to the friend who sent one.

In some implementations the game prompts players to send lives to other players that have run out of lives. When a player completes a level after receiving help from a friend, a 'thank you'-message can be sent to that friend, either automatically or manually. This message can contain an item of value. In some implementations the player helping another player can get other benefits, such as special symbols or marks being displayed next to their names. Recognition is another benefit that can be awarded to players who help others.

Figure 70:
FIG. 70 shows one implementation for a mobile version of a message list.

In the mobile version of the game, the player is presented with messages when logging in. Messages that are presented can be related to the player receiving lives and friends requesting lives. This is shown in FIG. 70. After receiving a life from a friend, the player is asked to send a life back. If choosing to send a life back in response, the friend who originally sent it will not get a request to send back yet another life. So, this chain of events has two steps if a player starts out by sending a life without request; step 1 is sending a life and step 2 is the recipient sending a life back in response. If a player starts with requesting a life, the chain of events has three steps; step 1 is requesting a life, step 2 is receiving a life, step 3 is sending a life back in response.

It is also possible to buy gifts in the Yeti shop and send these to friends. Such gifts are in the form of boosters that can be used either during a level or before a level.

Figure 71:
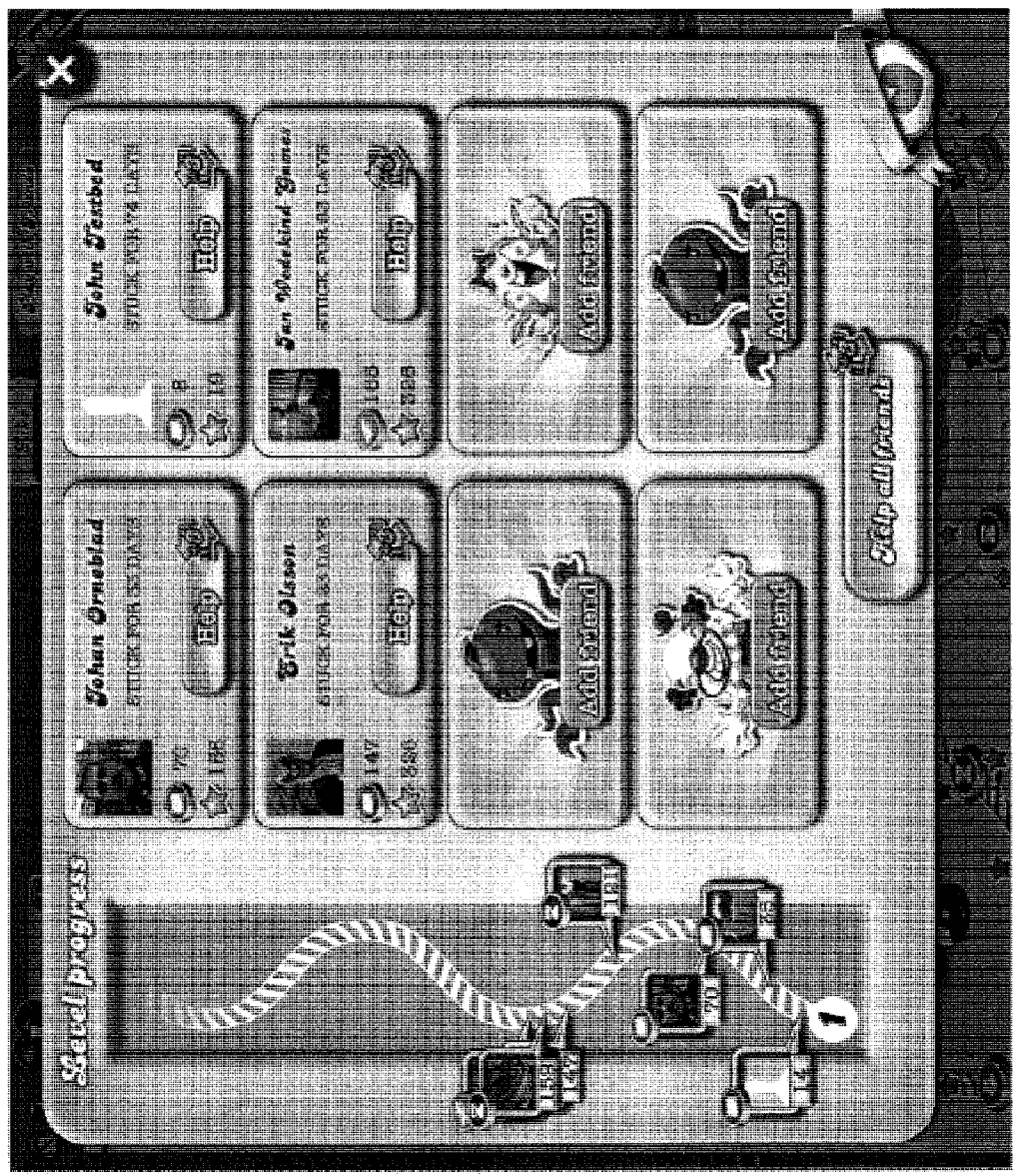
FIG. 71 shows one implementation of friends' progress and the option to send extra moves.

Sending Extra Moves to a Player that is Stuck on a Level for a Certain Number of Days/Failed Attempts Another way of helping friends is to send extra moves. This is not something that is possible to do to all players at all times, but instead certain criteria must be fulfilled. The criteria are related to how long a player has been stuck on the same level. When selecting the icon 'Play with Friends', a list of friends is presented, see FIG. 71. Some of these friends will have been stuck on a level for an extended period of time, and the player then has an option to help these players by sending three extra moves, free of charge. These moves are different from the booster giving five extra moves, not only because the amount of extra moves is lower, but also because the booster is only usable and available on a specific level. This is a way of facilitating the harder levels of the game by receiving help from friends.

Figure 72:
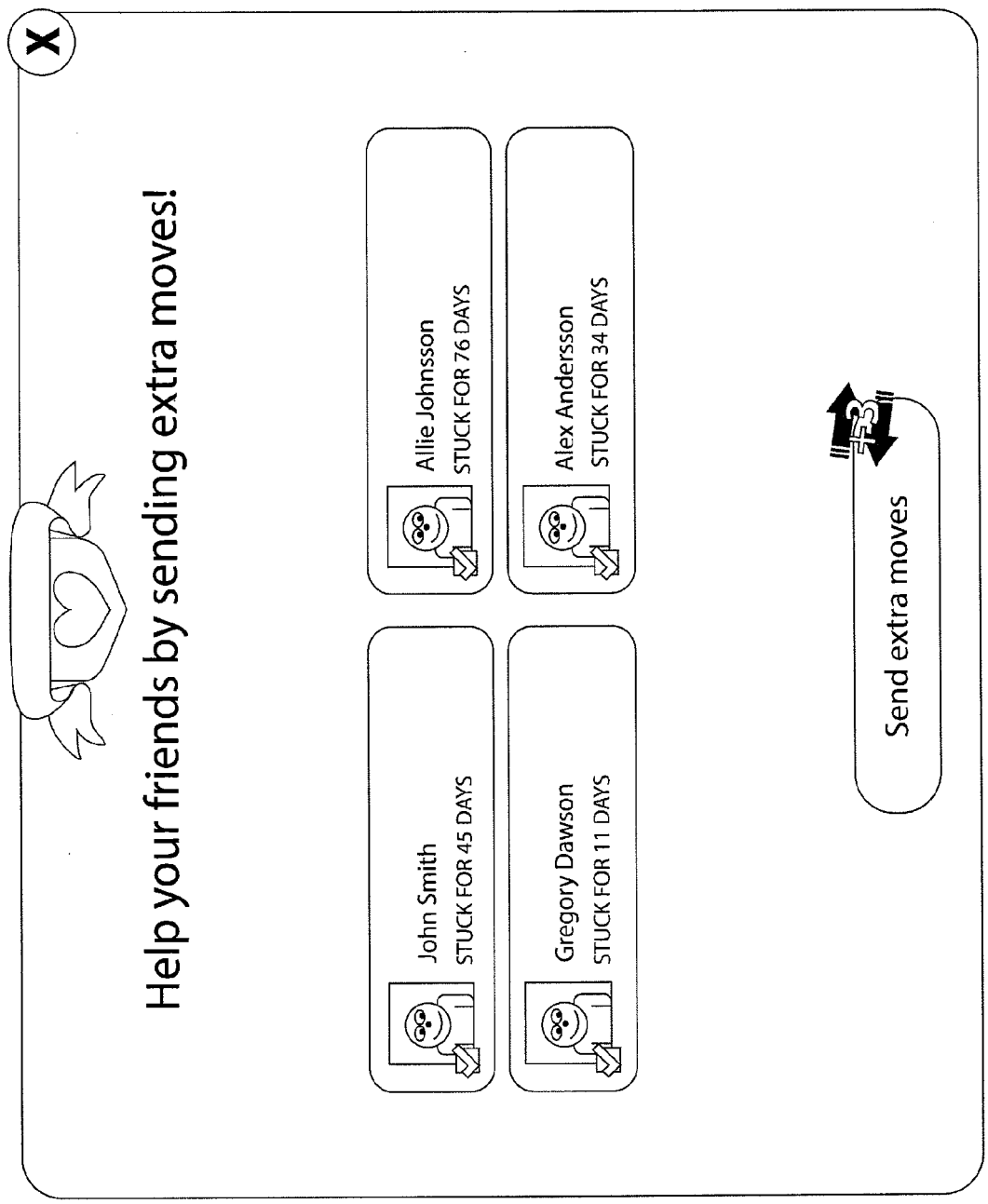
FIG. 72 shows one implementation where the game prompts the player to send help to friends.

The game can also prompt the player to send extra moves to friends that have been stuck on the same level for an extended period of time. In some implementations, this period of time is two days. In other implementations, the criteria for a player being stuck is related to the amount of times they have tried and failed a level. The prompting is for instance done when a player logs onto the game, as shown in FIG. 72. This increases engagement by helping players when the game is particularly difficult, and also adds a sense of collaboration and community among players. When a player has received extra moves this is indicated by a ribbon enveloping the node of the level in which the moves can be used, see FIG. 4.

In some implementations, the player can receive help from multiple friends. Help from multiple friends can be used at the same time or subsequently. When a player completes a level after receiving help from a friend, a 'thank you'-message can be sent to that friend. This message can have different implementations, such as the ones described in the passage above about a thank-you message related to sending lives.

Figure 73:
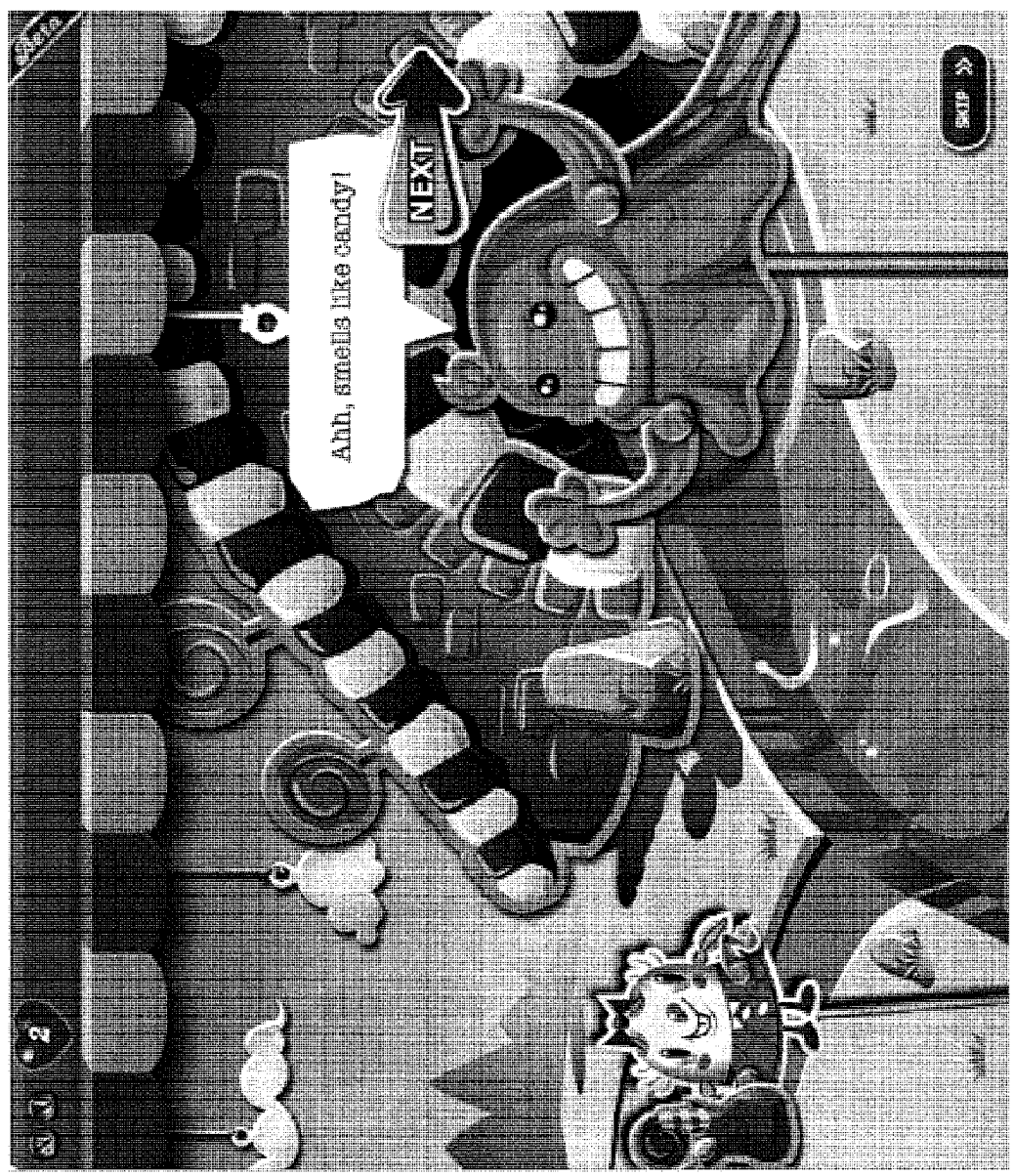
FIG. 73 shows one implementation of an in-game animation connected to a certain game episode.

Candy Crush Saga has a storyline that runs through the game. The main character is a little girl that goes around helping and defeating various creatures. At the start of the game, as well as at the start of every new episode, there are animated sequences. These sequences tell the story of how the girl goes around the world of Candy Crush Saga and how she overcomes obstacles that are presented to her. FIG. 73 shows an example of an animation that is displayed at the start of a new episode.

Figure 74:
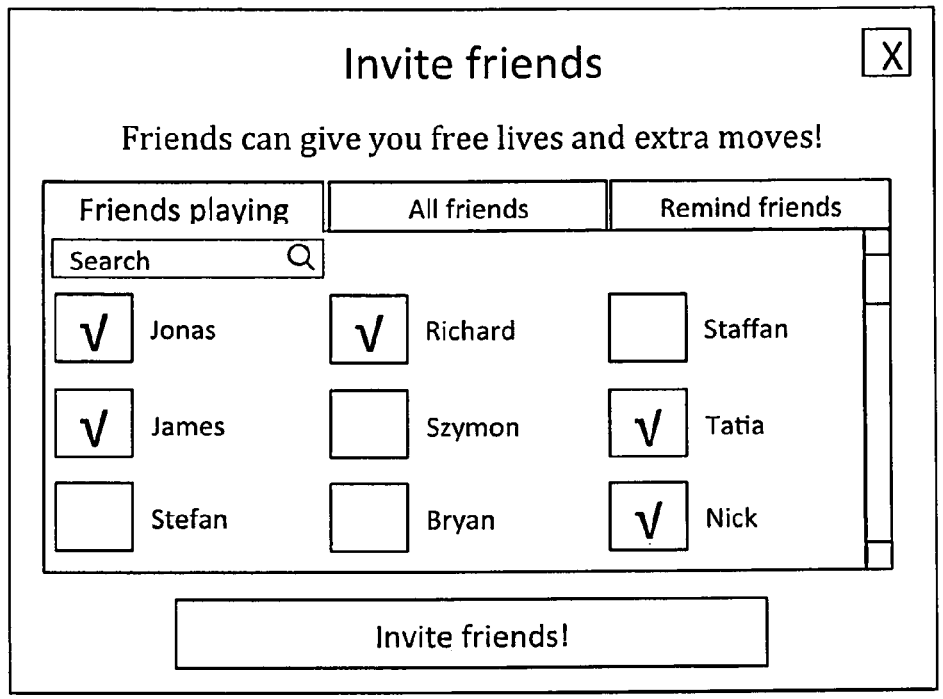
FIG. 74 shows friends that are playing the game.
Figure 75:
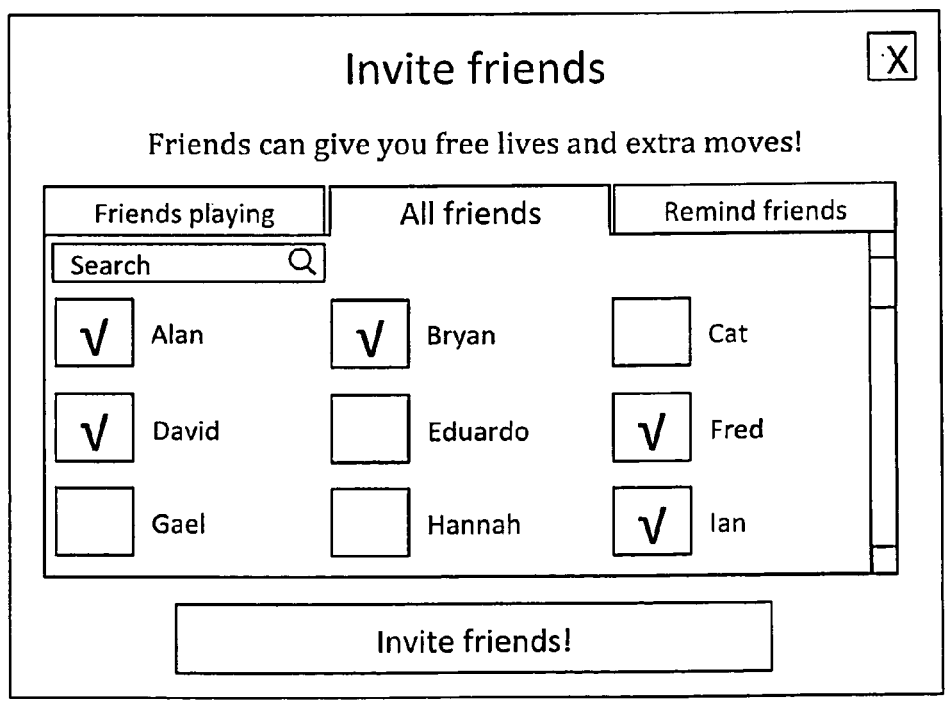
FIG. 75 shows all friends.
Figure 76:
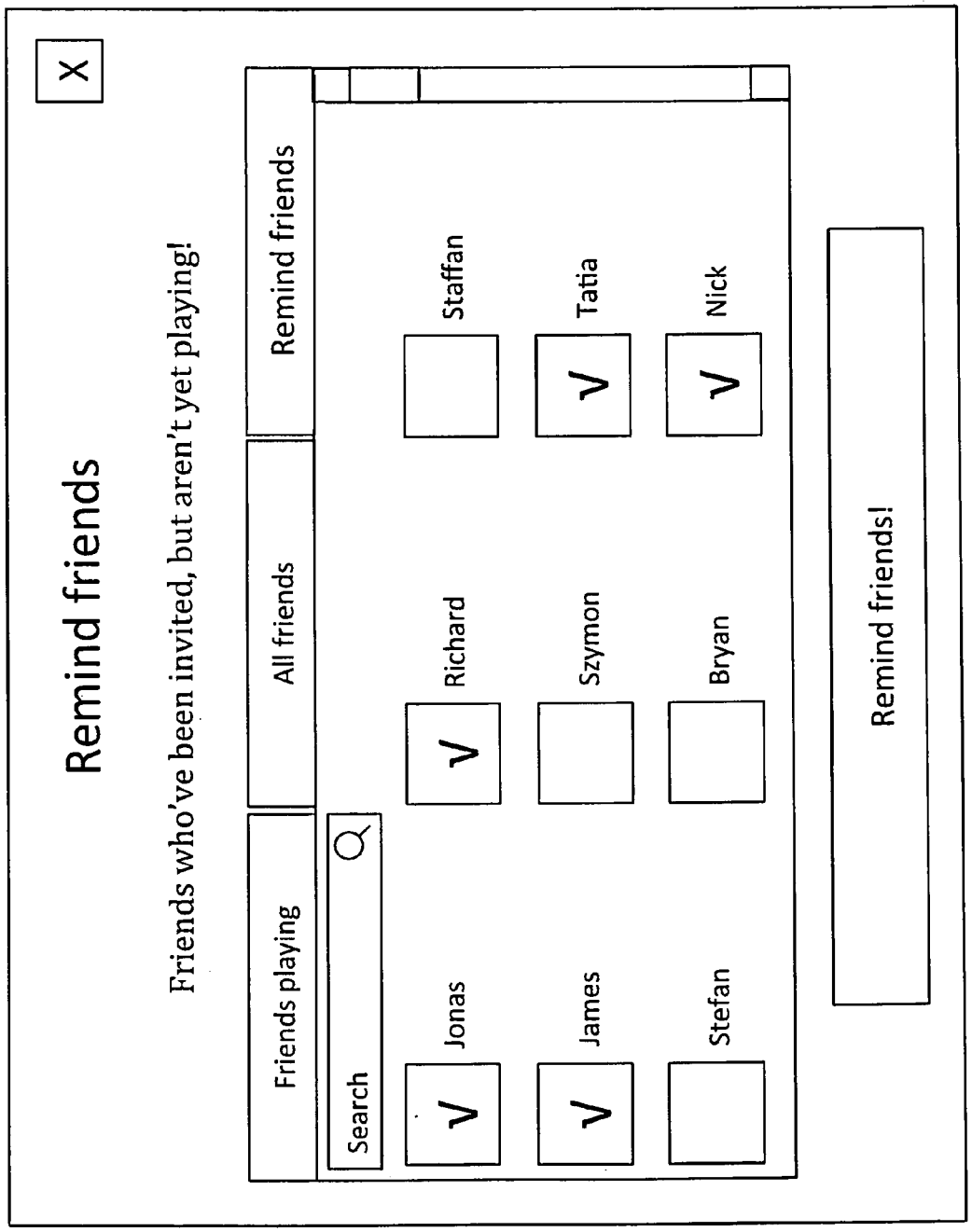
FIG. 76 shows the third tab with social network friends that have received requests or invites.

In some implementations, an area will start off as being slightly dirty with a sad atmosphere, to become colourful and full of love and warmth as the player progresses through the levels. Areas become even more happy and colourful as the player earns more stars, even on previously completed levels.
Invite Friends The player may in some implementations select subgroups of all available friends or filter the friends to only show the friends that also are playing the game. An exemplary implementation is shown in FIG. 74, FIG. 75 and FIG. 76.

The friend selection may appear when the player is to send requests to other player or ask for help. Exemplary implementations may include:
  Send moves pop-up
  Send lives pop-up
  Invite friends pop-up
  Other pop-ups which prompts the player to select friends By way of example one implementation where the player can select to filter the friends may be based on a certain criteria such as the level of interaction the friends have had in the past or the skill level or progress in the games. These different criteria are illustrated with a pre-filtering in three tabs in a pop-up window in the game. This popup window can be automatically initiated by the game, or requested by the player through for instance pressing a button in the game.

The list of friends may be populated from friends of the player that are also active in the game or only from friends on a social network. FIG. 74 shows the first tab open where friends from a social network who have installed the game are listed. In one implementation the default mode is that no friends have been selected. Clicking on a friend's picture or name will select that friend and a tick mar may appear to indicate that it has been selected.

Listed friends may be prioritised in the way they are shown in the list to the player. One such criteria in which the order of the listed friends show may be if they have paid for something in the game. Within that group players may be higher ranked if they have spent more money or if they have spent more money within a specific time period. Another criteria may be that the listed friends have been active in the game within a certain time period or with a certain activity level. Another criteria may be that the listed friends are ranked base don how many total game invites they have received to date, highest first.

If the user has no friends playing the game, this tab may be renamed 'Friends playing other games' and the same prioritisation may be applied to these game network players.

If the user has no friends at all playing games according to the filtering criteria then the tab may not appear.

The next tab in FIG. 75 shows all friends the player has connected with in the social network.

The third tab shown in FIG. 76 shows friends on the social network that the player previously have sent a request to. Only the friends that have not yet responded to the request are listed here. In an alternative implementation only the friends that have not yet installed the game may be presented in this tab. The player may tick some of the friends to indicate which to send a reminder to.

The friends listed in the different tabs may be prioritised further. The following refers to the tabs 'all friends' and 'remind friends' but the person skilled in the art will understand that this may in some implementations also be applied to other filtered groups.

Friends are prioritised in the following way:
1. Paying players within the game company's network, in order of CLV (customer life-time value) (highest CLV first), then in order of the invites received to date for the current game (highest first)
2. Non-paying players within the game company's network, in order of CLV (if CLV is >$x; highest CLV first), then in order of invites received to date in the current game (highest first)
3. Non-users of the game company's network (in order of invites received to date in the current game, highest first)

Ideally, this list should be easy to reorganise. E.g. in month 1 the focus might be on virality, so we would prioritise the game network's players known to be viral, but in month 2 we might want to focus on monetisation, so we would want to prioritise the game network's players who spend a lot.

Prompting invitees may be stopped at some point so that they are not being spammed. For instance, invitees who have received >10 invites should no longer appear in the list.
Customising Friend Selection Pop-Ups Friend selector pop-ups may be customized according to two factors: (1) the user who sees them, and (2) the current priorities of the game environment where it has been implemented.

For example: the game team wants to push monetization, so in the 'Send moves' pop-up the user's friends are arranged according to their spend, and so only friends with the highest spend appear in the pop-up.

The standard implementation for showing popups is to show all friends. Reasons for customizing the popups can be several:
  Increase spend (e.g. prioritise friends with high spend/CLV)
  Increase retention (e.g. prioritise inactive friends)
  Increase requests sent (e.g. prioritise viral friends)
  Increase CTR on notifications by improving targeting (e.g. by increasing relevance to recipient)

All these give the game developer an additional tool to optimise performance of a game.
What Information can be Used for a Typical Implementation?

The players may be ranked according to a set of measures. For example:
  Spend (for example how much has this player spent on in-game items over a period of time)
  Virality (for instance how active is this player responding to notifications, help requests and other in-game viral effects)
  Activity (for instance how active this player is playing the game; when did the player last play or how many levels have the player played)

These may also be combined—e.g. if the game team wants to reactive lapsed spenders, they might want the send moves pop-up to display each user's friends in order of spend, but to display only users who have been inactive for 10+ days.

Examples of Implementation in a System

There are many possible approaches. Customisation could be approached on a game-specific basis, using only information relating to a single game (e.g. the game could customise pop-ups using only the game's data): This information is stored in the game's own database. But customisation may be much more powerful if it used data from across the games company network, using data from all games. That information is typically stored in a database.

How can we Use that Information to Support Customisation?

Customisation on a game-specific basis—the server creates the user rankings based their past behaviour in the game, and that determines which users the server sends to the client. The client would simply display the users selected.

Customisation on a game company network basis—we create user rankings based on information taken from a database, covering all their activity within the game company network. The rankings would be stored in a system, would be updated at least on a daily basis, and would be available to all games using that framework. An individual game's servers would pull the rankings out of the system, and determine which users to send to the client. The client would simply display the users selected.

Music, Sounds and Effects

Candy Crush Saga has both music and other audio effects that are important for the overall feel of the game. All sounds and music have the same warm feeling to them as the colours and animations.

Sounds and Effects

Audio effects are always played as soon as something is happening in the game whether it is due to an input from the player or if it's some kind of automated event. For example, an automated event could be when the user starts the game and a pop up appear suggesting that the player should send gifts to friends. When this pop up appear there is a discrete swishing sound to make the player aware that something happened. Another automated event could be before starting a level and a message screen shows up saying what needs to be done to pass the level before it automatically disappears again.

For all objects that can be interacted with in the game, there is always either a visual notification, a sound, or both, to let the player know that something in the interface can be interacted with. For example, in one implementation there is a shop icon that highlights, starts swinging and lets off a short sound when the mouse is hovered over it.

The sounds played to give indication of interactable objects are always non-disturbing sounds that the player does not even think about are there unless someone points it out to him.

Figure 77:
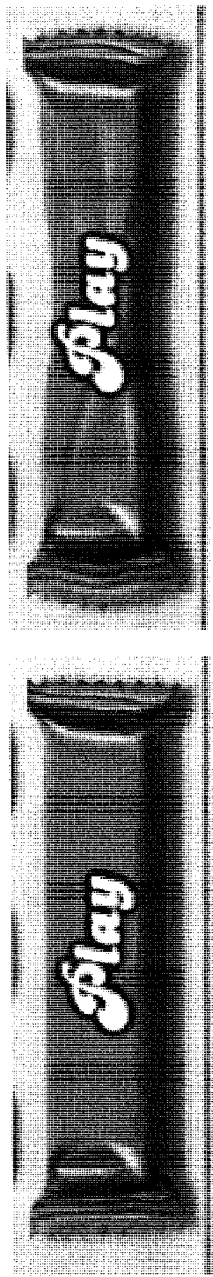
FIG. 77 shows one implementation of indication when a button has been pressed.

Sounds and effects are not only there to indicate when an interaction is possible. They are also present when something is being or has been interacted with, for example a click on a button would make a certain sound and sometimes change the appearance on some of the buttons available. FIG. 77 shows one implementation where a play button looks like a wrapped candy and when pressed the wrapper on the button becomes wrinkled.

Figure 78:
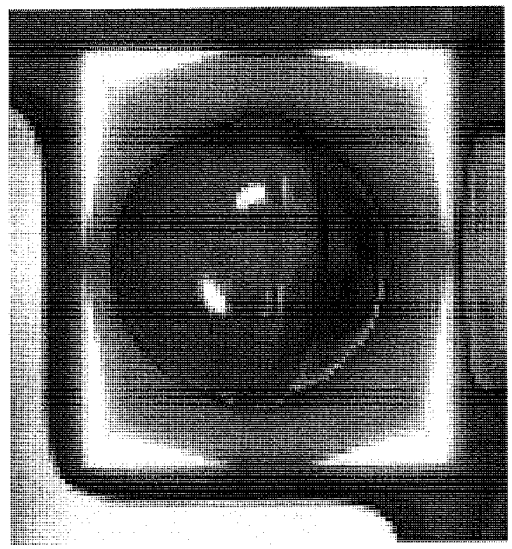
FIG. 78 shows one implementation where a game element has been clicked.

Clicking on a candy when playing a level would also give a visual notification. In one implementation the candy would be highlighted and so the player will know what candy has been chosen. In another implementation a frame would appear around the chosen candy, see FIG. 78.

When making different kinds of switches there are also different kinds of sounds and animations connected to these. There is one sound if the player tries to make an invalid move, another sound for a match of three, yet another sound for a match of four and so on. When candies are removed there is a small animation of stars in the emptied space. This adds to the visual feeling of the game.

The game encourages players to make good moves, and the sounds made when generating special candies are triumphant-sounding and can give players a feeling of satisfaction.

Figure 79:
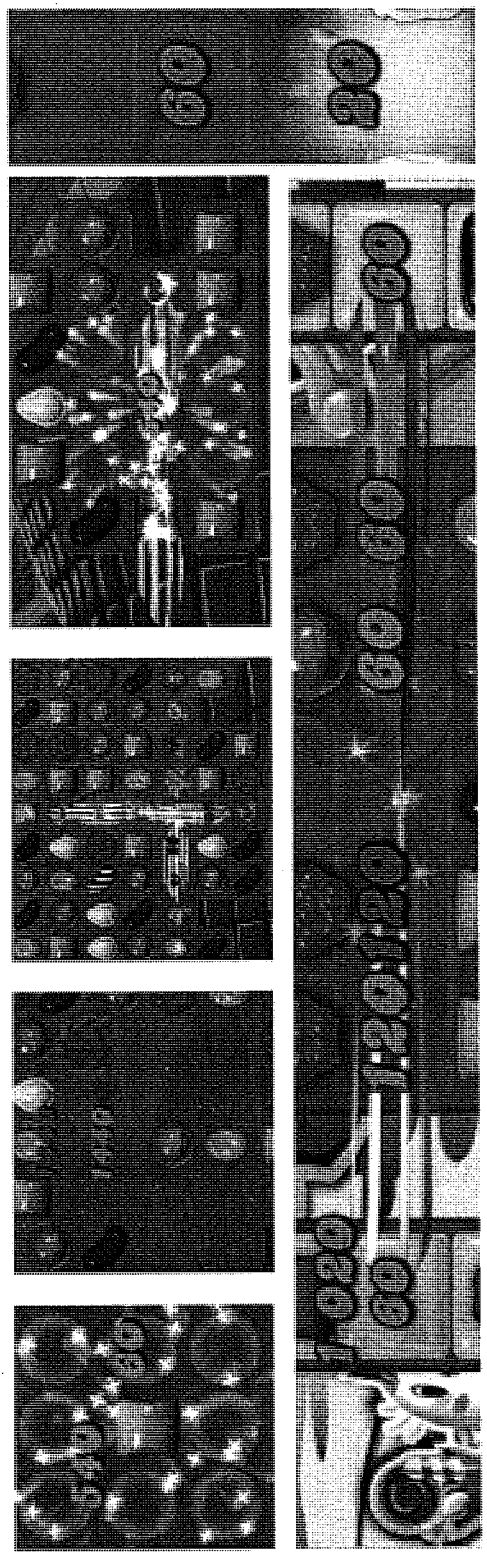
FIG. 79 shows examples of animations when removing or triggering various game elements.

Triggering special candies also have their unique sounds and visual effects. Animations with lines and stars are shown to emphasize how good it is to use these in the game and how much it helps the player. FIG. 79 shows a collection of several implementations of animations that are shown when various game elements are being triggered or removed.

If getting a cascade of matches falling one after the other then there is yet another sound together with a message shown on the screen saying either 'Delicious', 'Divine', 'Sweet' and 'Tasty' depending on how many matches were made with only one move. Together with these visual messages there is a voice saying them out loud in order to compliment and motivate the player and as a result adding more feeling to the game. The same thing happens when completing a level, there is a voice and a message saying 'Sugar crush!' in order to make the player feel like a good player.

Background Music

Music is constantly played while displaying the virtual landscape as well as when showing the game board. There can in some implementations be different music playing in a level compared to when viewing the virtual landscape.

Candy Crush Saga has implemented a background music that creates a state of mind of the player that is desirable to optimize engagement, virality and monetization.

The music is a waltz.
- dance music—human body is naturally inclined to 'dance' along (even if just subconsciously)
- strong beat falls approx. every second, feels in time with heartbeat, adds to sense of internalising the music
- the whole thing works on a subconscious level to keep the player involved in the game—mentally/subconsciously the player sings/dances along
- first few levels: whistle
- addition of 'human' sound is clever—adds a level of reality to an otherwise surreal/virtual game
- functions as question and answer (whistle provides the answer/response to the opening instrumental question)
- leads the player to subconsciously 'fill in' the answer along with the whistle
- all this, again, increases the level of absorption in the gaming experience The in-between level music (i.e. on the 'this is your score' pages) Weird and jarring descending passages in an unusual mode—creates a slightly unpleasant and jittery feeling after the contrasting happy/swinging/jolly music of the game play→subconsciously makes the player speed up and get onto the next gameplay screen where 'normal' tonality and harmony resume!

The speed of the music in gameplay mode—
- a waltz has three beats in a bar (ONE two three | ONE two three | ONE two three, etc.)
- although strong beat of the waltz falls every second, giving impression of gentle calm pace, the actual beats (one, two and three) are quite fast (i.e. three to a second)—this speed in the music creates a pressure on the player.
- so the player is really absorbed in game and music, and is unwittingly spurred to play quickly (increasing the pressure, feeling of challenge, thrill, excitement, whatever you want to call it) because of this constant push from the music's tempo. Still there is a calm feeling.

The music experience is subtle, sly and effective!

Synchronization Between Devices

Three platforms in particular are changing the way people expect games to be played. These three platforms are growing at the same time, and provide new input possibilities. To date, games have not absorbed all the new input possibilities.

The first platform is Facebook. The skilled person will understand that where Facebook is referred to in this document, other social network platforms may be used. A Facebook game may be a social game, a game you play with your friends. It is rare or unthinkable to launch a game (i.e. to play for the first time) on Facebook that is a paid game, because people playing games on Facebook expect not to pay to access a game. A Facebook game may be played on the internet, after logging in to Facebook (whether automatically or manually), such as from a personal computer.

The second platform is smartphones. Use of smartphones is not always continuous. You may use a smartphone for 5 minutes on a bus, and then for 20 minutes on a connecting train, for example. The use can have many starts and stops. Not like someone working at an office desk or at a home desk in a conventional way. A smartphone can be on an iOS platform, or on an Android platform, for example.

The third platform is tablets. What is a tablet? It can function as a mobile device and as a non-mobile device. The tablet can be a substitute for a personal computer. A user may want a seamless experience between using the game on a personal computer and on a tablet and on another mobile device. A tablet can be on an iOS platform, or on an Android platform, for example.

A game which works on a plurality of such as all three of the above platforms (or more), may provide a connected fully-synchronized seamless experience. Hence multi-platform games are important. Key criteria for multi-platform games are: they are free, they are social, stop-start use is possible, and seamless experience is provided. Such games may be "played anywhere" e.g. in a mobile environment or in a non-mobile environment. Such games may also be played online or offline.

The game must be fun when used in a stop-start way, and when used for even just short intervals. In an example, a game consists of parts or levels, each of which runs for about 3 minutes, eg. between 1 and 5 minutes. In an example, a game is structured in levels, so that if successful in a game level, such as by scoring a minimum score, a user can progress from that level to the next level. In an example, a game has about 200 levels.

A game can be optimized post-launch. For example, if it is clear that too many users are failing to progress past a particular level, the minimum score to pass the level can be lowered. An optimized game may be provided as an application update from an application store. In an alternative, a game may be optimized by a server sending a revised data file of scores required to pass each game level to a mobile device, when a game state of a user is being synchronized with the server, wherein the application running on the device replaces the previous file of scores stored on the device required to pass each level with the revised file of scores required to pass each level.

See for instance the method and system described in U.S. application Ser. No. 13/479,107 filed on 23 May 2012 and incorporated in this document.

The system and method described herein can be implemented together with a game, in which players can see their own and also their social network friends' game level position on a virtual path (or other virtual world) and in which game state information is fully synchronised across different platforms, such as iOS, desktop and Android via Facebook or other online social network, so that a player can seamlessly stop and re-start playing the game on any of those different platforms.

Different Devices

Some implementations of the game allows for the game to be synchronised between different devices or platforms.

The game can for instance be played in an offline mode on a handheld device using locally stored information on the handheld device. The device can store all or some of the levels that are available for the player to play in the game. Some of the features in the game can be locally run on the device and dependent on the local machine. This can for instance be that if the game is implemented to regenerate lives after a certain period of time, then the time can be locally decided based on the clock on the device. In some implementations, the central game server clock can override the local clock when the local device has been synchronised with the server.

Figure 80:
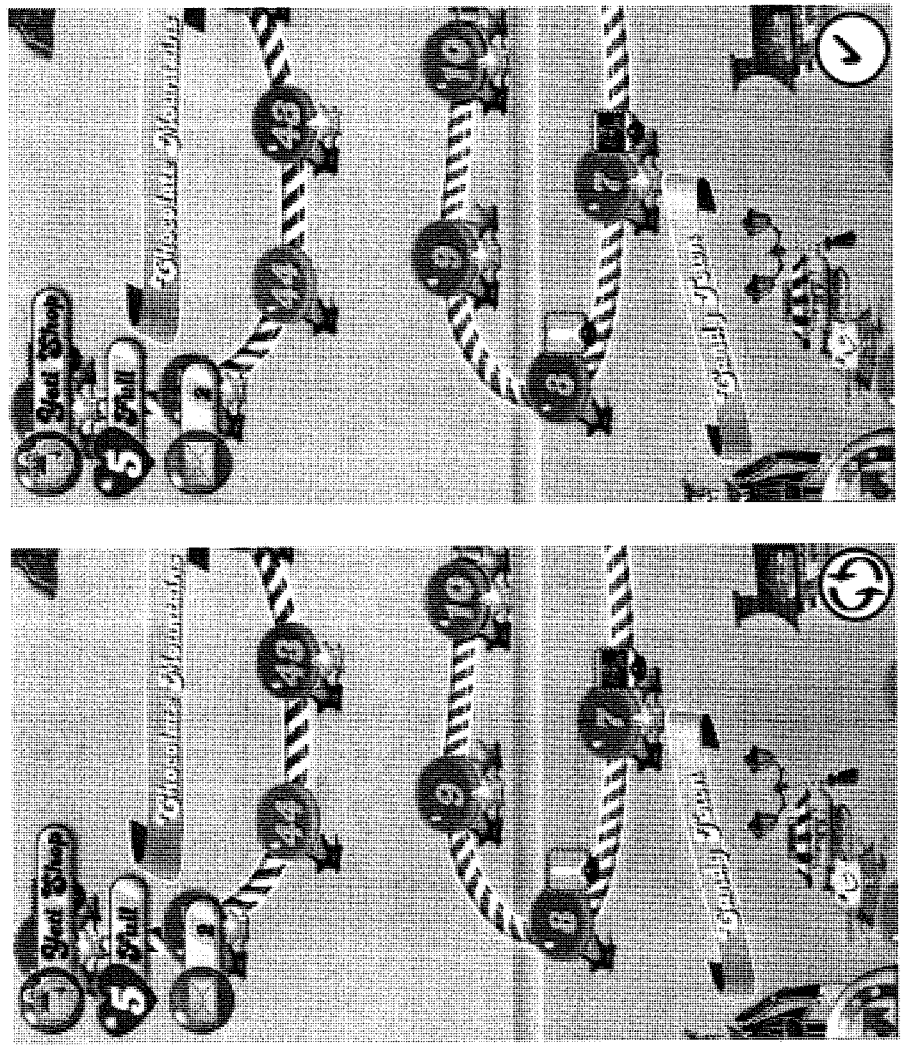
FIG. 80 shows one implementation of a synchronization indicator.

A game can be implemented so that the player knows if it has synchronised the available data with the central server or servers. This can for instance be through a coloured symbol or a check mark that indicates that the information is up to date. FIG. 80 shows one implementation of this where a symbol on the bottom right corner of the screen has a spinning animation while synchronizing and when synchronization has completed the symbol turns into a check mark symbol.

The game can also indicate if it has been able to establish a connection with the central server for synchronisation or if for instance the network connection is down. That the device is offline can for instance be illustrated with a greyed out icon.

Different Platforms (FB/Google+)

The game can be implemented to synchronize game state information and/or retrieve and connect to the social graph information and user profile of the player on a social network such as Facebook or Google+.

The game can also be implemented so that it is connected to a plurality of social networks. The user can be given the option to select what information that can be derived and shared with which social network.

One example of how the game can be connected to a social network is the Facebook™'s Open Graph API allows websites and applications to draw and share information about more objects than simply people, including photos, events, and pages, and their relationships between each other. This expands the social graph concept to more than just relationships between individuals and instead applies it to virtual non-human objects between individuals, as well. A game can typically share in-game events such as that a level has been completed, that a player has passed a friend in the game or beaten a friend's high score on a level. The game can also post event such as that a player has purchased objects in the game or received objects from other players of the game.

Features that May be Implemented Using the Inventions Described Herein

Having Various Elements to Combine in the Game.

There are six different game elements (candies). They can be combined in series of 3, 4 or 5 in a line, either row or a column, or in combinations in the shape of a T- or L-form.

Having Game Elements with a Certain Size

The game elements have certain sizes, all similar but not identical, making it possible to have a specific maximum number of rows and columns with candies.

Having a Transparent Area for the Game Board.

The game board is dark, semi-transparent and placed on top of a background picture which is tied to the story of the game.

Having a Specific Area for Each Separate Game Element.

In the game board, each element has a square space that is delimited by light horizontal lines and darker vertical lines. The lines do not cover the full square, but leave a gap in all the corners.

Adding Extra Obstacles and Difficulties to Complete a Level

New special game elements are introduced throughout the game to increase the difficulty. For example a layer which has to be removed by matching a candy covered by the layer (Jelly) or an impassable block that has to be removed by matching candies next to it a number of times (Frosting).

Having Another Challenge for the Level.

Most levels have two separate goals, one involving certain actions (remove jelly, get fruits to the bottom) and another related to score. This makes for a more challenging game.

Rewarding the Player with Points for Matching Combinations

The player is awarded points for each combination of at least 3 candies, enabling high score comparisons with other players as well as a challenge to beat oneself.

Showing What Points the Player is Earning

The amount of points gained by a combination is shown upon completing a combination, in the same colour as the candies used in the combination.

Getting a Certain Amount of Points for Removing a Certain Amount of Game Elements The score given for different combinations is not linear, but formed in a way to encourage longer combinations and a more thought out approach of playing the game.

Give Bonus Points in the Form of Certain 'Schemes' to Player when Finishing a Level Sooner than Necessary When a player finishes with moves left, bonus points are awarded. However, it is not simply a point bonus, there are at least two different bonus-schemes that can trigger. One transforms a number of candies into striped candies, the other summons jellyfish that remove candies on the game board.

Having an Item that Removes Three Columns or Rows

There is a booster that removes three columns by turning three candies into striped candies. This booster is in the form of a coconut wheel.

Different Combinations of Games Elements Return Special Game Elements

By making certain combinations of candies, special game elements will be produced. These are formed by making combinations of 4 candies (striped candy), 5 candies in a row or column (colour bomb), L or T-shapes of 5 candies (bomb candy).

One game element that when combined with the same colour removes all elements in that row or column.

A colour bomb-candy will be produced by combining 5 candies in a row or column. This item will either remove all candies of a certain colour (if combined with a regular candy), or it will remove all elements of two colours (if combined with a bomb candy) or it will transform all candies of the same colour into striped candies that subsequently trigger (if combined with a striped candy).

One Game Element Removes all Elements in a Certain Radius

By combining 5 or 6 candies into a L-shape or a T-shape, a bomb candy will be produced. This removes elements in a rectangle shape with a three-candy diameter.

Receive a Special Effect when Combining Striped Game Elements with Each Other

It is possible to combine striped candies, when doing so one column and one row of candies will be removed.

Receive a Special Effect when Combining a Striped Game Element with Bomb Candy

It is possible to combine a striped candy with a bomb candy, when doing so three columns and three rows of candies will be removed, originating from the spot where the combination was made.

Receive a Special Effect when Combining Two Bombs

It is possible to combine two bomb candies with each other. When doing so a rectangle shape with a diameter of 5 candies will be removed by each combined bomb candy.

Visualize the Effect when Combining a Striped Element with the Element Received from L- and T-Shapes When combining a striped candy with a bomb candy, a special visual animation is triggered in the form of a giant candy moving first horizontally in both directions from the point of origin, then vertically.

Have a Combination that Transforms Other Elements

When combining a colour bomb with a striped candy, all other candies of that colour will also be transformed into striped game elements that automatically trigger.

Having a Non-Obvious Division of Levels

The first and the second area in the game each has 10 levels. Area three and all subsequent areas each has 15 levels. This is not an obvious division, but might make it feel easier in the beginning.

Having and Showing a Map of the Game

The player progresses through the levels of the game, which is visually represented on a map. This gives the player a more tangible way of seeing progress than if levels were just represented by a number.

Having a Navigator

Having a tool for helping players to easily navigate and jump between areas on a map with as little effort as possible. One implementation is to have an expandable mini map which the player can scroll or click on to jump to desired location, or press a button which instantly takes the player to the furthest reached location on the map.

Having a tool that helps players getting an overview of a map either by the help of a special designed mini map or with a zoom in/out function.

Showing a Thumbnail of Each Level when Hovering the Cursor Over it on the Map

A small thumbnail version of each level can be shown by hovering the cursor over the level icon on the map. This gives the player a feel for what the level looks like before playing it, and makes it easier to find a level when wanting to replay it.

Having an Indicator Showing which Level the Player has Reached

The highest level reached by a player is indicated by an orange arrow pointing at it. This makes it easy for the player to find the current level and also facilitates the visualization of how far he has progressed.

To Show that a Level or Part of the Game is not Yet Available to Play

All available levels in Candy Crush can be viewed in the map, even though they haven't been unlocked. However, a padlock symbol is shown to represent that a level is yet to be unlocked and that it currently cannot be played.

Having an Welcoming Message Displayed at the Start of the Game

At the start of Candy Crush the player is greeted by an encouraging message: "Your adventure starts today! Click here to play level 2!"

To have a Tutorial

Candy Crush offers a tutorial in the beginning of the game to introduce the player to new concepts. Basic concepts, possible combinations and the different game modes are explained among other things.

Multiple Game Modes

Different game modes makes for a more diverse game. Candy Crush offers at least five different game modes—Score, Jelly, Ingredients, Orders, Time To have Blocks that have to be Removed Before Objects can Pass Through There are game elements in Candy Crush that have to be removed before objects can pass through the space they occupy. These are in the form of frosting blocks and require candies to be matched next to them a certain amount of times before they disappear.

Giving the Player Information about a Chosen Level and the Option to Use Extra Boosters When selecting a level from the map-view, information about the level is displayed together with an array of boosters that can be purchased and/or activated for that level. Information include previous scores of friends and specific instructions for the current level.

To Display Friends' Highscore

The previous high score of friends can be seen before playing a level, while playing a level and after a level has been played (provided that friends have played the level before). This increases competition and gives a sense of community at the same time.

To Give the Player the Option to Use Extra Boosters

The player can select boosters before playing a level as well as during the play of a level. The boosters which can be used in the two situations differ. This facilitates and adds more depth to the game.

Share a Result with Friends

After finishing a level, the player will get feedback to how his score relates to that of friends playing the game. An option is given to share results with friends, possibly accompanied by a message saying something along the lines of 'I beat your score'.

To Show the Player how Well a Level is being Completed

The player is provided real-time feedback in relation to the score during play of a level. This is done by a meter being filled, the meter having three different levels represented by one, two and three stars respectively.

Have Aesthetic Icons for Showing Results of Finished Levels.

In the map-view, the player can see results of previously completed levels in the form of how many stars were attained in those levels. This makes for a easy overview of the overall performance in the game.

Giving the Player a Maximum Amount of Life that is Restored Over Time

The player starts with 5 lives that are used up when failing to complete a level. These lives are then replenished with one life every 30 minutes.

Having a Thumbnail Version of a Level

When hovering over a level with the cursor, the player is presented with a thumbnail version of the level, showing the layout of it. Also displayed on this thumbnail is the performance of the player, if applicable, and also the performance of friends, if applicable.

Having an Algorithm for Reshuffling and Recognizing when there are No Possible Moves Left Candy Crush very quickly recognizes when there are no possible moves left. When that occurs, the candies on the game board are re-shuffled. When re-shuffling, there will be no combinations automatically triggering, i.e. 3 or more candies are not placed adjacent to each other.

A Match 3-Game with Boosters Usable Across Different Platforms

A match 3 switcher game, in which players can see their own and their social network friends' game level position on a virtual path, in which the game is fully sync'd across different platforms, such as iOS, desktop and Android via Facebook, and, in which the gameplay for each level can be enhanced through the use of an acquired item.

The acquired items can be synchronized across all of the platforms where the game is played by the user.

A Match 3-Game with a Mode to Bring Down Objects

A match 3 switcher game, in which players can see their own and their social network friends' game level position on a virtual path and, in which the game board contains switchable elements that can be matched with other switchable elements and switchable elements that cannot be matched with other switchable elements on the game board, where one of the goals for completing a level is to interact with the game board in such a way that a predefined number of non-matchable switchable elements are placed in any of a plurality of predefined areas on the game board.

A Match 3-Game with Multiple Different Objectives

A match 3 game in which the player has to satisfy a plurality of criteria within a limited number of moves to complete the level; the criteria include at least one of the following:
  reaching a target score
  removing matchable game elements to clear a path for a non-matchable game element to get to a predefined area on the game board
  clear a predefined number of a certain type of game items layered on the game board having a matchable game element together with each of the layered game items, each layered game item can be removed by removing a matcheable game element in the same position as the layered game item.

Concepts

Key Concepts

There are multiple technical challenges facing the designer of computer implemented games. These challenges can be broadly categorised into the following areas: 'engagement'; 'viralisation' and 'monetisation'.

We will look first at 'engagement', which involves designing game play to be engaging and rewarding to players. This typically requires games to be easily understood at their simplest or introductory levels, providing rewarding game play with even quite simple game mechanics, but becoming progressively more challenging so that players are not bored, but remain engaged and develop rewarding skills Effective engagement requires various forms of feedback to reinforce players' sense of success and accomplishment. Effective engagement can be greatly magnified if the game has a social aspect—for example, it is linked into a social network so that game players can interact with their friends in the social network. The game can then transform into something that goes far beyond a simple solo game experience, into a shared journey.

'Viralisation' requires a game to be include various techniques that encourage players to share the game with others, encouraging them to play the game. It is a key technique in enabling mass-scale distribution or penetration of games. Viralisation can be especially effective when the game is integrated into a social network environment in some manner, so that the game can then propagate through the network of player's friends, and their friends and so on.

'Monetisation' covers those techniques that enable revenue to be generated from a game; this involves many challenges, because the monetisation techniques need to be acceptable to players and in no way undermine engagement.

A successful and original game will requires a team of game designers to solve complex problems of engagement, viralisation and monetisation; this can take many months of skilled work and, not infrequently, a great deal of trial-and-error testing of new ideas, functions and game mechanics before a game successfully combines all these elements into a new experience. The skilled game designer will appreciate that there is an almost infinite number of possible combinations of game features and mechanics available to him—although in isolation, these features may be known, it takes inventive insight to create a combination where there is some synergistic effect, or where the whole is more compelling than the mere sum of its parts.

In this section, we will summarise some of the combinations of features that have made Candy Crush Saga one of the most popular casual, social games in the world.

High Level-Concepts

A gaming system in which functions and features relating to sharing players' game state information, including levels and achievements, on a virtual path (or other virtual world) with that player's social network friends is continuously or regularly optimized for engagement and monetization by continuously or regularly monitoring analysing player behaviour and interaction, such as monetisation.

A gaming system in which a single user database, which may be distributed or centralised, tracks all metrics for all players, including all game state information, irrespective of the platform used by each of those players, and that single user database is accessible by several different games, such as a match 3 switcher and a match 3 clicker, a bubble shooter etc.

A casual, social game connected to a player's friends through a social network, in which every change in the game state, such as every move of a game piece by the user, and every consequential change in every game piece on the game board, is accompanied by sound and/or visual feedback to provide immediate, positive gratification to the player.

A match 3 switcher game, in which players can see their own and also their social network friends' game level position on a virtual path (or other virtual world) and in which game state information is fully sync'd across different platforms, such as iOS, desktop and Android via Facebook, so that a player can seamlessly stop and re-start playing the game on any of those different platforms.

A match 3 switcher game, in which a player's score and game level position and also the scores and game level positions of all their social network friends also playing the game, is fully sync'd across different platforms, such as iOS, desktop and Android via Facebook.

A match 3 switcher game, in which players can see their own and their social network friends' game level position on a virtual path (or other virtual world) and, in which each level of the game can be failed and, if a level is failed, the game automatically offers the player extra moves to purchase, to carry on playing the game.

A match 3 switcher game, in which players can see their own and their social network friends' game level position on a virtual path (or other virtual world), in which in-app purchases are bought for real or virtual currency by touching an icon of the booster shown next to the gameplay board, and then touching a 'buy' button that is subsequently displayed.

A match 3 switcher game, in which a player's score and game level position and also the scores and game level positions of all their social network friends also playing the game, is fully sync'd across different platforms, such as iOS, desktop and Android via Facebook, and there are sections of the game that must be unlocked through either help from those friends or through a purchase.

A match 3 switcher game, connected to a player's friends through a social network, in which friends can send gifts, boosters, extra moves, or extra lives to one another.

A match 3 switcher game, in which players can see their own and social network friends' game level position on a virtual path (or other virtual world) and where a visual prompt is displayed by the game if a friend's high score has been beaten by that player, the prompt enabling the player to send a message to that friend.

A match 3 switcher game, in which players can see their own and also their social network friends' game level position on a virtual path (or other virtual world) and where the player can play the game in offline mode on one platform/device and the progress in the game and other game state information is synchronised with a remote server when the device is online again and the player can continue playing the game on another platform.

A match 3 switcher game, in which players can see their own and their social network friends' game level position on a virtual path (or other virtual world) and the game enables the player to buy a permanent booster which can be used without limit in time.

A match 3 switcher game, in which players can see their own and their social network friends' game level position on a virtual path (or other virtual world), in which successive levels have different difficulty rankings to introduce variety even without a new game mechanic being introduced—e.g. after a difficult level, there is an easier level.

A match 3 switcher game, connected to a player's friends through a social network, where some or all of those friends are sent a message prompting the friend(s) to assist the player once that player has played, but not completed, a level, for more than a predefined time or predefined number of attempts.

A match 3 switcher game, or other kind of social, casual game, in which players can see their own and their social network friends' level position on a virtual path (or other virtual world) and where the player is prompted to notify a social network friend when the friend's high score on a specific level has been beaten by that player.

A match 3 switcher game, in which players can see their own and their social network friends' game level position on a virtual path (or other virtual world), in which the game state information is fully sync'd across different platforms, such as iOS, desktop and Android via Facebook, and, in which the gameplay for each level can be enhanced through the use of an acquired item, such as a booster.

A match 3 switcher game, in which players can see their own and their social network friends' game level position on a virtual path (or other virtual world), in which the game state information is fully sync'd across different platforms, such as iOS, desktop and Android via Facebook, and, in which the gameplay for each level can be enhanced through the use of an acquired item, such as a booster, and where the game state information relating to the acquisition or use of an acquired item is synchronized across several different platforms.

A match 3 switcher game, in which players can see their own and their social network friends' game level position on a virtual path (or other virtual world) and, in which the game board contains switchable elements that can be matched with other switchable elements and switchable elements that cannot be matched with other switchable elements on the game board, where one of the goals for completing a level is to interact with the game board in such a way that a predefined number of non-matchable switchable elements are placed in any of a plurality of predefined areas on the game board, such as being brought down from the top of the gameboard to the bottom.

A match 3 game in which the player has to satisfy multiple criteria within a limited number of moves to complete the level; in which the criteria include at least two of the following:
  reaching a target score
  removing matchable game elements to clear a path for a non-matchable game element to reach a predefined area on the game board
  clear a predefined number of a certain type of game items layered on the game board having a matchable game element, together with each of the layered game items, where each layered game item can be removed by removing a matcheable game element in the same position as the layered game item.

A match 3 switcher game in which a player can purchase on-line a booster to aid gameplay and that booster, once available for use on the player's current platform, can be used immediately and alternatively on any other platform used by the player, and in which game state information for that player, including information relating to use of the booster, is synchronised using a remote server across each of several different devices used by that player.

A casual online game connected to a social network in which players can see their own and their social network friends' game level position on a virtual path (or other virtual world) with nodes representing levels in the game, and each node can reveal, in response to user input, a graphical preview representation of the gameboard for that level and, if the player has played that level before, a visual indication of how well the player succeeded on that level.

A match 3 switcher game in which, after a player has failed to meet the level completion criteria, a message is shown articulating why the level completion criteria was not met, and offering as the only visually significant option to replay the level.

A match 3 switcher game in which, after a player has achieved the level completion criteria, a message is shown articulating that the level was successfully completed, and offering as the only visually significant option to share information to a social network.

A match 3 switcher game in which, when matching 3 or more of the same type of game element the matched game elements are removed from the game board and replaced with a game element from the same type of game elements that has a higher stage, and when including the newly introduced game element in a new combination replacing it with another game element of a further higher stage, when the introduced game element reach a certain stage it is removed and all game elements of the same type on the game board are upgraded one level.

NB Each of the above concepts can be combine with any and all of the other high-level concepts. Also, although the high-level concepts are generally defined in relation to a match 3-switcher game, the concepts can be deployed in other game variants (e.g. clicker games).

Further Concepts

A gaming system in which a single user database, which may be distributed or centralised, tracks all metrics for all players, including all game state information, irrespective of the platform used by each of those players, and that single user database is accessible by several different games, such as a match 3 switcher or clicker, a bubble shooter etc.

A clicker game, in which players can see their own and also their social network friends' game level position on a virtual path (or other virtual world) and in which game state information is fully sync'd across different platforms, such as iOS, desktop and Android via Facebook, so that a player can seamlessly stop and re-start playing the game on any of those different platforms.

A clicker game, in which a player's score and game level position and also the scores and game level positions of all their social network friends also playing the game, is fully sync'd across different platforms, such as iOS, desktop and Android via Facebook.

A clicker game, in which players can see their own and their social network friends' game level position on a virtual path (or other virtual world) and, in which each level of the game can be failed and, if a level is failed, the game automatically offers the player extra moves to purchase, to carry on playing the game.

A clicker game, in which players can see their own and their social network friends' game level position on a virtual path (or other virtual world), in which in-app purchases are bought for real or virtual currency by touching an icon of the booster shown next to the gameplay board, and then touching a 'buy' button that is subsequently displayed.

A clicker game, in which a player's score and game level position and also the scores and game level positions of all their social network friends also playing the game, is fully sync'd across different platforms, such as iOS, desktop and Android via Facebook, and there are sections of the game that must be unlocked through either help from those friends or through a purchase.

A clicker game, connected to a player's friends through a social network, in which friends can send gifts, boosters, extra moves, or extra lives to one another.

A clicker game, in which players can see their own and social network friends' game level position on a virtual path (or other virtual world) and where a visual prompt is displayed by the game if a friend's high score has been beaten by that player, the prompt enabling the player to send a message to that friend.

A clicker game, in which players can see their own and also their social network friends' game level position on a virtual path (or other virtual world) and where the player can play the game in offline mode on one platform/device and the progress in the game and other game state information is synchronised with a remote server when the device is online again and the player can continue playing the game on another platform.

A clicker game, in which players can see their own and their social network friends' game level position on a virtual path (or other virtual world) and the game enables the player to buy a permanent booster which can be used without limit in time.

A clicker game, in which players can see their own and their social network friends' game level position on a virtual path (or other virtual world), in which successive levels have different difficulty rankings to introduce variety even without a new game mechanic being introduced—e.g. after a difficult level, there is an easier level.

A clicker game, connected to a player's friends through a social network, where some or all of those friends are sent a message prompting the friend(s) to assist the player once that player has played, but not completed, a level, for more than a predefined time or predefined number of attempts.

A clicker game, or other kind of social, casual game, in which players can see their own and their social network friends' level position on a virtual path (or other virtual world)

and where the player is prompted to notify a social network friend when the friend's high score on a specific level has been beaten by that player.

A clicker game, in which players can see their own and their social network friends' game level position on a virtual path (or other virtual world), in which the game state information is fully sync'd across different platforms, such as iOS, desktop and Android via Facebook, and, in which the gameplay for each level can be enhanced through the use of an acquired item, such as a booster.

A clicker game, in which players can see their own and their social network friends' game level position on a virtual path (or other virtual world), in which the game state information is fully sync'd across different platforms, such as iOS, desktop and Android via Facebook, and, in which the gameplay for each level can be enhanced through the use of an acquired item, such as a booster, and where the game state information relating to the acquisition or use of an acquired item is synchronized across several different platforms.

A clicker game, in which players can see their own and their social network friends' game level position on a virtual path (or other virtual world) and, in which the game board contains switchable elements that can be matched with other switchable elements and switchable elements that cannot be matched with other switchable elements on the game board, where one of the goals for completing a level is to interact with the game board in such a way that a predefined number of non-matchable switchable elements are placed in any of a plurality of predefined areas on the game board, such as being brought down from the top of the gameboard to the bottom.

A clicker game in which the player has to satisfy multiple criteria within a limited number of moves to complete the level; in which the criteria include at least two of the following:
  reaching a target score
  removing matchable game elements to clear a path for a non-matchable game element to reach a predefined area on the game board
  clear a predefined number of a certain type of game items layered on the game board having a matchable game element, together with each of the layered game items, where each layered game item can be removed by removing a matcheable game element in the same position as the layered game item.

A clicker game in which a player can purchase on-line a booster to aid gameplay and that booster, once available for use on the player's current platform, can be used immediately and alternatively on any other platform used by the player, and in which game state information for that player, including information relating to use of the booster, is synchronised using a remote server across each of several different devices used by that player.

A clicker game in which, after a player has failed to meet the level completion criteria, a message is shown articulating why the level completion criteria was not met, and offering as the only visually significant option to replay the level.

A clicker game in which, after a player has achieved the level completion criteria, a message is shown articulating that the level was successfully completed, and offering as the only visually significant option to share information to a social network.

A clicker game in which, when removing a group of game elements of the same type of game element the matched game elements are removed from the game board and replaced with a game element from the same type of game elements that has a higher stage, and when including the newly introduced game element in a new combination of removed game elements replacing it with another game element of a further higher stage, when the introduced game element reach a certain stage it is removed from the game board and all other game elements of the same type on the game board are upgraded one level.

NB Each of the above concepts can be combine with any and all of the other high-level concepts. Also, although the high-level concepts are generally defined in relation to a specific type of game match 3-switcher game, the concepts can be deployed in other game variants (e.g. clicker games, match 3-switcher games, bubble shooter games, puzzle games).

Key Features Shared Across all High-Level Concepts

Candies are the game pieces that are used in the match 3 switcher game Candies are shiny, reflective, brightly coloured candies, but the background gameplay region is dark and matt, so the candies readily stand out, reducing cognitive load.

Some or all game levels are untimed, eliminating any time pressure; (e.g. because a player can seamlessly stop and re-start playing the game at any time since game state information is stored, e.g. remotely and/or on the playing device)

Some or all levels have a true fail (which enables monetization through purchasing extra moves; true fails in casual games are rare because the assumption to the designer is that it will put people off playing the game; allowing players to continue playing manipulates the fail condition to make it feel agreeable).

Virtual path is through a candy-themed fantasy map

Continuous musical soundtrack plays during gameplay

Game generates and displays congratulatory messages when the player scores more than a predefined amount, or matches more than a predefined number of game elements, in a single move Failing a level is accompanied with a soothing, whistling soundtrack There is always an available match-3 switcher move, readily seen by the average player, that will score some points, whilst higher scoring moves are randomly available.

Games are played using software downloaded to an end-user device such as a smartphone, tablet, PC or laptop, or running remotely on a server, or a combination of the two, the software running on one or more processors, and the processor controls or is involved with all gameplay, game interaction, graphics displays, communication, interaction with social networks, synchronization across platforms, data storage, game state information.

Games are played using a hardware gaming system comprising processors and data memories, the system including multiple end-user devices, such as smartphones, tablets and PCs, as well as remotely connected servers, the gaming system enabling the games defined above to be played on the multiple end-user devices.

The game is defined using non-transitory computer readable medium encoded with instructions for controlling a hardware gaming system to display and enable users to play the games defined above.

Other Concepts

A match 3-game, fully sync'd across platforms, having an algorithm for automatically detecting when there are no possible moves left.

A match 3-game, fully sync'd across platforms, having an algorithm for re-shuffling the elements on the game board.

A switcher-based match 3-game fully sync'd a cross platforms, having sections which must be unlocked with the help of friends or through a purchase.

A switcher-based match 3-game, fully sync'd across platforms with at least 3-5 different goals for completing different levels.

A switcher-based match 3-game, fully sync'd across platforms, having a limited amount of lives that can be replenished either by waiting or by purchasing new lives.

A switcher-based match 3-game fully sync'd across different platforms.

A match-3 switcher game that offers users to buy permanent boosters which can be accessed one or more times for each time playing a level or once a day.

A match-3 switcher game which is connected to the player's friends through a social network and where friends can send gifts to each other.

A match-3 switcher game which is connected to the player's friends through a social network and where friends can help each other by sending extra moves or extra lives.

A match-3 switcher game which is connected to the player's friends through a social network and where friends can help each other by sending various boosters and where the help sent can only be used on the level the player is stuck on.

A match-3 game that has a sign in the shape of a bow tie or ribbon next to those level nodes on the visual path where help from the player's friends.

A match-3 game where there are six standard game elements to switch in the shape of candies.

A match-3 switcher game where the player's Facebook portrait moves along a virtual path when progressing through the game.

A match-3 game where there is a map showing the progress of the player and where the map looks like a foldable physical game board which has been place on top of a table.

A match-3 game where the player moves along a virtual path and where the path moves through different candy themed areas and where each area has its own sub-story with an intro and an end when entering and exiting each area respectively.

The switch-based match 3 game, comprising a special game element, which, variable in its character, can be automatically moved and combined with other game elements into a match combo, or is locked in the blocker that is required to be unlocked first.

The switch-based match 3 game, comprising a special game element, which, variable in its character, can remain as the same special game element after combinable moves are taken.

The switch-based match 3 game, comprising a special game element, which, variable in its character, can transform into a random game element that can either yield a combo to remove the game elements or yield an obstacle to block the combo, depending on the game elements it combined with.

The switch-based match 3 game, comprising a special game element, which can transform into another special game element that, when combined with other game elements, yields a special combo effect to remove all the game elements in a row and/or column, or a bigger area more than a layer.

The switch-based match 3 game, comprising a special game element, which can transform into another special game element that, when combined with other game elements, yields a special combo effect to remove game elements of the same colour.

The switch-based match 3 game, comprising a special game element, which can transform into another special game element that is not playable or movable unless it is unlocked first.

The switch-based match 3 game, comprising a special game element, which can transform into another special game element that, consume other game elements so that they are not playable or movable.

The switch-based match 3 game, comprising special boosters, which can be obtainable free of charge.

The booster element can be obtainable free of charge by installing the game at a different platform, e.g. iPad.

The booster can be obtainable free of charge by seeking help from social network friends.

The switch-based match 3 game, comprising special boosters, which are purchasable before or during the game level.

The switch-based match 3 game, comprising special boosters, which can smash and remove any game element.

The switch-based match 3 game, comprising special boosters, which allow the game element to switch if no any combinable move on the game board is available.

The switch-based match 3 game, comprising special boosters, which allow different special game elements to exist at the start of the game level.

The switch-based match 3 game, comprising special boosters, which add five to the count of the time-counting in-game elements on the game board.

The switch-based match 3 game, comprising special boosters, which rolls over an area on the game board by transforming into striped game element and creates three line blasts.

The switch-based match 3 game, comprising special boosters, which, following its path, can chomp away any game elements and have them removed at several squares.

The switch-based match 3 game, comprising special boosters, which more than one can be mixed or combined from a certain game level.

A match 3 switcher game, in which players can see their social network friends' level position on a virtual path and where the player can play the game in offline mode on one platform/device and the progress in the game is synchronised with a central server when the device is online again and the player can continue playing the game on another platform.

A casual online game connected to a social network where social network friends are prompted to assist another player if that other player has played, but not completed, a level meeting a certain criteria; the criteria can be any of the following
　the player has played the level a predefined number of times
　a predefined time has passed since the player first played the level A casual online game connected to a social network where social network friends are prompted to assist another player if that other player has played, but not completed, a level meeting a certain criteria, the help received can only be used by the player on that specific level.

A method for displaying score in a virtual game, comprising:
　Measuring the score a player receives while playing a game; and
　Visually representing an indication of how this score relates to one or multiple pre-defined goals;
　Gathering information about the high scores of different players of the game level; and
　Comparing the current score of the player, the previous high score of the player and the high scores of other players; and
　During the play of the game, visually representing the difference between the current score, the different high scores and the pre-defined goals.

Although these ideas are generally defined in relation to a match 3-switcher game, the ideas can be deployed in other game variants (e.g. clicker games etc).

Further Features
  Short feature name
  Match 3 game
  Match 4 for a special item
  Match 5 for a special item
  Combine special items for an explosion that clears candies
  Items are candies
  Six standard candies with different appearance
  Shiny, reflective, brightly coloured candies; but background is matt
  If the player doesn't make a move for a pre-set time, then a possible match-3 combination of candies is shown, with each candy briefly illuminated or otherwise highlighted.

Continuous Musical Soundtrack
  If 4 candies are combined, then a striped candy results; combining that striped candy into a match-3 combination removes all candies in the stripe direction for the row or column of the striped candy
  The direction of the stripes of a striped candy is perpendicular to the combination that created the striped candy
  The column and line that are removed are determined by the crossing point (the cell) in which the combination is made
  If 5 candies are combined in a line, then a special candy results; subsequently switching that special candy with an adjacent candy of a given colour then removes all candies on the board in that colour.
  If the special game element that removes all game elements of one colour is combined with a striped candy then all candies of the striped candy's colour becomes triggered striped candies
  If the special game element that removes all game elements of one colour is combined with another identical special game element then all game element son the game board are removed in a sweeping motion from left to right.
  Removing game elements through combinations or special game elements only removes one 'layer'.
  Some special game elements or combinations of regular game elements remove more than one 'layer'
  Some elements on the game board can only be removed if an adjacent game element is removed.
  Some elements 'consume' other game elements so that they are not playable or moveable.
    Can only consume/move if there is a game element in an adjacent cell on the game board
  Some elements 'consume' other game elements so that they are not playable or moveable—they appear after
    Time
    Number of moves
    Number of moves that have not performed a specific action
  Some elements 'consume' other game elements so that they are not playable or moveable
    These game elements consume other game elements in a hierarchy: 1) Regular game elements, 2) special game elements
  Some special game elements can be swapped normally, which later transforms into a random game element that can be either a positive element or an obstacle.
    Positive: e.g. a striped game element, a wrapped game element, a colour bomb, a fish, a lucky candy which can transform into useful element when removed, etc.
    Negative: e.g. a piece of chocolate, (which, if left unchecked, will spread), a chocolate factory, a piece of liquorice, a piece of cream of random "thickness", etc.
  Congratulatory words on screen and spoken after good gameplay
  Levels are timed
  Levels are not timed
  Levels contain non-combinable game elements that shall be moved to the last row on the screen where they disappear in order to complete the game.
  All non-combinable game elements to be moved are on the game board at the start
  All non-combinable game elements to be moved are not on the game board at the start and will be introduced during the gameplay when other game elements are removed
  The method on how the non-combinable game elements are introduced on to the game board
  Remove a certain number of some or all of the available types of matchable game elements on the game board to complete the level.
  The sequence of game elements is re-arranged (instead of "level failed") with the current elements on the board when no combinable moves are available during the level.

Blockers
  Jelly
  Expanding Chocolate blocker
  Frosting blocker
  1 Layer Frosting
  2 Layers Frosting
  3 Layers Frosting
  4 Layers Frosting
  5 Layers Frosting
  Liquorice blocker
  Locked objects blocker
  Candy Cannon
  Chocolate fountain
  Marmalade
  Bomb (countdown bomb—one in each colour)
  Walls
  Net Boosters (not Described Elsewhere)
  Free Switch
  Shuffle
  Bomb Cooler
  Sweet Teeth
  Coconut liquorice
  Free switcher hand
  Paintbrush
  Frozen clock charm
  +3 Heart charm
  Mix paper bag
  Booster fish
  Booster 5 switch
  Bubble-gum Troll Other in-Game Elements
  Mystery Candy—One in each colour
  Lucky Candy—One in each colour
  Fish—One in each colour
    Regular
    Wrapped
    Polka
  Wrapped fish—One in each colour
  Polka fish—One in each colour
  Black Metal Candy
  Time Bomb Maker
  A part of the game board that moves a game element that passes through it to a different part on the game board
  Levels can be completed in under 80 moves
  Each level has a true fail, giving player option to play that level again Failing a level is accompanied with a soothing whistling soundtrack Succeeding at a level moves the user one step along a virtual path The virtual path is set on a candy themed fantasy map which has the appearance of a physical game board that is foldable and placed on top of a table.

Moving along the virtual path transports the player through different themed landscapes/areas and when entering a new landscape a sub-story begins which then ends when that landscape has been progressed through.

On the virtual path there are level nodes representing each level. The level nodes have a specific look depending on what type of goal the level they represent has.

Shown on all levels

Shown on all unlocked levels

Each node can reveal a preview thumbnail of the level

The thumbnail can show how well the player has succeeded on that level before (stars, points, place in high score list)

Game Life

The maximum game life is set (5 times). The player will lose a life if fails a level.

1. Players automatically gain one game life every 30 minutes free of charge.

2. Chance of purchasing game life is provided if no game life is available.

3. Seek friends' help is possible through social network Facebook. Players may send requests for more lives by clicking the icon on the screen, which will launch a Facebook pop-up that allows the player to select friends individually.

4. A special method of adding game life is to purchase the Charm of Life from which the player may increase number of maximum lives from five to eight. The change of default life time can be permanent through a full refill Charm of life.

Players can see their social network friends' position on the virtual path

Players can see their social network friends' scores for a level, e.g. when they complete that level Players can see their social network friends' scores for the same level they are currently playing on the star meter together with their friends' portrait Players can post their results for a level on their Facebook wall The player is prompted to post a message/on the wall of a friend that is passed in the high score list The player is presented with the option o texted the play on the level (more moves or time) to beat one of the friends in that level.

Can be triggered by that the player is within a threshold of the friend's score on that level Players can see the full extent of the virtual path Number of levels in the path is being increased by the game designer every few days or weeks Every interaction is accompanied with sound and a visual feedback When a level is failed, the player is offered extra moves to purchase The player can buy in-app boosters and charms to help with the current level Boosters can be bought before a level Boosters can be bought during a level There is a booster that lets the player switch two game elements that do not match There is a booster that gives additional time for the player to complete a timed level Coconut Wheel, a booster that rolls over an area on the game board by transforming into striped game element and creates (3) line blasts The method to define where the coconut wheel is to roll (if that is not defined by the user)

A booster that instantly gives 5 extra moves

A booster that inserts special elements (jelly fishes) on the game board which clears three pieces of jelly when matched A booster that lets the player start a level with a colour bomb three times A booster that lets the player start a level with one bomb and one lineblast 3 times Lollipop booster: A booster that may smash and remove any game element Stripe & wrap booster: A booster that gives a striped game element and a wrapped game element at the beginning of the game.

Shuffle Candy: A booster that allows to shuffle the game element on the board if no any good move is available.

Bomb Cooler booster: A booster that adds five to the count of all the visible bombs on the game board Boosters can be permanent and available to the player for all levels or they can be non-permanent and need to be topped-up through purchases or help from friends The player can choose to use boosters both before starting a level and during the play of a level.

In-app purchases are bought by touching an icon of the booster shown next to the gameplay board, and then touching a 'buy' button that is subsequently displayed At some levels, the player may ask friends from her social network to help Social network friends can provide a player with boosters and extra moves Social network friends are prompted to help out if the player has been 'stuck' on a level for a specified time without completing the level.

The received help can only be used for that specific level where the player has been stuck The player can receive help from several friends (can in different implementations use help from several friends or only from one friend)

Social network friends are prompted to help out if the player has played a level a certain number of times without completing the level.

Social network friends are prompted to help if the player has run out of game life and wish to continue the game.

The help that can be sent to a stuck friend can be extra moves to be used for free in that specific level That the player has received from a friend is indicated on the overview map in relation to the level where the help can be used In one implementations if the player has completed the level using the help from a specific friend a 'thank you' message is sent to the helping friend.

That message can be an item of value

The message can be a message only

The helping friend can get another benefit

The helping friend can get recognition

A player that is stuck can 'buy' himself past that level with help from friends—receiving help/unlocking from a plurality of friends gets the player past the level.

All levels require the player to combine candies in various combinations

Successive levels can have different difficulty rankings—e.g. after a tough level, there is an easy level.

Goal for successive levels may change—e.g. one level may require the player to clear all the jellies, and the next may require the player to bring down all the special non-candy foods. Or successive levels may require jellies to be cleared, but have very different shapes of the gameboard and blockers.

A goal may be to collect, by making combos, a certain amount of candies, special candies or specific combos in order to complete a level.

Fully sync'd across iOS, desktop and Android via Facebook.

Some levels are designed to be exceptionally difficult to succeed at through skill alone.

Game is free to play, but in-game purchases can be made for boosters/charms to help gameplay.

The tutorial of the game spans over the first six levels.

The game board's grid has a maximum size of 9×9.

The invention claimed is:

1. A computer implemented method for enabling computer game graphics for a casual, social game displayed on a display of a first computing device to be synchronized across different platforms, comprising executing on one or more processors the steps of:
   preserving game state information, said preserved game state information enabling a remote server system to identify a player and aspects of a state of the game they are playing, so that the player can end game play on the first computing device and resume, from the first computing device and also from a second computing device at a later time, at the same state, said first computing device and said second computing device being supported by different platforms, wherein said game state information is synchronized across said different platforms;
   displaying game progress information of said player of the first computing device on the display, said game progress information of said player comprising a game level position shown on a virtual path or other virtual world on said display, said game state information comprising said game level position;
   displaying game progress information of a social network contact of the player of the first computing device on the display of the first computing device, said game progress information of said social network contact comprising a game level position shown on the virtual path or other virtual world on the display of the first computing device; and
   causing said game to be played and an item to be acquired by playing said game, said game state information comprising information relating to said acquired item.

2. The method of claim 1 in which the game state information defines all previously completed levels.

3. The method of claim 1 in which the game state information defines all previously completed levels, plus the current state of playing a level.

4. The method of claim 1 in which the game state information defines all boosters, charms or other in-game assistance acquired.

5. The method of claim 1 in which the game state information defines all boosters, charms or other in-game assistance acquired but not paid for using any form of currency.

6. The method of claim 1 in which the casual, social game is a clicker, switcher or shooter game.

7. The method of claim 1 in which the second device is a different type of device, so that the player can move seamlessly between playing the game on a smartphone as the first device and on a tablet as a second device.

8. The method of claim 1, further comprising fully synchronizing the game state information across different types of computing platform, wherein said player can seamlessly stop and re-start playing the game on any of those different platforms.

9. The method of claim 1, further comprising identifying via a remote server system said player because that player has accessed the game through a social network.

10. The method of claim 9, further comprising fully synchronizing across different platforms via the social network said player's score and game level position and the scores and game level positions of all the social network contacts of said player also playing the game.

11. The method of claim 1, further comprising downloading said casual, social game as an app to said first computing device, said first computing device being at least one of: a smartphone and tablet computer, wherein said first computing device can be accessed or played using a social network application or environment.

12. The method of claim 1, further comprising, for every change in the game state, and every consequential change in every game piece on the game board, providing audio and visual feedback.

13. The method of claim 1, further comprising tracking at a single user database, all metrics for all players of the casual, social game, said metrics, including all game state information wherein said single user database is accessible by several different games.

14. The method of claim 10, wherein there are sections of the game that are unlockable only through either: help from said contacts or a purchase.

15. A computing device adapted to play a computer game, the device including a processor, a memory, a display, a touch screen or a cursor based input device, and computer code stored in device memory or on a remote server and executable by the device processor or a remote processor, and in which the computer code generates computer game graphics for the display on the device,
   and in which the processor(s) execute steps to:
   preserve game state information, said preserved game state information enabling a remote server system to identify a player and aspects of a state of the game they are playing, so that the player can end game play on the first computing device and resume, from the first computing device and also from a second computing device at a later time, at the same state,
   said first computing device and said second computing device being supported by different platforms, wherein said game state information is synchronized across said different platforms;
   display game progress information of said player of the first computing device on the display, said game progress information of said player comprising a game level position shown on a virtual path or other virtual world on said display, said game state information comprising said game level position;
   display game progress information of a social network contact of the player of the first computing device on the display of the first computing device, said game progress information of said social network contact comprising a game level position shown on the virtual path or other virtual world on the display of the first computing device;
   cause said game to be played and an item to be acquired by playing said game, said game state information comprising information relating to said acquired item.

16. A non-transitory computer readable medium encoded with instructions which when executed on a processor perform a method for controlling a computer system to enable a display of a game on a display of a first computing device to be synchronized across different platforms, said method comprising executing on the processor the steps of:
- preserving game state information, said preserved game state information enabling a remote server system to identify a player and aspects of a state of the game they are playing, so that the player can end game play on the first computing device and resume, from the first computing device and also from a second computing device at a later time, at the same state,
- said first computing device and said second computing device being supported by different platforms, wherein said game state information is synchronized across said different platforms;
- displaying game progress information of said player of the first computing device on the display, said game progress information of said player comprising a game level position shown on a virtual path or other virtual world on said display, said game state information comprising said game level position;
- displaying game progress information of a social network contact of the player of the first computing device on the display of the first computing device, said game progress information of said social network contact comprising a game level position shown on the virtual path or other virtual world on the display of the first computing device; and
- causing said game to be played and an item to be acquired by playing said game, said game state information comprising information relating to said acquired item.

17. A computer implemented method for enabling computer game graphics for a casual, social game displayed on a display of a first computing device to be synchronized across different platforms, comprising executing on one or more processors the steps of:
- preserving game state information, said preserved game state information enabling a remote server system to identify a player and aspects of a state of a game they are playing, so that the player can end game play on the first computing device and resume, from the first computing device and also from a second computing device at a later time, at the same state, said first computing device and said second computing device being supporting by different platforms;
- displaying game progress information of said player of the first computing device on the display, said game progress information of said player comprising a game level position shown on a virtual path or other virtual world on said display, said game state information comprising said game level position;
- displaying game progress information of a social network contact of the player of the first computing device on the display of the first computing device, said game progress information of said social network contact comprising a game level position shown on the virtual path or other virtual world on the display of the first computing device;
- causing the game to played when the computer device is not connected to the internet; and
- when the computer device is connected to the internet, synchronizing the progress in the game and other game state information with a remote server.

18. A computing device adapted to play a computer game, the device including a processor, a memory, a display, a touch screen or a cursor based input device, and computer code stored in device memory or on a remote server and executable by the device processor or a remote processor, and in which the computer code generates computer game graphics for the display on the device, and in which the processor(s) execute steps to:
- preserve game state information, said preserved game state information enabling a remote server system to identify a player and aspects of a state of a game they are playing, so that the player can end game play on the first computing device and resume, from the first computing device and also from a second computing device at a later time, at the same state, said first computing device and said second computing device being supported by different platforms, wherein said game state information is synchronized across said different platforms;
- display game progress information of said player of the first computing device on the display, said game progress information of said player comprising a game level position shown on a virtual path or other virtual world on said display, said game state information comprising said game level position;
- display game progress information of a social network contact of the player of the first computing device on the display of the first computing device, said game progress information of said social network contact comprising a game level position shown on the virtual path or other virtual world on the display of the first computing device;
- cause the game to played when the computer device is not connected to the internet; and
- when the computer device is connected to the internet, synchronizing the progress in the game and other game state information with a remote server.

19. A non-transitory computer readable medium encoded with instructions which when executed on a processor perform a method for controlling a computer system to enable a display of a game on a display of a first computing device to be synchronized across different platforms, said method comprising executing on the processor the steps of:
- preserving game state information, said preserved game state information enabling a remote server system to identify a player and aspects of a state of a game they are playing, so that the player can end game play on the first computing device and resume, from the first computing device and also from a second computing device at a later time, at the same state, said first computing device and said second computing device being supported by different platforms, wherein said game state information is synchronized across said different platforms;
- displaying game progress information of said player of the first computing device on the display, said game progress information of said player comprising a game level position shown on a virtual path or other virtual world on said display, said game state information comprising said game level position;
- displaying game progress information of a social network contact of the player of the first computing device on the display of the first computing device, said game progress information of said social network contact comprising a game level position shown on the virtual path or other virtual world on the display of the first computing device;
- causing the game to played when the computer device is not connected to the internet; and
- when the computer device is connected to the internet, synchronize the progress in the game and other game state information with a remote server.

* * * * *